(12) United States Patent
Abdollahian et al.

(10) Patent No.: US 10,691,330 B2
(45) Date of Patent: Jun. 23, 2020

(54) DEVICE, METHOD, AND GRAPHICAL USER INTERFACE FOR FORCE-SENSITIVE GESTURES ON THE BACK OF A DEVICE

(71) Applicant: Apple Inc., Cupertino, CA (US)

(72) Inventors: Golnaz Abdollahian, San Francisco, CA (US); Wayne C. Westerman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 58 days.

(21) Appl. No.: 15/691,705

(22) Filed: Aug. 30, 2017

(65) Prior Publication Data

US 2018/0088793 A1   Mar. 29, 2018

Related U.S. Application Data

(60) Provisional application No. 62/399,308, filed on Sep. 23, 2016.

(51) Int. Cl.
*G06F 3/0488* (2013.01)
*G06F 1/16* (2006.01)
(Continued)

(52) U.S. Cl.
CPC ........ *G06F 3/04883* (2013.01); *G06F 1/1626* (2013.01); *G06F 3/0483* (2013.01);
(Continued)

(58) Field of Classification Search
CPC .................................................. G06F 3/0488
See application file for complete search history.

(56) References Cited

U.S. PATENT DOCUMENTS

2014/0351696 A1* 11/2014 Singhal ................... G06F 17/21
2016/0026375 A1*  1/2016 Wu et al. ............... G06F 3/0484
(Continued)

FOREIGN PATENT DOCUMENTS

WO   WO/2015/098061 A1   7/2015

OTHER PUBLICATIONS

International Search Report and Written Opinion, dated Dec. 19, 2017, received in International Patent Application No. PCT/US2017/049644, which corresponds with U.S. Appl. No. 15/691,705, 11 pages.

*Primary Examiner* — James J Debrow
(74) *Attorney, Agent, or Firm* — Morgan, Lewis & Bockius LLP

(57) ABSTRACT

An electronic device with a front side including a touch-sensitive display, a back side that does not include a display, and sensor(s) to detect contact intensities on the front and back side displays, on the touch-sensitive display, a user interface including objects. While displaying the user interface, the device detects an input on a side of the electronic device. In response, for a front side input with intensity that meets first criteria, the device performs a first operation corresponding to a first object; for front side input with intensity that meets second criteria, the device performs a second operation corresponding to the first object; for back side input with intensity that meets third criteria, the device performs a third operation that changes the user interface; and for back side input with intensity that does not meet the third criteria, the device maintains display of the user interface.

49 Claims, 87 Drawing Sheets

(51) Int. Cl.
*G06F 3/0483* (2013.01)
*H04B 1/3827* (2015.01)
*G06F 3/0482* (2013.01)

(52) U.S. Cl.
CPC ....... *G06F 3/04886* (2013.01); *H04B 1/3827* (2013.01); *G06F 3/0482* (2013.01); *G06F 2203/04803* (2013.01)

(56) References Cited

U.S. PATENT DOCUMENTS

2016/0041965 A1* 2/2016 Ghassabian ............. G06F 17/27
2017/0017388 A1* 1/2017 Heo et al. ............. G06F 3/0488
2017/0038893 A1* 2/2017 Takeda .................. G06F 3/0416

* cited by examiner

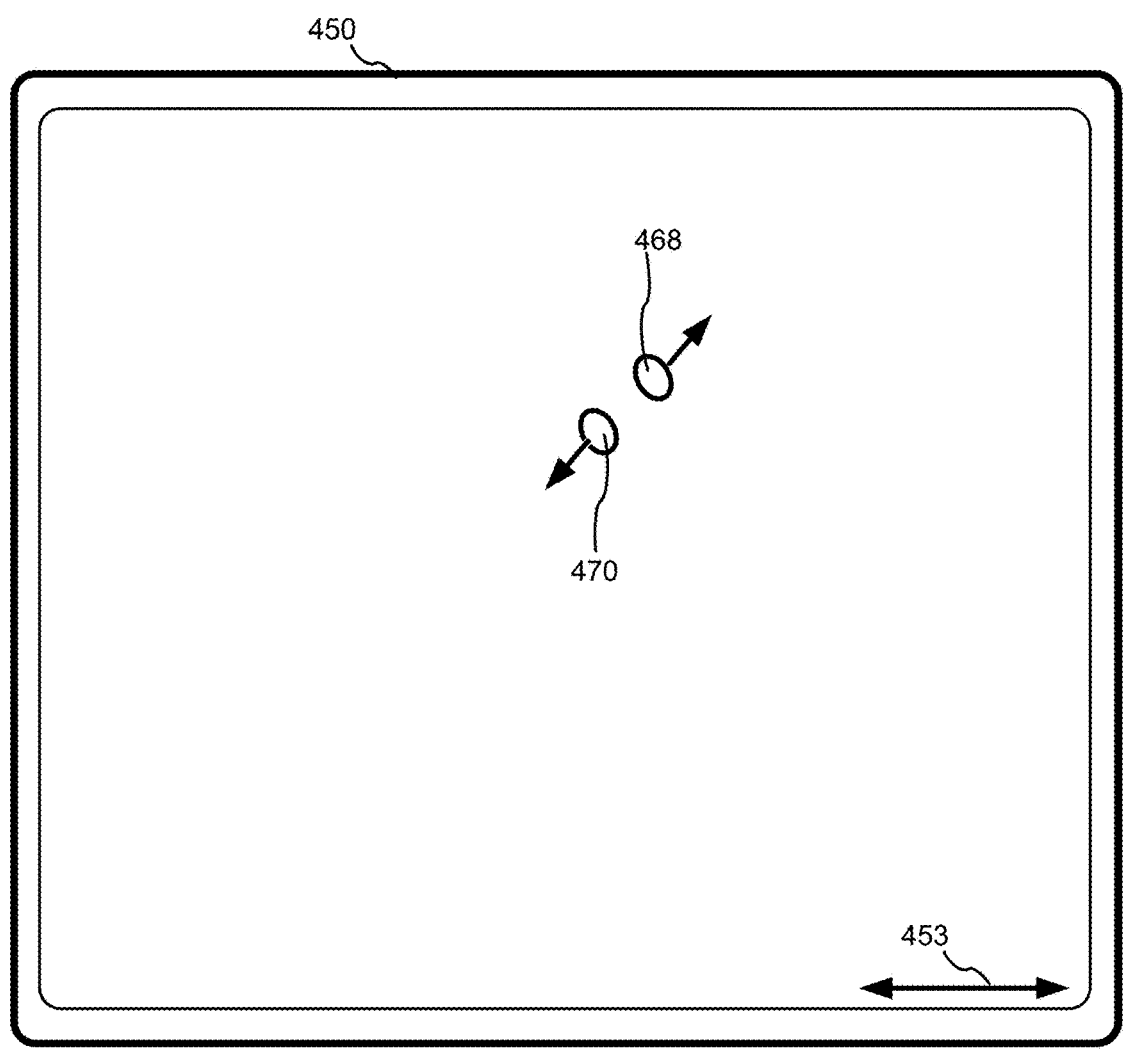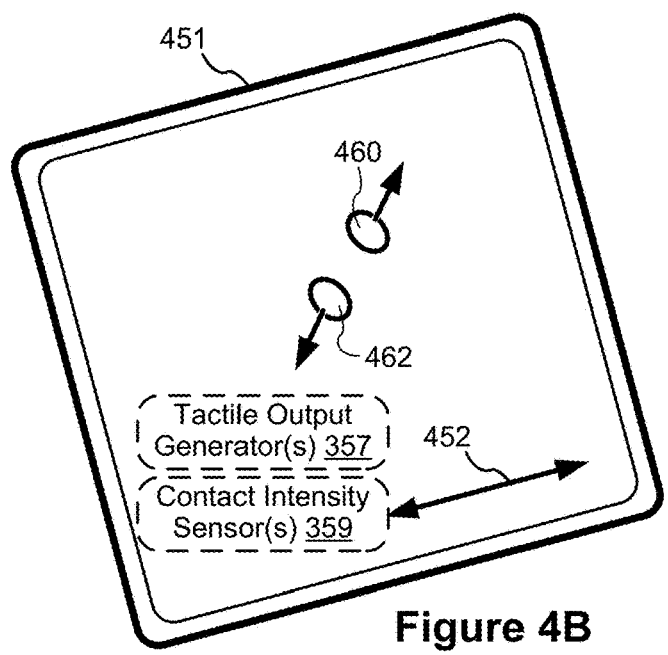
Figure 4B

900

902
Display, on the touch-sensitive display, a user interface that includes a plurality of objects

904
While displaying the user interface, detect an input on a side of the electronic device

906
In response to detecting the input on the side of the electronic device:

908
In accordance with a determination that the input is detected on the front side of the electronic device and meets first response criteria, perform a first operation that corresponds to a first object, in the plurality of objects, at a location of the input, wherein the first response criteria require that a characteristic intensity of the input meet a first intensity threshold in order for the criteria to be met

910
In accordance with a determination that the input is detected on the front side of the electronic device and meets second response criteria, perform a second operation, different from the first operation, that corresponds to the first object at the location of the input, wherein the second response criteria do not require that the characteristic intensity of the input meet the first intensity threshold for the criteria to be met

906
In response to detecting the input on the side of the electronic device:

912
In accordance with a determination that the input is detected on the back side of the electronic device and meets third response criteria, perform a third operation, wherein: the third operation is different from the first operation and the second operation; the third operation changes the displayed user interface; the change in the displayed user interface does not correspond to interaction with just a single object in the plurality of objects; and the third response criteria include a criterion that is met when a characteristic intensity of the input is above a third intensity threshold

914
In accordance with a determination that the input is on the back side of the device and does not meet the third response criteria, maintain display of the user interface that includes the plurality of objects

916
Performing the third operation includes changing the user interface dynamically as the intensity of the input increases

918
Performing the second operation includes activating a media control; and performing the third operation includes hiding a set of one or more media controls

920
In response to detecting a second input while the set of one or more media controls are hidden: in accordance with a determination that the second input is on the back side of the device and the second input meets the third response criteria, redisplay the set of one or more media controls

922
Performing the first operation includes performing a first map application operation; performing the second operation includes performing a second map application operation that is different from the first map application operation; and performing the third operation includes performing a third map application operation that is different from the first map application operation and the second map operation

924
The first object corresponds to a point of interest in a map; the first map application operation includes displaying a menu for the map; the second map application operation includes displaying information about the point of interest; and the third map application operation includes tilting the map

---

926
Performing the first operation includes performing a first keyboard operation; and performing the third operation includes performing a second keyboard operation

928
The first object corresponds to a key in an unsplit keyboard; the first keyboard operation includes selecting the key in the unsplit keyboard; and the second keyboard operation includes displaying a split keyboard

930
The first object corresponds to a key in a displayed keyboard; the first keyboard operation includes selecting the key in the displayed keyboard; and the second keyboard operation includes ceasing to display the keyboard

932
Performing the second operation includes changing an appearance of the keyboard to indicate that the electronic device is operating in a text selection mode of operation, wherein changing the appearance of the keyboard includes obscuring an appearance of characters on keys of the keyboard

934
The first object corresponds to first content in a view of an application; the first operation includes displaying a preview of second content; the second operation includes navigating from the first content to the second content in the view of the application; and the third operation includes displaying multiple views

936
The multiple views include views of multiple applications

938
The multiple views include views of representations of webpages in a single application

940
In response to detecting a second input while displaying the multiple views: in accordance with a determination that the second input is on the back side of the electronic device and the second input meets fourth response criteria, navigate through the multiple views

942
A speed of navigating through the multiple views varies in accordance with a characteristic intensity of a contact in the second input

944
Navigating through the multiple views includes changing from primarily displaying a first view of the multiple views to primarily displaying a second view of the multiple views; and the method includes: determining a location on the back side of the device at which the second input is received; in accordance with a determination that the location corresponds to a first location on the back side of the device, the second view of the multiple views is a next view relative to the first view; and in accordance with a determination that the location corresponds to a second location on the back side of the device, the second view of the multiple views is a previous view relative to the first view

946
The first object corresponds to first content in a view of an application; the first operation includes displaying a preview of second content; the second operation includes navigating from the first content to the second content in the view of the application; and the third operation includes displaying multiple views 948
In response to detecting a second input while displaying the multiple views: in accordance with a determination that the second input is on the back side of the electronic device and the second input meets fifth response criteria, navigate from a first view to an adjacent view in the multiple views 950
In response to detecting a second input while displaying the multiple views: in accordance with a determination that the second input includes a first contact on a first half of the back side of the electronic device and a second contact on a second half of the back side of the electronic device, and the second input meets sixth response criteria, replace display of the multiple views with a currently selected view of the multiple views

952
The first object corresponds to a portion of text on a first page of a document; performing the first operation includes displaying a preview that corresponds to the portion of the text; performing the second operation includes selecting the portion of the text; and performing the third operation includes navigating from the first page of the document to a second page of the document

954
Navigating from the first page of the document to the second page of the document includes: determining a location on the back side of the electronic device at which the input is received; in accordance with a determination that the location corresponds to a first location on the back side of the electronic device, the second page of the document is a page of the document that precedes the first page of the document; and in accordance with a determination that the location corresponds to a second location on the back side of the electronic device, the second page of the document is a page of the document that follows the first page of the document.

956
A speed of navigating from the first page of the document to the second page of the document varies in accordance with the characteristic intensity of a contact in the input

958
In response to detecting a second input while displaying the second page of the document: in accordance with a determination that the second input is on the back side of the electronic device and the second input meets sixth response criteria, navigate from the second page of the document to an adjacent page

960
The back side of the electronic device does not have a touch-sensitive surface, and the electronic device is not configured to detect a location of an input on the back side of the electronic device

962
At least one sensor that is configured to detect intensities of inputs on the front side of the device is also configured to detect intensities of inputs on the back side of the device

---

964
in accordance with a determination that the input is detected on the back side of the electronic device and meets fourth response criteria, perform a fourth operation, wherein: the fourth operation is different from the first operation, the second operation, and the third operation; the fourth operation changes the displayed user interface; the change in the displayed user interface does not correspond to interaction with just a single object in the plurality of objects; and the fourth response criteria include a criterion that is met when a characteristic intensity of the input is above a fourth intensity threshold

Figure 9G

DEVICE, METHOD, AND GRAPHICAL USER INTERFACE FOR FORCE-SENSITIVE GESTURES ON THE BACK OF A DEVICE

RELATED APPLICATION

This application claims priority to U.S. Provisional Application Ser. No. 62/399,308, filed Sep. 23, 2016, which is incorporated by reference herein in its entirety.

TECHNICAL FIELD

This relates generally to electronic devices with touch-sensitive surfaces, including but not limited to electronic devices that detect input on the back side of the device.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to perform operations in device applications.

Exemplary operations include operations for content navigation, such as navigating between pages in a web browsing application (e.g., Safari from Apple Inc. of Cupertino, Calif.), navigating between pages in a document reader application (e.g., iBooks from Apple Inc. of Cupertino, Calif.), and moving through a media file in a media player application (e.g., iTunes, Videos from Apple Inc. of Cupertino, Calif.). Additional examples of operations include navigating between active applications, map operations such as changing the presentation of map information and displaying information about items on a map in a map application (e.g., Maps from Apple Inc. of Cupertino), displaying information about document content, and hiding and/or displaying controls such as media controls, document controls, a keyboard, or a split keyboard.

When a device has a large size and is frequently operated while supported in two hands, providing input to perform these operations is inefficient (e.g., when the support for the device must be changed in order to free a hand for providing input at a touchscreen on the front of the device) and causes user fatigue (e.g., when the device must be held in one hand for an extended period of time to free a hand for providing input at a touchscreen on the front of the device). In addition, these methods take longer than necessary, thereby wasting energy. This latter consideration is particularly important in battery-operated devices.

SUMMARY

Accordingly, there is a need for electronic devices that perform an operation in response to input detected on the back side of the device. Such methods and interfaces optionally complement or replace conventional methods for performing the operation. Such methods and interfaces provide alternative and additional control options and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is portable (e.g., a notebook computer, tablet computer, or handheld device). In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, document reading, map using, navigating between applications, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a front side that includes a touch-sensitive display and a back side that does not include a display, where the electronic device includes one or more sensors that are configured to detect intensities of inputs on the front side of the electronic device and the back side of the electronic device. The method includes displaying, on the touch-sensitive display, a user interface that includes a plurality of objects. While displaying the user interface, the method further includes detecting an input on a side of the electronic device. In response to detecting the input on the side of the electronic device, the method further includes: in accordance with a determination that the input is detected on the front side of the electronic device and meets first response criteria, performing a first operation that corresponds to a first object, in the plurality of objects, at a location of the input, wherein the first response criteria require that a characteristic intensity of the input meet a first intensity threshold in order for the criteria to be met; in accordance with a determination that the input is detected on the front side of the electronic device and meets second response criteria, performing a second operation, different from the first operation, that corresponds to the first object at the location of the input, where the second response criteria do not require that the characteristic intensity of the input meet the first intensity threshold for the criteria to be met; in accordance with a determination that the input is detected on the back side of the electronic device and meets third response criteria, performing a third operation, where the third operation is different from the first operation and the second operation, the third operation changes the displayed user interface, the change in the displayed user interface does not correspond to interaction with just a single object in the plurality of objects, and the third response criteria include a criterion that is met when a characteristic intensity of the input is above a third intensity threshold; and, in accordance with a determination that the input is on the back side of the device and does not meet the third response criteria, maintaining display of the user interface that includes the plurality of objects.

In accordance with some embodiments, an electronic device includes a touch-sensitive display unit configured to display user interfaces and to detect contacts and a processing unit coupled to the touch-sensitive display unit and the one or more sensor units. In some embodiments, the electronic device has a front side that includes the touch-sensitive display unit and a back side that does not include a display unit, the electronic device further includes one or more sensor units that are configured to detect intensities of inputs on the front side of the electronic device and the back side of the electronic device. In some embodiments, the processing unit includes a detecting unit, a performing unit, a maintaining unit, a changing unit, an activating unit, a hiding unit, a tilting unit, a selecting unit, a navigating unit, a determining unit, and a replacing unit. The processing unit is configured to: enable display of, on the touch-sensitive display unit, a user interface that includes a plurality of objects; while displaying the user interface, detect an input on a side of the electronic device; and, in response to detecting the input on the side of the electronic device: in accordance with a determination that the input is detected on the front side of the electronic device and meets first response criteria, perform a first operation that corresponds to a first object, in the plurality of objects, at a location of the input, where the first response criteria require that a characteristic intensity of the input meet a first intensity threshold in order for the criteria to be met; in accordance with a determination that the input is detected on the front side of the electronic device and meets second response criteria, perform a second operation, different from the first operation, that corresponds to the first object at the location of the input, wherein the second response criteria do not require that the characteristic intensity of the input meet the first intensity threshold for the criteria to be met; in accordance with a determination that the input is detected on the back side of the electronic device and meets third response criteria, perform a third operation, where: the third operation is different from the first operation and the second operation; the third operation changes the displayed user interface; the change in the displayed user interface does not correspond to interaction with just a single object in the plurality of objects; and the third response criteria include a criterion that is met when a characteristic intensity of the input is above a third intensity threshold; and, in accordance with a determination that the input is on the back side of the device and does not meet the third response criteria, maintain display of the user interface that includes the plurality of objects.

In accordance with some embodiments, an electronic device includes a front side that includes a touch-sensitive display, a back side that does not include a display, one or more sensors to detect intensities of inputs on the front side of the electronic device and the back side of the electronic device, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a front side that includes a touch-sensitive display and a back side that does not include a display, wherein the electronic device includes one or more sensors that are configured to detect intensities of inputs on the front side of the electronic device and the back side of the electronic device, cause the device to perform or cause performance of the operations of any of the methods described herein. In accordance with some embodiments, a graphical user interface on an electronic device with a front side that includes a touch-sensitive display and a back side that does not include a display, wherein the electronic device includes one or more sensors that are configured to detect intensities of inputs on the front side of the electronic device and the back side of the electronic device, a memory, and one or more processors to execute one or more programs stored in the memory, comprises one or more of the interfaces displayed in any of the methods described herein, which are updated in response to inputs, as described in any of the methods described herein. In accordance with some embodiments, an electronic device includes: a front side that includes a touch-sensitive display, a back side that does not include a display, one or more sensors to detect intensities of inputs on the front side of the electronic device and the back side of the electronic device; and means for performing or causing performance of the operations of any of the methods described herein. In accordance with some embodiments, an information processing apparatus, for use in an electronic device with a front side that includes a touch-sensitive display, a back side that does not include a display, one or more sensors to detect intensities of inputs on the front side of the electronic device and the back side of the electronic device, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for performing an operation in response to input detected on the back side of the device, thereby increasing the effectiveness, efficiency, and user satisfaction with such devices. Such methods and interfaces may complement or replace conventional methods for performing an operation in response to input detected on the back side of the device.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 8A-1 to 8A-2, 8B-1 to 8B-2, 8C-1 to 8C-2, 8D1 to 8D-2, 8E-1 to 8E-2, 8F-1 to 8F-2, 8G-1 to 8G-2, 8H-1 to 8H-2, 8I-1 to 8I-2, 8J-1 to 8J-2, 8K-1 to 8K-2, 8L-1 to 8L-2, 8M-1 to 8M-2, 8N-1 to 8N-2, 8O-1 to 8O-2, 8P-1 to 8P-2, 8Q-1 to 8Q-2, 8R-1 to 8R-2, 8S-1 to 8S-2, 8T-1 to 8T-2, 8U-1 to 8U-2, 8V-1 to 8V-2, 8W-1 to 8W-2, 8X-1 to 8X-2, 8Y-1 to 8Y-2, 8Z-1 to 8Z-2, 8AA-1 to 8AA-2, 8AB-1 to 8AB-2, 8AC-1 to 8AC-2, 8AD-1 to 8AD-2, 8AE-1 to 8AE-2, 8AF-1 to 8AF-2, 8AG-1 to 8AG-2, 8AH-1 to 8AH-2, 8AI-1 to 8AI-2, 8AJ-1 to 8AJ-2, 8AK-1 to 8AK-2, 8AL-1 to 8AL-2, 8AM-1 to 8AM-2, 8AN-1 to 8AN-2, 8AO-1 to 8AO-2, 8AP-1 to 8AP-2, 8AQ-1 to 8AQ-2, 8AR-1 to 8AR-2, 8AS-1 to 8AS-2, 8AT1 to 8AT-2, 8AU-1 to 8AU-2, 8AV-1 to 8AV-2, 8AW-1 to 8AW-2, 8AX-1 to 8AX-2, 8AY-1 to 8AY-2, 8AZ-1 to 8AZ-2, 8BA-1 to 8BA-2, 8BB-1 to 8BB-2, 8BC-1 to 8BC-2, 8BD-1 to 8BD-2, 8BE-1 to 8BE-2, 8BF-1 to 8BF-2, 8BG-1 to 8BG-2, 8BH-1 to 8BH-2, 8BI-1 to 8BI-2, 8BJ-1 to 8BJ-2, 8BK-1 to 8BK-2, 8BL-1 to 8BL-2, 8BM-1 to 8BM-2, 8BN-1 to 8BN-2, and 8BO-1 to 8BO-2 (also referred to as 8A-8BO or a subset thereof) illustrate exemplary user interfaces for performing an operation in response to input detected on the back side of the device in accordance with some embodiments.

FIGS. 9A-9G are flow diagrams illustrating a method of performing an operation in response to input detected on the back side of the device in accordance with some embodiments.

DESCRIPTION OF EMBODIMENTS

Many electronic devices detect input on the front side of the device using a touch screen display to perform operations on objects in user interfaces and to change displayed graphical user interfaces. As portable devices grow larger in format, a user is increasingly likely to often support the device in two hands while operating the device. Various operations may be inconvenient for the user to perform while supporting the device in two hands, particularly if the operations are frequently used. Some applications are particularly likely to be used while the user is holding the device in two hands, such as a web browser application, a media player application, a document reading application, a map application, and a multitasking interface for switching between active applications. While a user is primarily observing the display and/or using an application that requires relatively little input, the user may find it more efficient and less fatiguing to provide input while continuing to support the device with two hands.

A device that detects input on the back side of the device to perform operations that change a displayed user interface is beneficial to a user who desires to operate the device without needing to provide input on the front side of the device (e.g., while supporting the device with two hands). The processing and power requirements of sensing input on the back of a device are low compared with sensing input with detailed input location information using a touch screen on the front of a device. For object-specific functionality in applications, the touch screen provides the input location information needed to identify the object at which input is received. This method provides the efficiency of detecting input at the back side of a device for operations that do not require interaction with a single object among multiple objects displayed in a graphical user interface, combined with the utility of detecting input that corresponds to a particular object using a touch screen on the front of the device.

Figure 5:
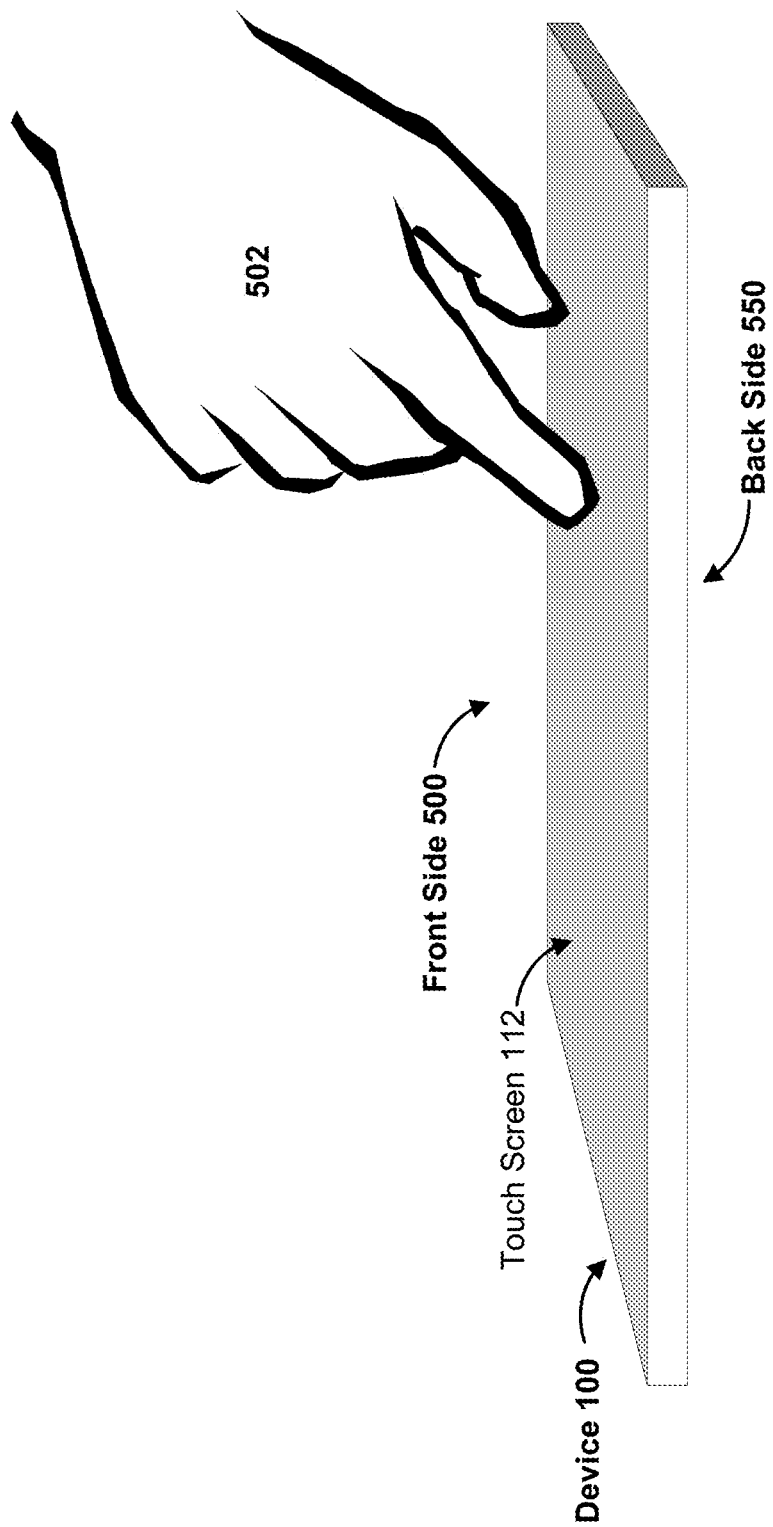
FIG. 5 illustrates the font side and back side of an exemplary device, in accordance with some embodiments.
Figure 6A:
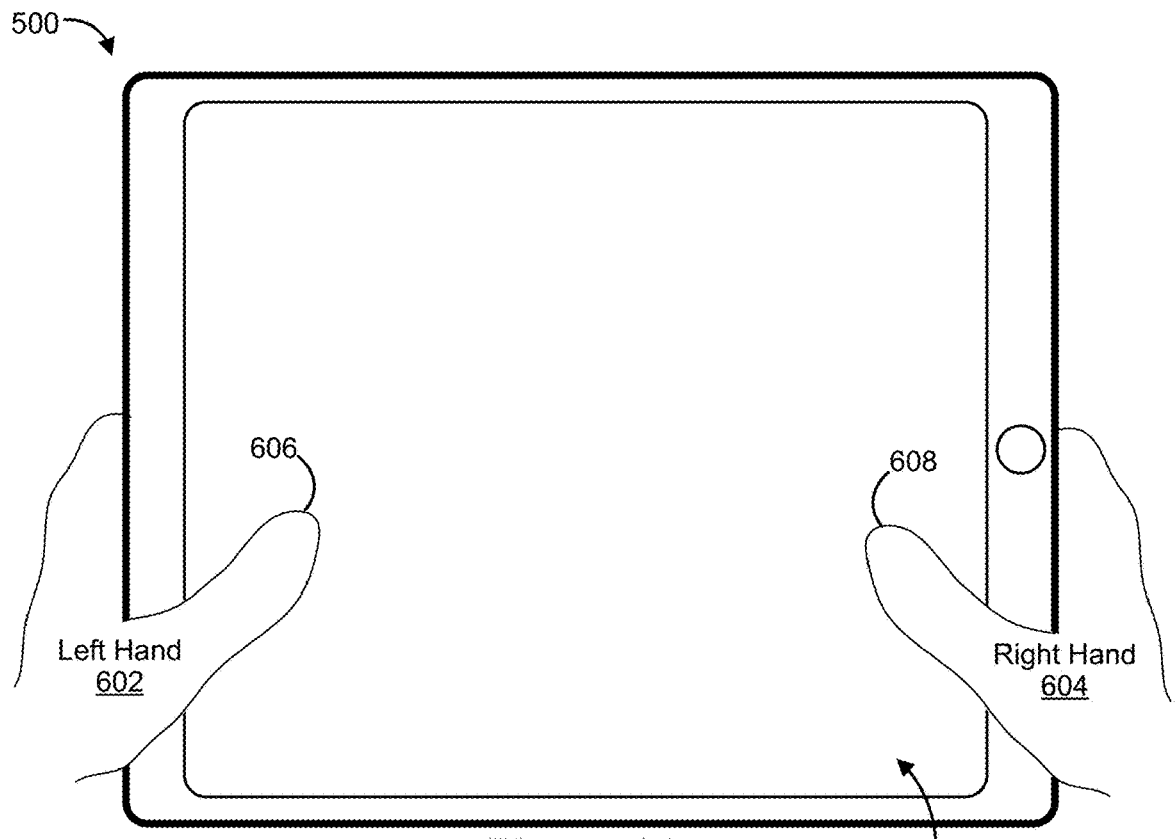
FIGS. 6A-6B illustrate exemplary support for a device, in accordance with some embodiments.
Figure 6B:
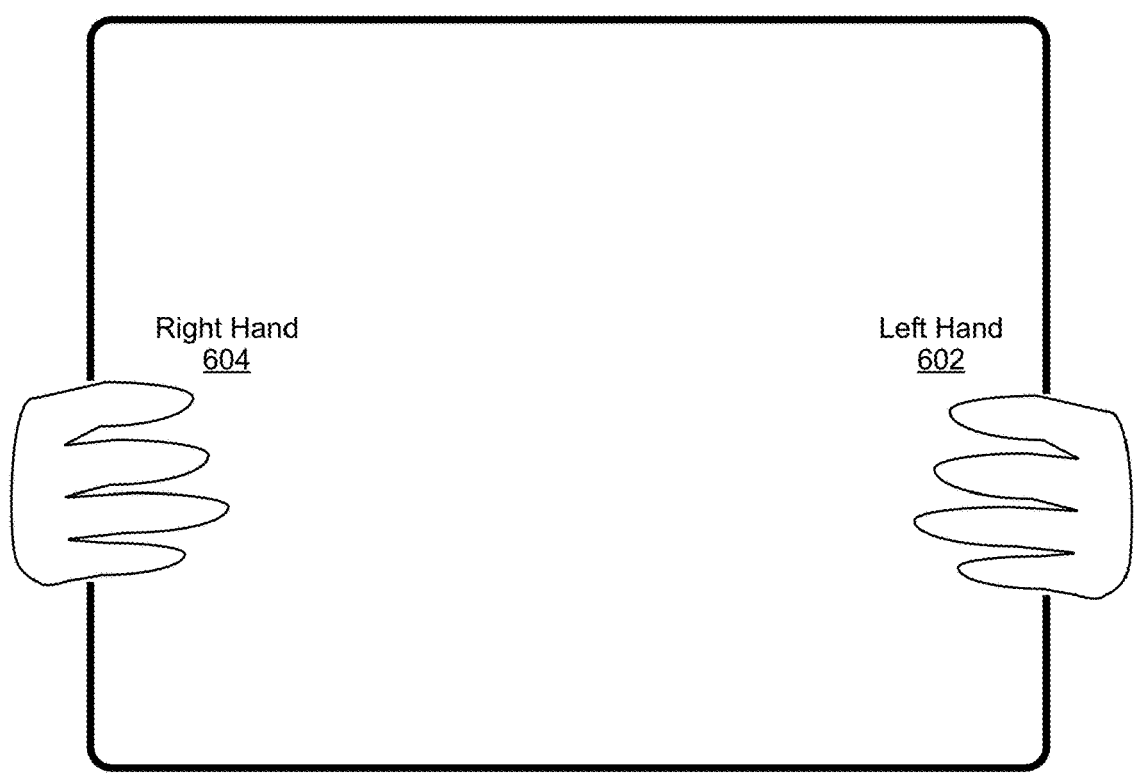
Figure 7A:
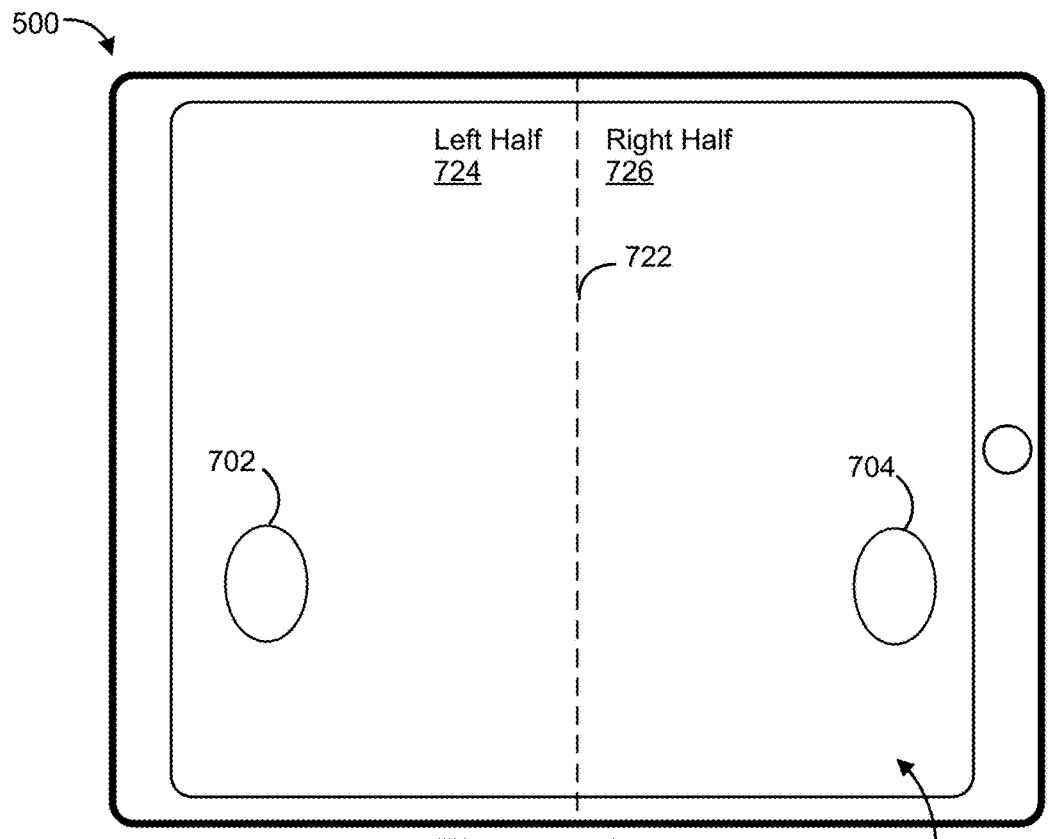
FIGS. 7A-7B illustrate an exemplary configuration of contacts on the device, in accordance with some embodiments.
Figure 7B:
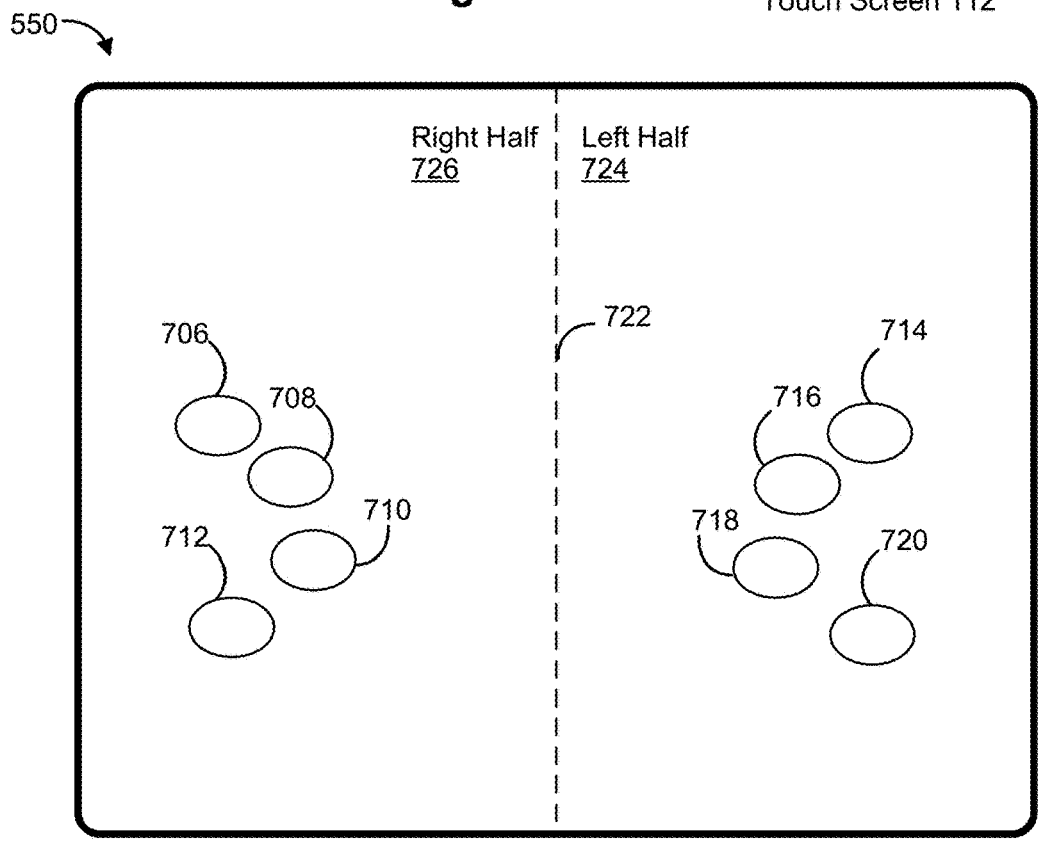

Below, FIGS. 1A-1B, 2, and 3 provide a description of exemplary devices. FIGS. 4A-4B and 8A-8BO illustrate exemplary user interfaces for performing an operation in response to input detected on the back side of the device. FIG. 5 illustrates the font side and back side of an exemplary device. FIGS. 6A-6B illustrate exemplary two-hand support for a device. FIGS. 7A-7B illustrate exemplary configurations of contacts on the device. FIGS. 9A-9G illustrate a flow diagram of a method of performing an operation in response to input detected on the back side of the device. The user interfaces in FIGS. 8A-8BO are used to illustrate the process in FIGS. 9A-9G.

EXEMPLARY DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a document reader application, a map application, a multitasking application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
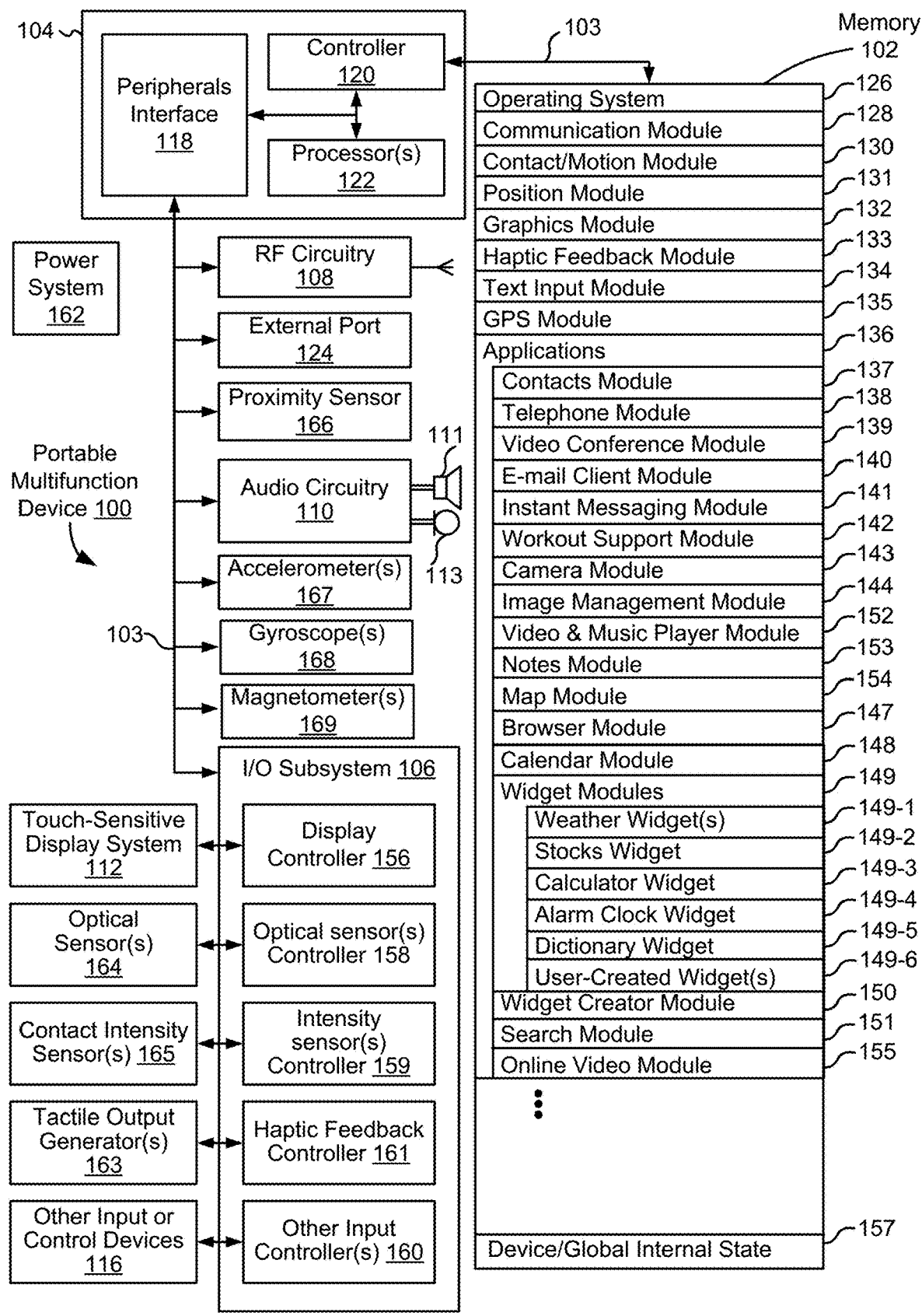
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., graphical user interface object that is configured to respond to inputs directed toward the graphical user interface object). Examples of user-interactive graphical user interface objects include, without limitation, a button, slider, icon, selectable menu item, switch, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
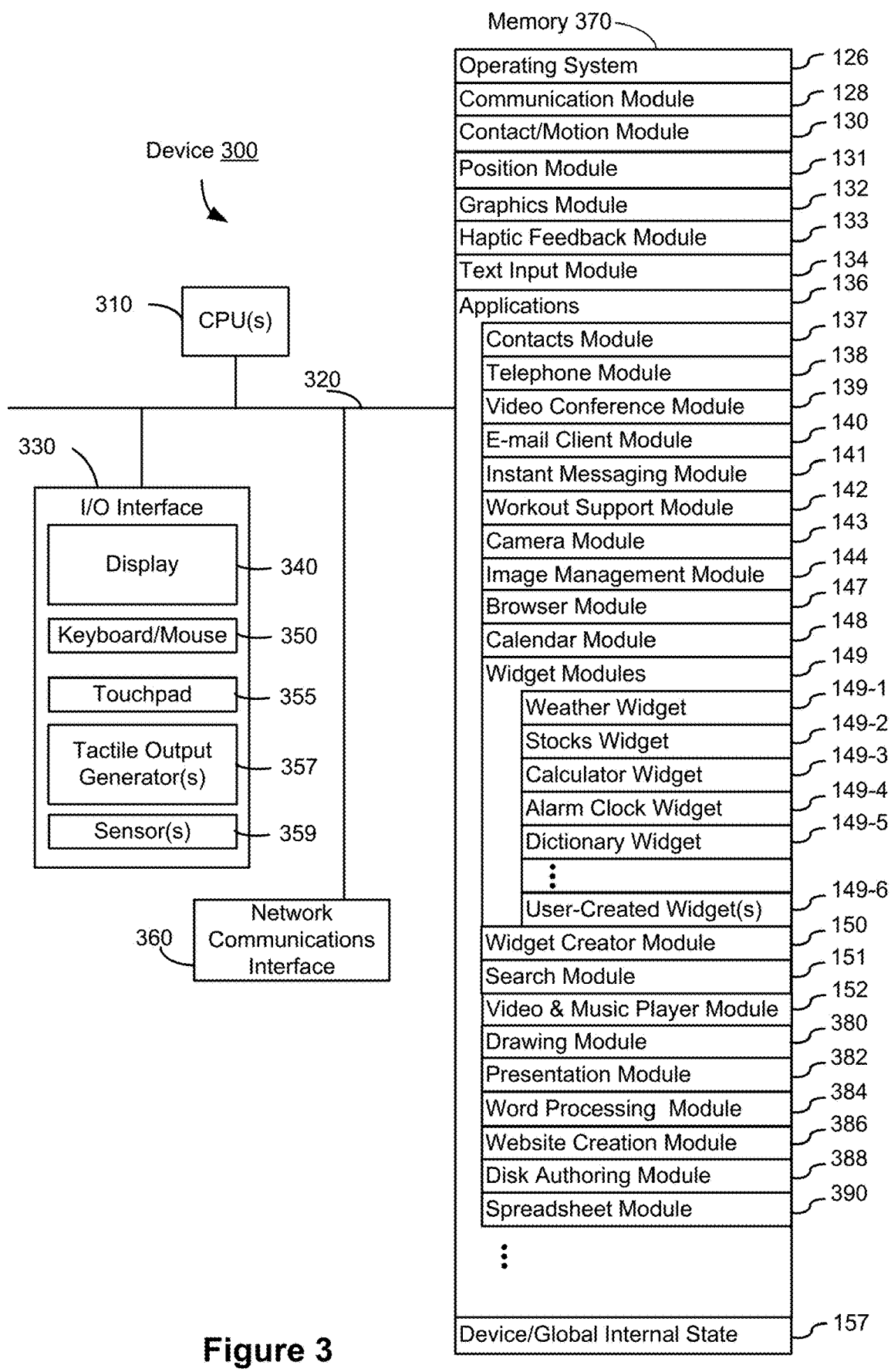
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
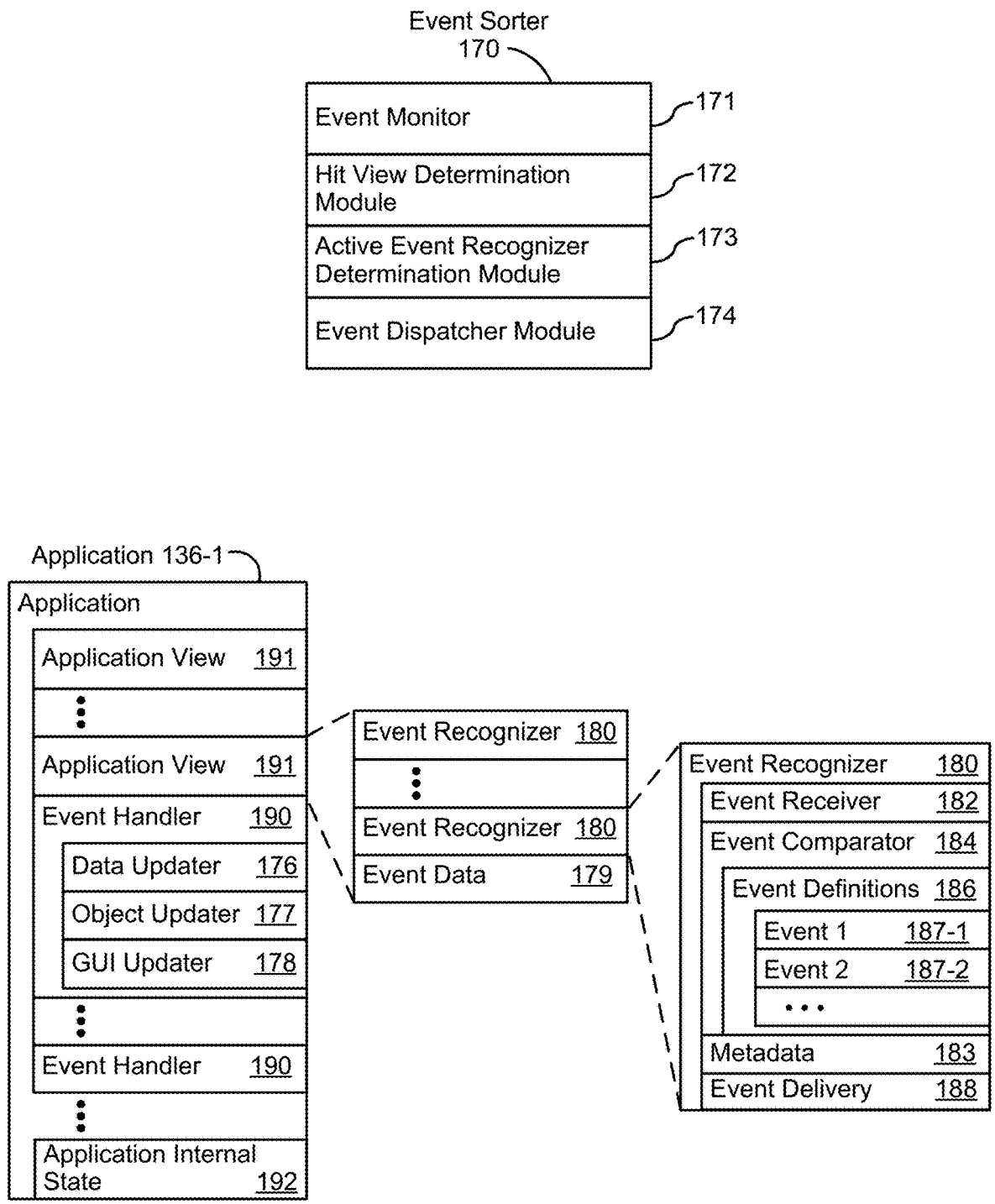
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
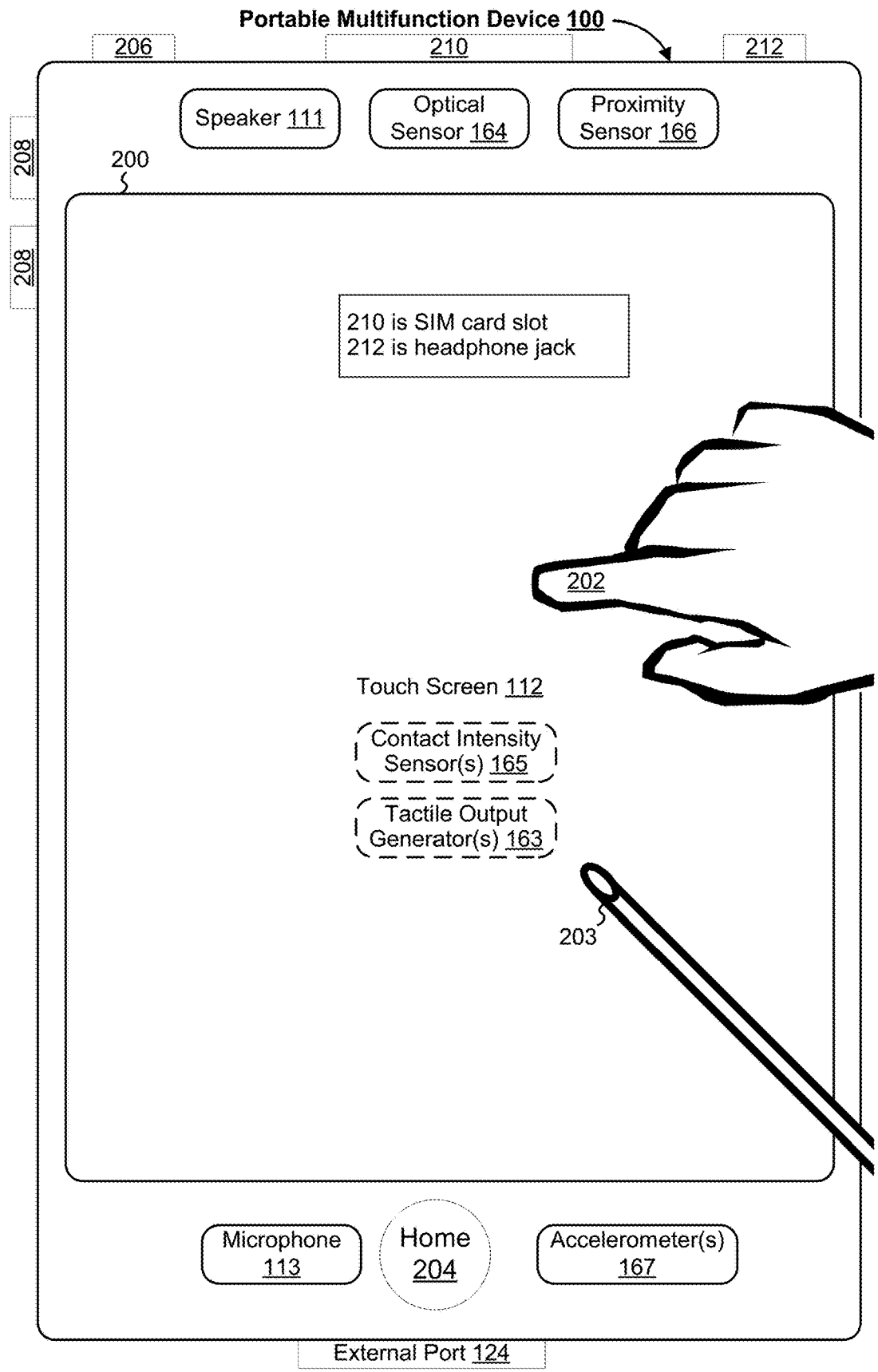
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
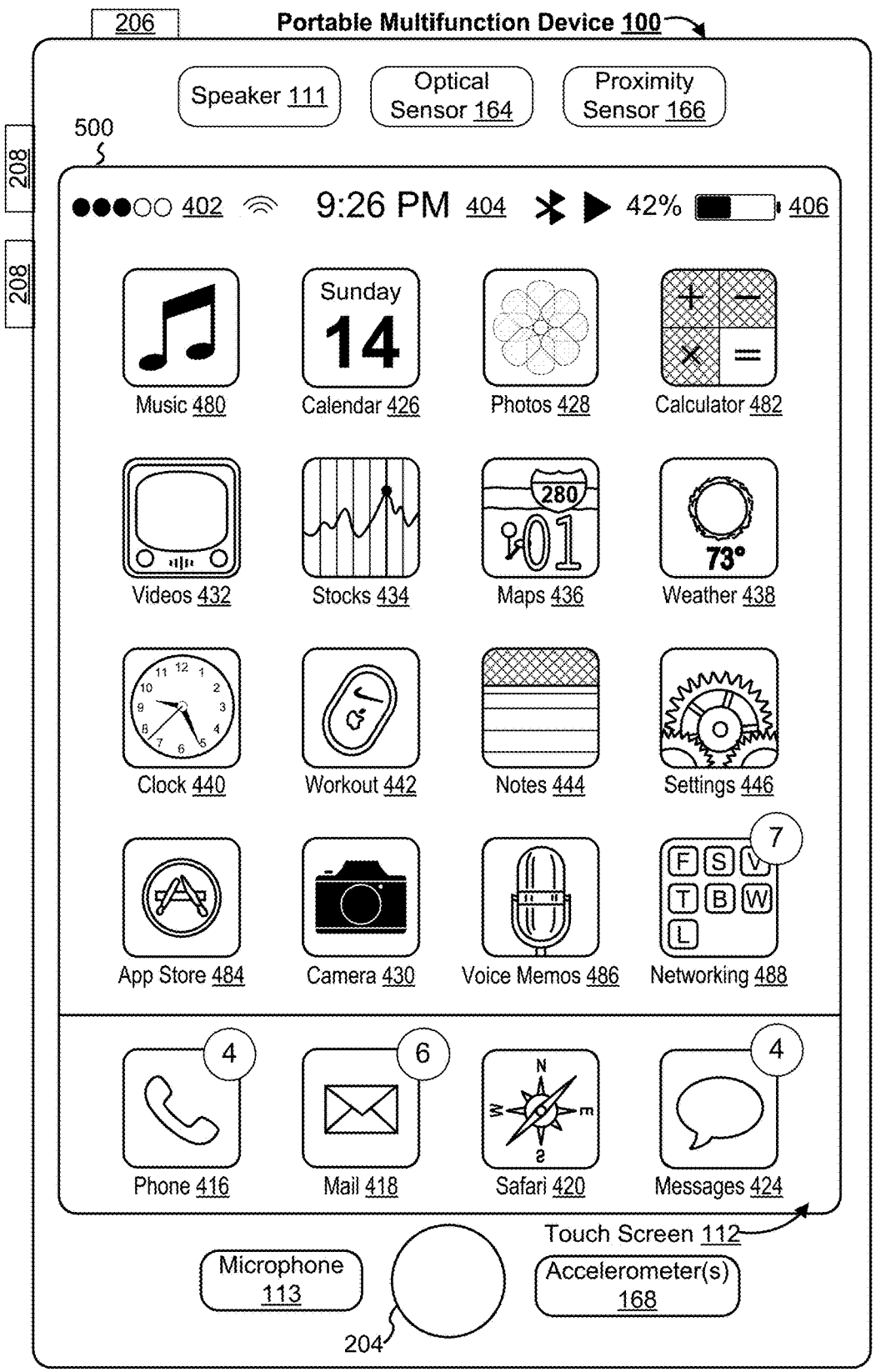
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
   Icon 416 for telephone module 138, labeled "Phone," which optionally includes an indicator 414 of the number of missed calls or voicemail messages;
   Icon 418 for e-mail client module 140, labeled "Mail," which optionally includes an indicator 410 of the number of unread e-mails;
   Icon 420 for browser module 147, labeled "Browser;" and
   Icon 422 for video and music player module 152, also referred to as iPod (trademark of Apple Inc.) module 152, labeled "iPod;" and
Icons for other applications, such as:
   Icon 424 for IM module 141, labeled "Messages;"
   Icon 426 for calendar module 148, labeled "Calendar;"
   Icon 428 for image management module 144, labeled "Photos;"
   Icon 430 for camera module 143, labeled "Camera;"
   Icon 432 for online video module 155, labeled "Online Video;"
   Icon 434 for stocks widget 149-2, labeled "Stocks;"
   Icon 436 for map module 154, labeled "Map;"
   Icon 438 for weather widget 149-1, labeled "Weather;"
   Icon 440 for alarm clock widget 149-4, labeled "Clock;"
   Icon 442 for workout support module 142, labeled "Workout Support;"
   Icon 444 for notes module 153, labeled "Notes;" and
   Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least two distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 8A-8BO) described below optionally include various intensity diagrams that show the current intensity of the contact on the touch-sensitive surface relative to one or more intensity thresholds (e.g., a contact detection intensity threshold $IT_0$, a light press intensity threshold $IT_L$ (also called herein IM and activation intensity threshold $IT_A$) a deep press intensity threshold ITS (also called herein $I_H$ that is at least initially higher than $I_M$), and/or one or more other intensity thresholds (e.g., an intensity threshold $I_L$ that is lower than $I_M$). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

Figure 4C:
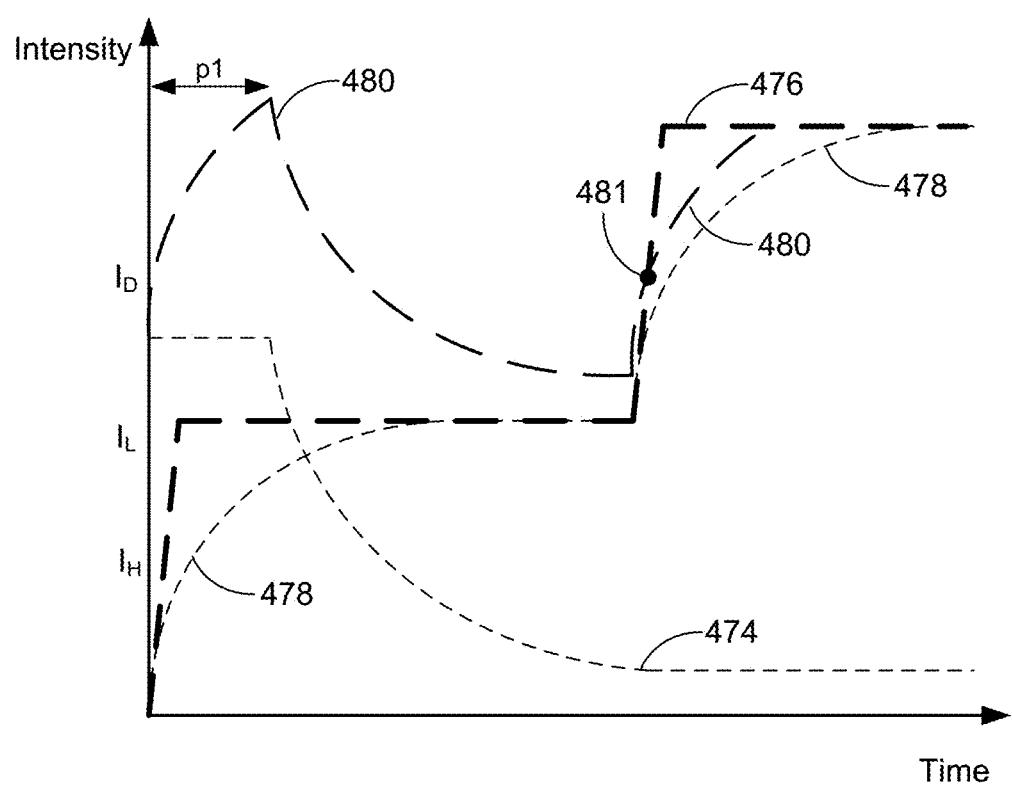
FIGS. 4C-4E illustrate exemplary dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
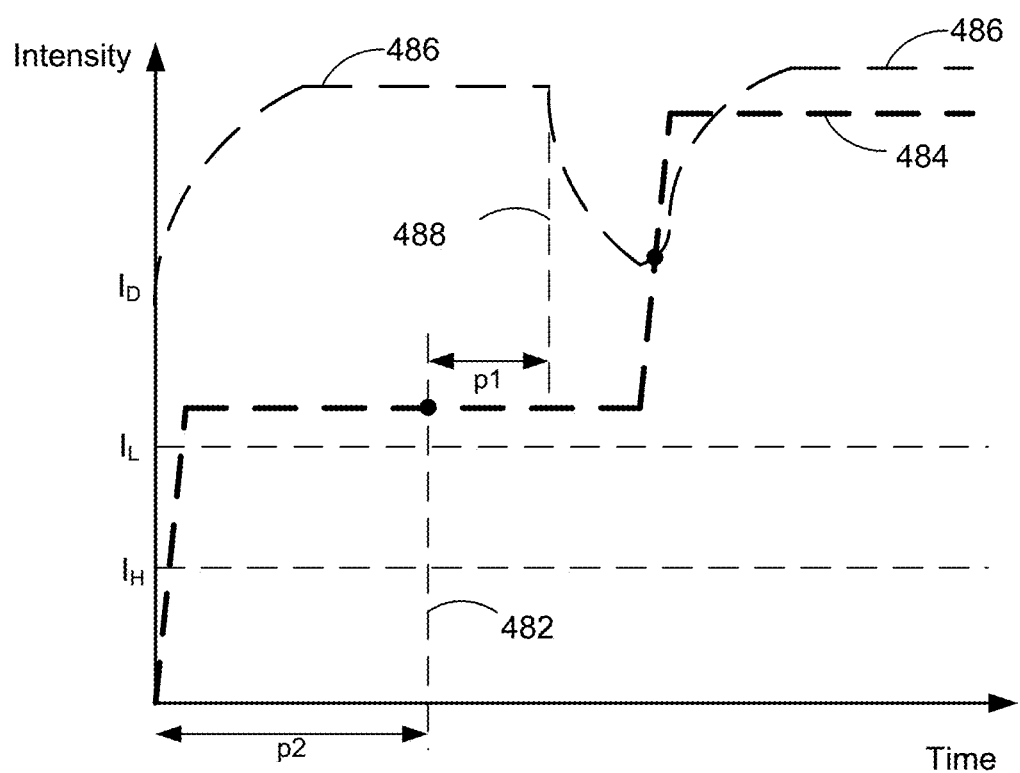

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
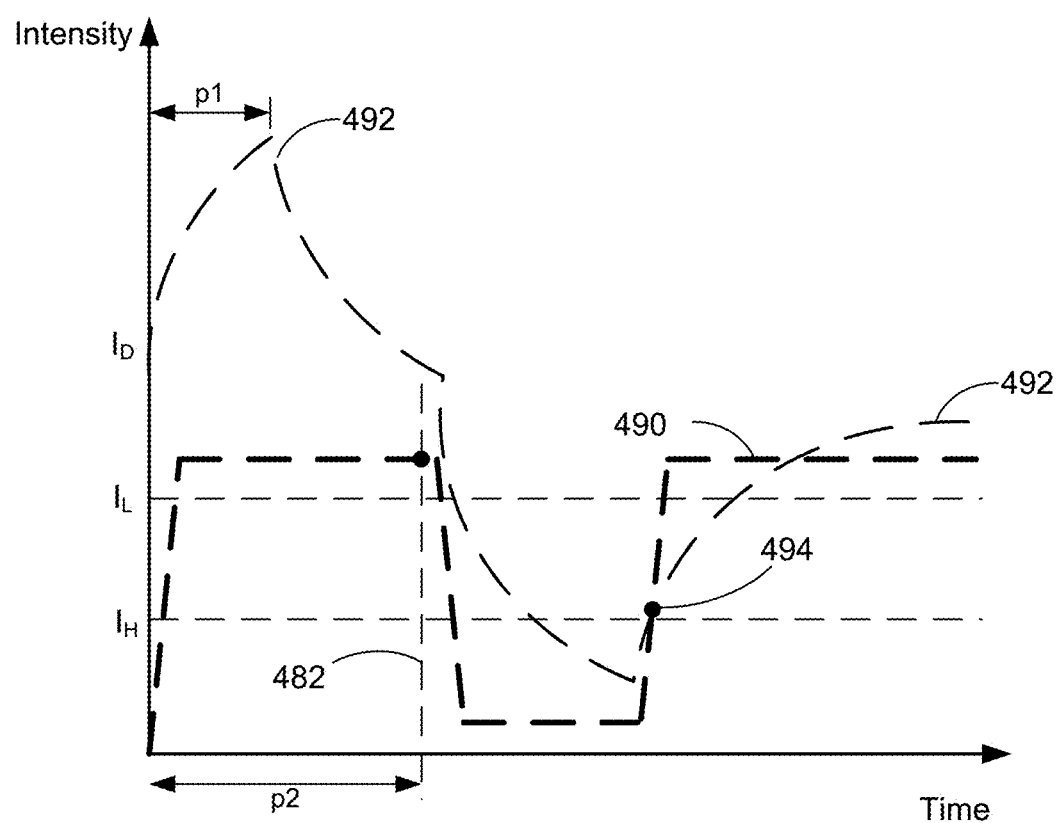

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

FIG. 5 illustrates an exemplary device (e.g., device 300, FIG. 3, or portable multifunction device 100, FIG. 1A) configured to detect input at front side 500 of the device (e.g., using a touch screen 112) and to detect input at a back side 550 of the device (e.g., using the touch screen 112 and/or using one or more back side content intensity sensors 165 that are separate from the touchscreen 112). In FIG. 5, input from a single hand 502 is being provided at front side 500 of the device.

FIGS. 6A-6B illustrate exemplary support for a device (e.g., device 300, FIG. 3, or portable multifunction device 100, FIG. 1A) by left hand 602 and right hand 604. As described further below, positions of left thumb 606 and/or right thumb 608 on the front side 500 of the device are used to determine a location at which a keyboard 852 will be displayed. Left hand 602 and right hand 604 grip the device with left thumb 606 and/or right thumb 608 on the front side 500 of the device and the fingers of left hand 602 and right hand 604 on the back side 550 of the device.

FIG. 7A illustrates front side contact 702 that corresponds to left thumb 606 of FIG. 6A and front side contact 704 that corresponds to right thumb 608 of FIG. 6A. At some times (e.g., when the device is not supported with two hands), a front side contact is provided with a finger of a hand that is not supporting the device.

FIG. 7B illustrates back side contacts 706, 708, 710, and 712 that correspond to the fingers of right hand 604 as shown in FIG. 6B and back side contacts 714, 716, 718, and 720 that correspond to the fingers of left hand 602 as shown in FIG. 6B. Back side contacts 706, 708, 710 and 712 are located at positions on right half 726 of the back side 550 of the device. Back side contacts 714, 716, 718 and 720 are located at positions on left half 724 of the back side 550 of the device. Line 722 is a dividing line that defines right half 726 and left half 724 of the device. In some embodiments, right half 726 and left half 724 are regions (e.g., non-rectangular regions) that approximately correspond to halves as defined by dividing line 722.

USER INTERFACES AND ASSOCIATED PROCESSES

Attention is now directed towards embodiments of user interfaces ("UI") and associated processes that may be implemented on an electronic device, such as portable multifunction device 100 or device 300, with a display, a touch-sensitive surface, and one or more sensors to detect intensities of contacts with the touch-sensitive surface.

Figures 1, 8A:
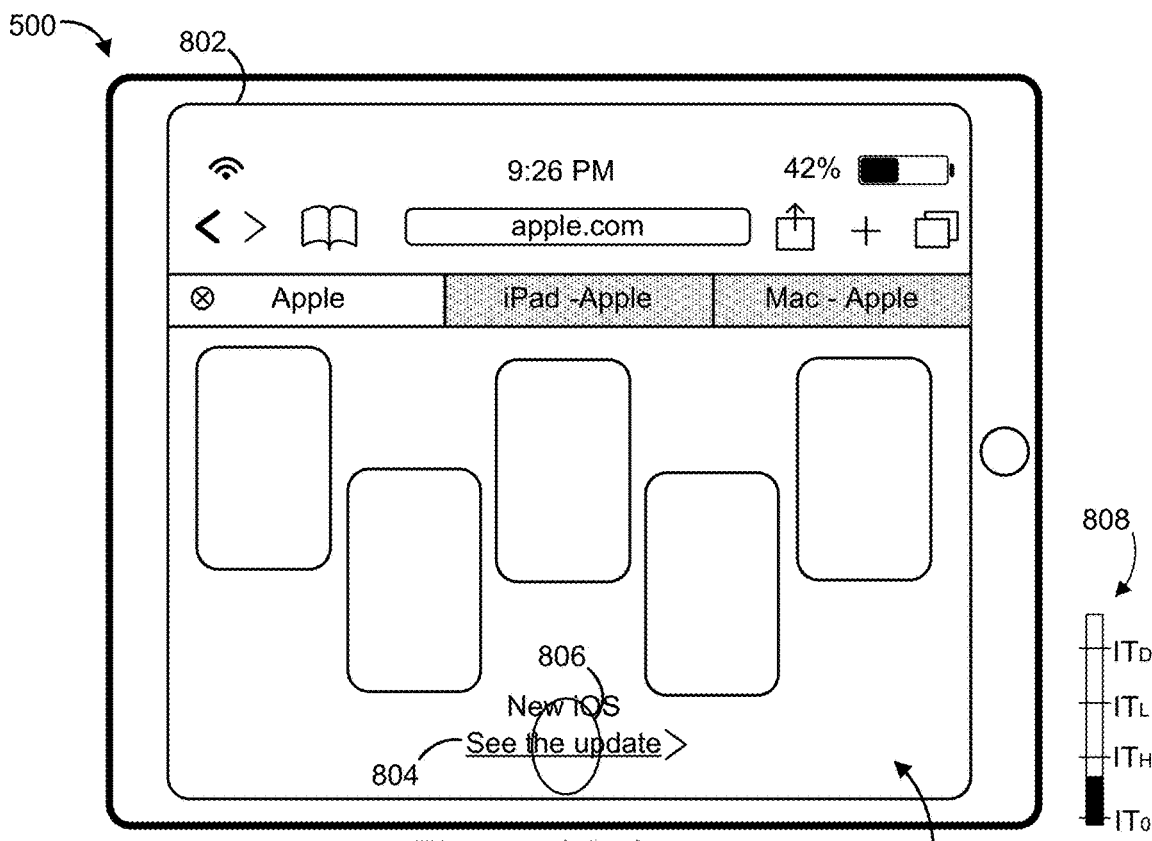
Figures 2, 8A:
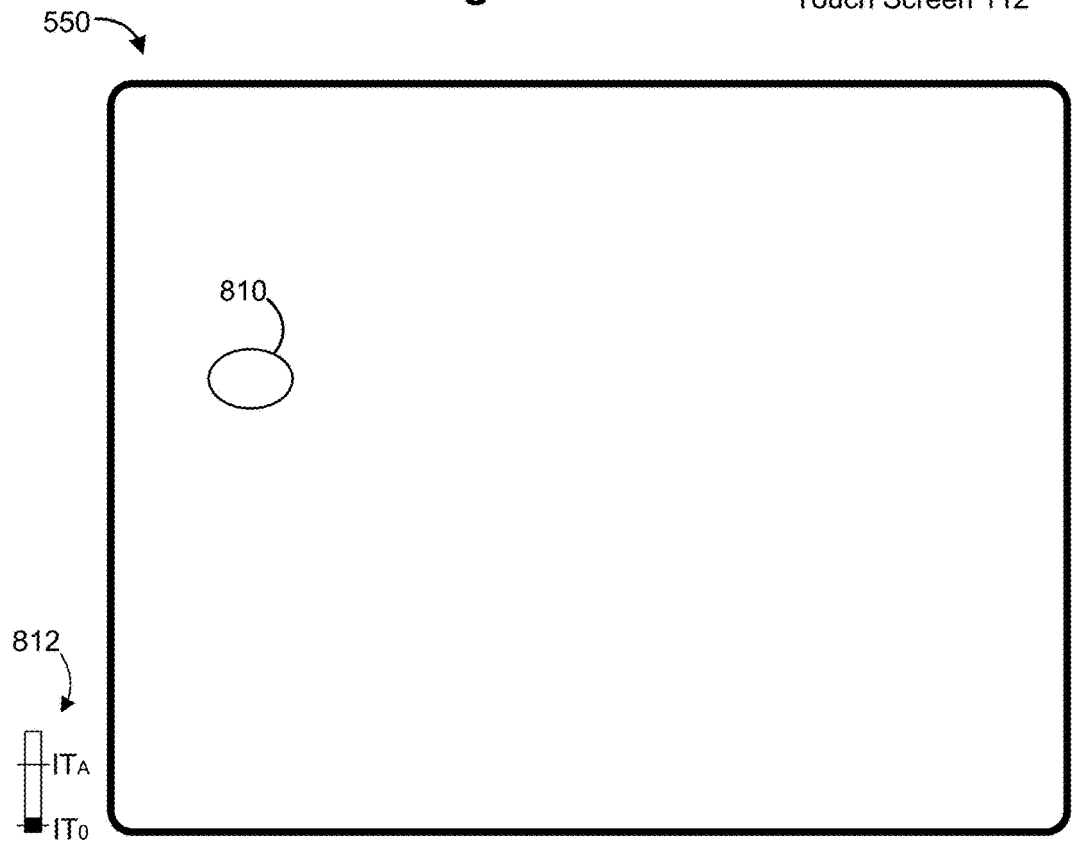
Figures 1, 8B:
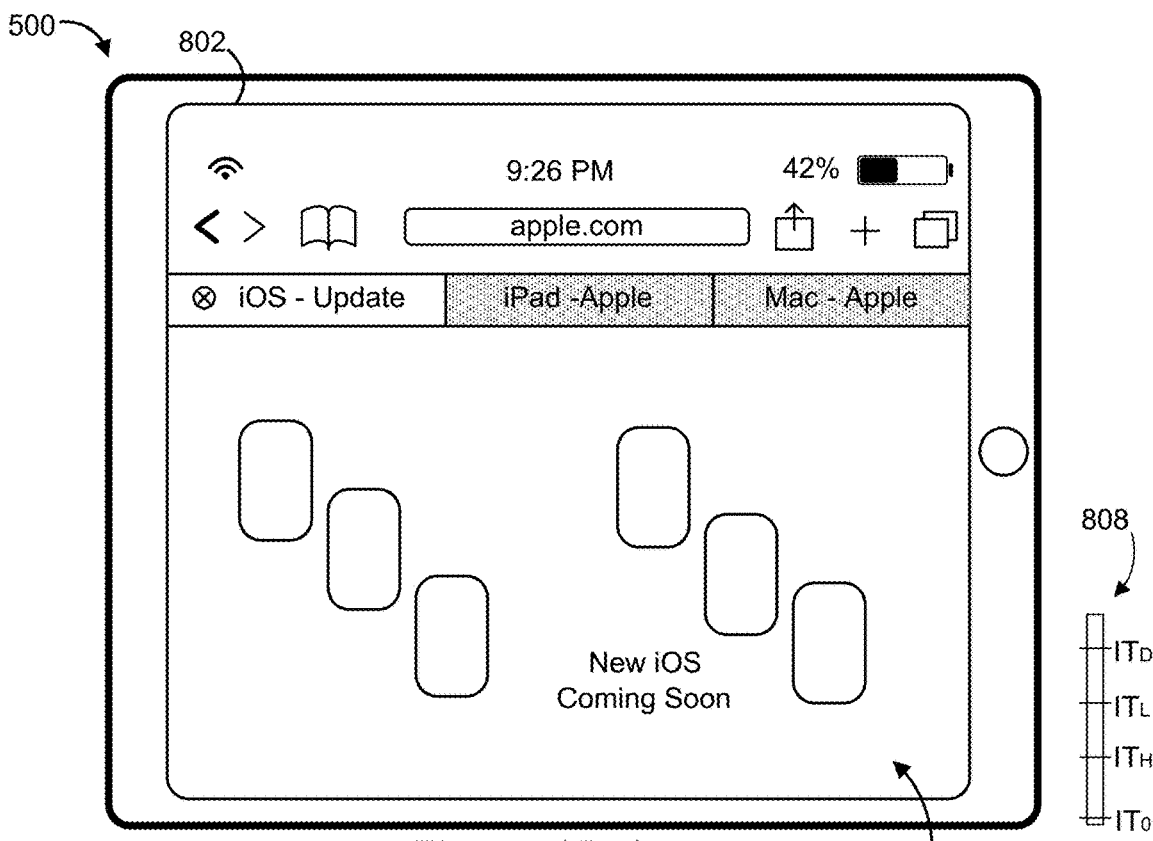
Figures 2, 8B:
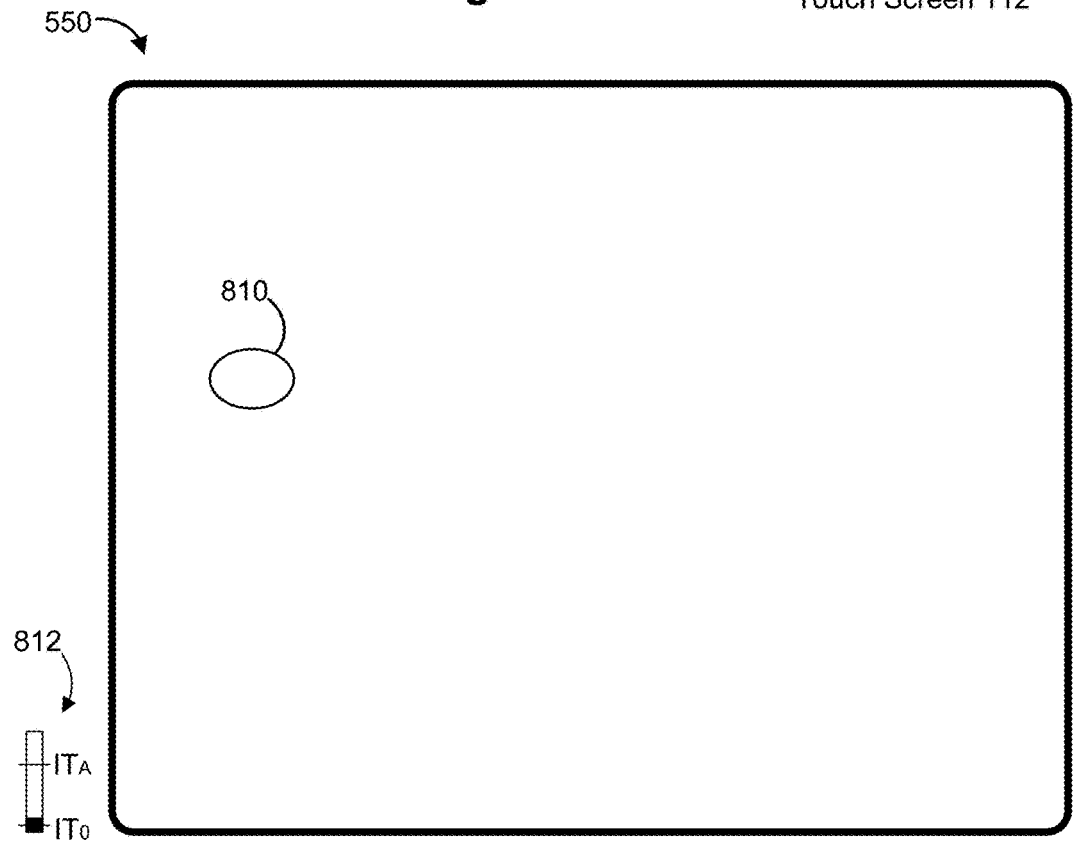

FIGS. 8A-8B0 illustrate exemplary user interfaces for performing an operation in response to input detected on the back side of the device, in accordance with some embodiments. The user interfaces in these figures are used to illustrate process in FIGS. 9A-9G described below. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 8A-1 illustrates user interface 802 displayed on the touch screen 112 on the front side 500 of the device. User interface 802 is a user interface for a web browsing application. In FIG. 8A-1, user interface 802 is displaying a first web page that includes a link 804. The device detects an input (e.g., a tap input) by front side contact 806 on touch screen 112 at a location that corresponds to link 804. An intensity of front side contact 806 is indicated by front side intensity meter 808. A characteristic intensity of the front side contact 806 is above a contact detection threshold $IT_0$ and below a hint intensity threshold $IT_H$, as indicated by front side intensity meter 808. In response to the input by front side contact 806, a second web page that is the destination of link 804 is displayed in user interface 502, as shown in 8B-1.

FIG. 8A-2 illustrates back side input by contact 810 detected on the back side 550 of the device. An intensity of back side contact 810 is indicated by a first back side intensity meter 812. A characteristic intensity of back side contact 810 is above a contact detection threshold $IT_0$ and below an activation intensity threshold $IT_A$, as indicated by a first back side intensity meter 812.

For simplicity, FIG. 8A-2 and the other figures that illustrate back side 550 of the device show one back side contact (e.g., back side contact 810) or two back side contacts (e.g., back side contact 810 on the right half 726 of back side 550 of the device and back side contact 842 of the left half 724 of the back side 550 of the device, as shown in FIGS. 8N-8U). In some embodiments, multiple back side contacts (e.g., multiple back side contacts on the left half of the back side of the device and/or multiple back side contacts on the right half of the back side of the device) are present on back side 550 of the device (e.g., the set of back side contacts 706-720, as described with regard to 7B, or a subset thereof, are present on back side 550 of the device).

In some embodiments, a characteristic intensity indicated by first back side intensity level meter 812 indicates a characteristic intensity of the multiple back side contacts (e.g., multiple contacts on the left half of the back side of the device). In some embodiments, a characteristic intensity indicated by second back side intensity level meter 844 (e.g., as shown in FIGS. 8N-8U), indicates a characteristic intensity of multiple back side contacts (e.g., multiple back side contacts on the left half of the back side of the device).

Figures 1, 8C:
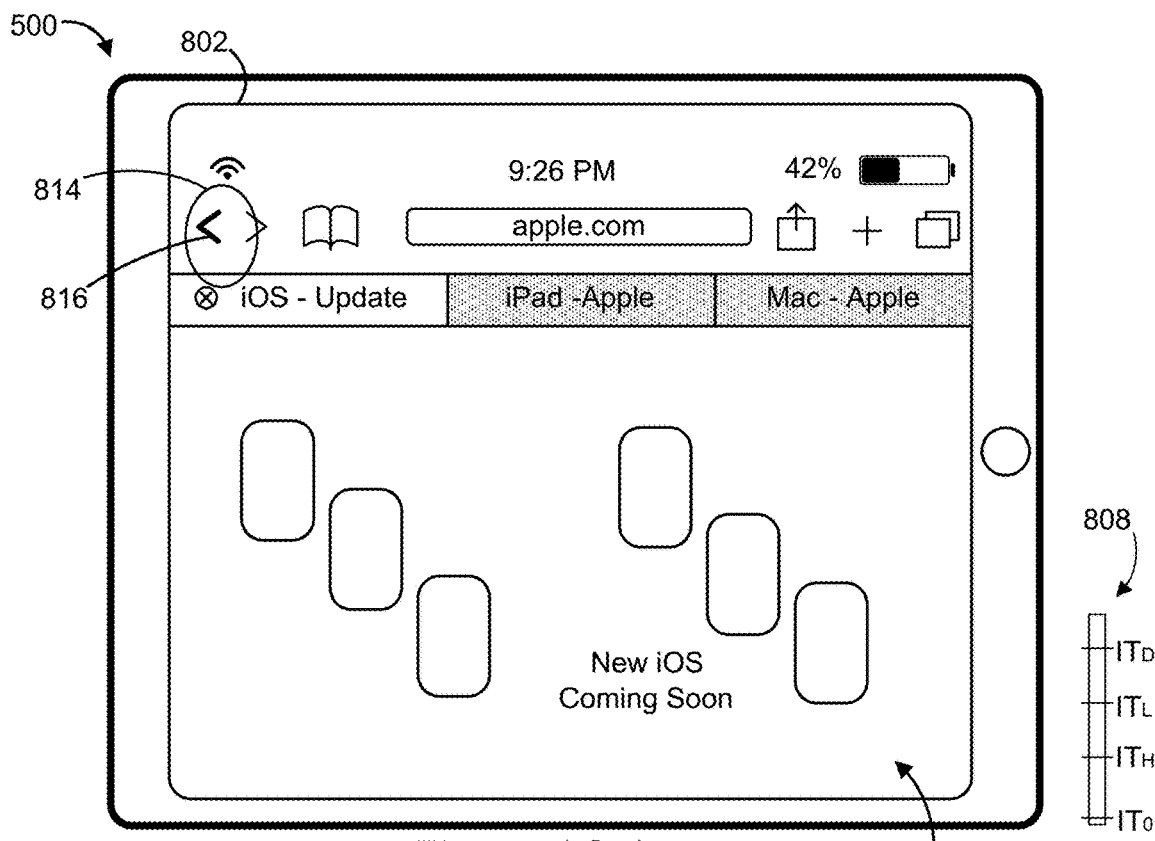
Figures 2, 8C:
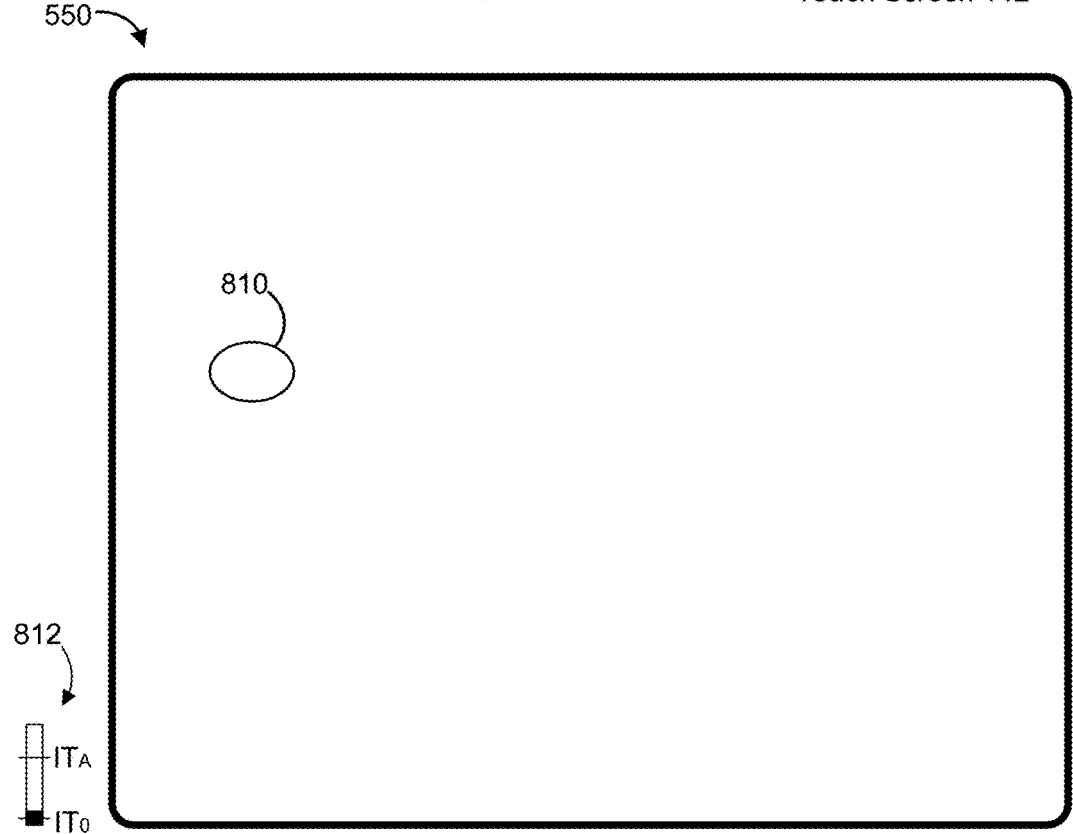

In FIG. 8C-1, the device detects an input (e.g., a tap input) by a front side contact 814 on touch screen 112 at a location that corresponds to a back button 816 for navigating to a prior web page. In response to the input by front side contact 814, the first web page is redisplayed in user interface 502, as shown in 8D-1.

FIGS. 8D-8G illustrate changes to web application user interface 802 in response to a front side contact 818 at link 804 with increasing intensity.

Figures 1, 8D:
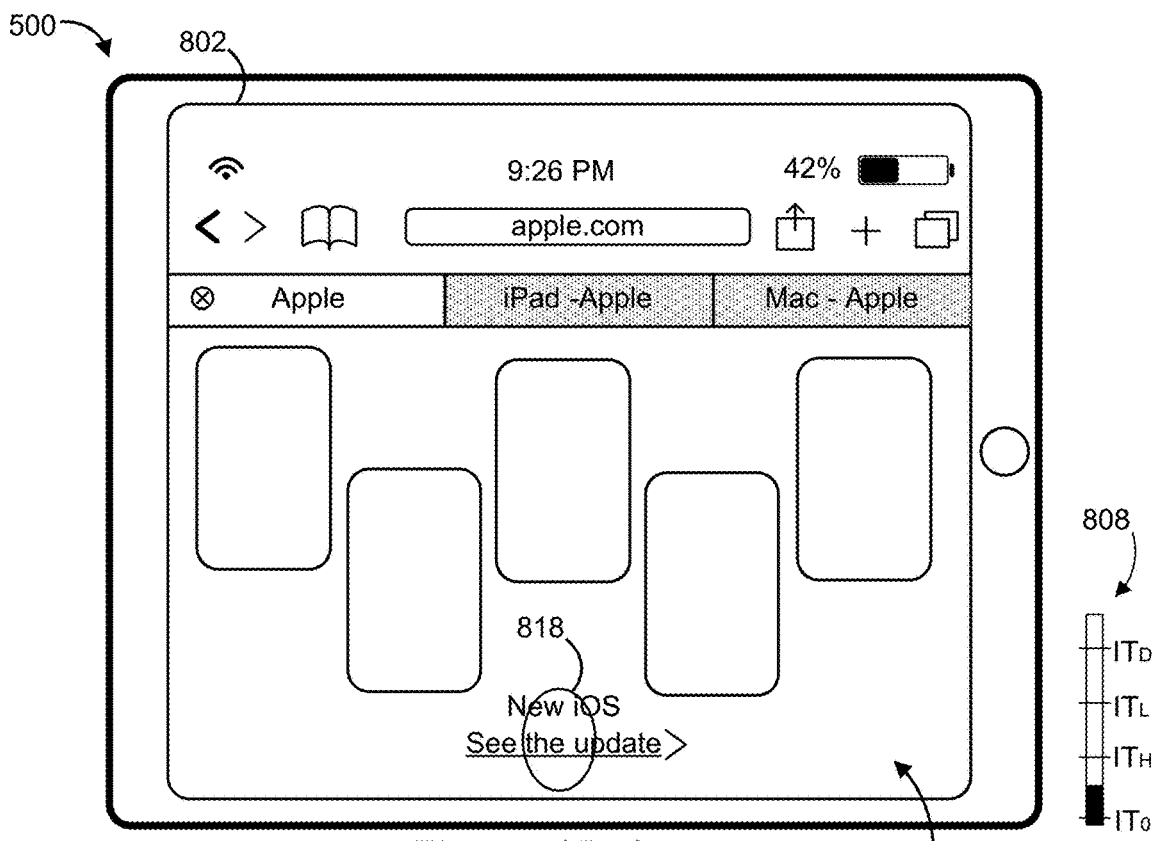
Figures 2, 8D:
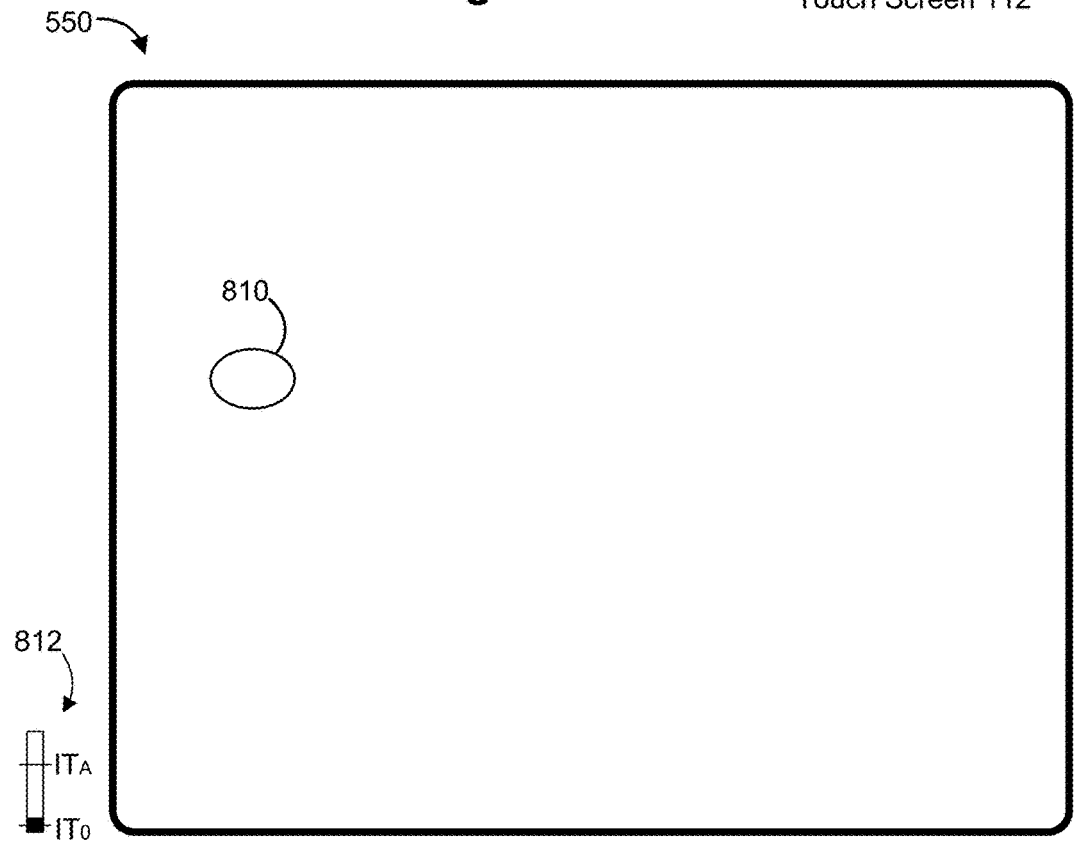
Figures 1, 8E:
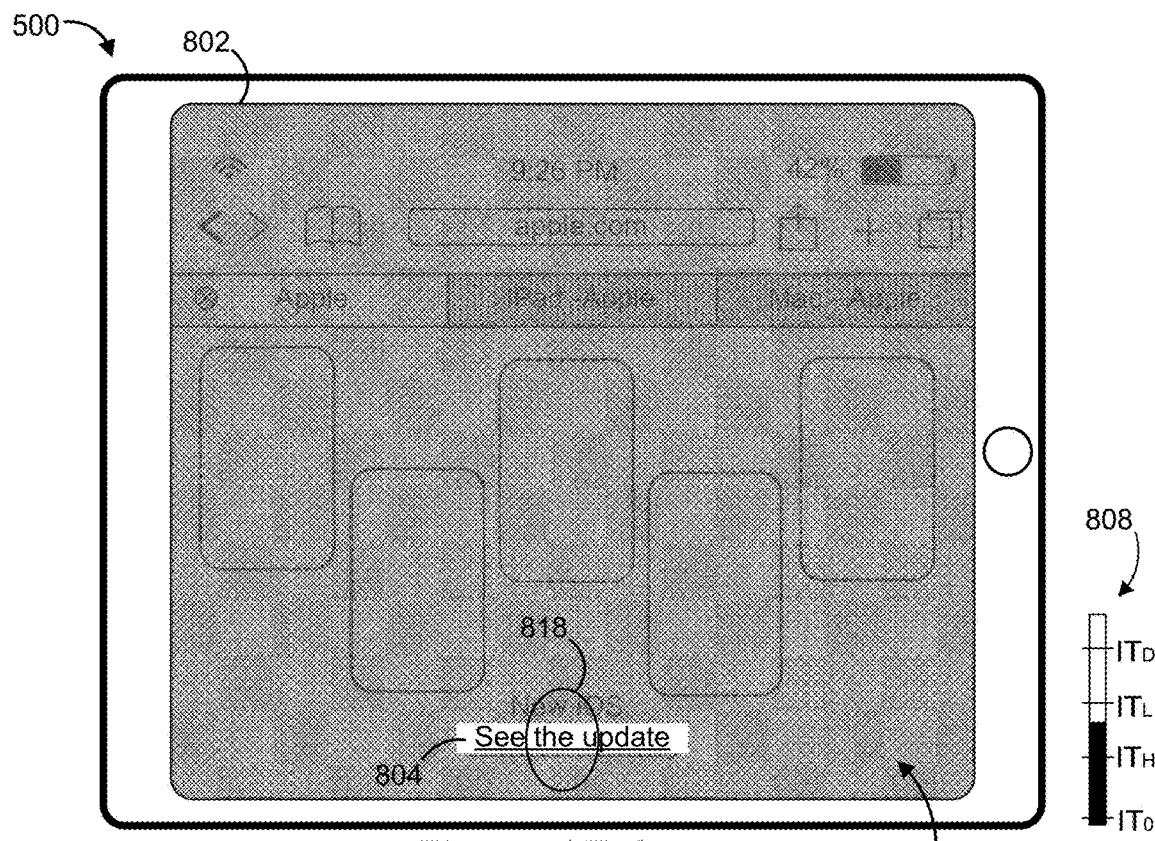
Figures 2, 8E:
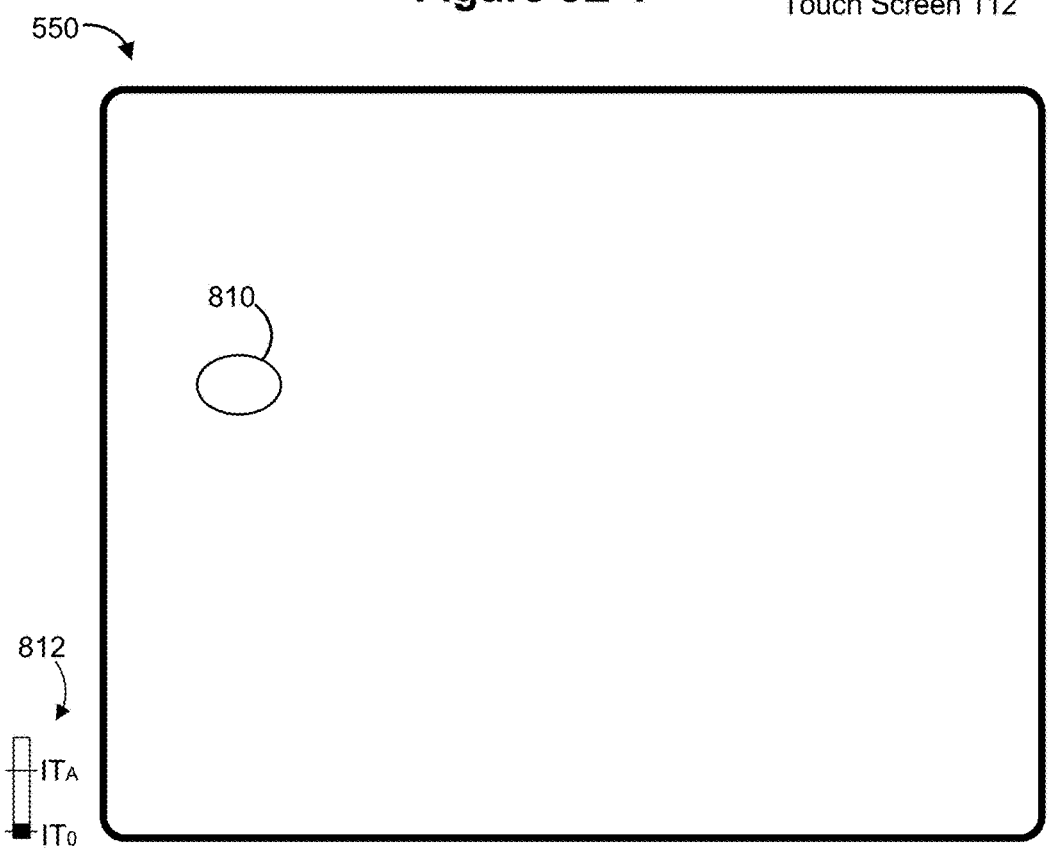

In FIG. 8D-1, the device detects an input by a front side contact 818 on touch screen 112 at a location that corresponds to link 804. In FIG. 8E-1, a characteristic intensity of front side contact 818 has increased above a hint intensity threshold $IT_H$, as indicated by front side intensity meter 808. In accordance with a determination that the characteristic intensity of front side contact 818 has increased above the intensity threshold $IT_H$, web application user interface 802 is visually altered (e.g., web application user interface 802 (except for link 804) is blurred). In some embodiments, web application user interface 802 is increasingly altered as the characteristic intensity of the contact 818 continues to increase above hint intensity threshold $IT_H$ to light press intensity threshold $IT_L$.

Figures 1, 8F:
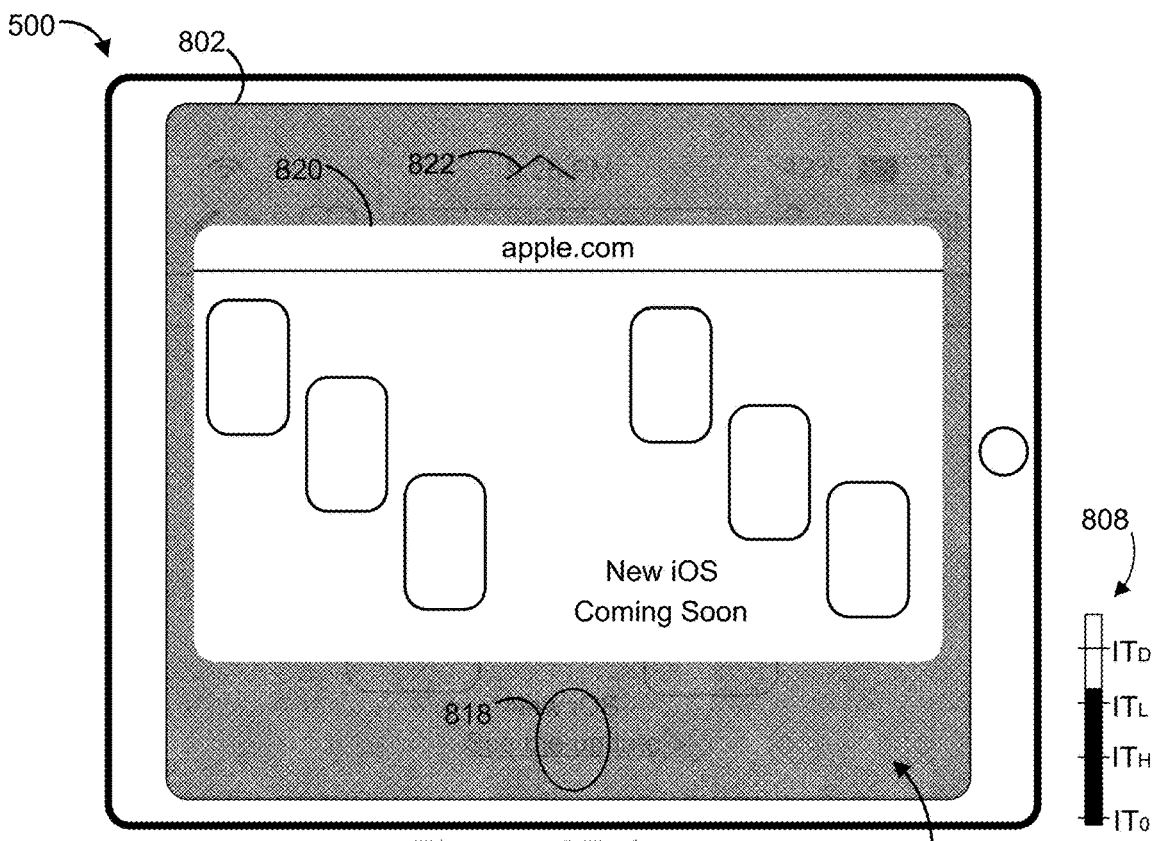
Figures 2, 8F:
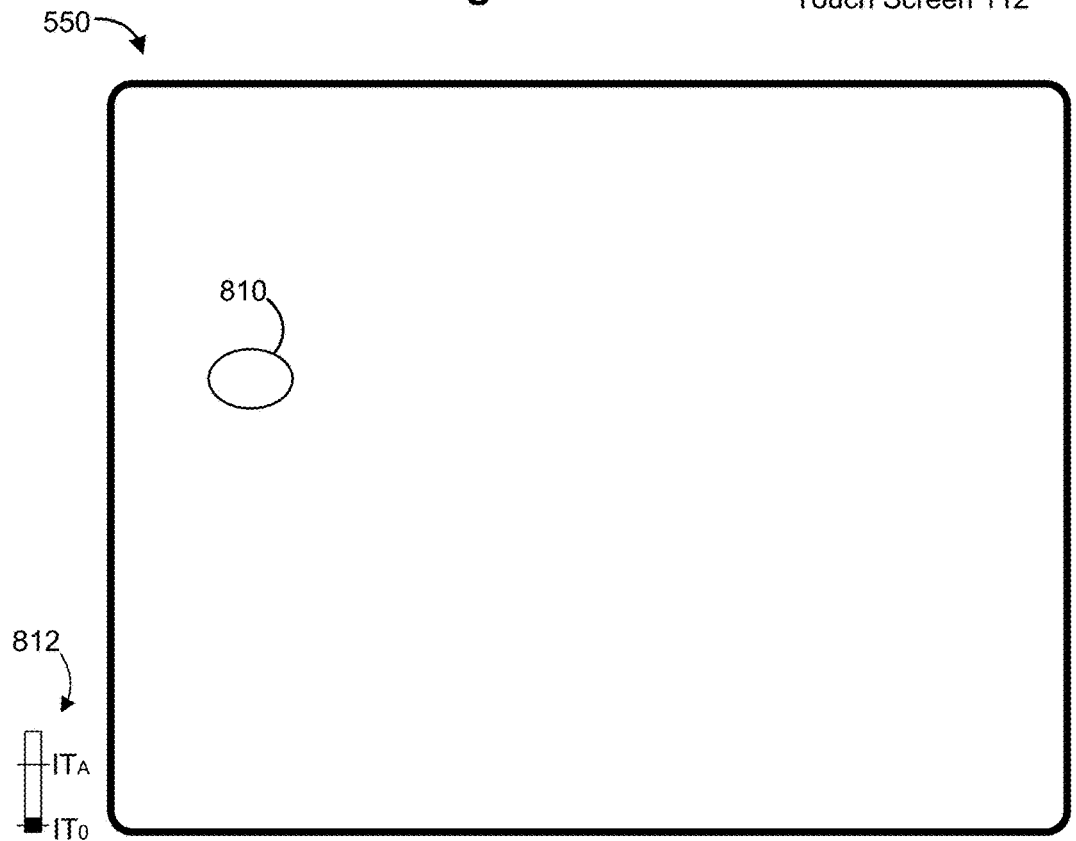

In FIG. 8F-1, the characteristic intensity of front side contact 818 has increased above a light press intensity threshold $IT_L$, as indicated by front side intensity meter 808. In accordance with a determination that the characteristic intensity of front side contact 818 has increased above the intensity threshold $IT_L$, a preview 820 of the second web page that is the destination of link 804 is displayed in user interface 802. In some embodiments, a control 822 for displaying additional controls that correspond to preview 820 is displayed in user interface 802.

Figures 1, 8G:
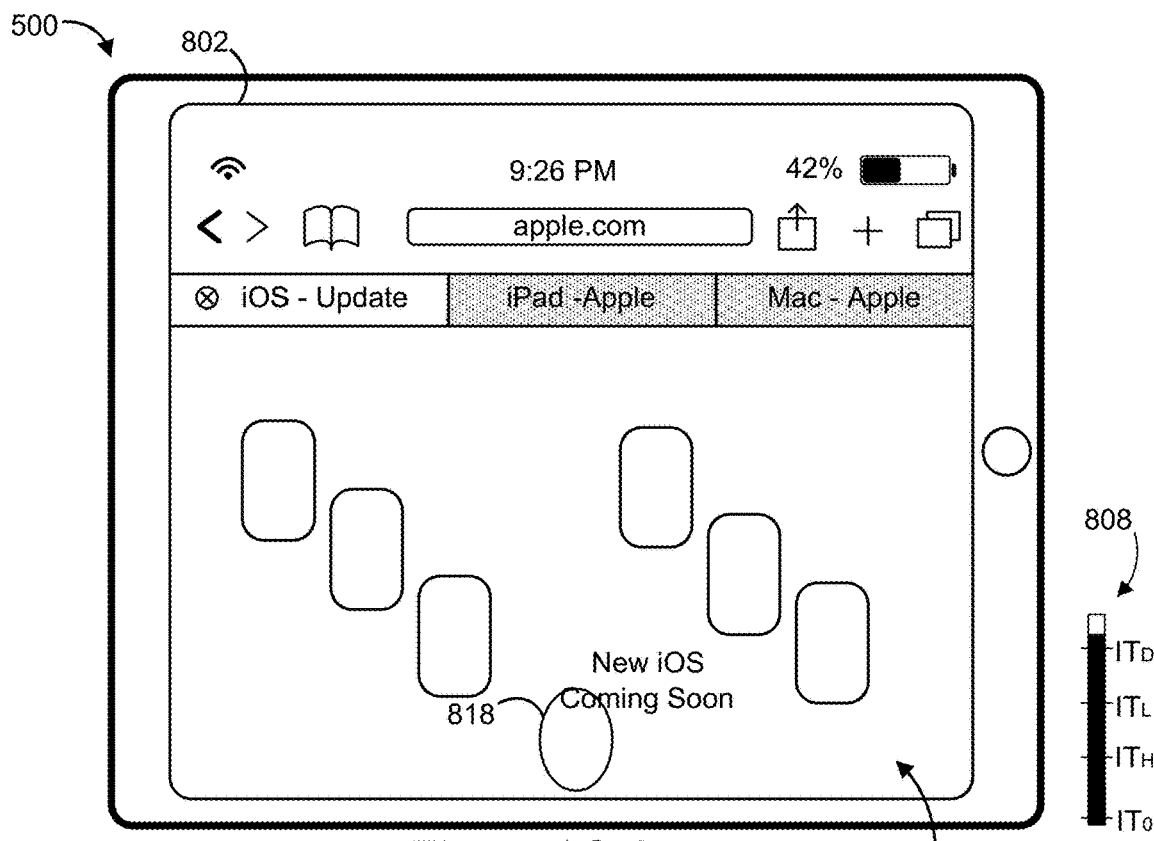
Figures 2, 8G:
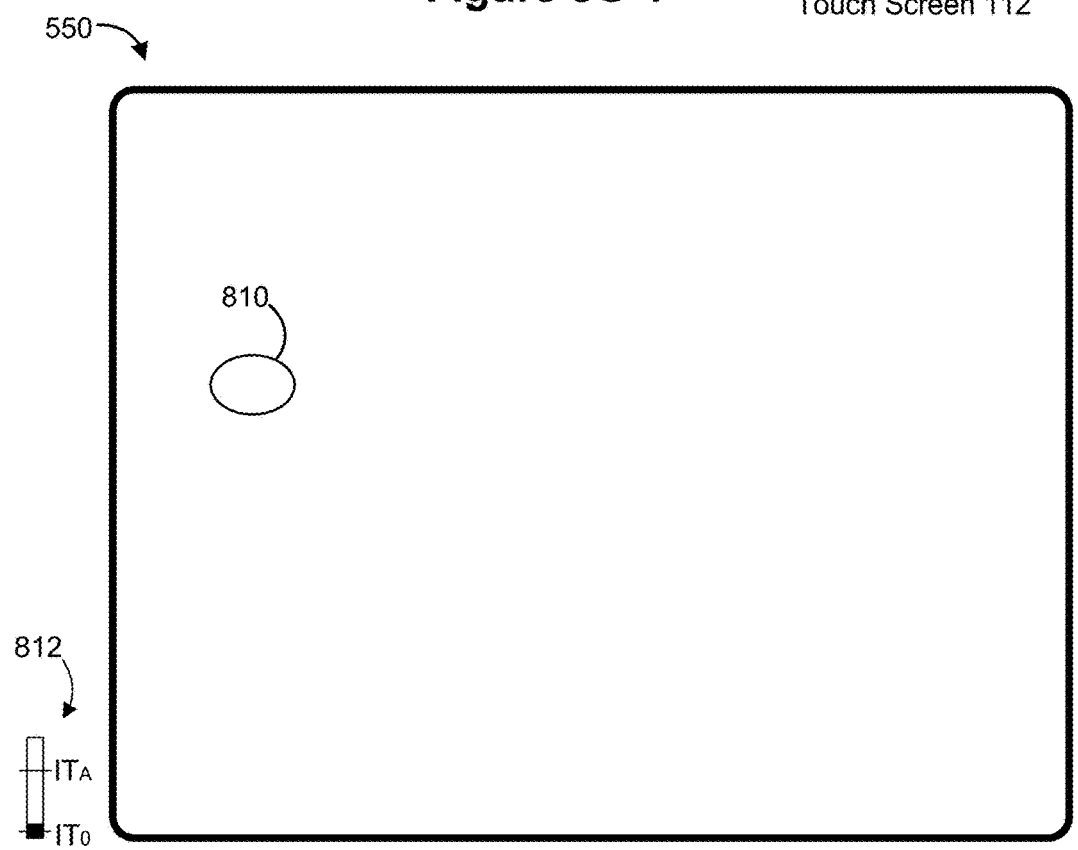

In FIG. 8G-1, the characteristic intensity of front side contact 818 has increased above a deep press intensity threshold $IT_D$, as indicated by front side intensity meter 808. In accordance with a determination that the characteristic intensity of front side contact 818 has increased above the deep press intensity threshold $IT_D$, the second web page that is the destination of link 804 is displayed in user interface 802.

Figures 1, 8H:
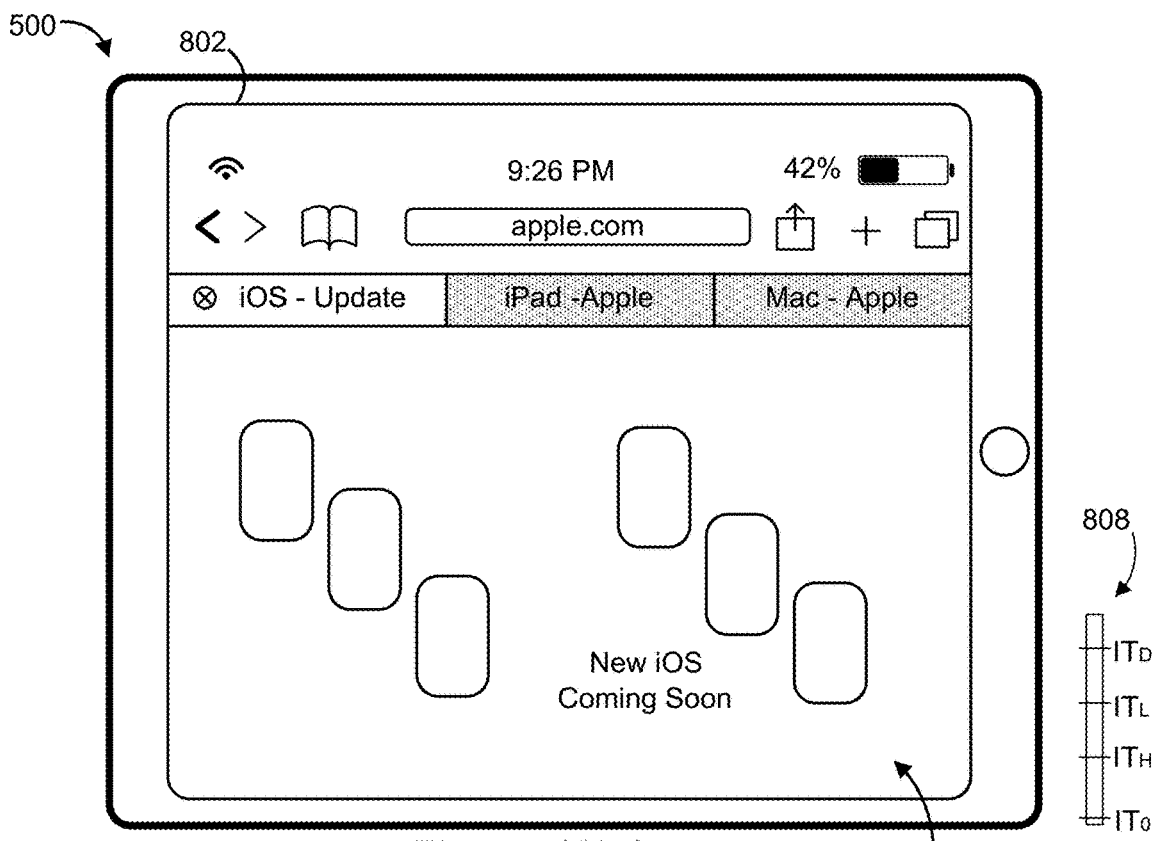
Figures 2, 8H:
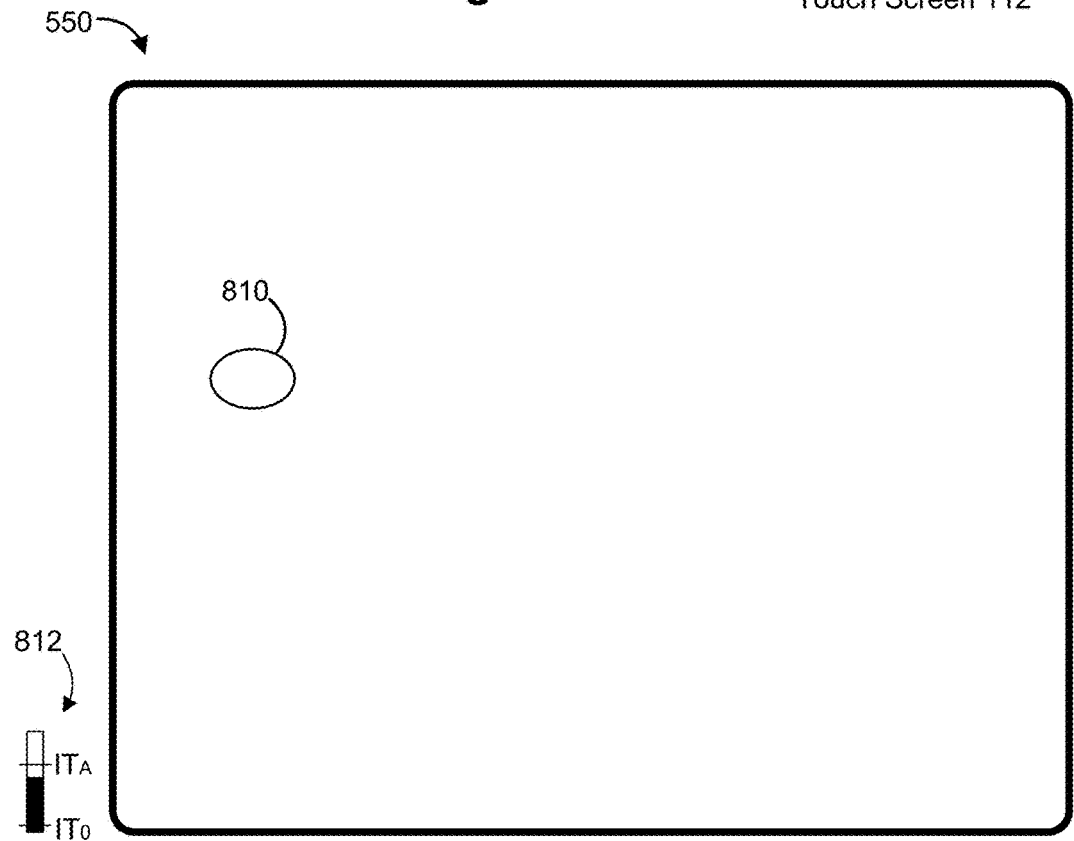

In FIG. 8H-1, front side contact 818 has lifted off from touch screen 112. In FIG. 8H-2, a characteristic intensity of back side contact 810 has increased to just below an activation intensity threshold $IT_A$, as indicated by first back side intensity meter 812.

Figures 1, 8I:
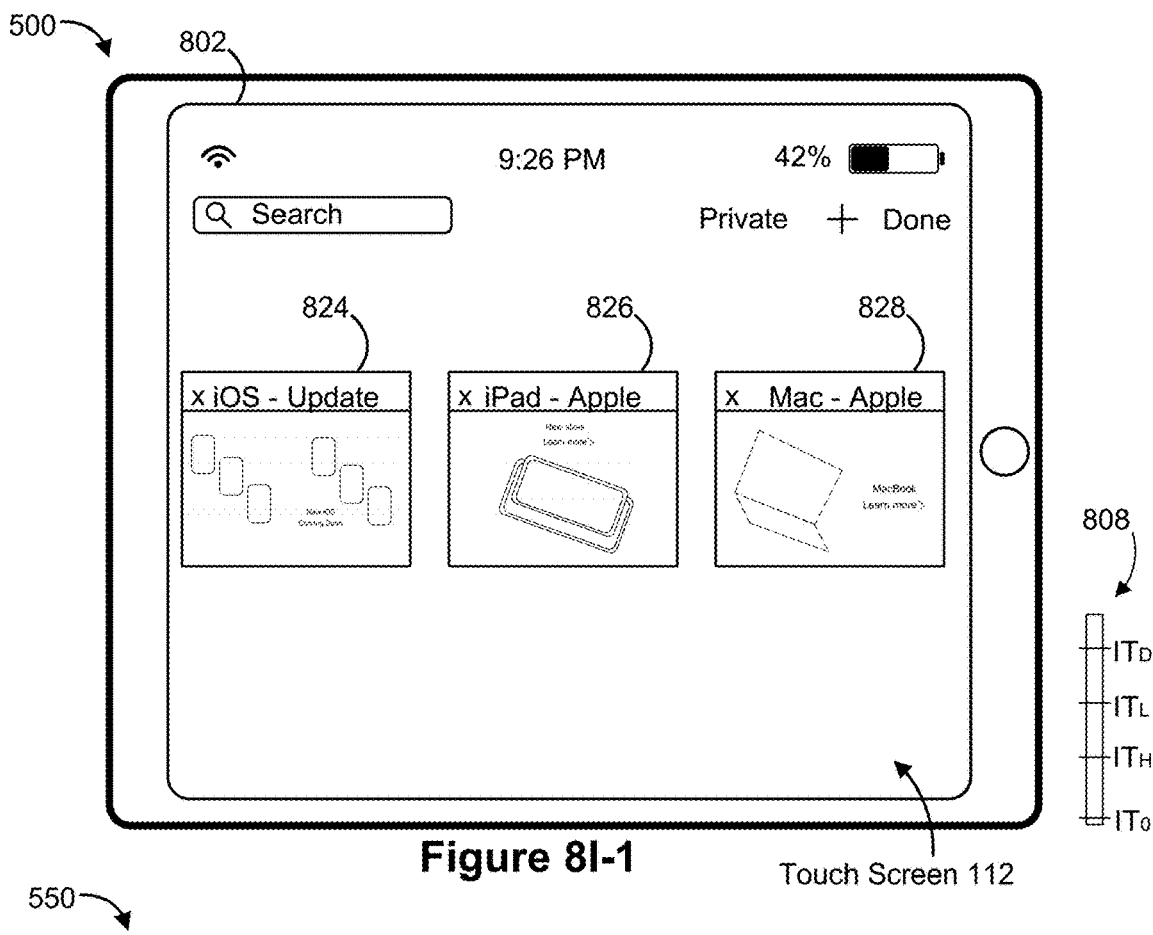
Figures 2, 8I:
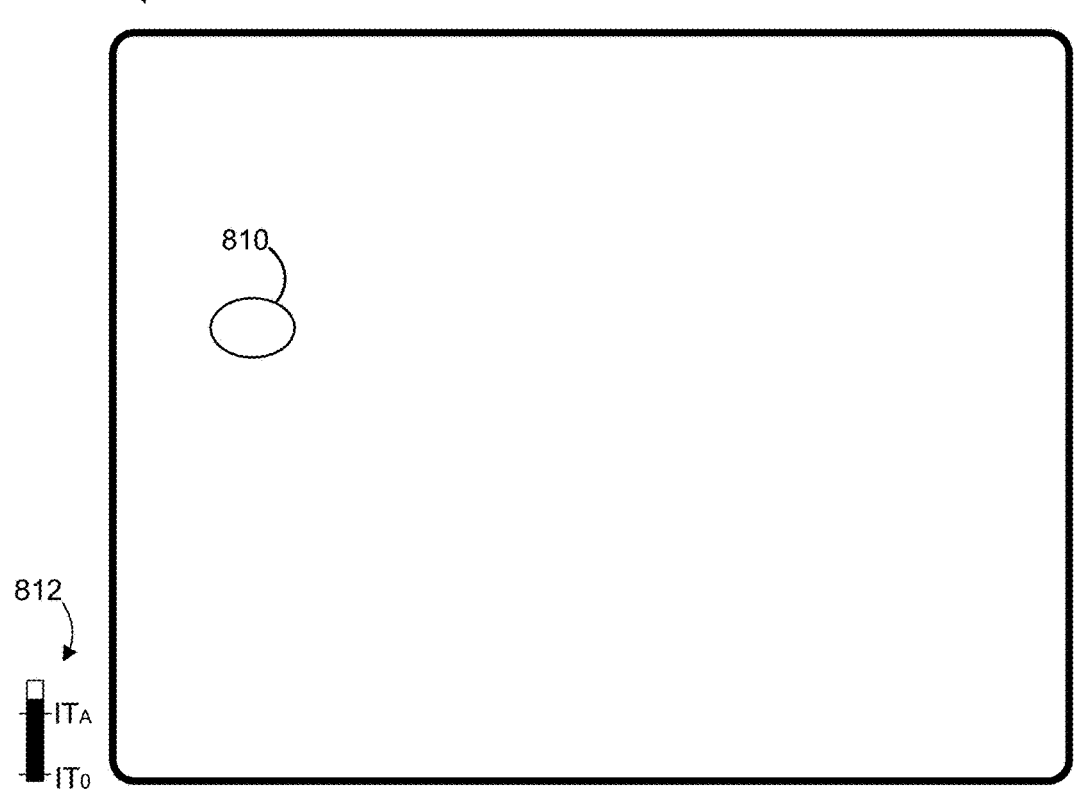

In FIG. 8I-1, web browser user interface 802 has transitioned from displaying a view of a single web page to a view of multiple open web pages in response to an increase in the characteristic intensity of back side contact 810 above activation intensity threshold $IT_A$, as indicated by first back side intensity meter 812 shown in FIG. 8I-2. In FIG. 8I-1, multiple representations of web pages that have been opened in a web browsing application (e.g., representation 824 of the second web page, representation 826 of a third web page, and representation 828 of a fourth web page) are displayed in user interface 802.

Figures 1, 8J:
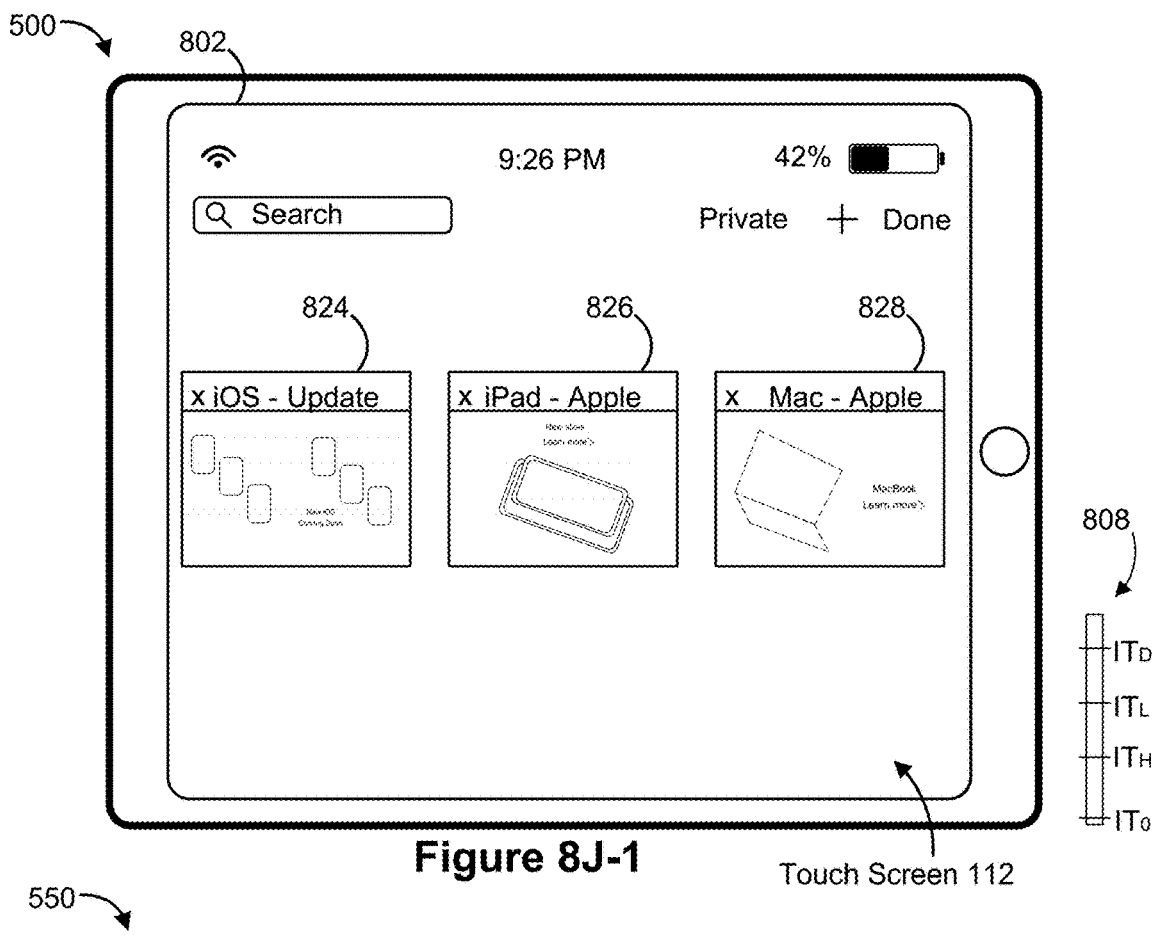
Figures 2, 8J:
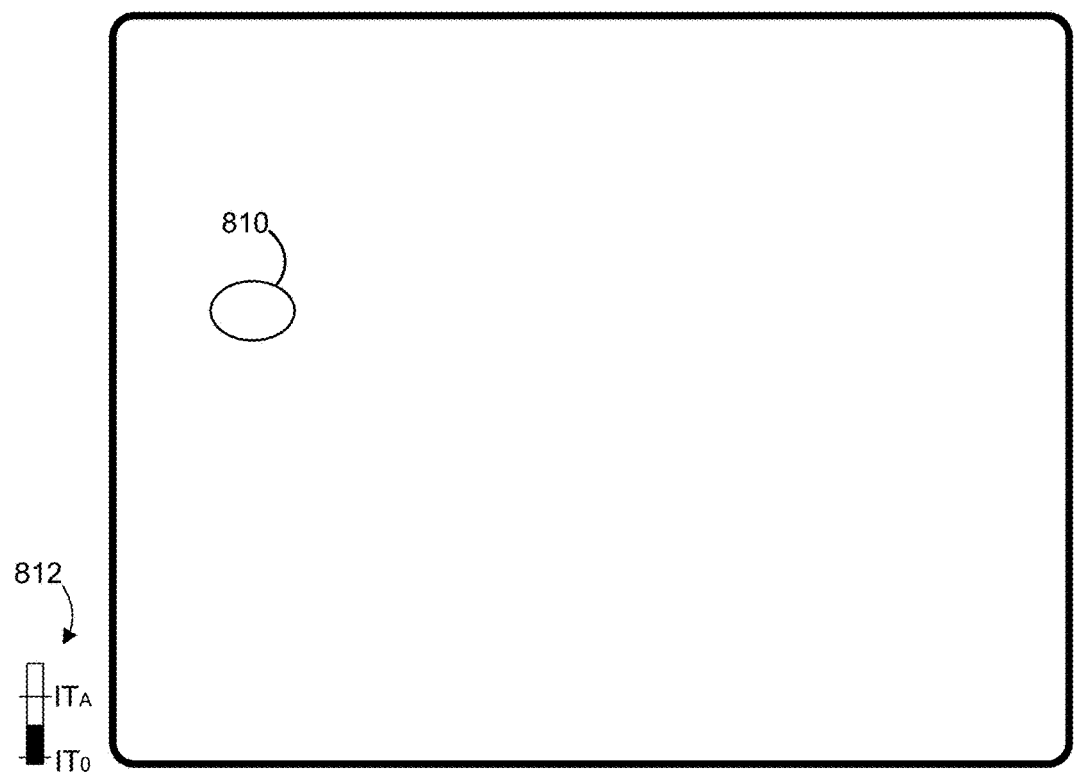

In FIG. 8J-2, the characteristic intensity of back side contact 810 has decreased below activation intensity threshold $IT_A$, as indicated by first back side intensity meter 812. The multiple representations of web pages remain displayed in user interface 802, as shown in FIG. 8J-1.

Figures 1, 8K:
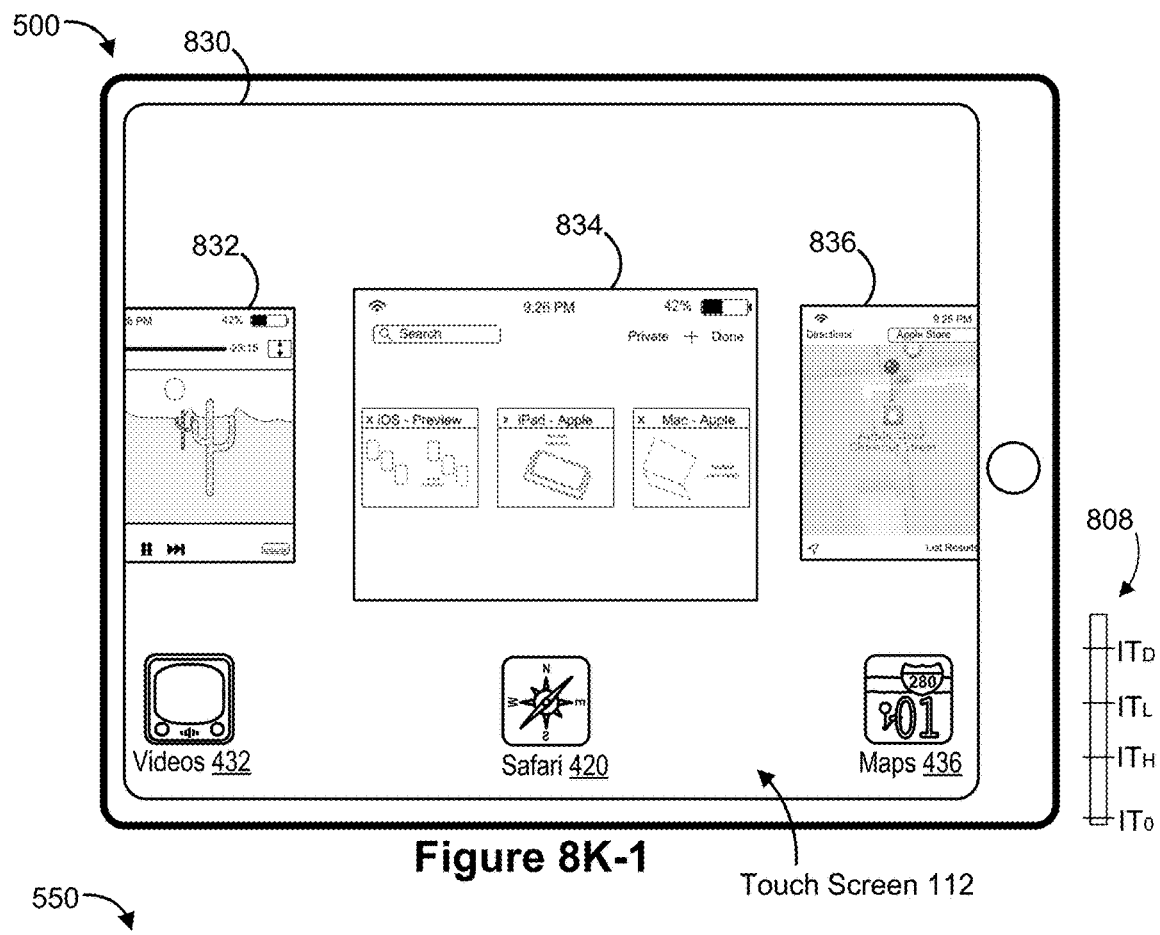
Figures 2, 8K:
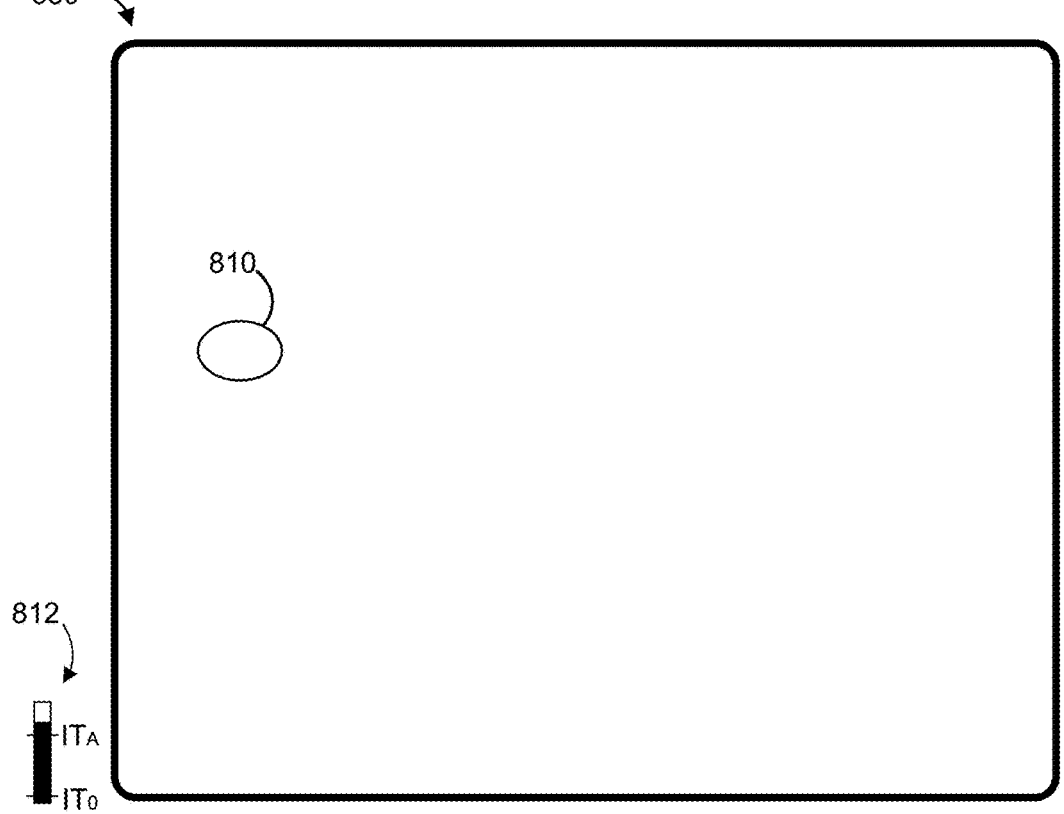

In FIG. 8K, the device has transitioned from displaying a view of multiple open web pages in web application user interface 802 to displaying a view of multiple active applications (e.g., currently executing applications) in a multitasking user interface 830 in response to an increase in the characteristic intensity of back side contact 810 above activation intensity threshold $IT_A$, as indicated by first back side intensity meter 812 in FIG. 8K-2. In FIG. 8K-1, representations of multiple active applications (e.g., representation 832 of a video application user interface, application icon 432 for a video application, representation 834 of a web application user interface 802, application icon 420 for a web browsing application, representation 836 of a map application user interface, and map application icon 436 for a map application) are displayed in a multitasking interface 830.

FIGS. 8L-8O illustrate use of back side input on the right and left halves of the back side 550 of the device to shift left and right, respectively, through the active applications in the multitasking user interface 830.

Figures 1, 8L:
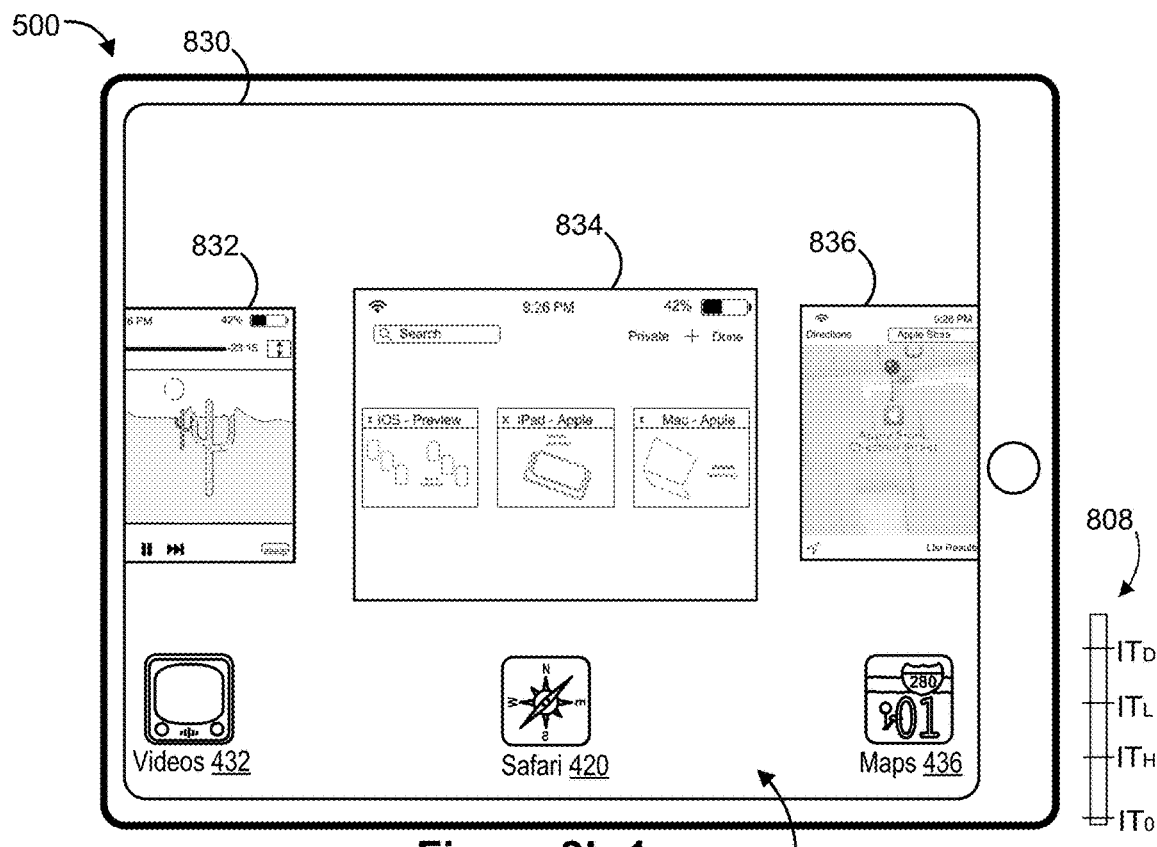
Figures 2, 8L:
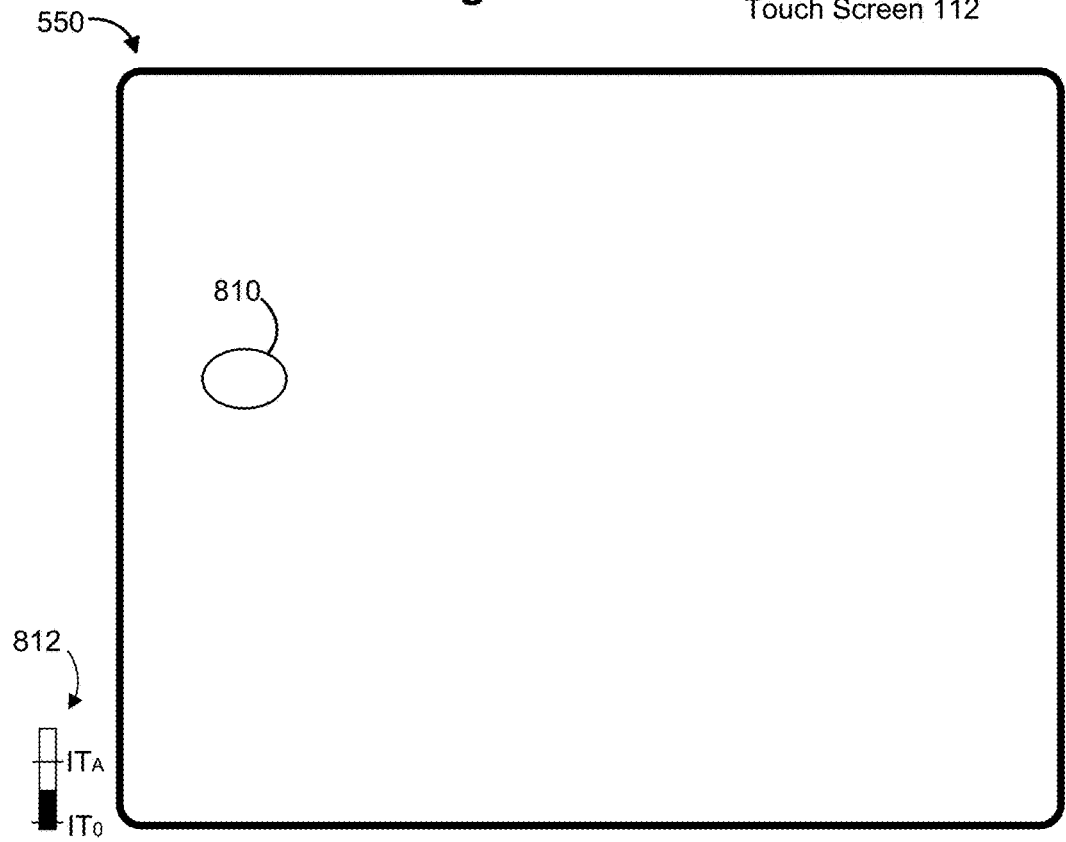

In FIG. 8L-2, the characteristic intensity of back side contact 810 has decreased below activation intensity threshold $IT_A$, as indicated by first back side intensity meter 812. The multiple representations of active applications 832, 834, and 836 remain displayed in multitasking user interface 830, as shown in FIG. 8L-1.

Figures 1, 8M:
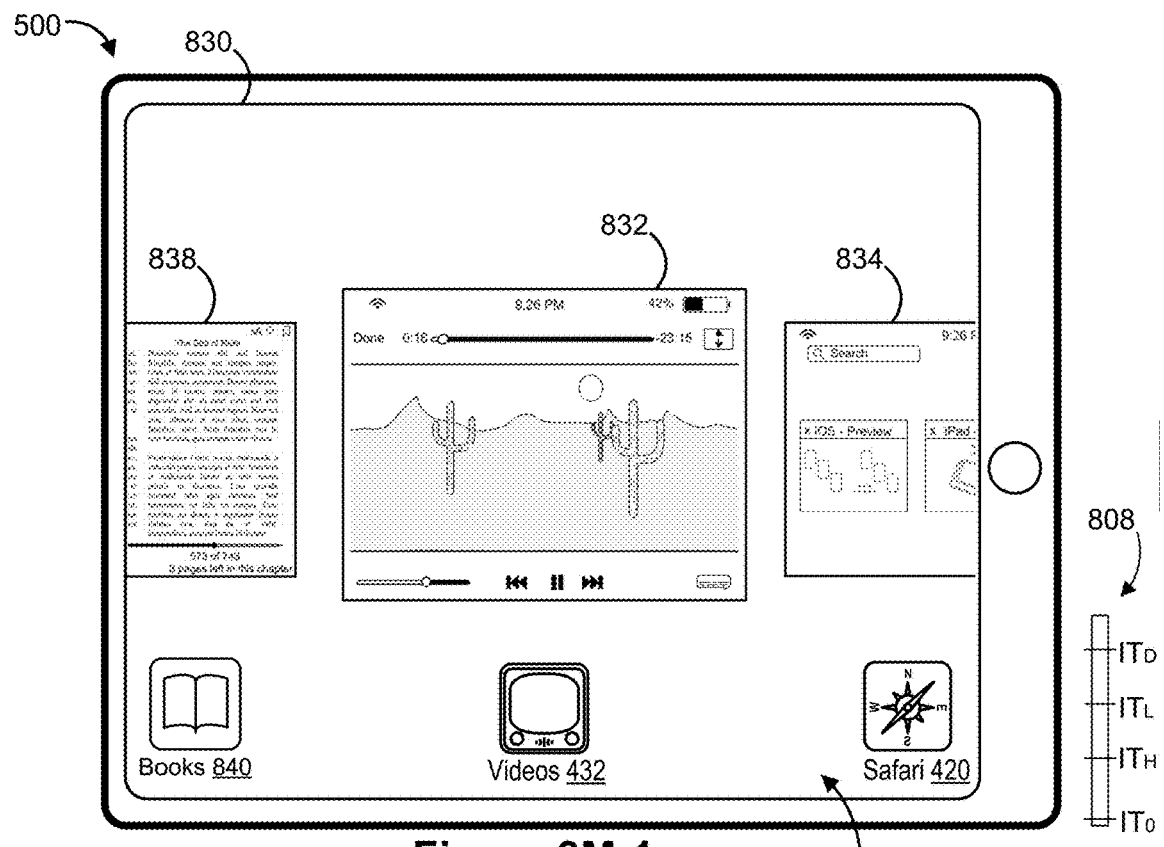
Figures 2, 8M:
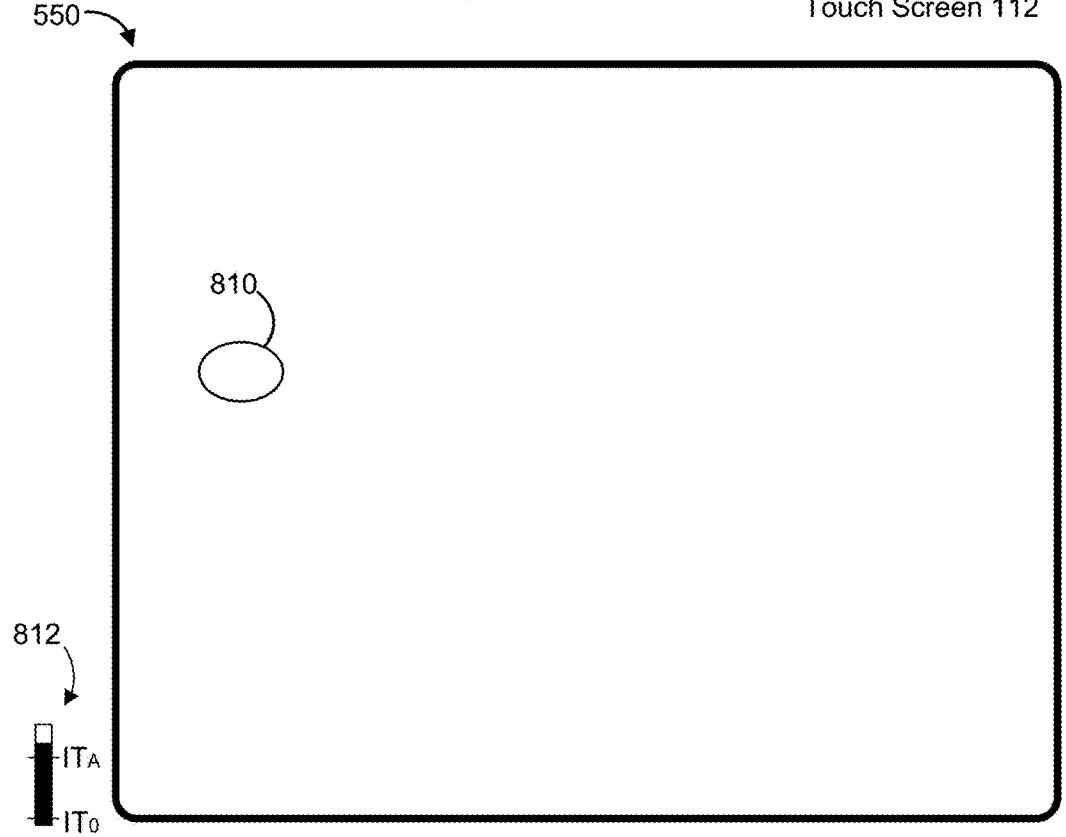

In FIG. 8M-2, the characteristic intensity of back side contact 810 has increased above activation intensity threshold $IT_A$, as indicated by first back side intensity meter 812. In accordance with a determination that the characteristic intensity of back side contact 810 has increased above the activation intensity threshold $IT_A$ (e.g., while a multitasking user interface 830 is displayed), the representations of the multiple active applications are shifted. For example, the representations of the multiple active applications are shifted rightward in response to the input by back side contact 810 on the right half 726 (as described with regard to FIGS. 7A-7B) of the back side 550 of the device, and a representation 838 of a book application user interface and an application icon 840 for a book application are displayed in multitasking interface 830, as shown in FIG. 8M-1.

Figures 1, 8N:
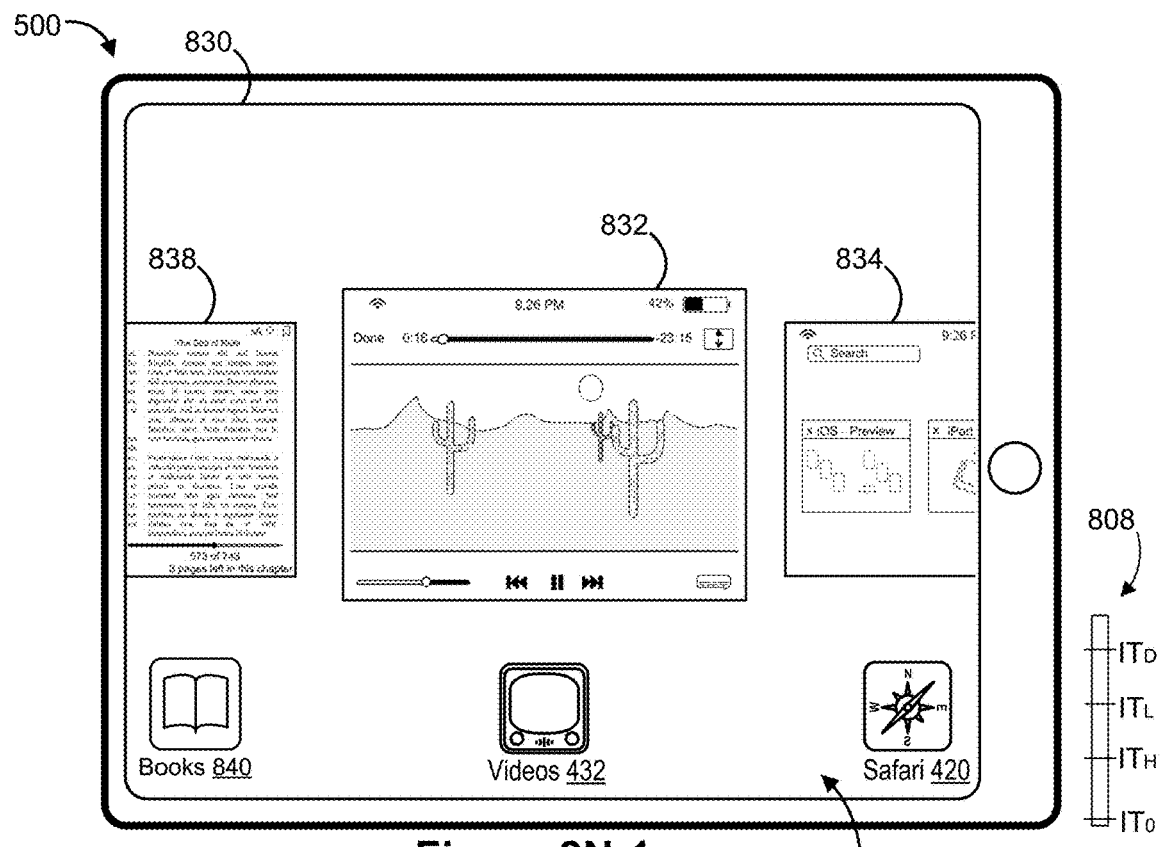
Figures 2, 8N:
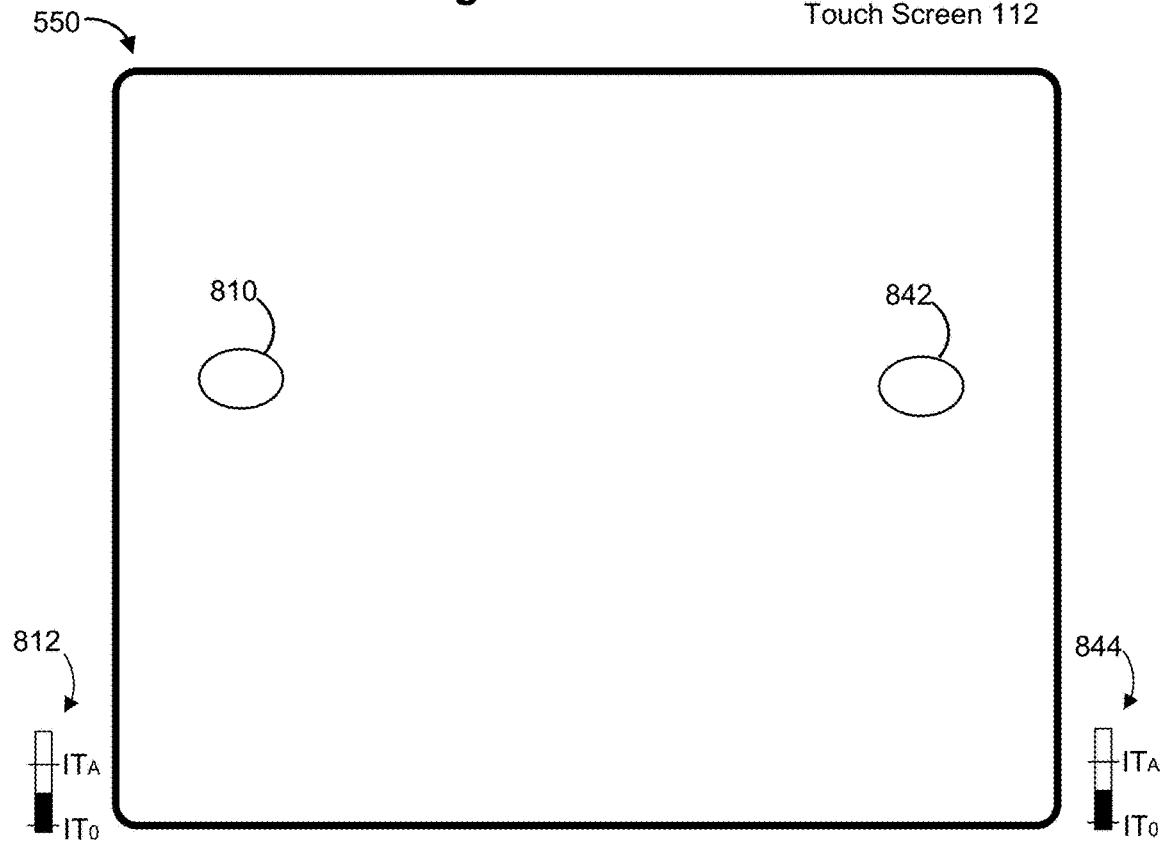

In FIG. 8N-2, the characteristic intensity of back side contact 810 has decreased below activation intensity threshold $IT_A$, as indicated by first back side intensity meter 812. A back side contact 842 is detected on the left half 724 (as described with regard to FIGS. 7A-7B) of the back side 550 of the device. A characteristic intensity of back side contact 842 on the left half 724 of the back side 550 of the device is below activation intensity threshold $IT_A$, as indicated by second back side intensity meter 844, and a characteristic intensity of back side contact 810 on the right half 726 of the back side 550 of the device is below activation intensity threshold $IT_A$, as indicated by first back side intensity meter 812. The representations 838, 832 and 834 of active applications and application icons 420, 432, and 420 remain displayed in web application user interface 802, as shown in FIG. 8N-1.

Figures 1, 8O:
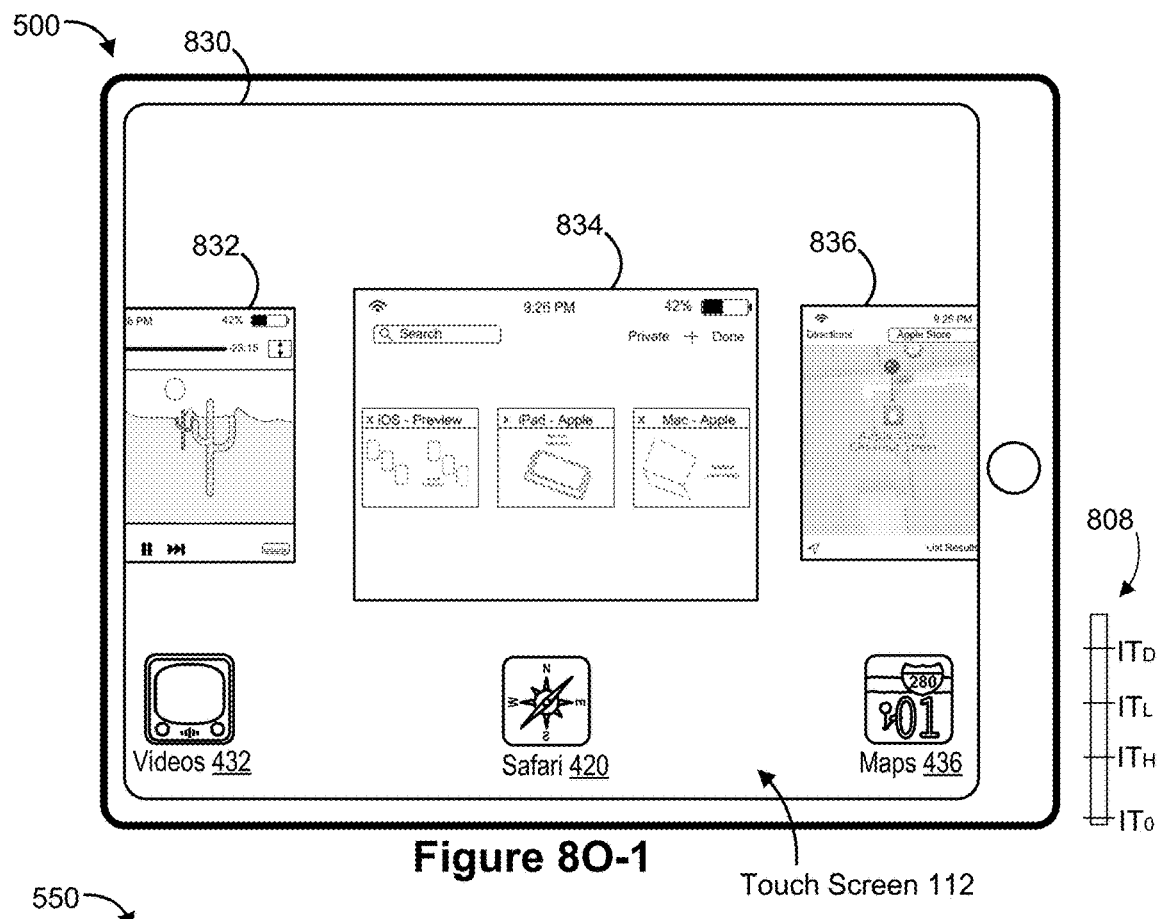
Figures 2, 8O:
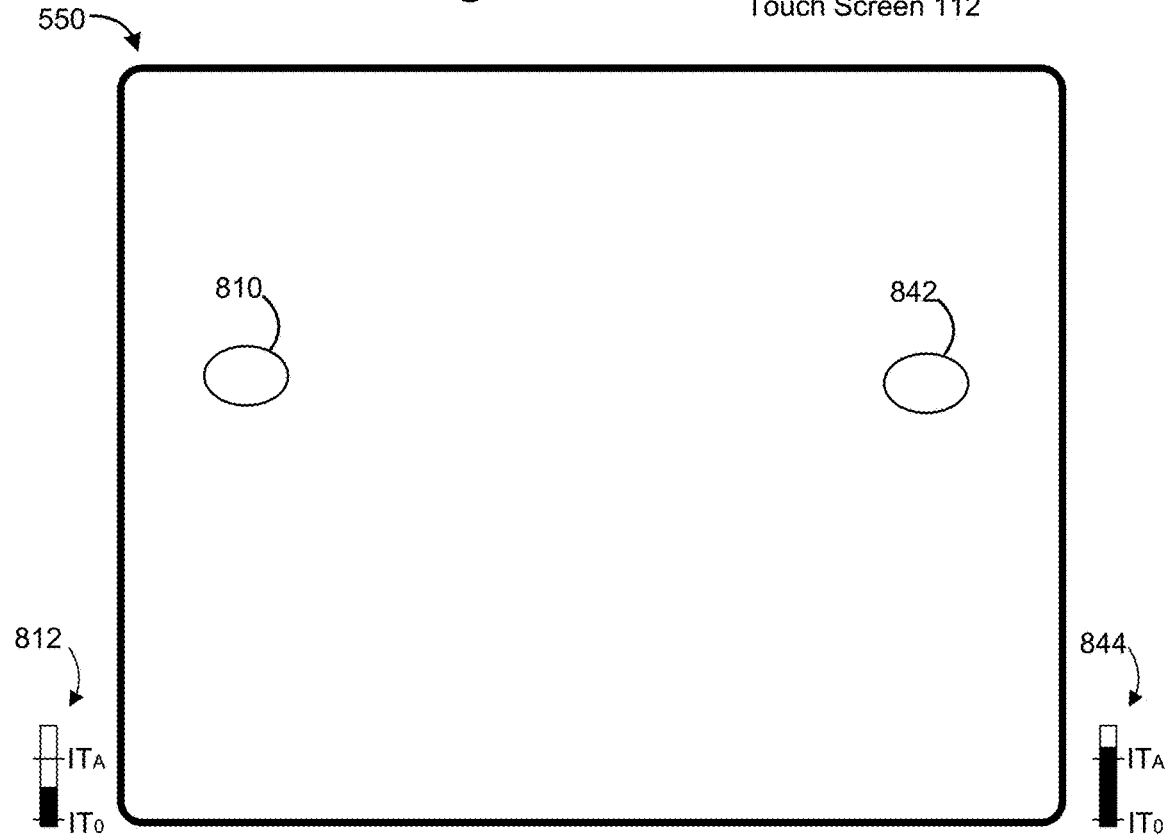

In FIG. 8O-2, a characteristic intensity of back side contact 842 on the left half 724 of the back side 550 of the device increases above activation intensity threshold $IT_A$, as indicated by second back side intensity meter 844, and a characteristic intensity of back side contact 810 on the right half 726 of the back side 550 of the device remains below activation intensity threshold $IT_A$, as indicated by first back side intensity meter 812. In accordance with a determination that the characteristic intensity of back side contact 842 has increased above the activation intensity threshold $IT_A$ (e.g., while a multitasking user interface 830 is displayed), the representations of the multiple active applications are shifted. For example, the representations of the multiple active applications are shifted leftward in response to input by back side contact 842 on the left half 724 of the back side 550 of the device, and a representation 838 of a book application user interface and an application icon 840 for a book application cease to be displayed in multitasking interface 830, as shown in FIG. 8O-1.

Figures 1, 8P:
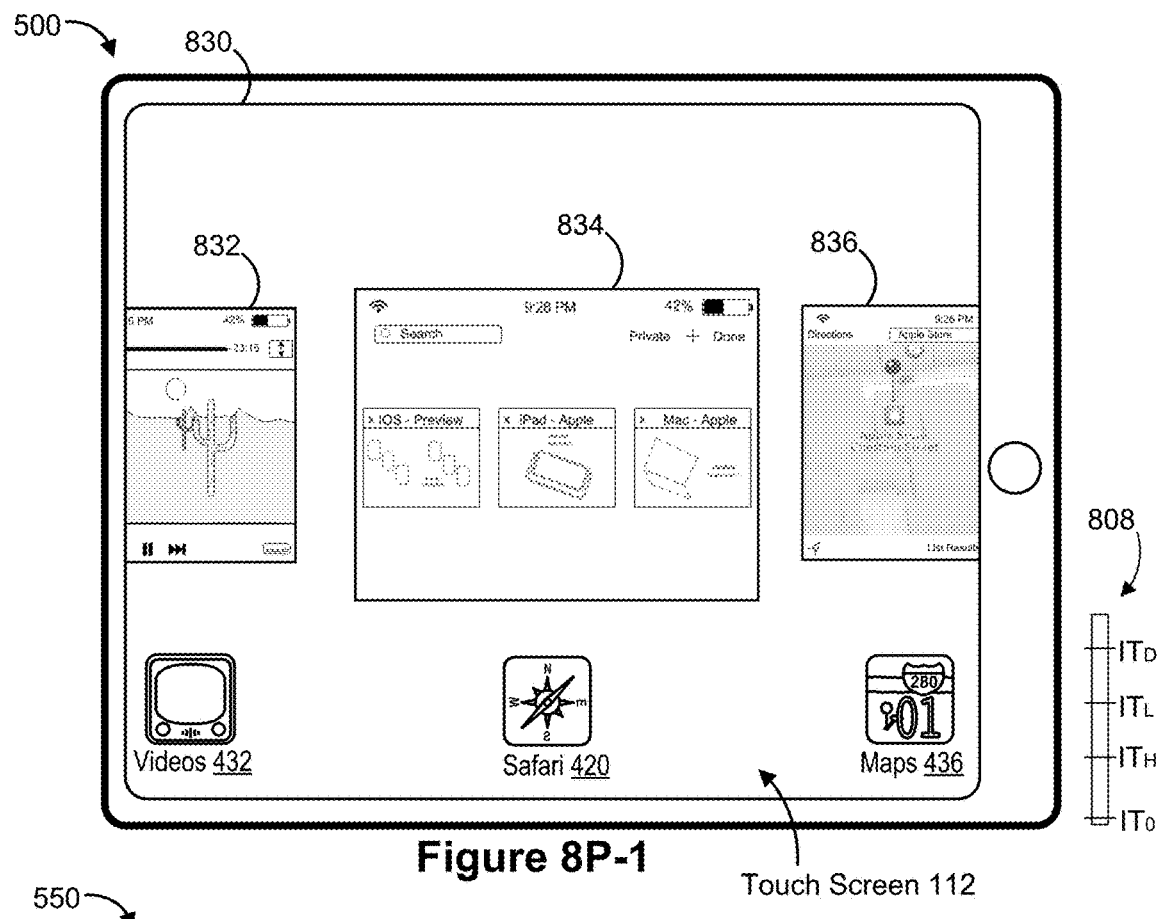
Figures 2, 8P:
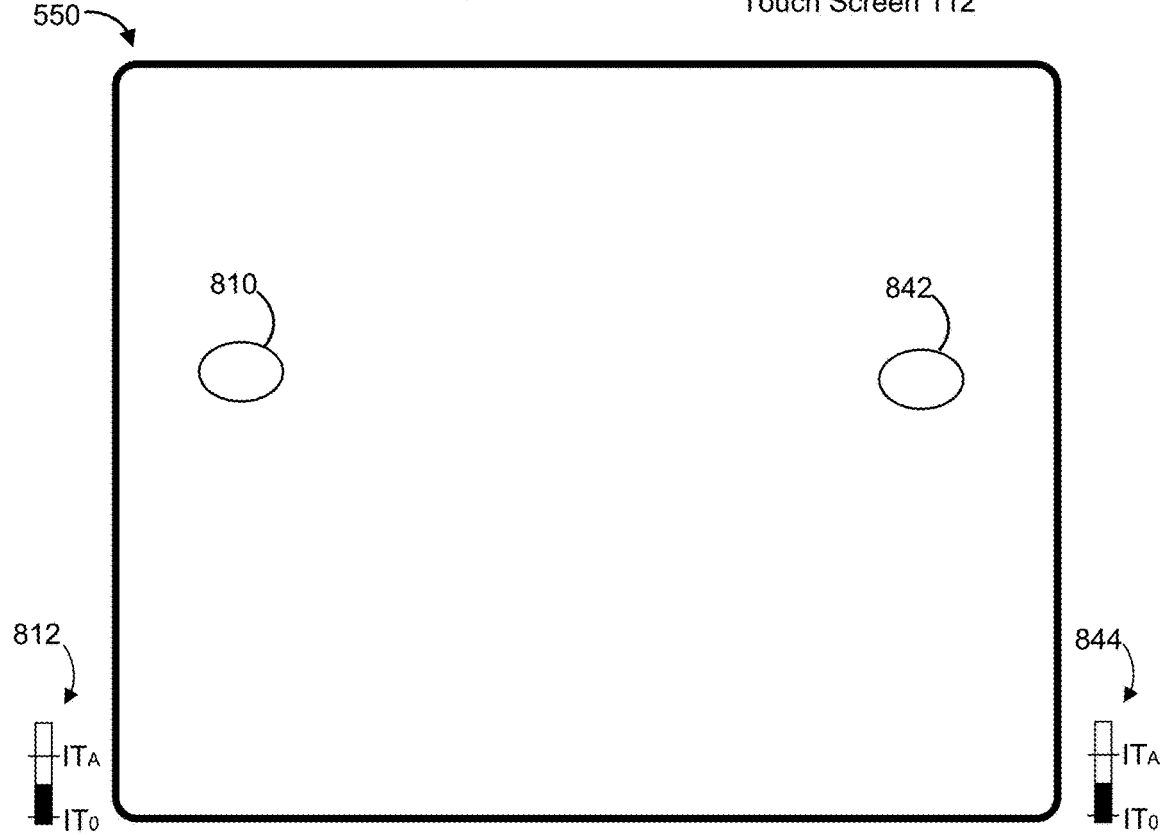

In FIG. 8P-2, the characteristic intensity of back side contact 810 on the right half 726 of the back side 550 of the device has decreased below activation intensity threshold $IT_A$, as indicated by first back side intensity meter 812, and the characteristic intensity of back side contact 842 on the left half 724 of the back side 550 of the device has decreased below activation intensity threshold $IT_A$, as indicated by second back side intensity meter 844. The representations 832, 834 and 836 of active applications and application icons 420, 432, and 840 remain displayed in web application user interface 802, as shown in FIG. 8P-1.

Figures 1, 8Q:
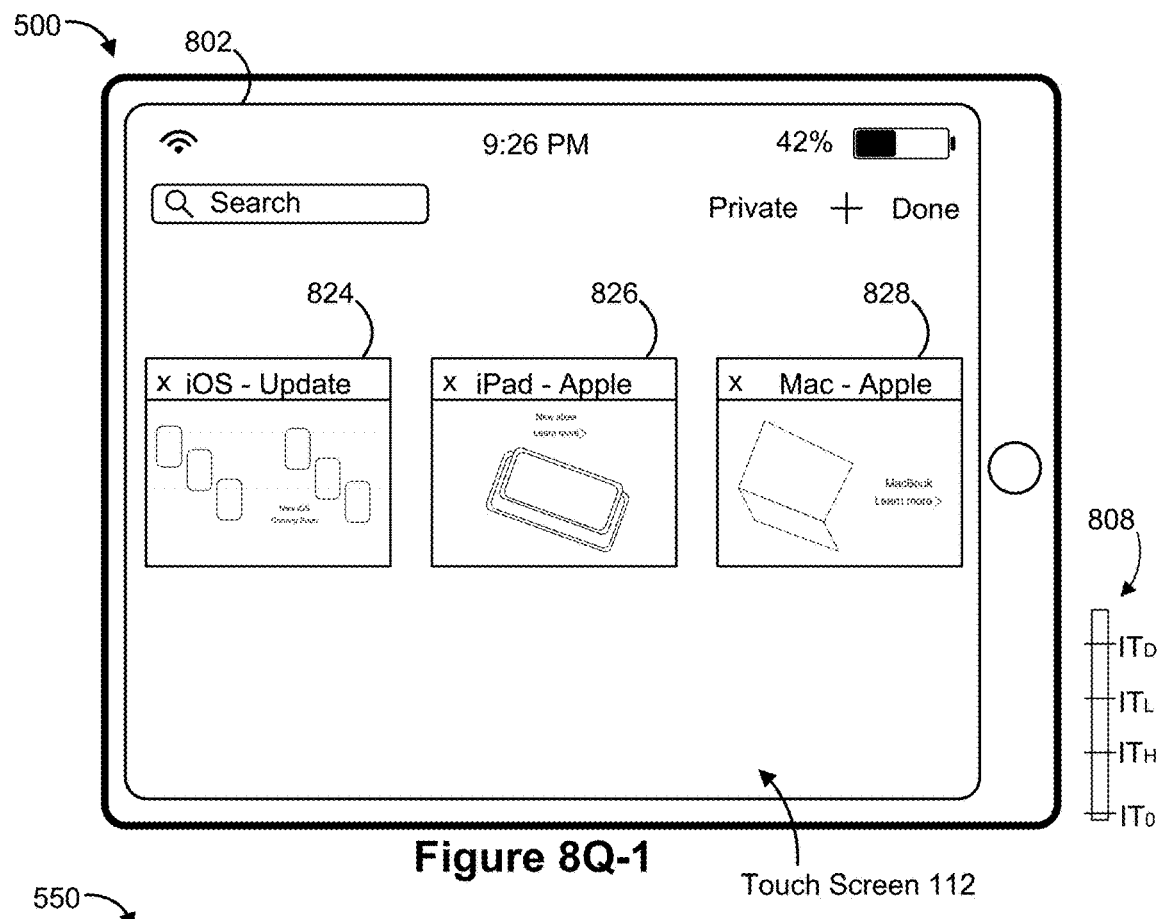
Figures 2, 8Q:
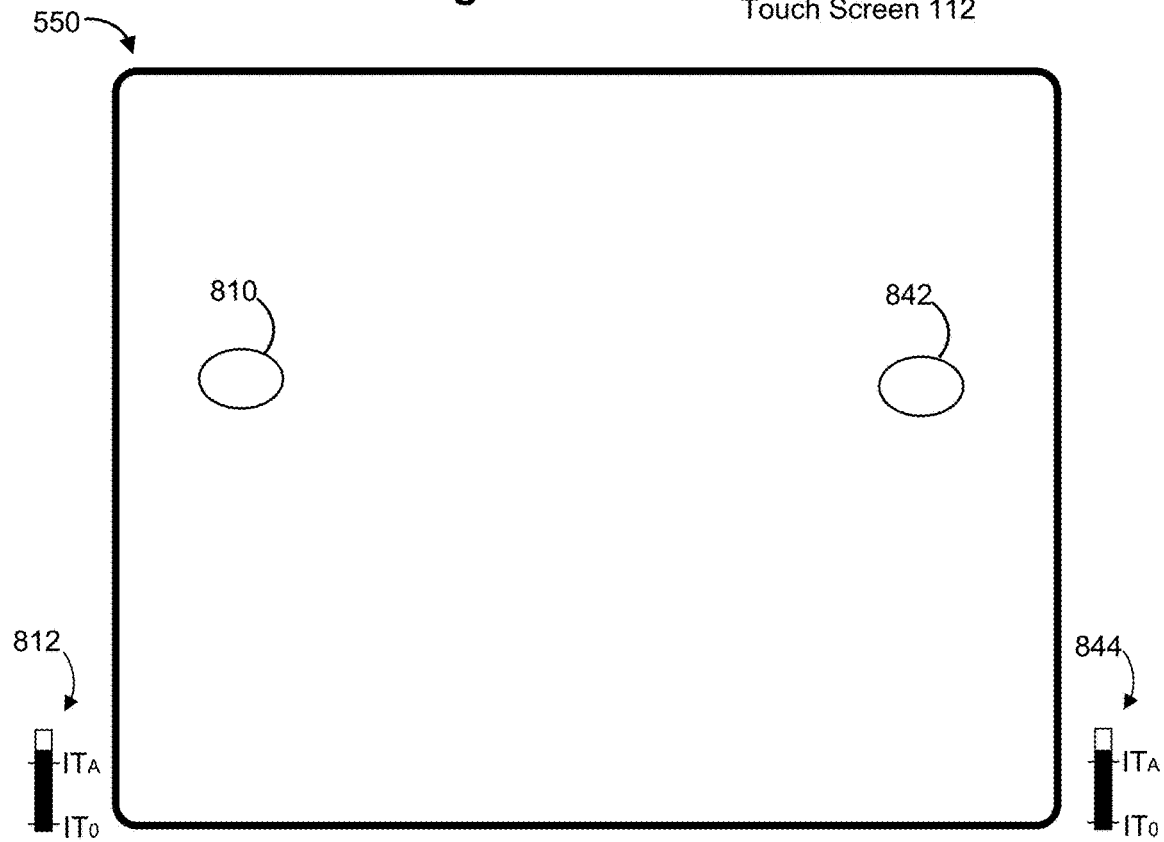

In FIG. 8Q, the device has transitioned from displaying a view of multiple active applications in a multitasking user interface 830 to displaying a view of multiple open web pages in web application user interface 802, in response to an increase in the intensity of both contacts on the back side of the device, e.g., the characteristic intensity of back side contact 810 on the right half 726 of the back side 550 of the device has increased above activation intensity threshold $IT_A$, as indicated by first back side intensity meter 812, and the characteristic intensity of back side contact 842 on the left half 724 of the back side 550 of the device has increased above activation intensity threshold $IT_A$, as indicated by second back side intensity meter 844, as shown in FIG. 8Q-2. In accordance with a determination that the characteristic intensity of back side contact 810 has increased above the activation intensity threshold and the characteristic intensity of back side contact 842 has increased above the activation intensity threshold, the web application user interface 802 including the multiple representations (824, 826, and 828) of web pages is redisplayed, as shown in FIG. 8Q-1.

Figures 1, 8R:
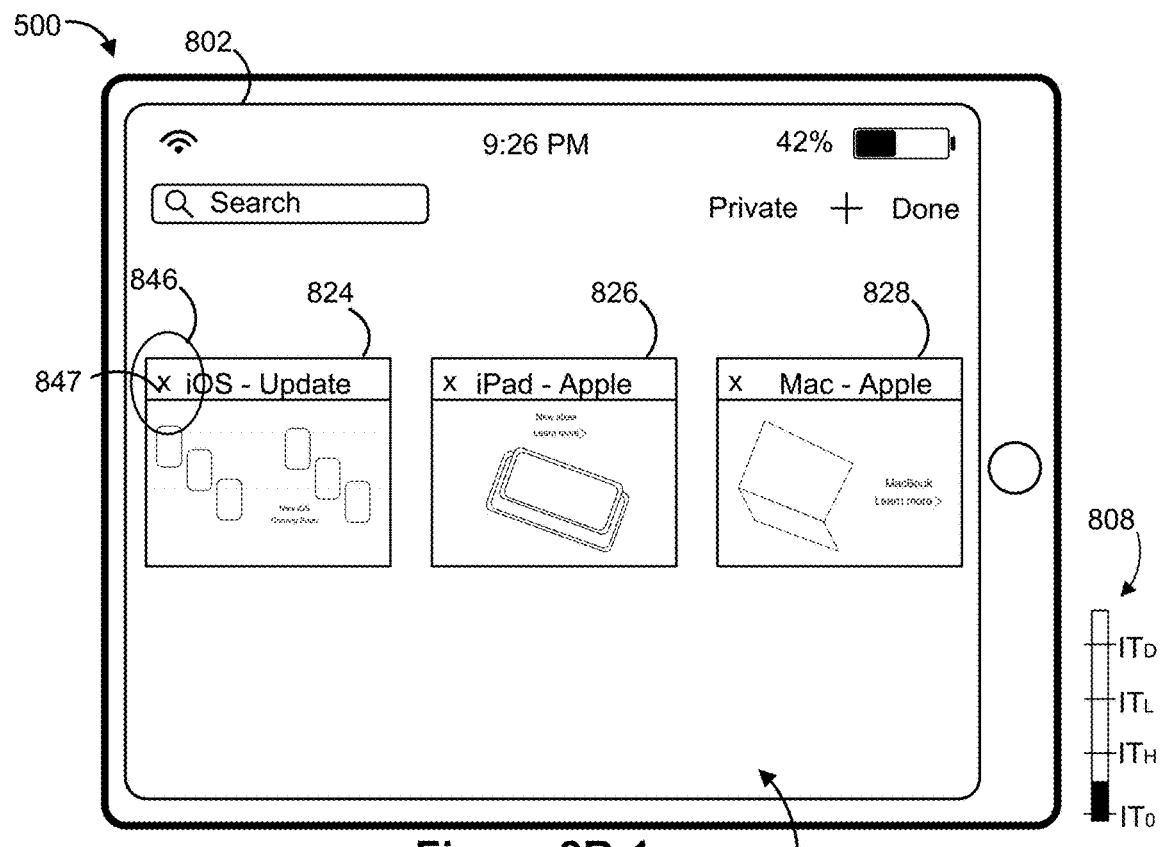
Figures 2, 8R:
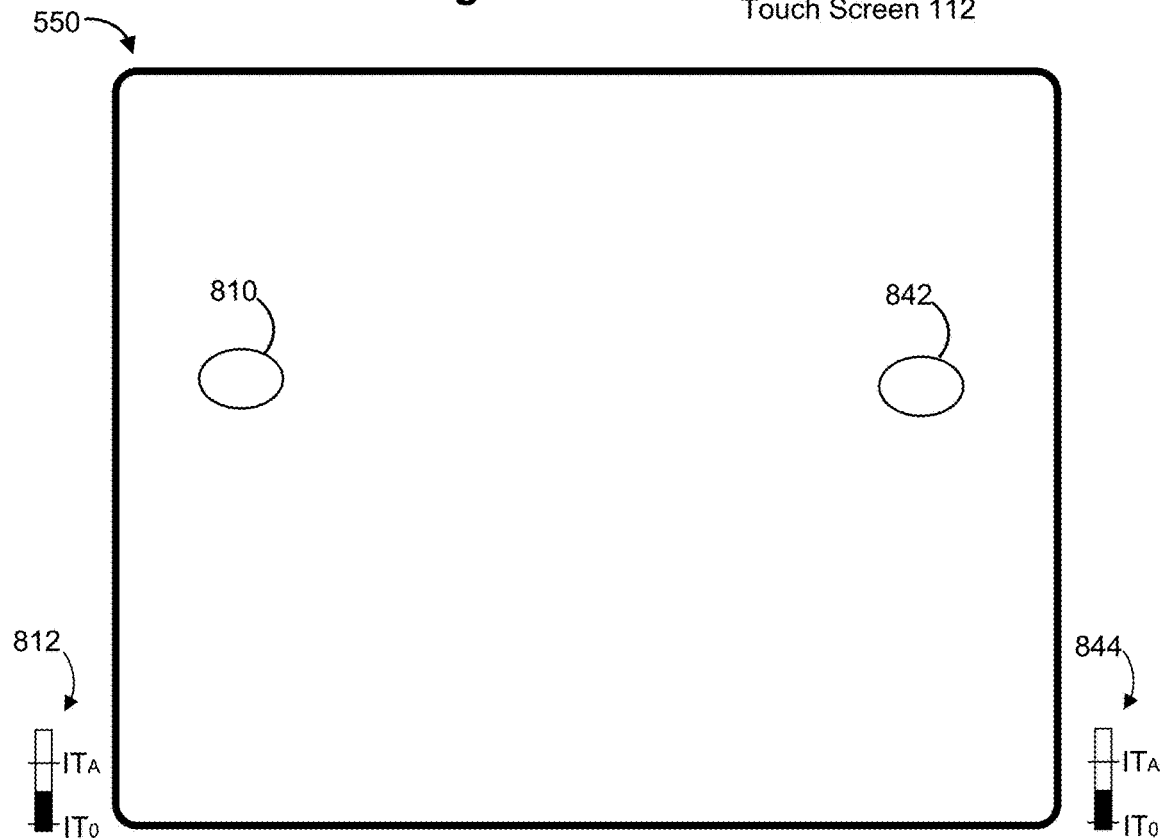

In FIG. 8R, the intensity of both back side contacts has decreased, and a front side input is received to close an open web page. In FIG. 8R-2, the characteristic intensity of back side contact 810 on the right half 726 of the back side 550 of the device has decreased below activation intensity threshold $IT_A$, as indicated by first back side intensity meter 812, and the characteristic intensity of back side contact 842 on the left half 724 of the back side 550 of the device has decreased below activation intensity threshold $IT_A$, as indicated by second back side intensity meter 844. In FIG. 8R-1, the device detects an input (e.g., a tap input) by a front side contact 846 on touch screen 112 at a location that corresponds to a control 847 for closing the second web page indicated in representation 824. In response to the input by front side contact 846, the second web page indicated in representation 824 is closed, as indicated in FIG. 8S-1.

Figures 1, 8S:
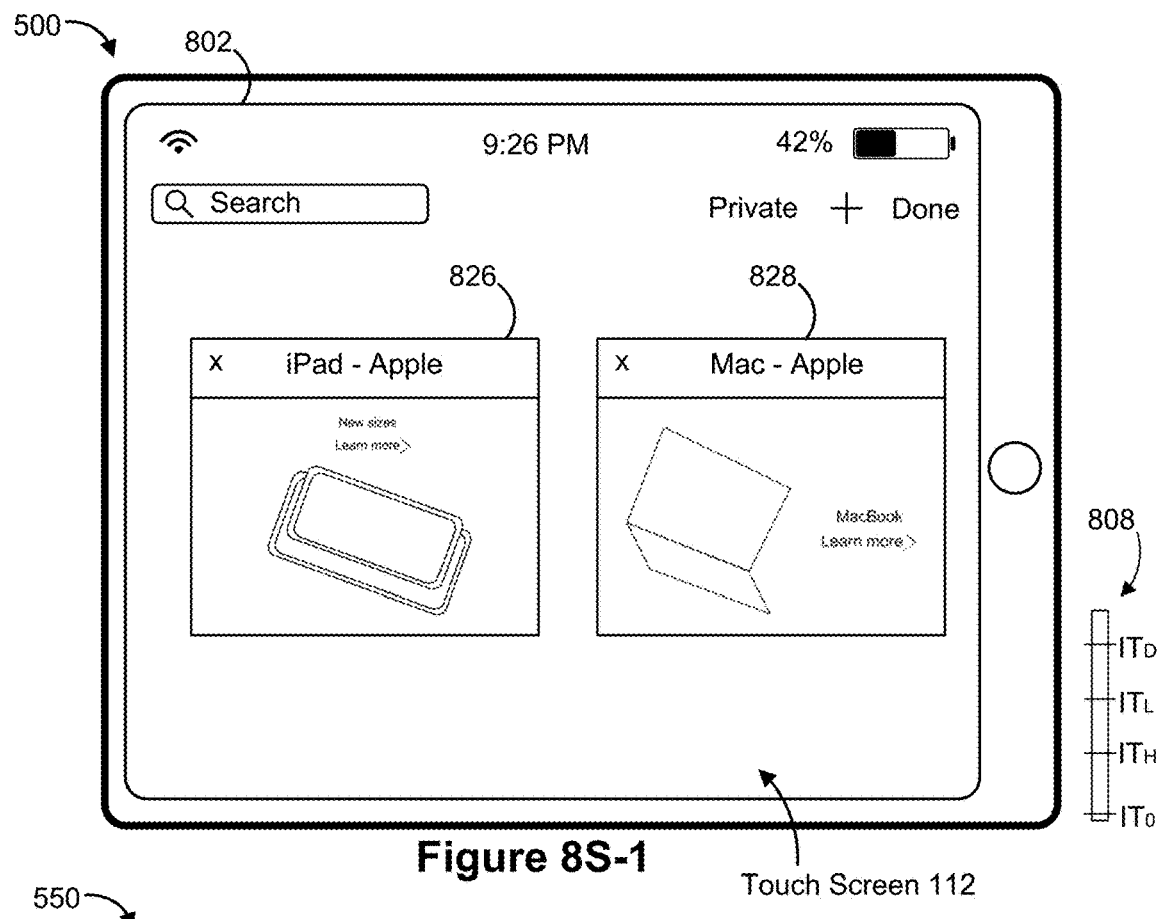
Figures 2, 8S:
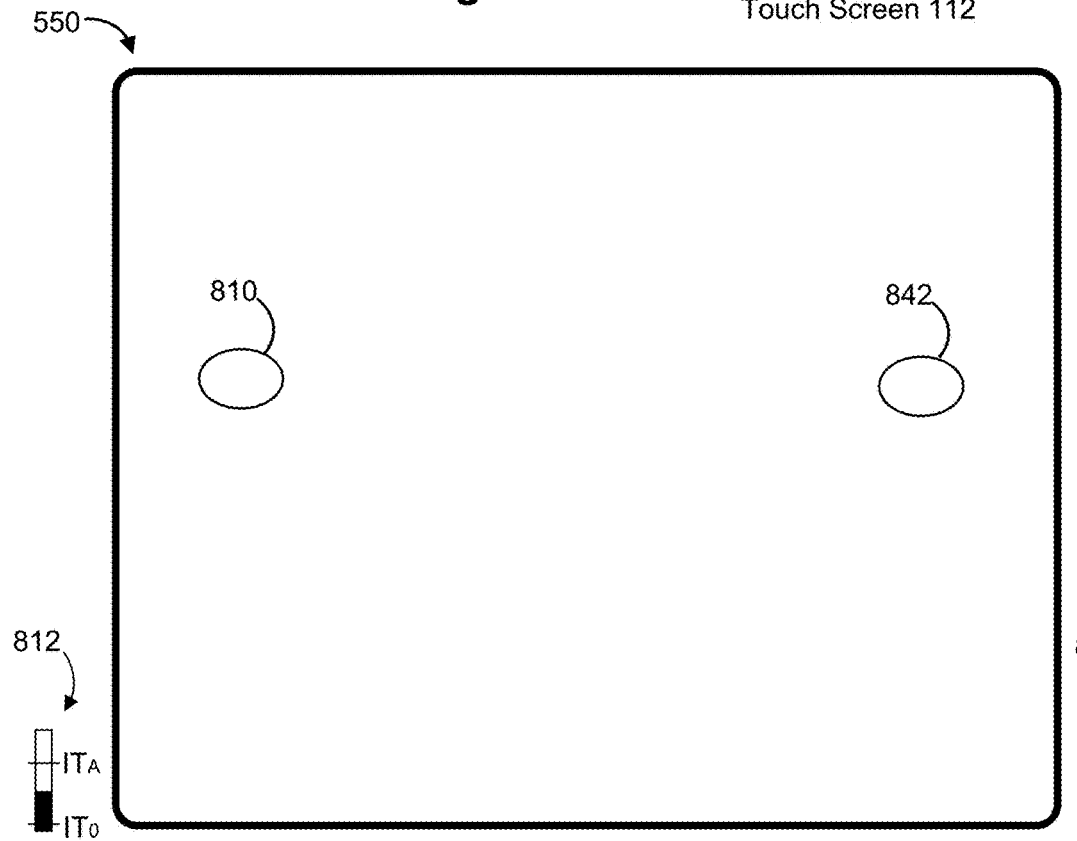

In FIG. 8S-1, front side contact 846 has lifted off from touch screen 112. In response to the input by front side contact 846 (as described with regard to 8R-1), the second web page indicated in representation 824 is not displayed in web application user interface 802. Because the second web page has been deleted from the set of open web pages in the web browsing application, the third web page corresponding to representation 826 moves into the leftmost position in web application user interface 802 (e.g., indicating that the third web page is the most recently viewed open web page).

Figures 1, 8T:
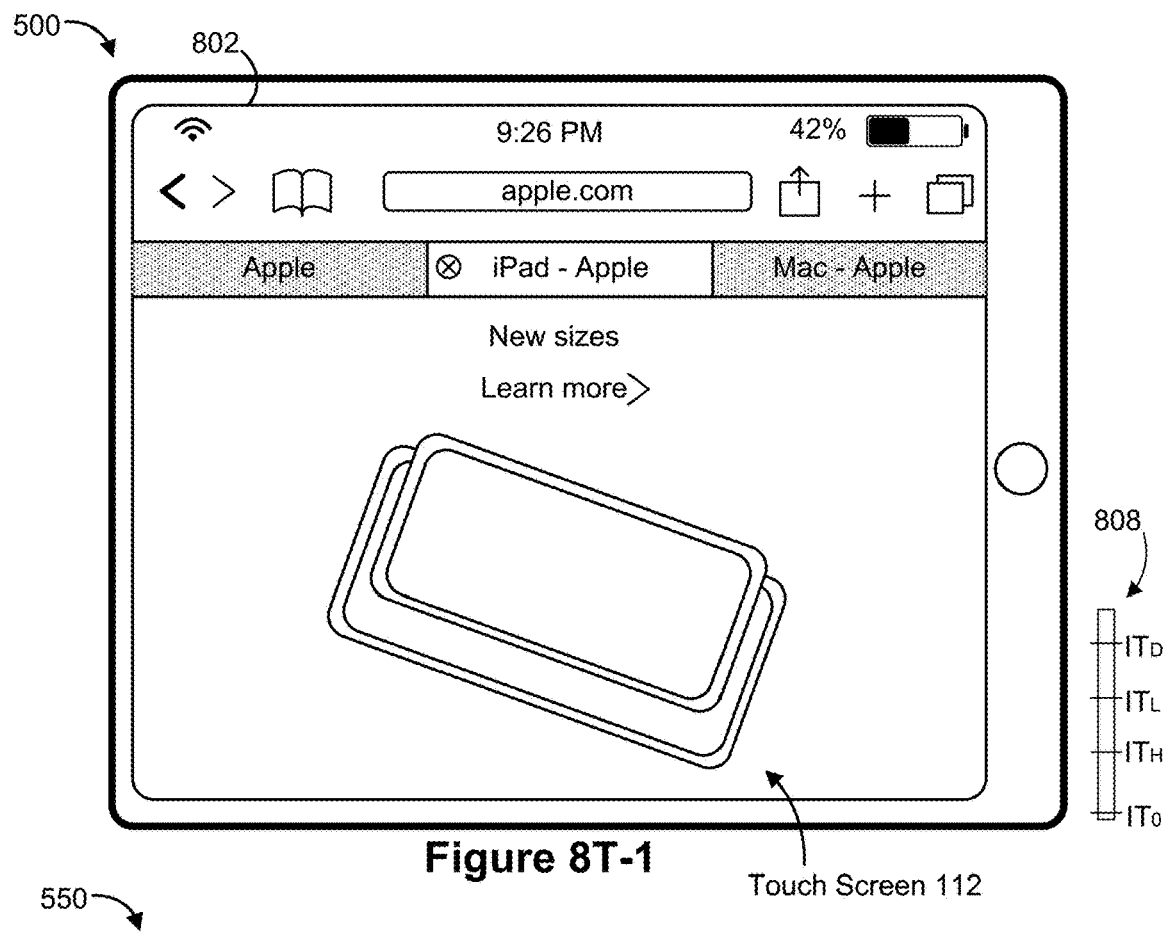
Figures 2, 8T:
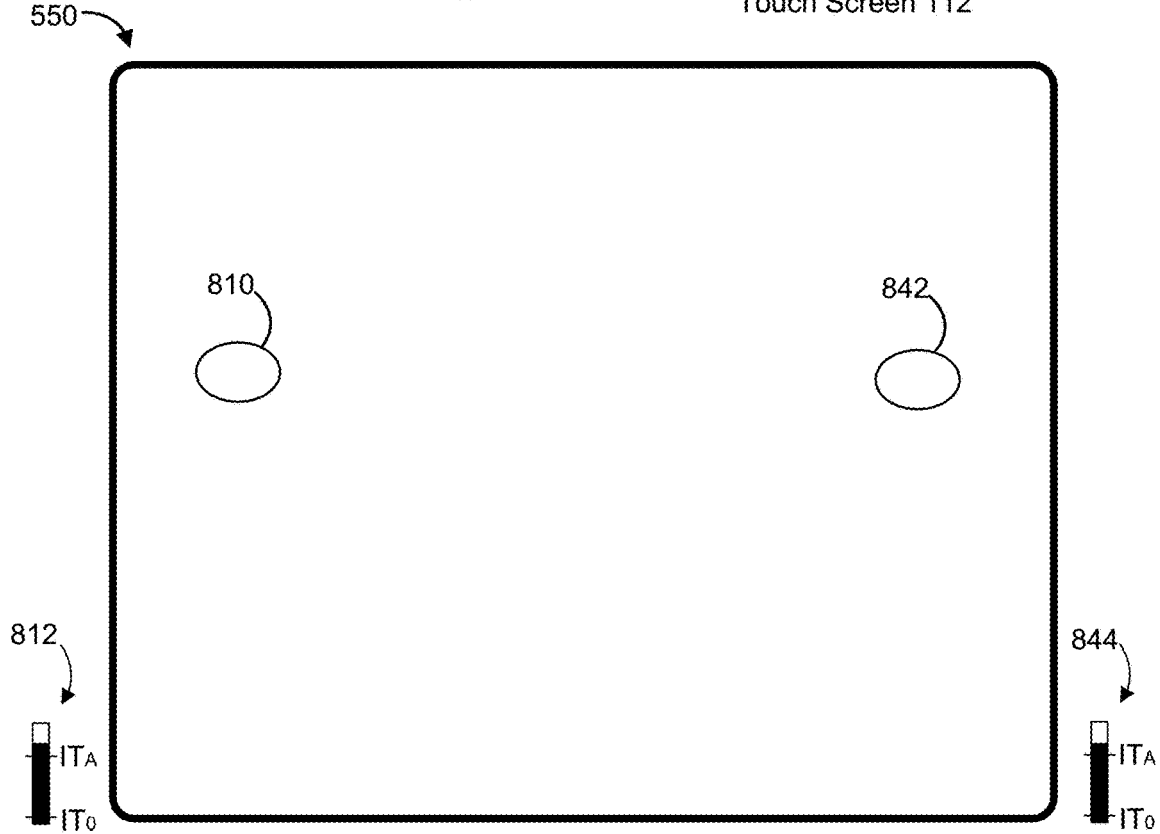

In FIG. 8T, web application user interface 802 has transitioned from displaying a view of multiple open web pages to a view of a single (most recently viewed) open web page. The intensities of both contacts on the back side of the device have increased, e.g., the characteristic intensity of back side contact 810 on the right half 726 of the back side 550 of the device has increased above activation intensity threshold $IT_A$, as indicated by first back side intensity meter 812, and the characteristic intensity of back side contact 842 on the left half 724 of the back side 550 of the device has increased above activation intensity threshold $IT_A$, as indicated by second back side intensity meter 844, as shown in FIG. 8T-2. In accordance with a determination that the characteristic intensity of back side contact 810 has increased above the activation intensity threshold and the characteristic intensity of back side contact 842 has increased above the activation intensity threshold, a third web page corresponding to representation 826 is displayed in web application user interface 802, as indicated in FIG. 8T-1.

Figures 1, 8U:
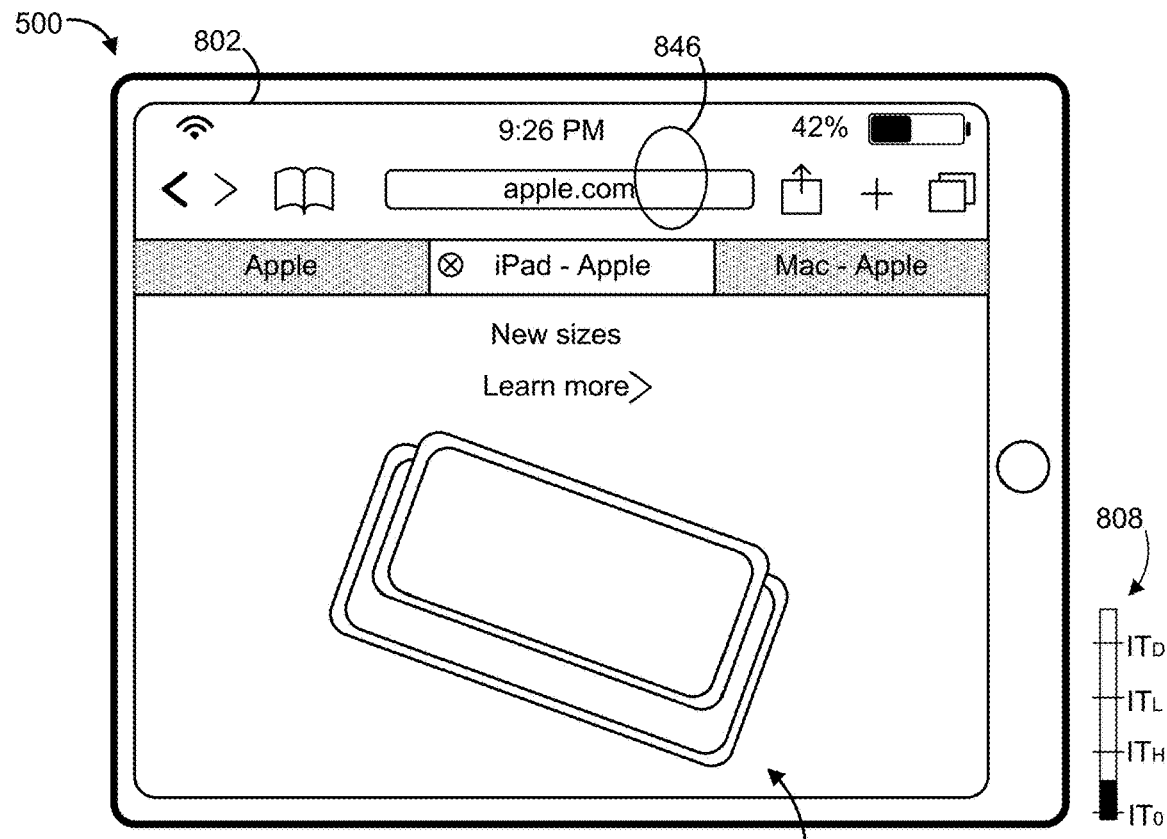
Figures 2, 8U:
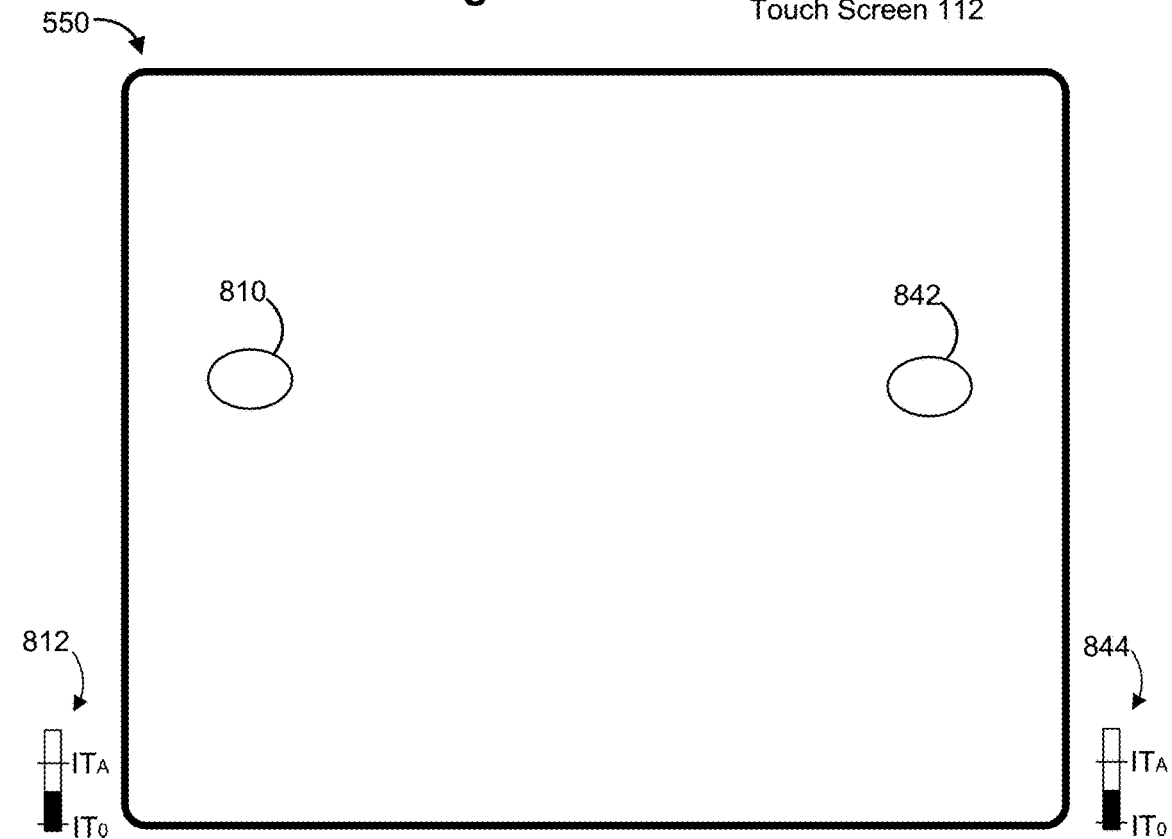

In FIG. 8U, the intensity of both back side contacts has decreased, and a front side input is received to display a keyboard. In FIG. 8U-2, The characteristic intensity of back side contact 810 on the right half 726 of the back side 550 of the device has decreased below activation intensity threshold $IT_A$, as indicated by first back side intensity meter 812, and the characteristic intensity of back side contact 842 on the left half 724 of the back side 550 of the device has decreased below activation intensity threshold $IT_A$, as indicated by second back side intensity meter 844. In FIG. 8U-1 the device detects an input (e.g., a tap input) by a front side contact 848 on touch screen 112 at a location that corresponds to a text input field 850. In response to the input by front side contact 848, a keyboard 852 is displayed, as indicated in FIG. 8V-1.

Figures 1, 8V:
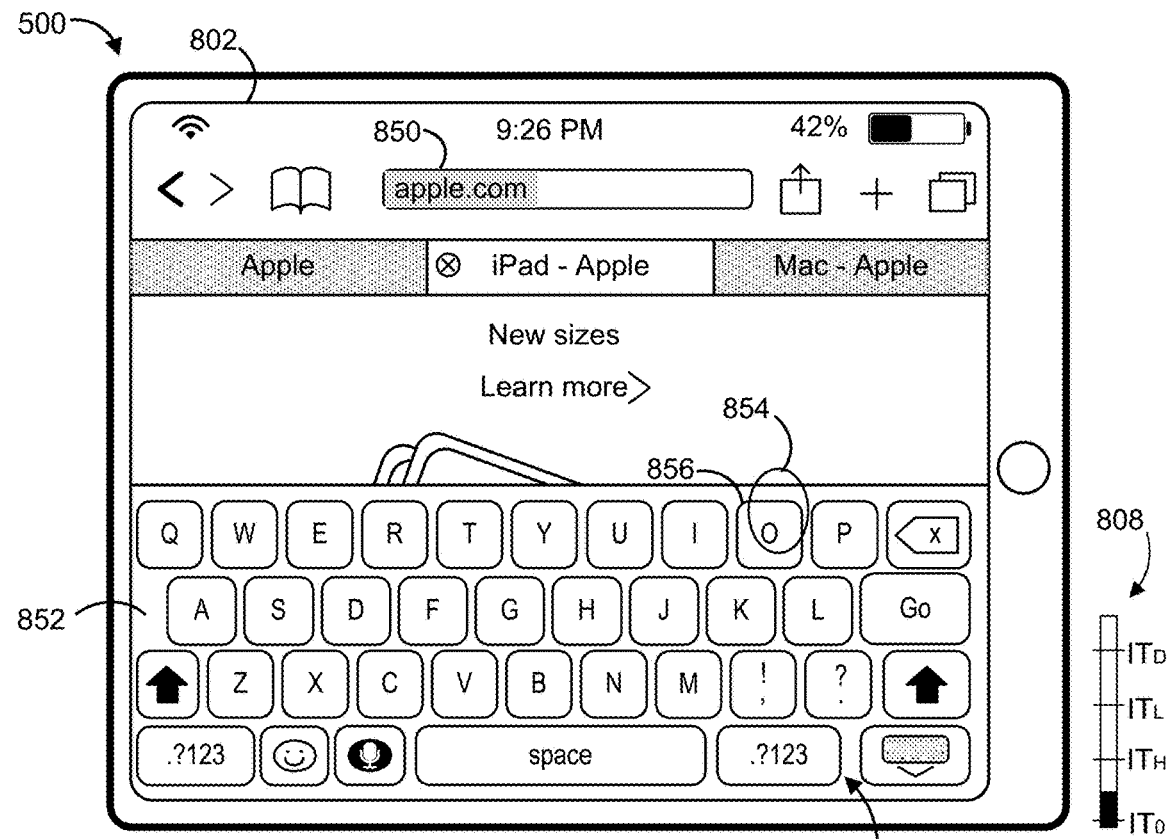

In FIG. 8V, the keyboard 852 is displayed in the web application user interface 802, and a front side input by a front side contact 854 is received to insert a character in text input field 850. In FIG. 8V-1, an input by contact 854 (e.g., a tap input) is received at a location corresponding to "O" key 856 of keyboard 852.

Figures 1, 8W:
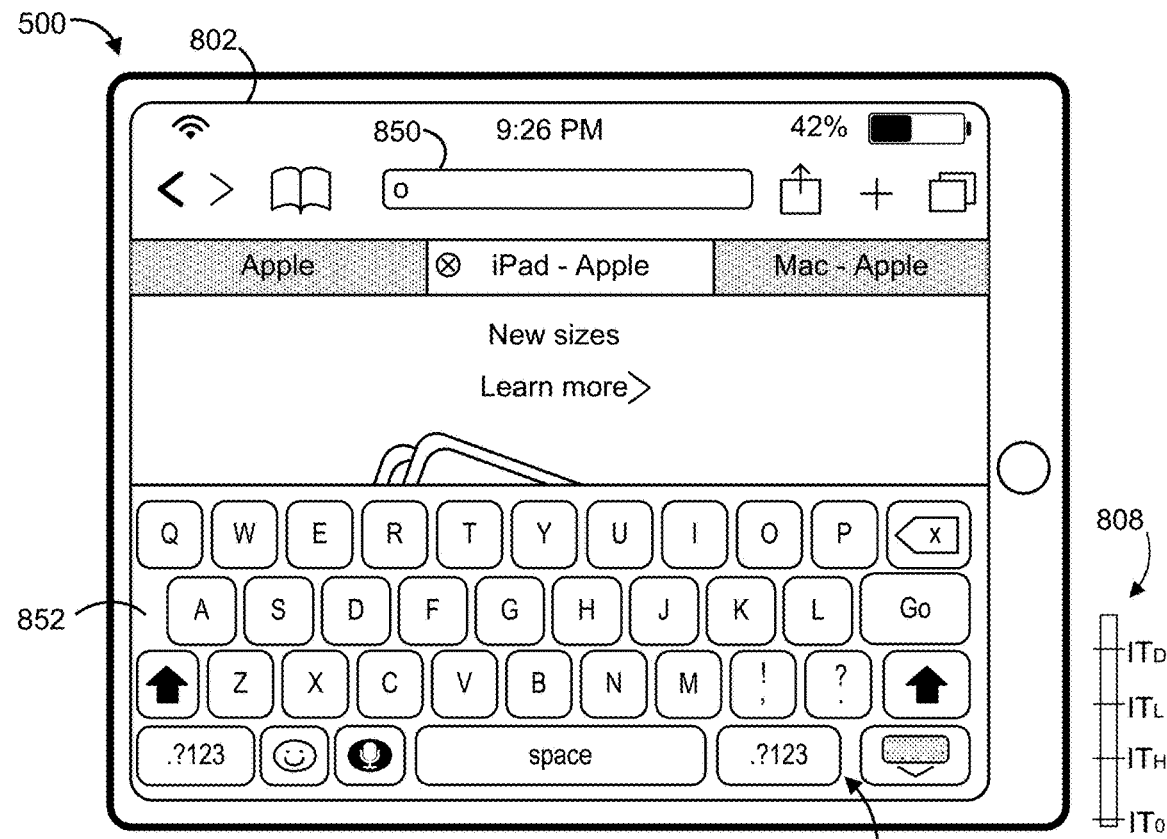
Figures 2, 8W:
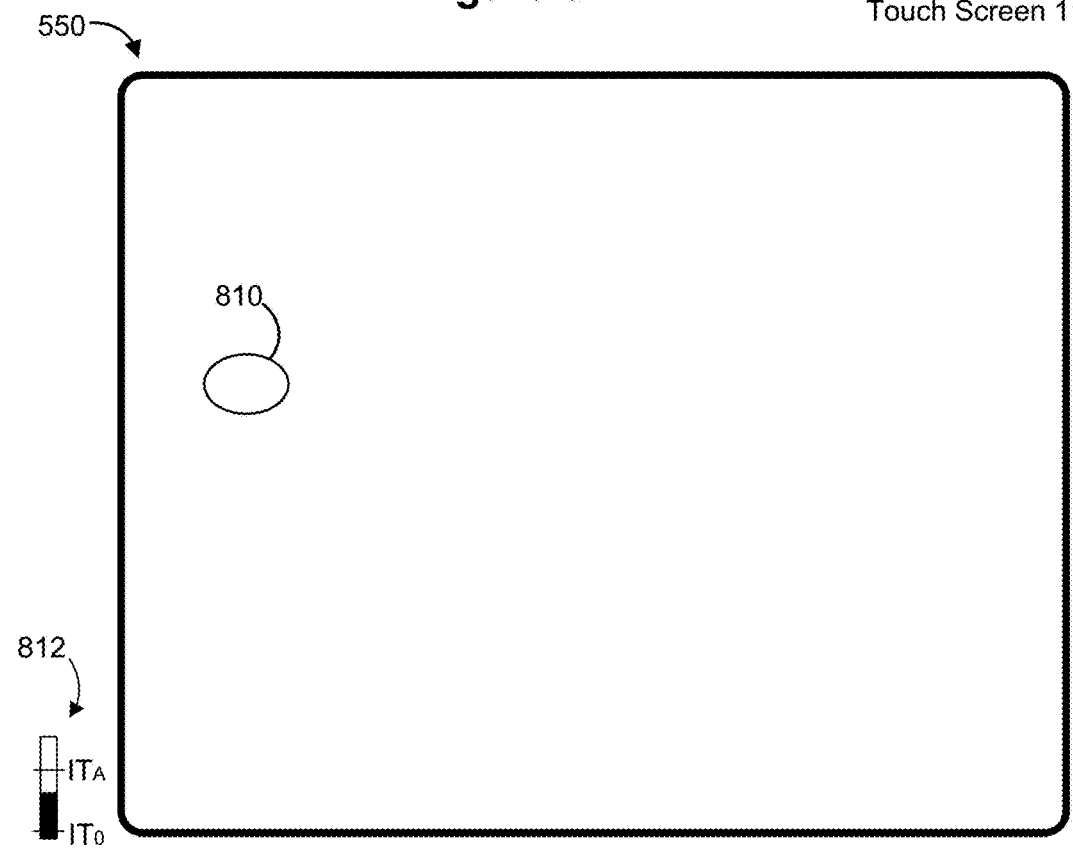

In FIG. 8W-1, in response to the input by front side contact 854, a character ("o") has been inserted in text input field 850.

Figures 1, 8X:
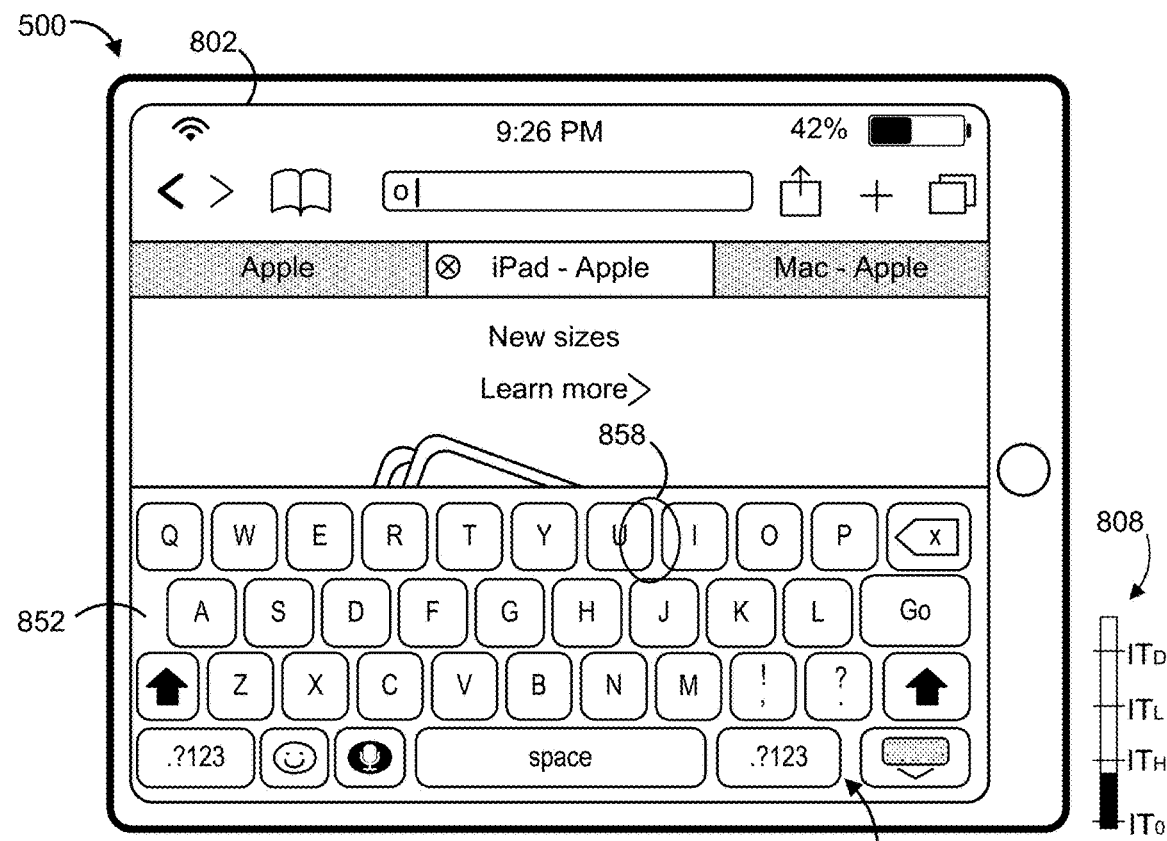
Figures 2, 8X:
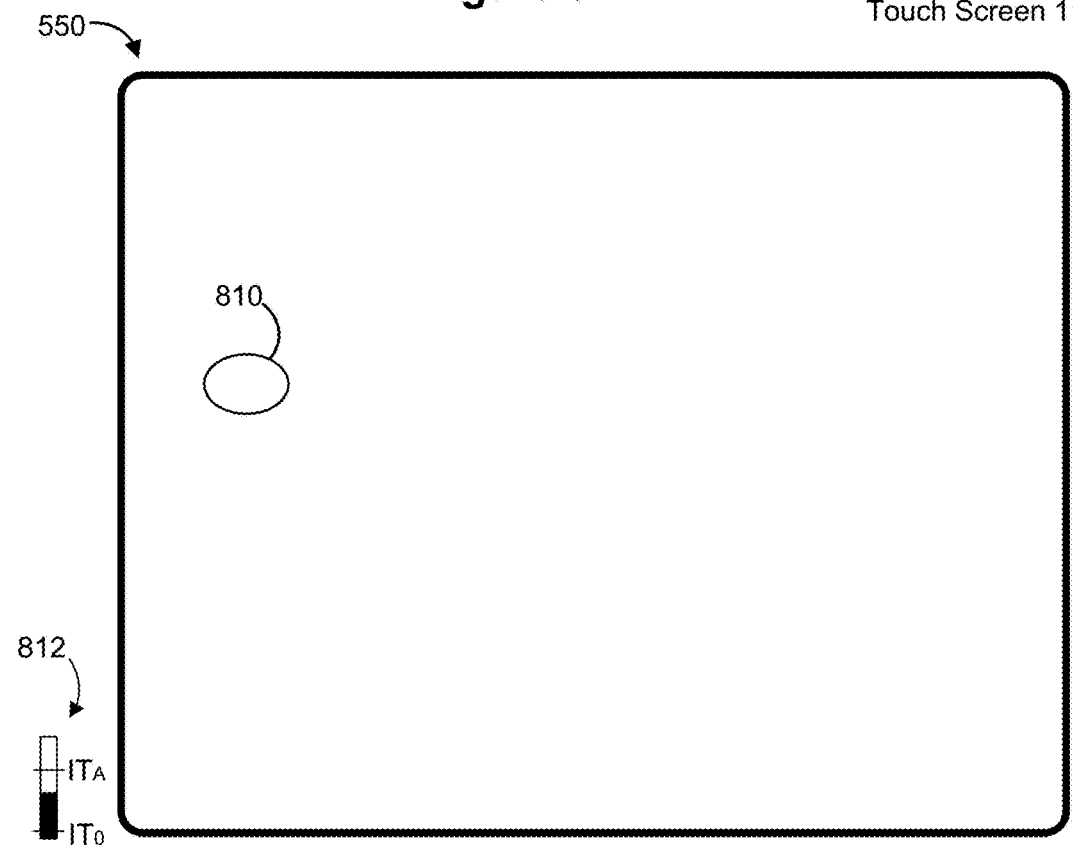
Figures 1, 2, 8Y:
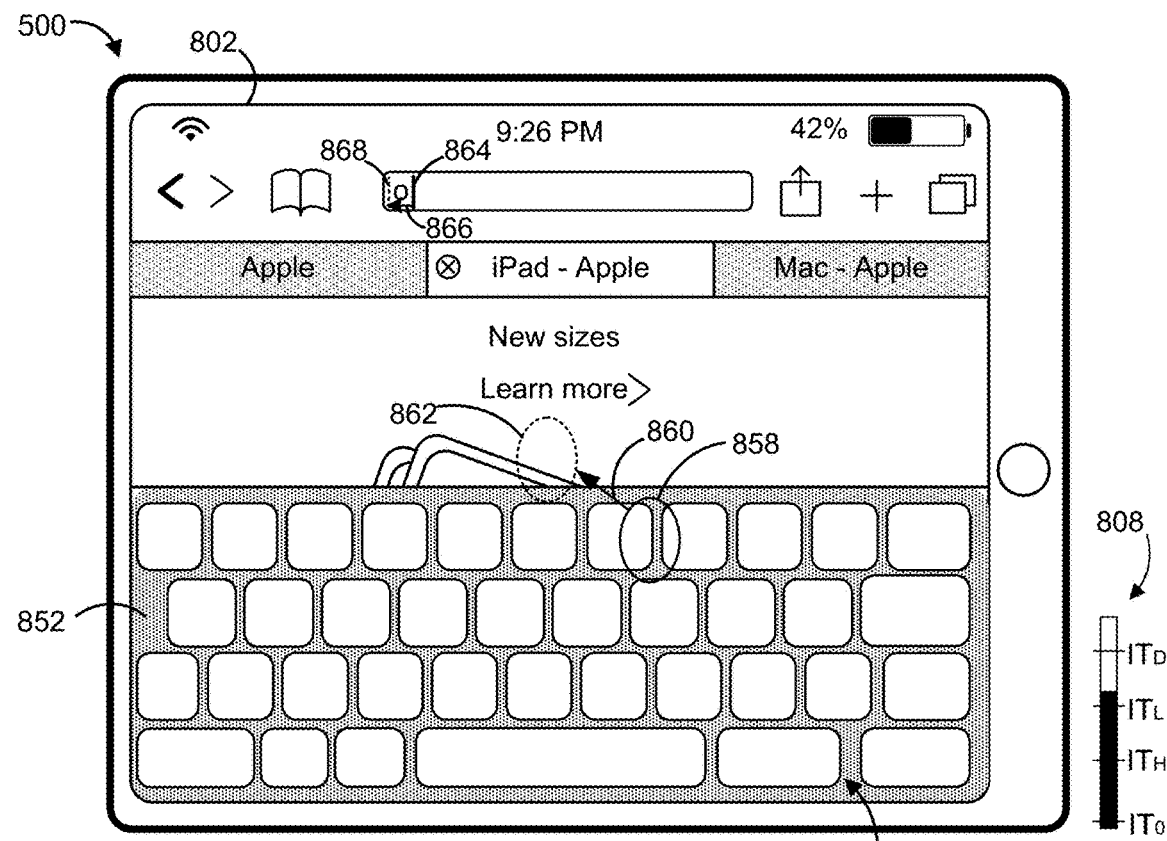

In FIGS. 8X-8Y, in response to input with an intensity that increases above a light press intensity threshold $IT_L$, keyboard 852 enters a content insertion indicator movement mode. In FIG. 8X-1, an input by contact 858 is detected at a location on keyboard 852. In FIG. 8Y-1, a characteristic intensity of the input has increased above a light press intensity threshold $IT_L$, as indicated by intensity level meter 812. In accordance with a determination that the intensity of the front side contact 858 has increased above the light press intensity threshold $IT_L$, keyboard 852 enters a content insertion mode in which movement of front side contact 858 (e.g., along a path indicated by arrow 860 to a position indicated at 862) causes movement of content insertion indicator 864 (e.g., along a path indicated by arrow 866 to a position indicated by 868.

Figures 1, 8Z:
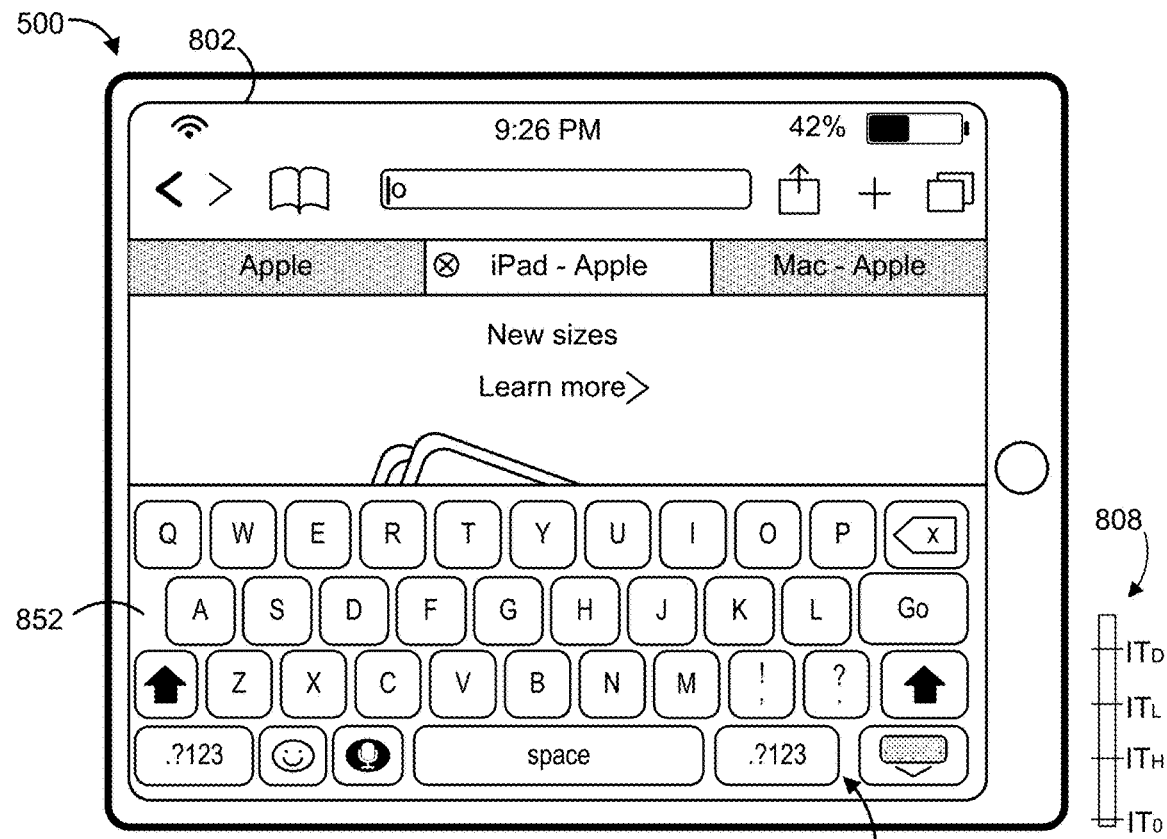
Figures 2, 8Z:
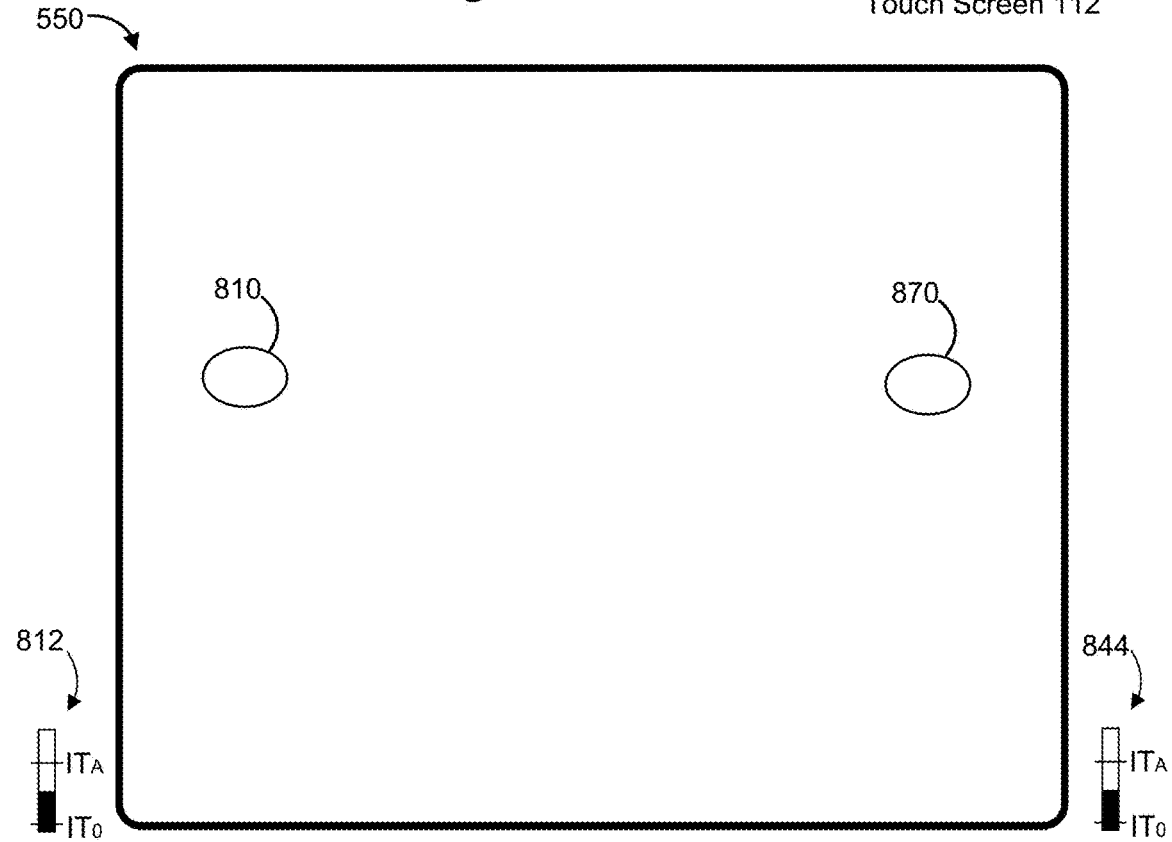
Figure 8A:
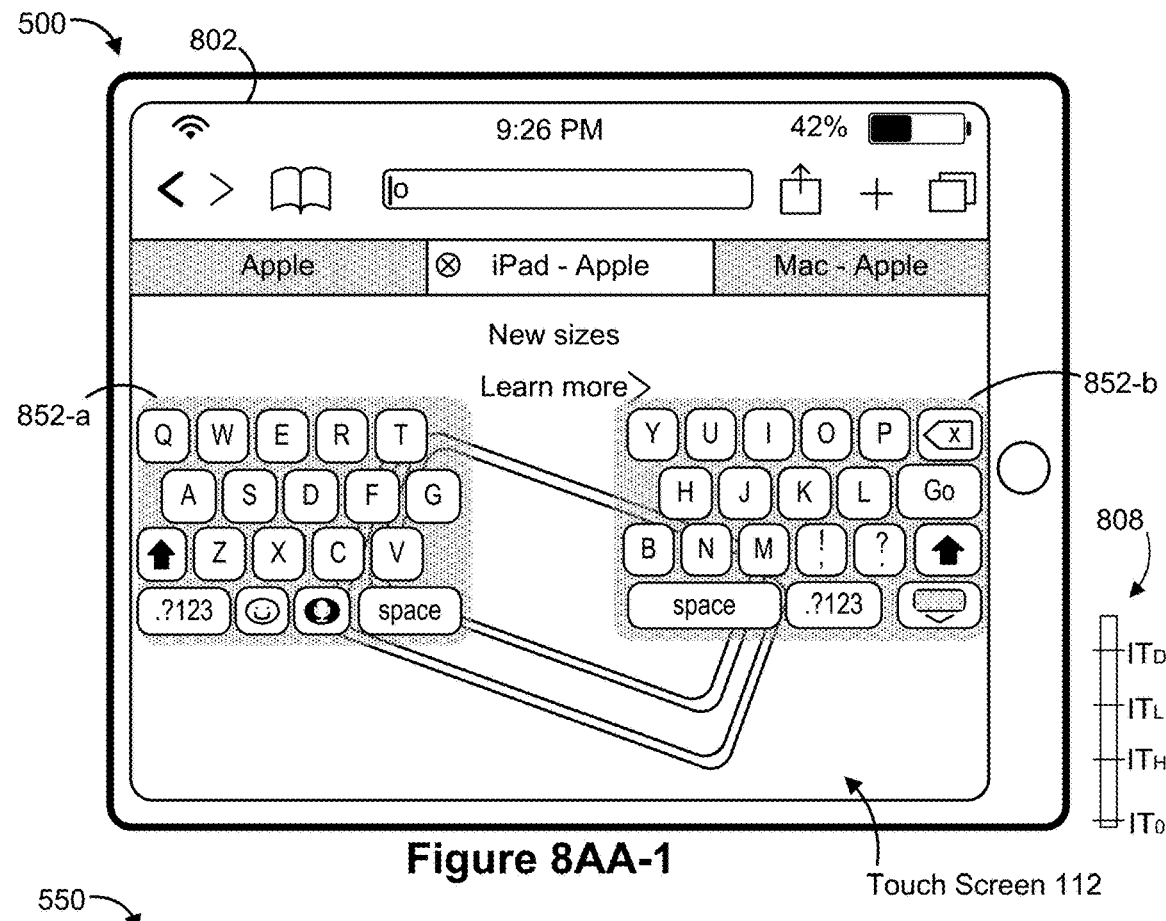
Figure 8A:
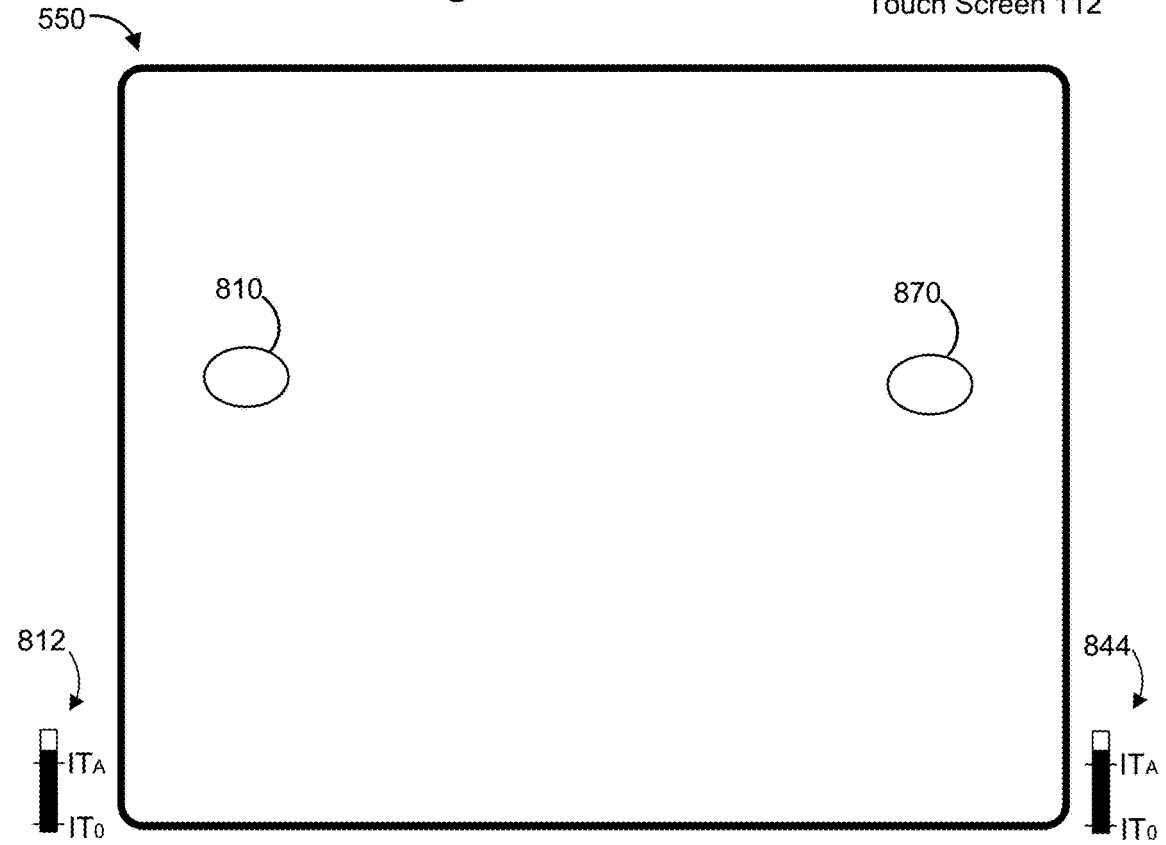
Figure 8A:
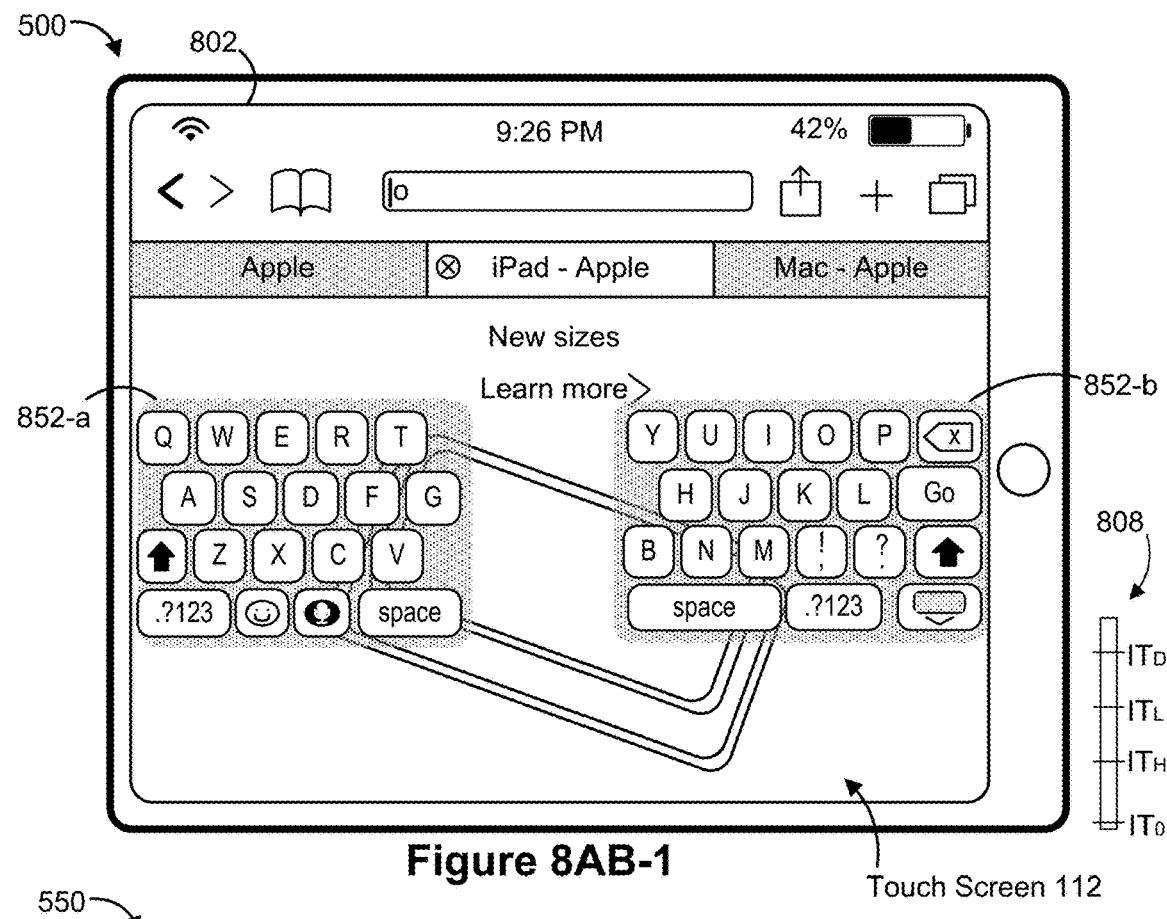
Figure 8A:
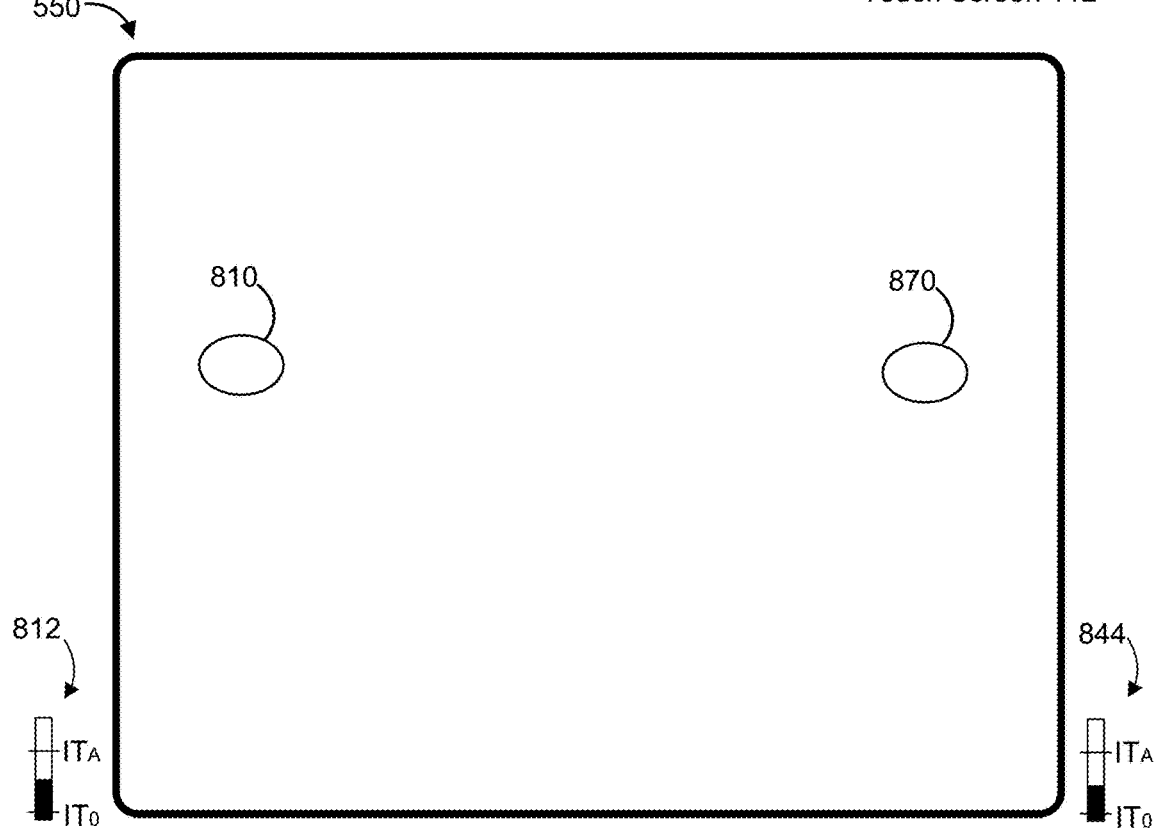
Figure 8A:
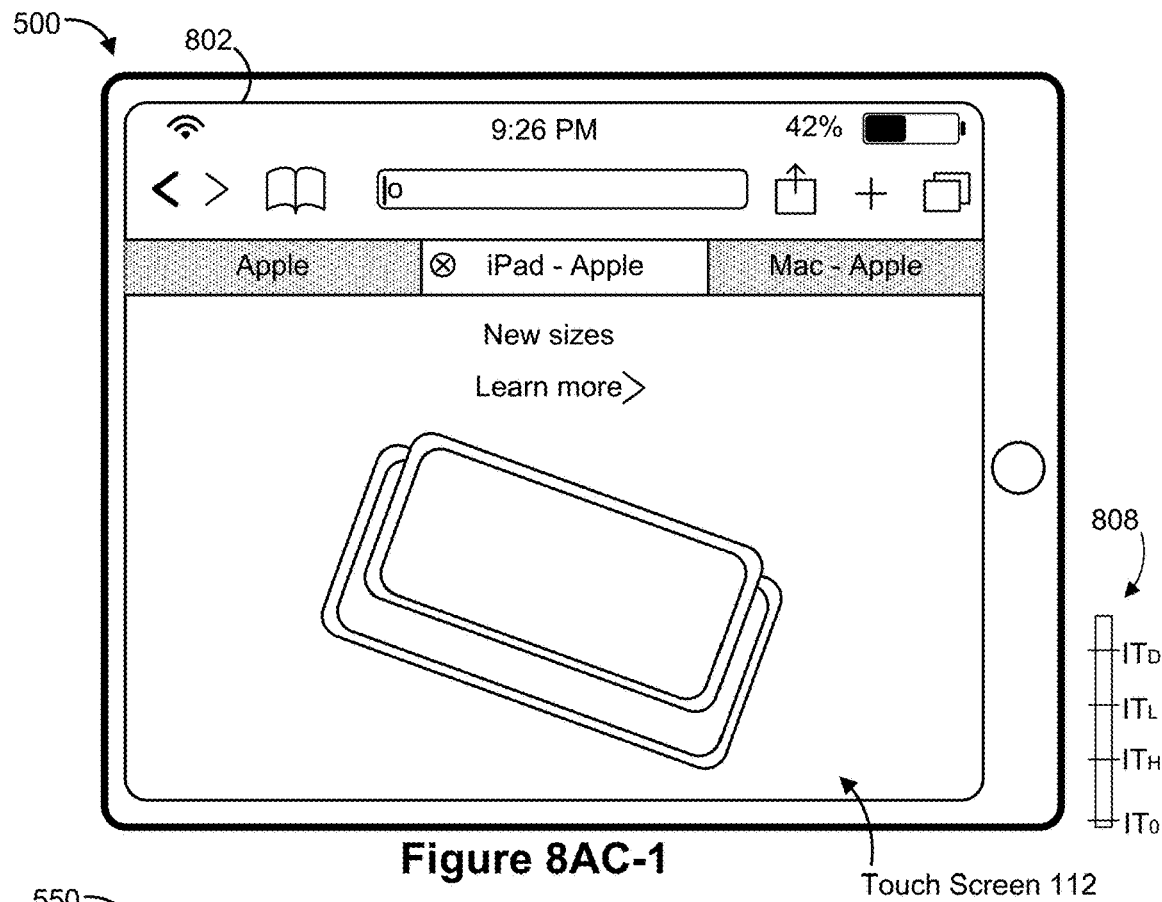
Figure 8A:
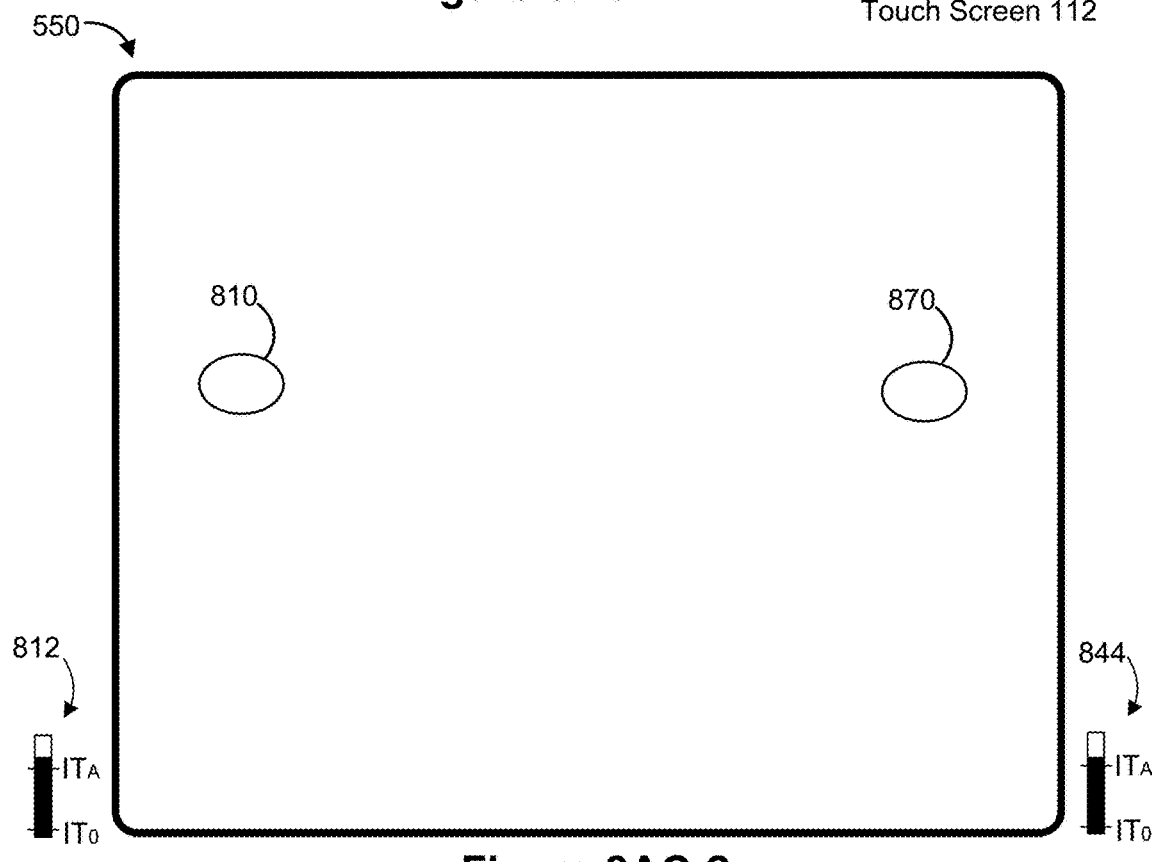
Figure 8A:
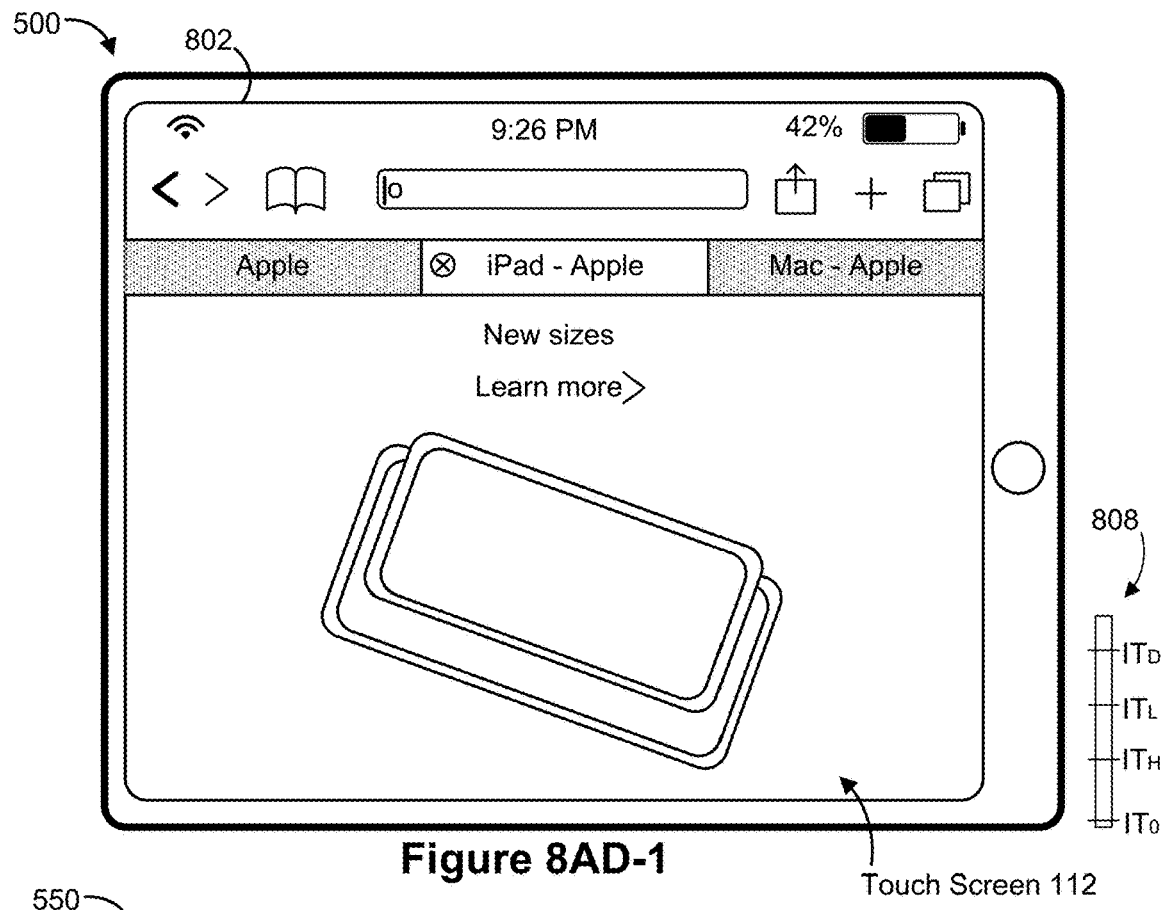
Figure 8A:
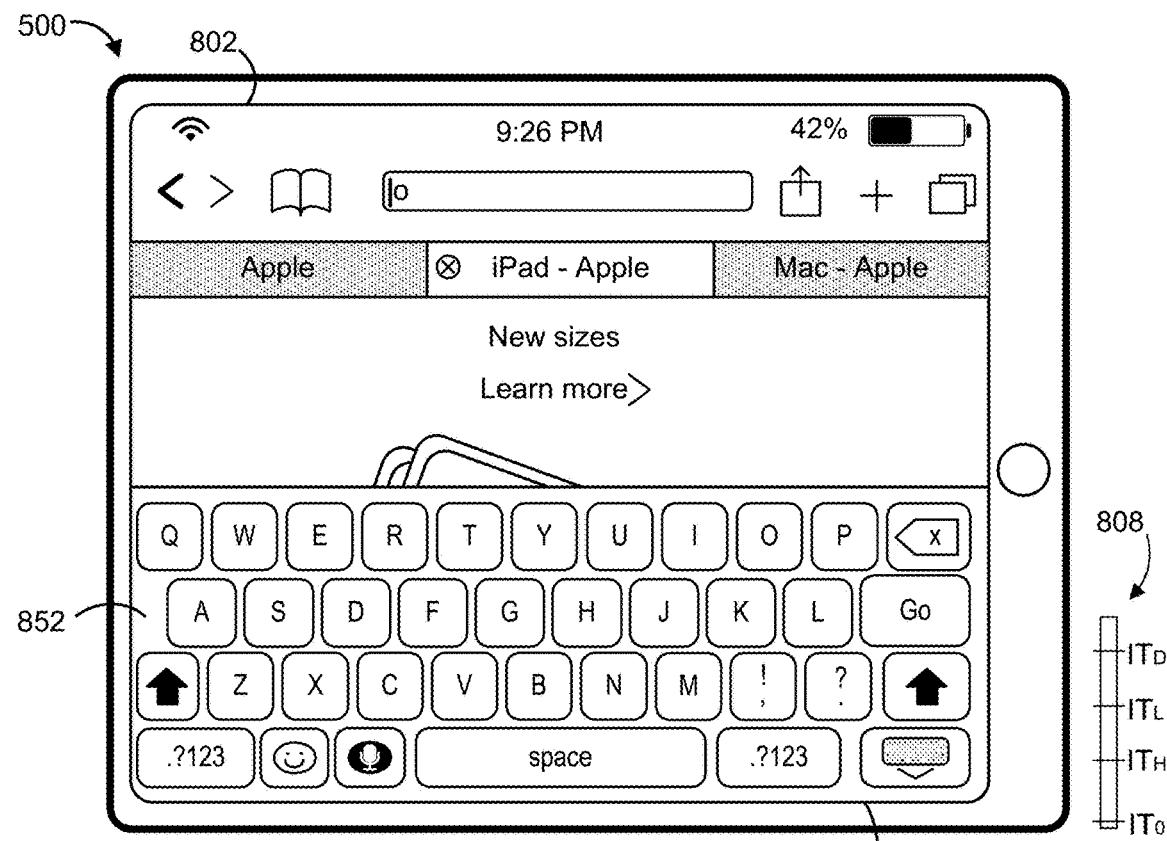
Figure 8A:
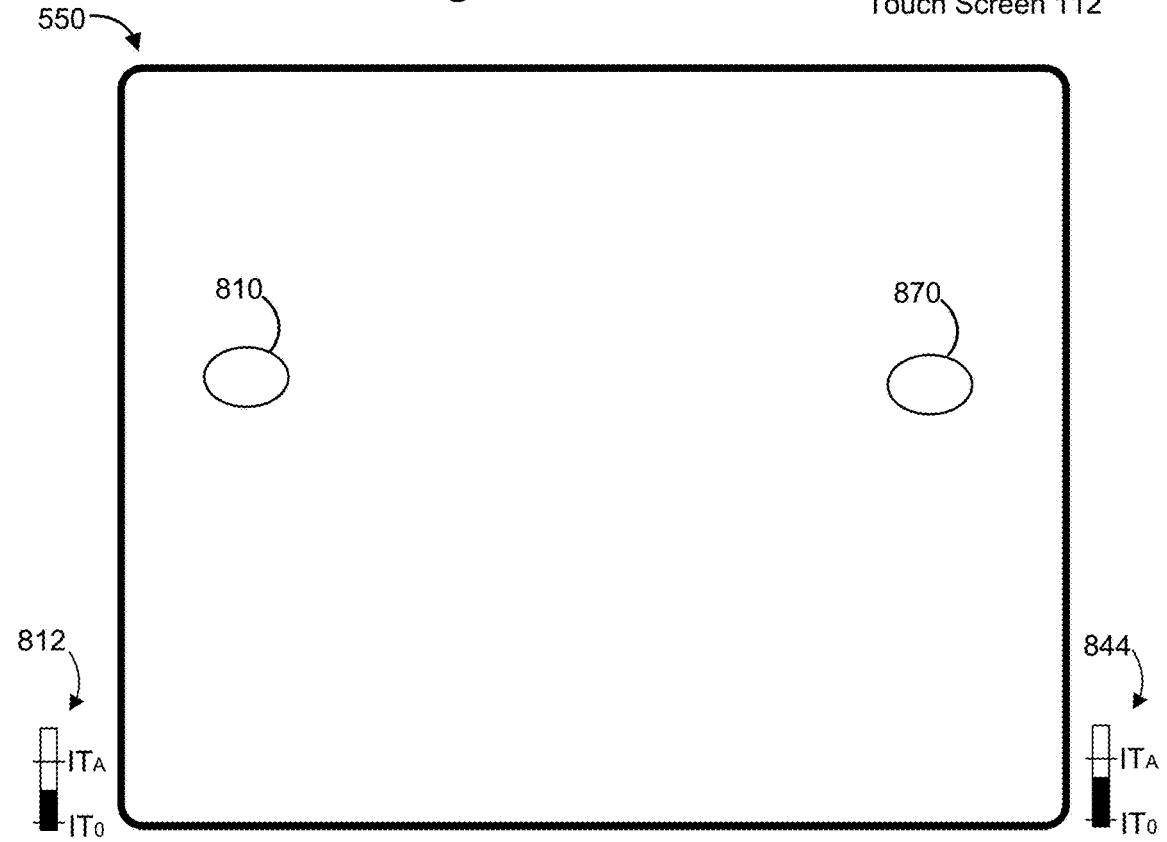
Figure 8A:
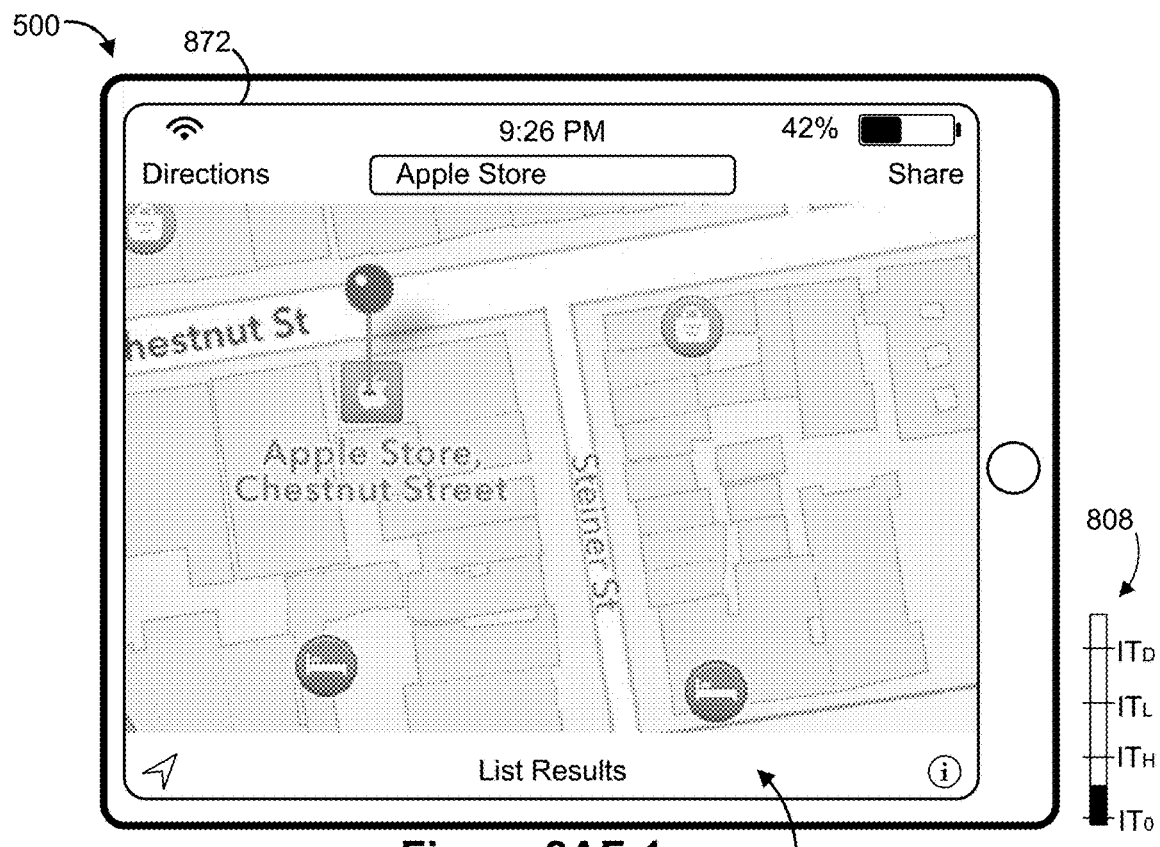
Figure 8A:
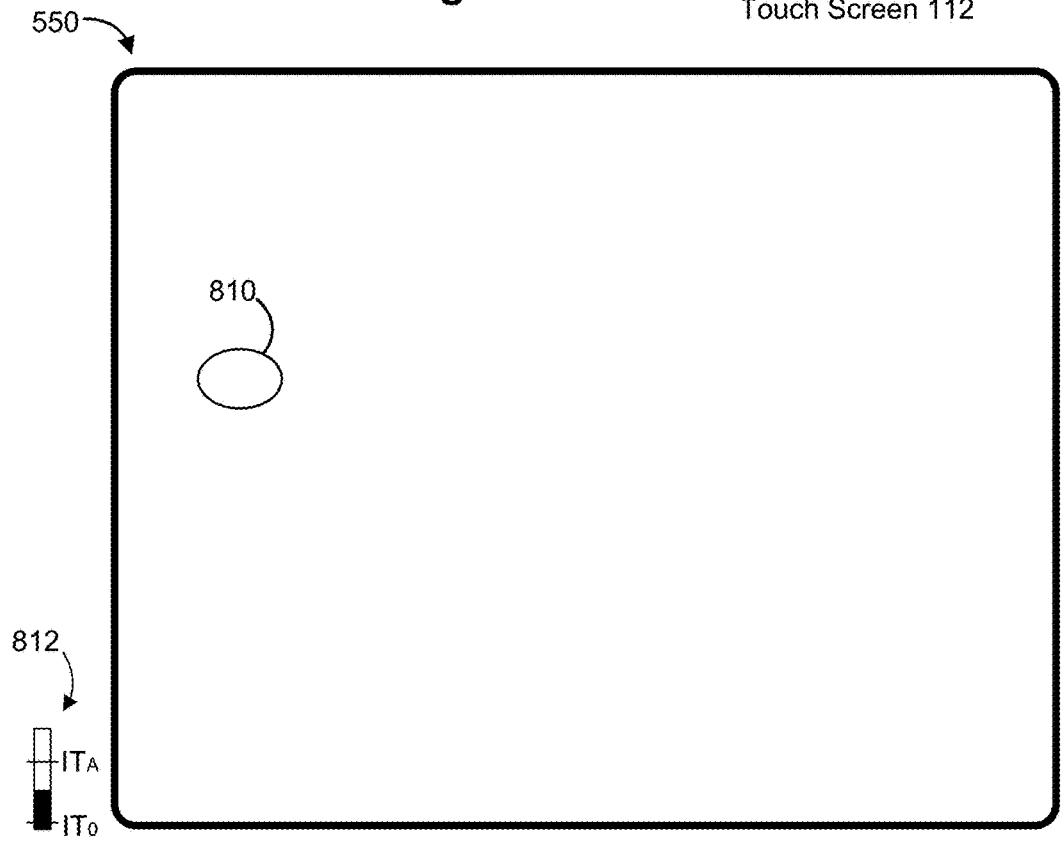
Figure 8A:
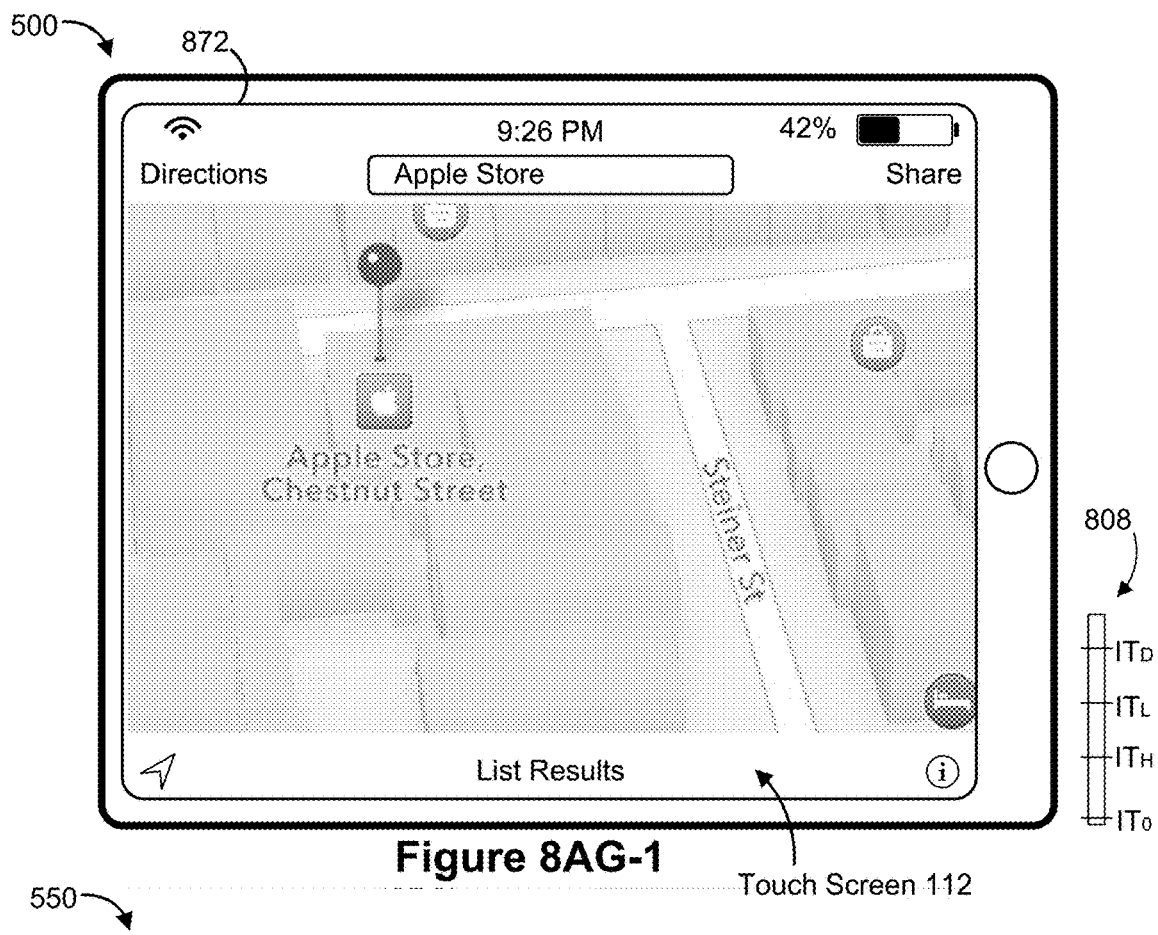
Figure 8A:
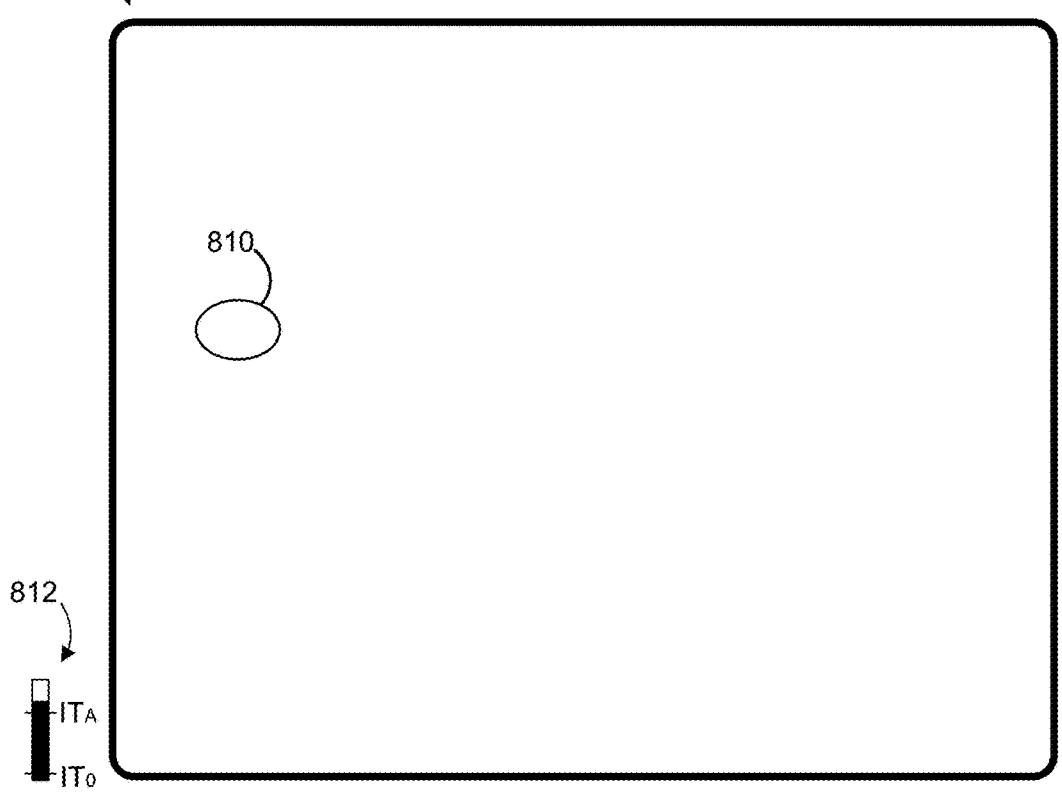
Figure 8A:
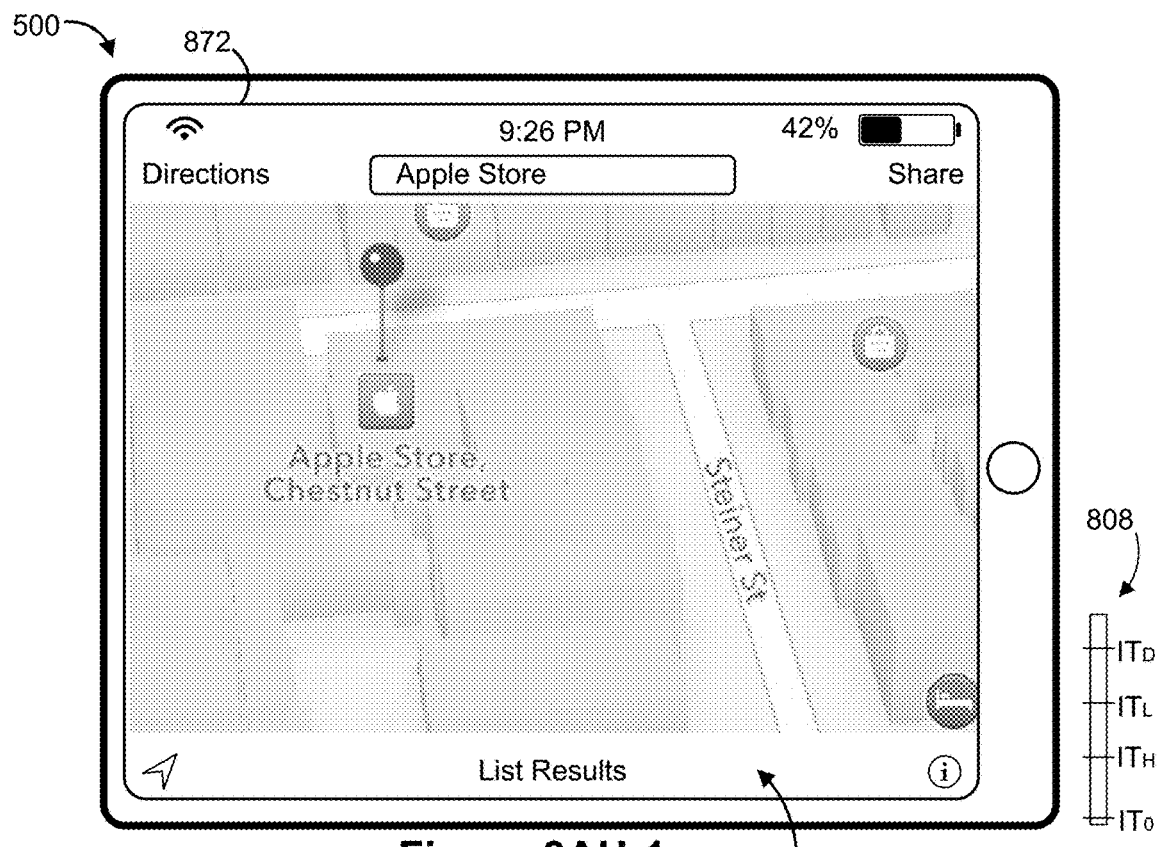
Figure 8A:
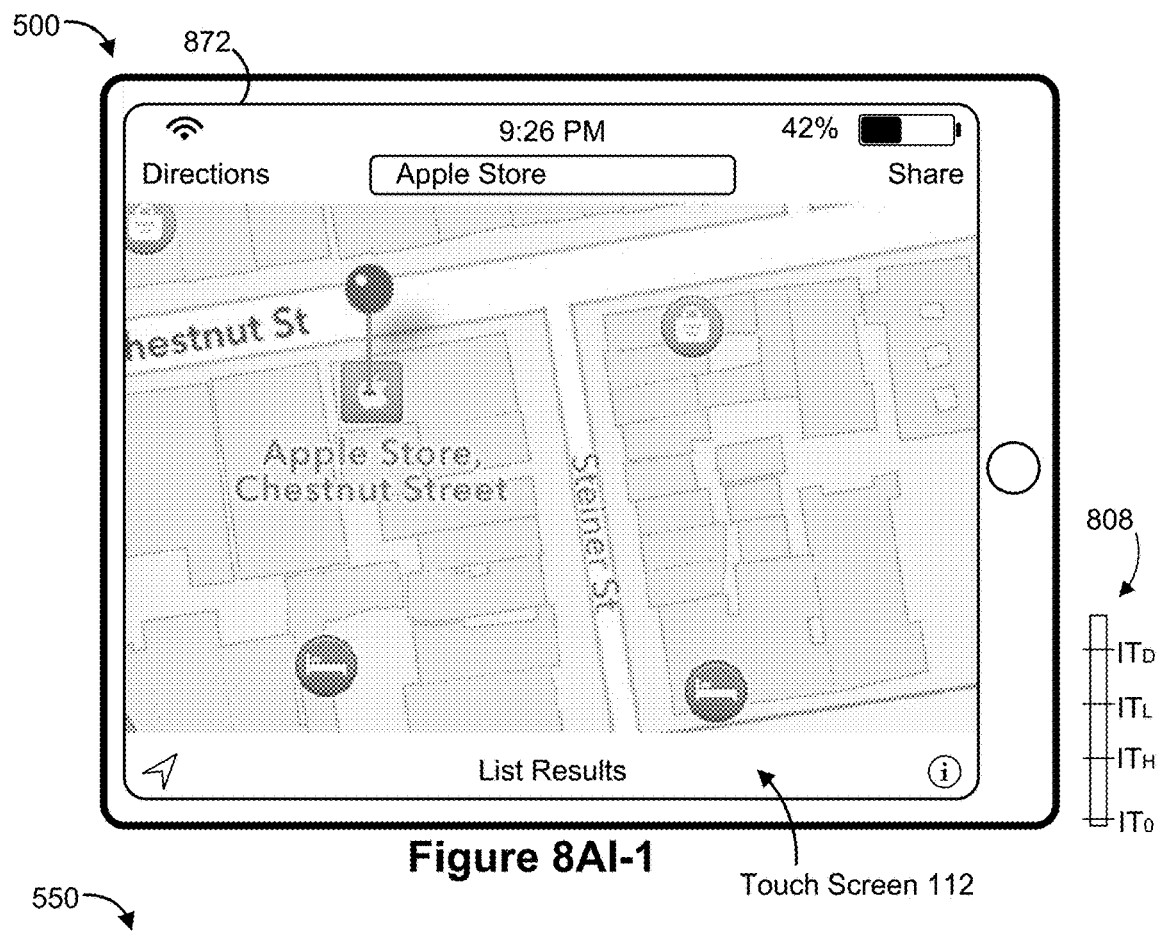
Figure 8A:
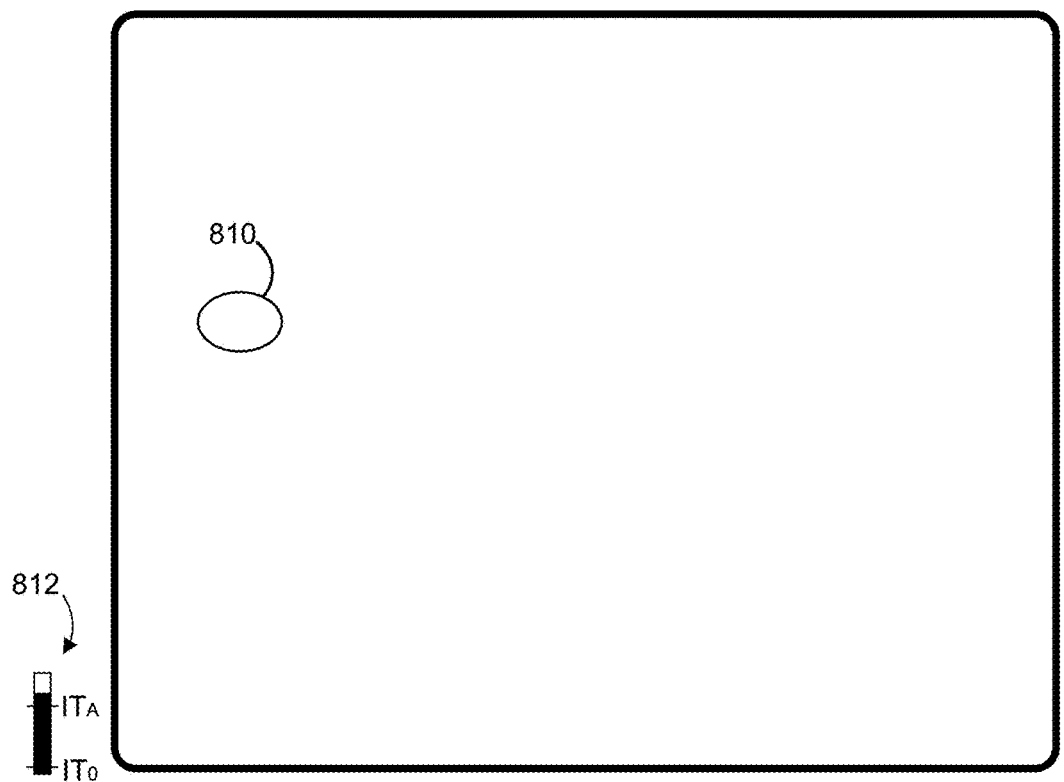
Figure 8A:
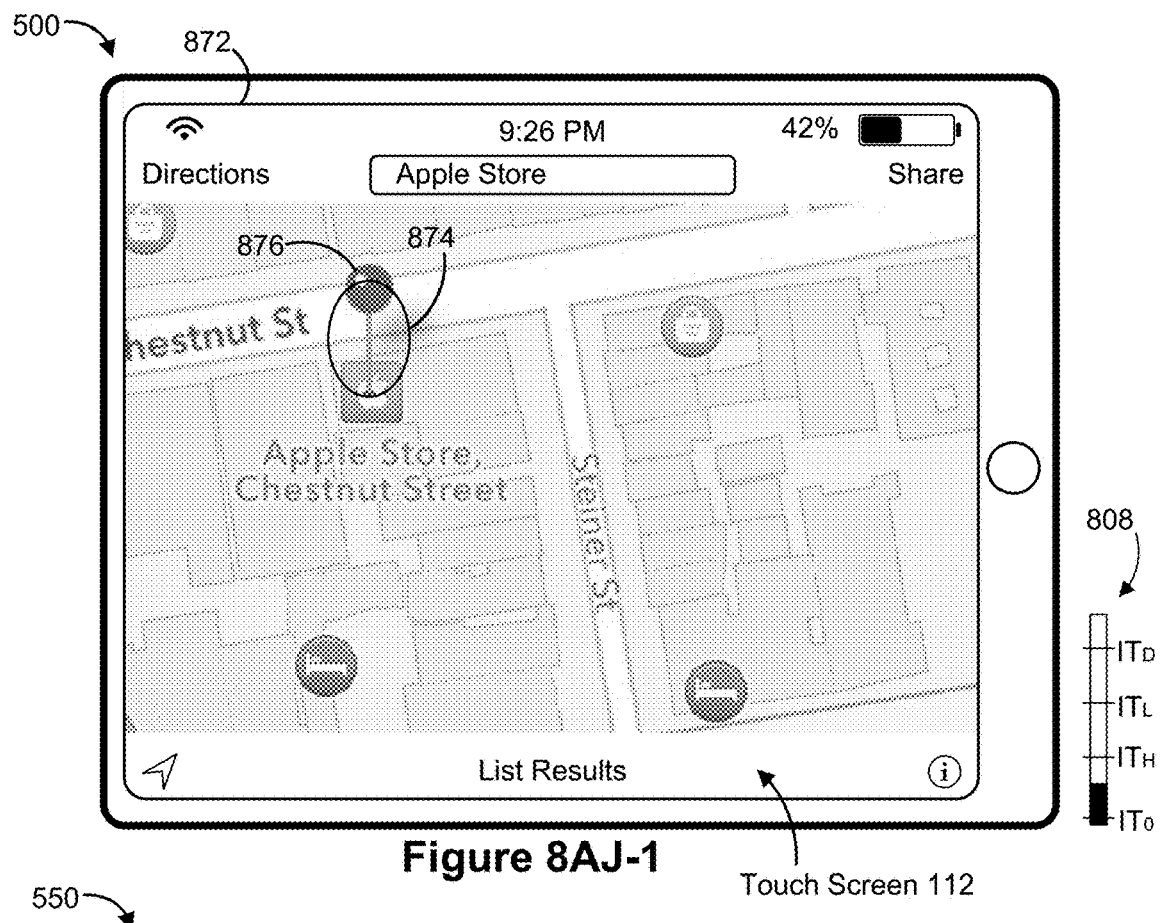
Figure 8A:
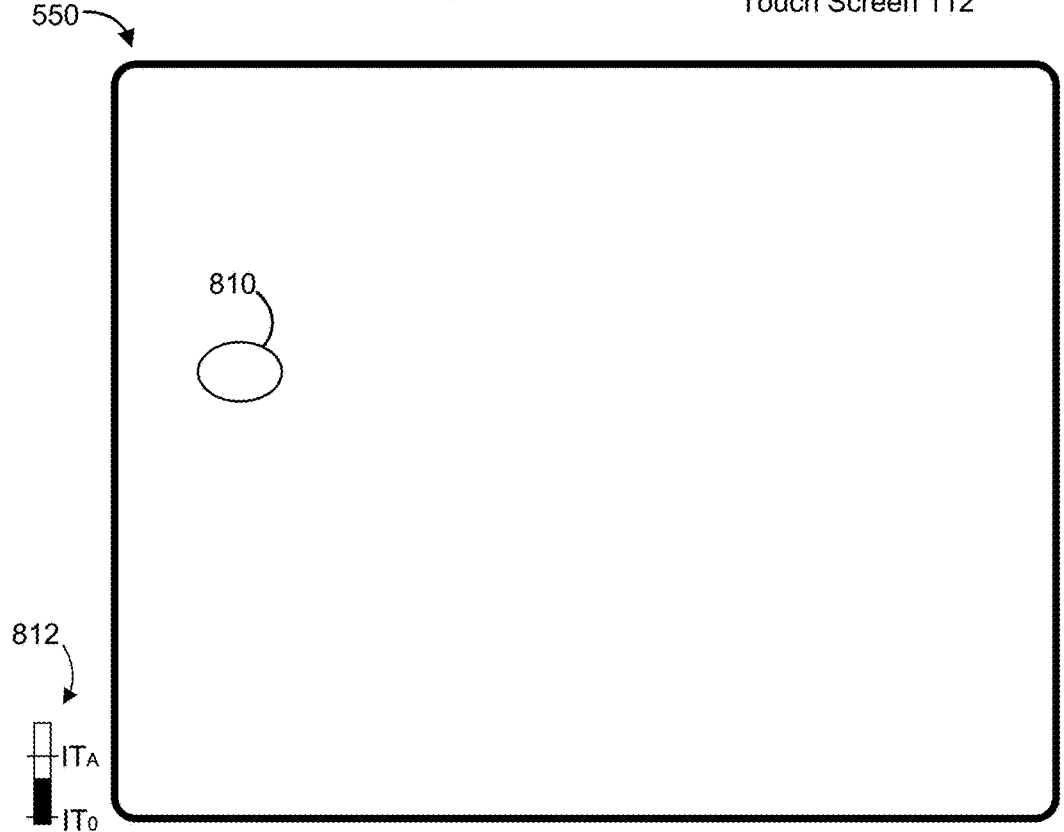
Figure 8A:
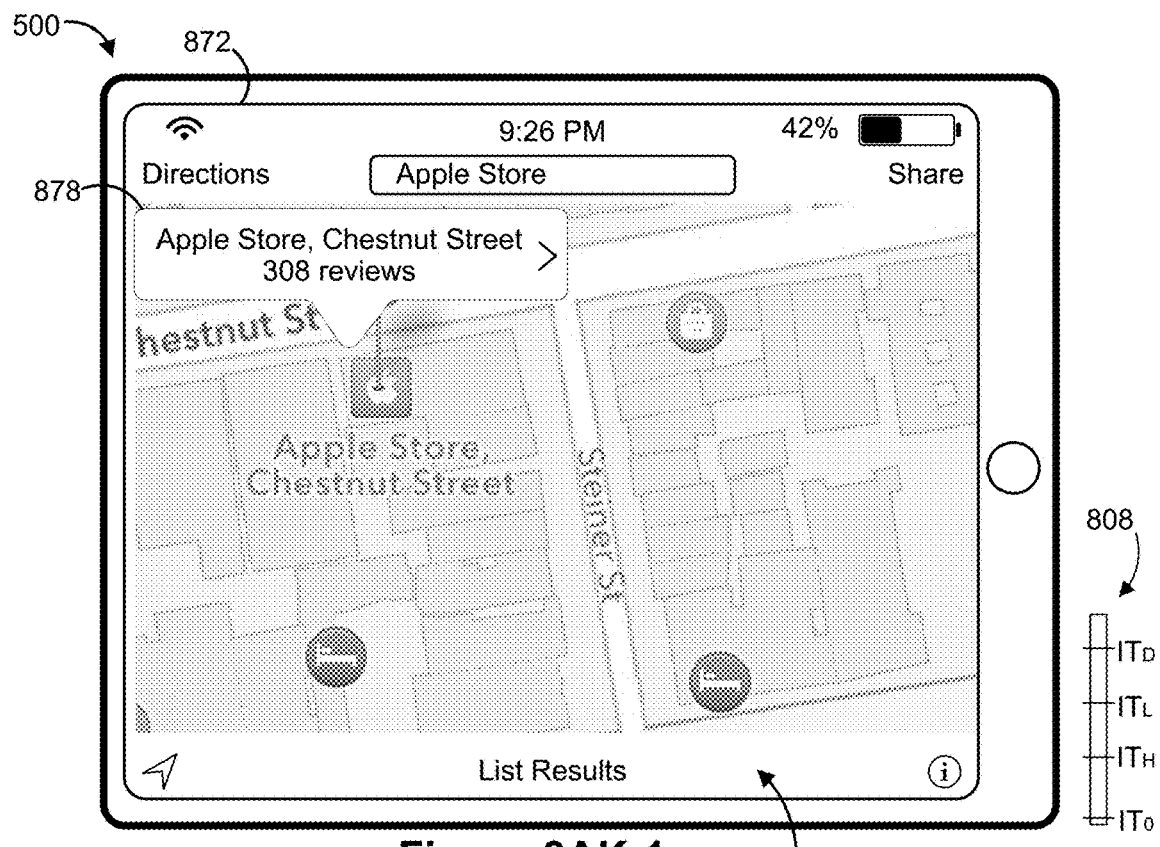
Figure 8A:
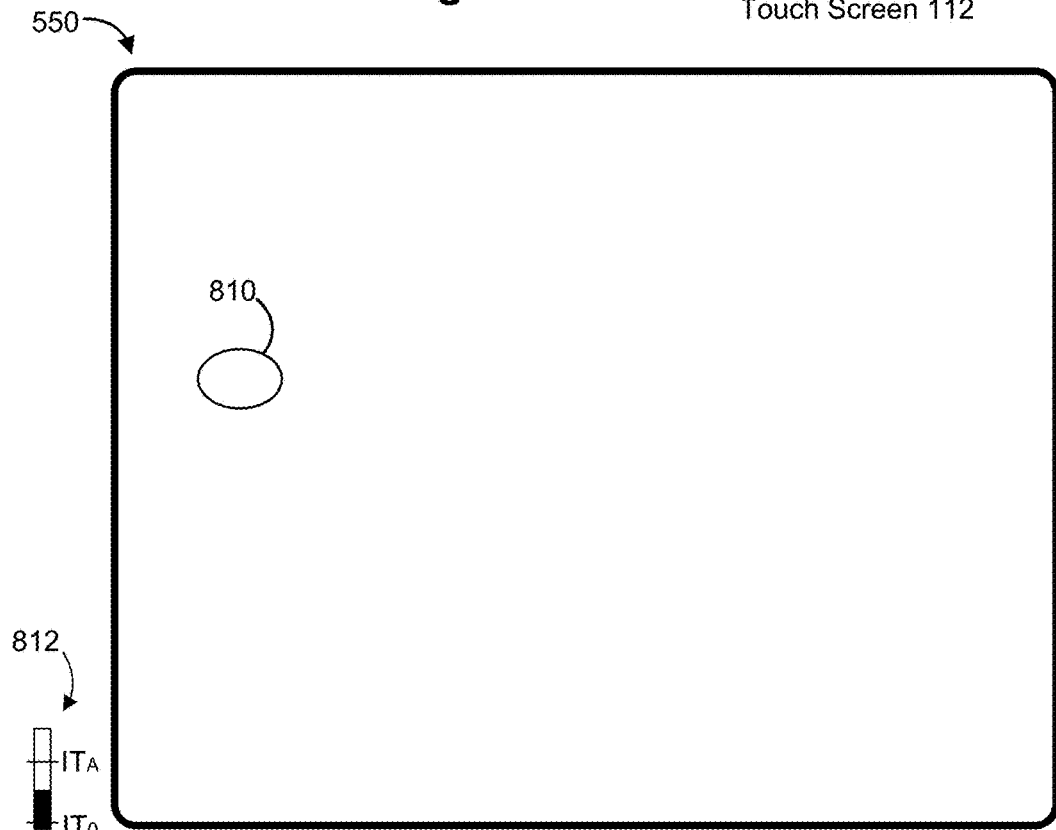
Figure 8A:
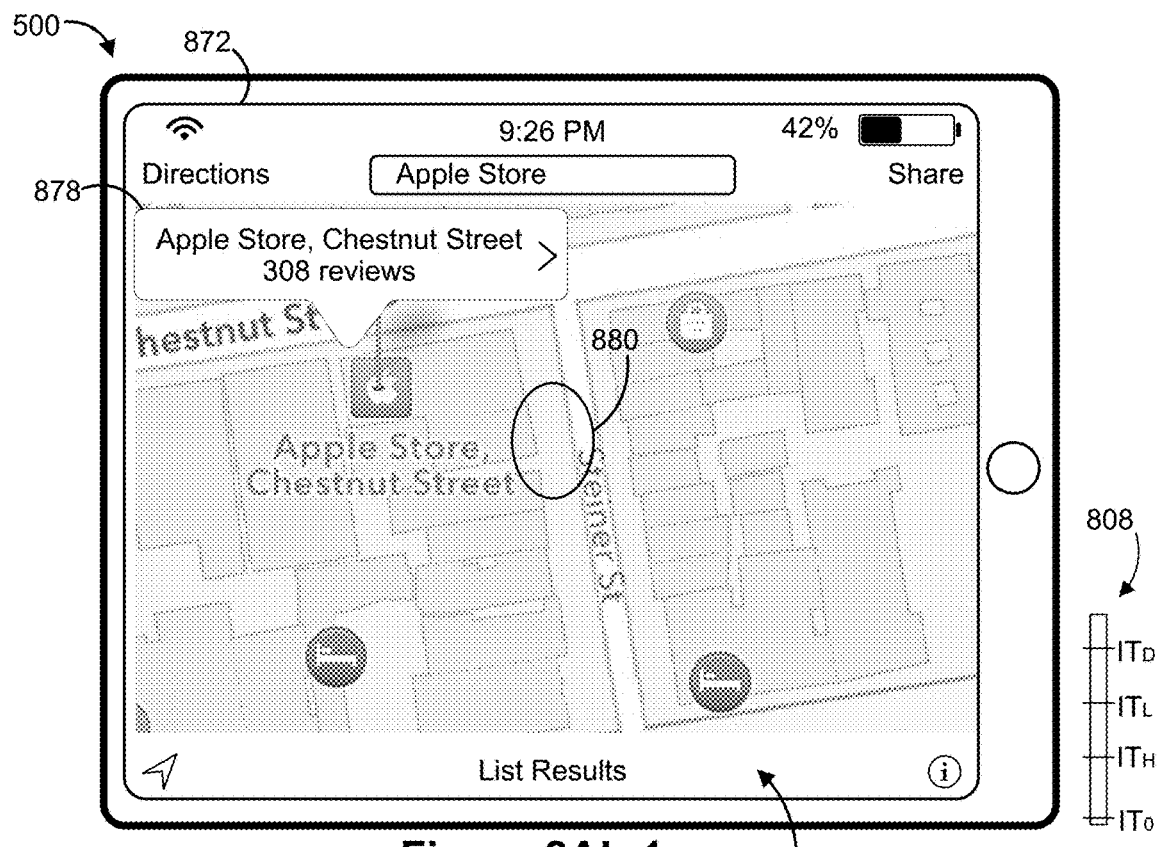
Figure 8A:
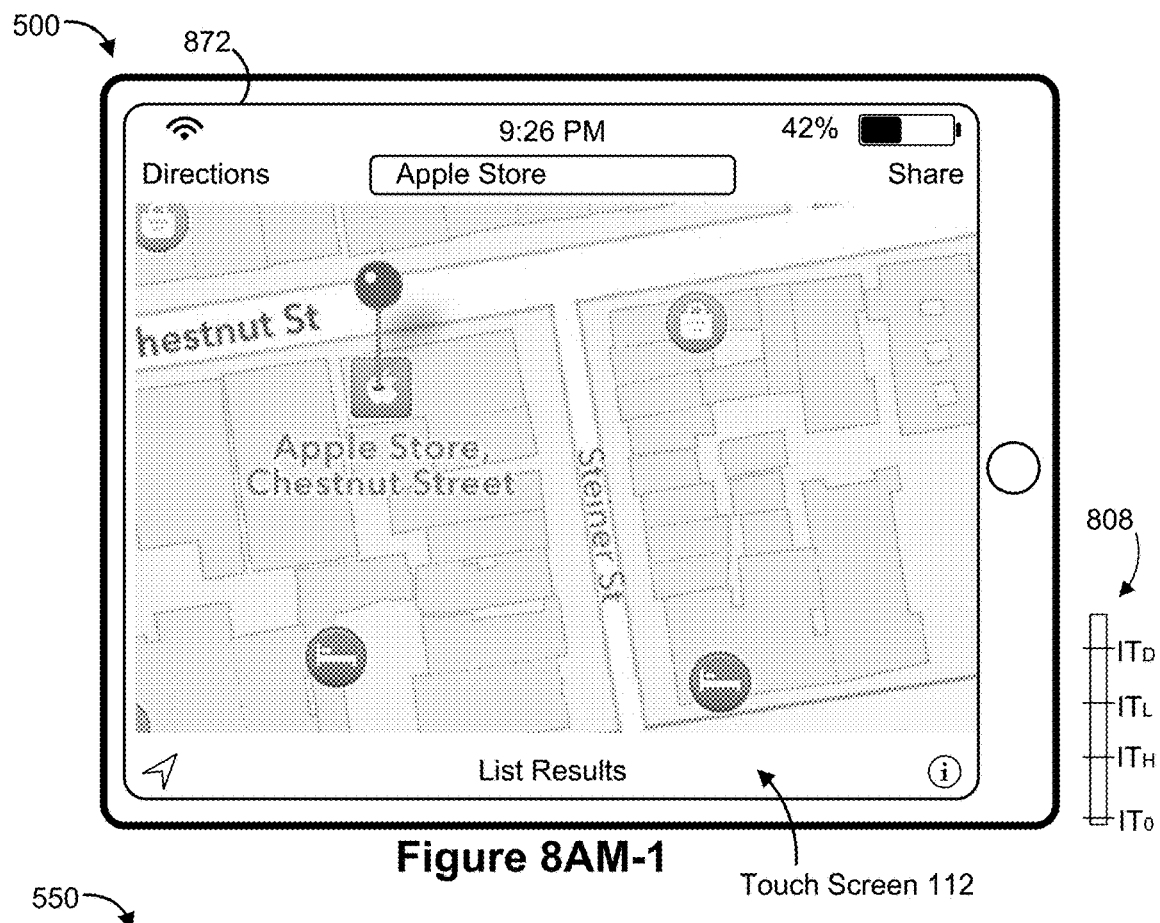
Figure 8A:
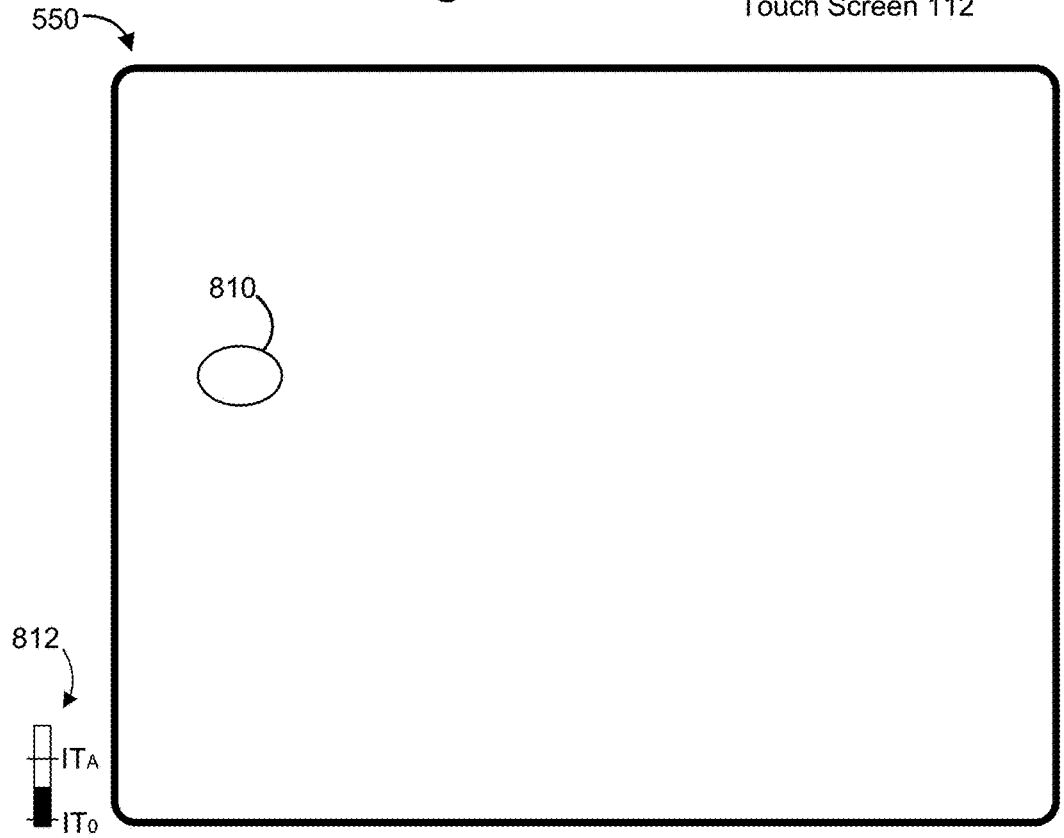
Figure 8A:
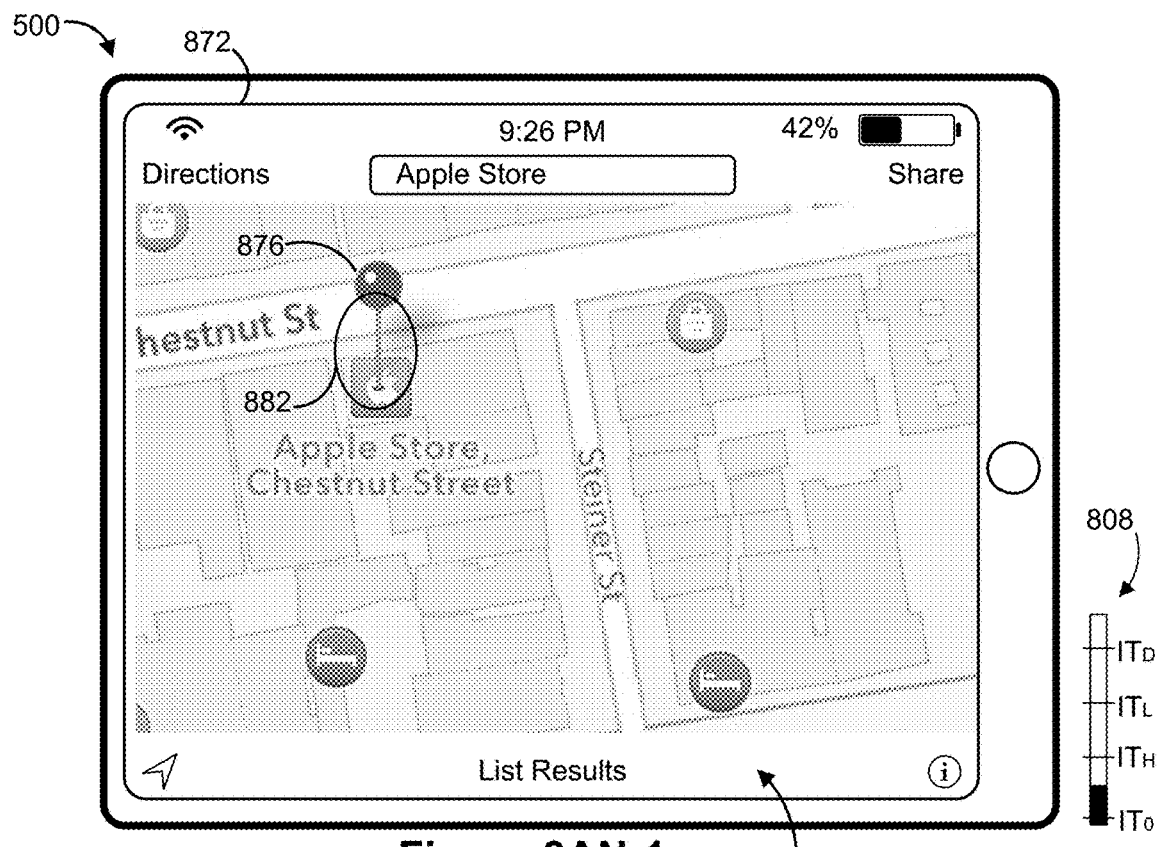
Figure 8A:
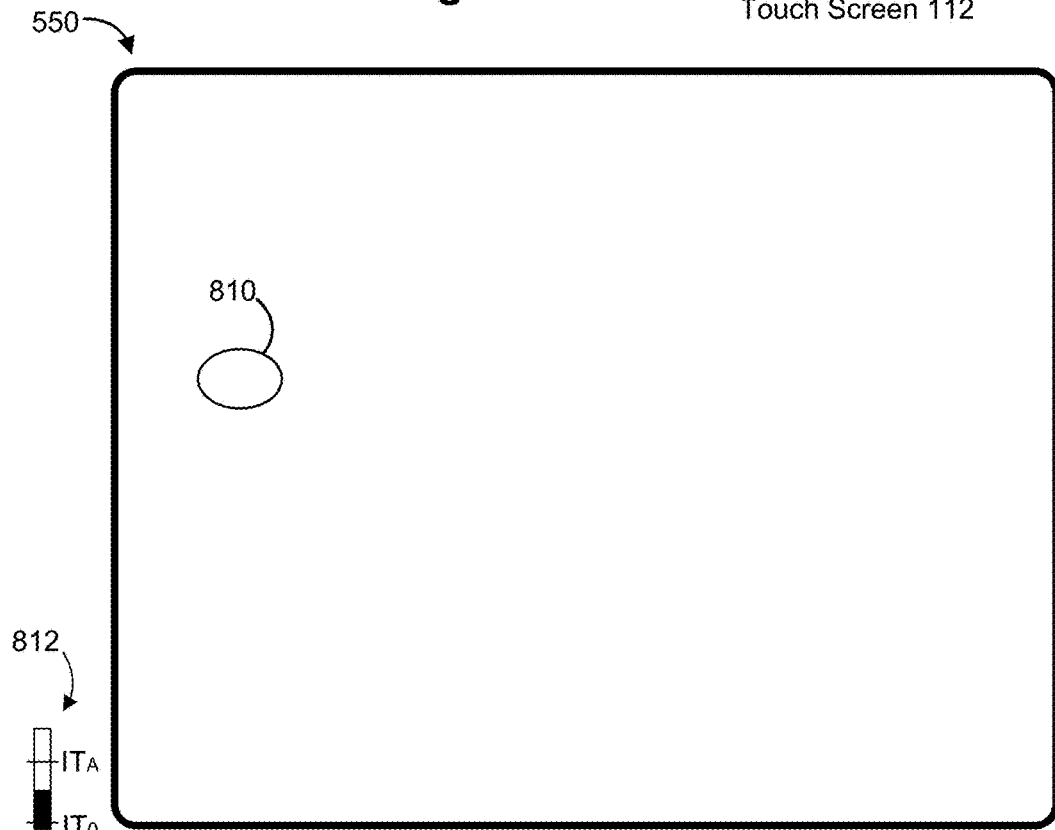
Figure 8A:
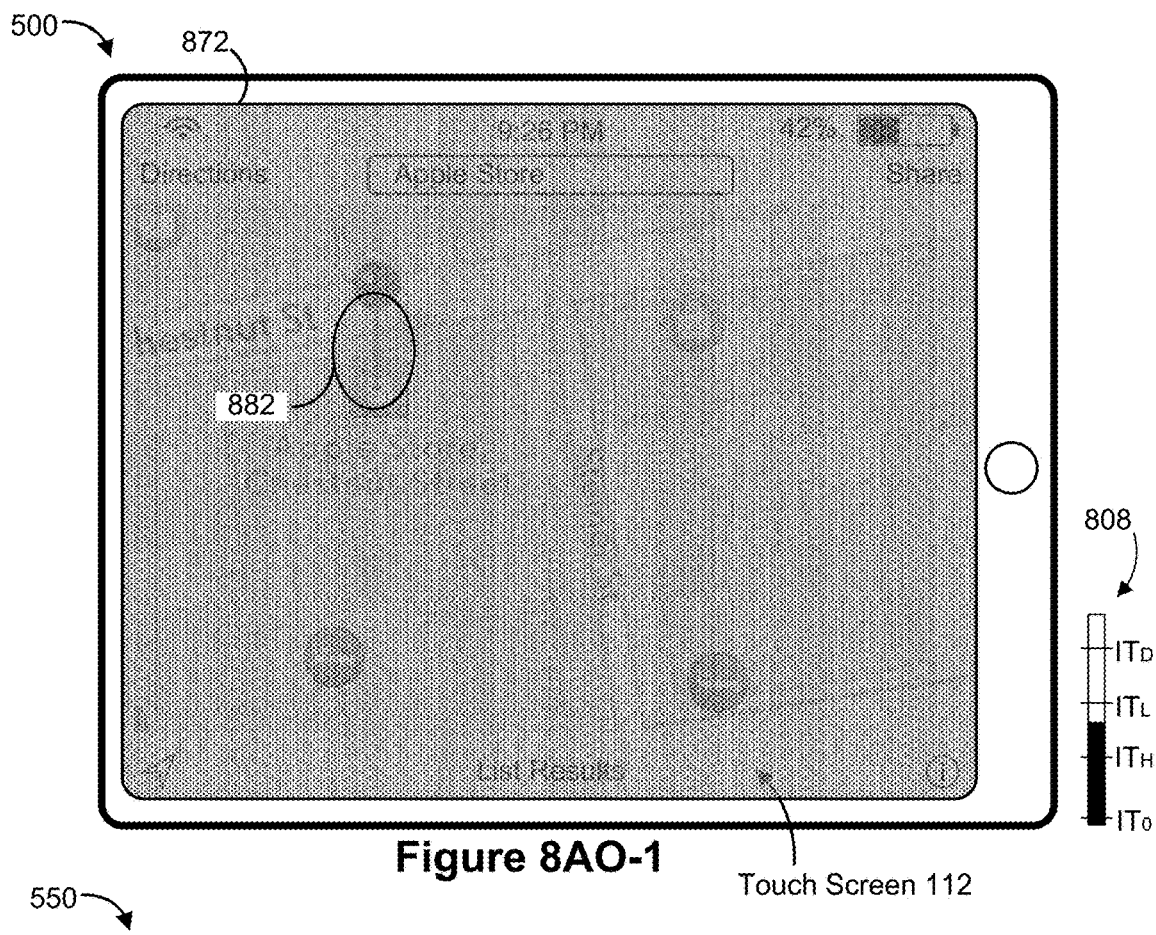
Figure 8A:
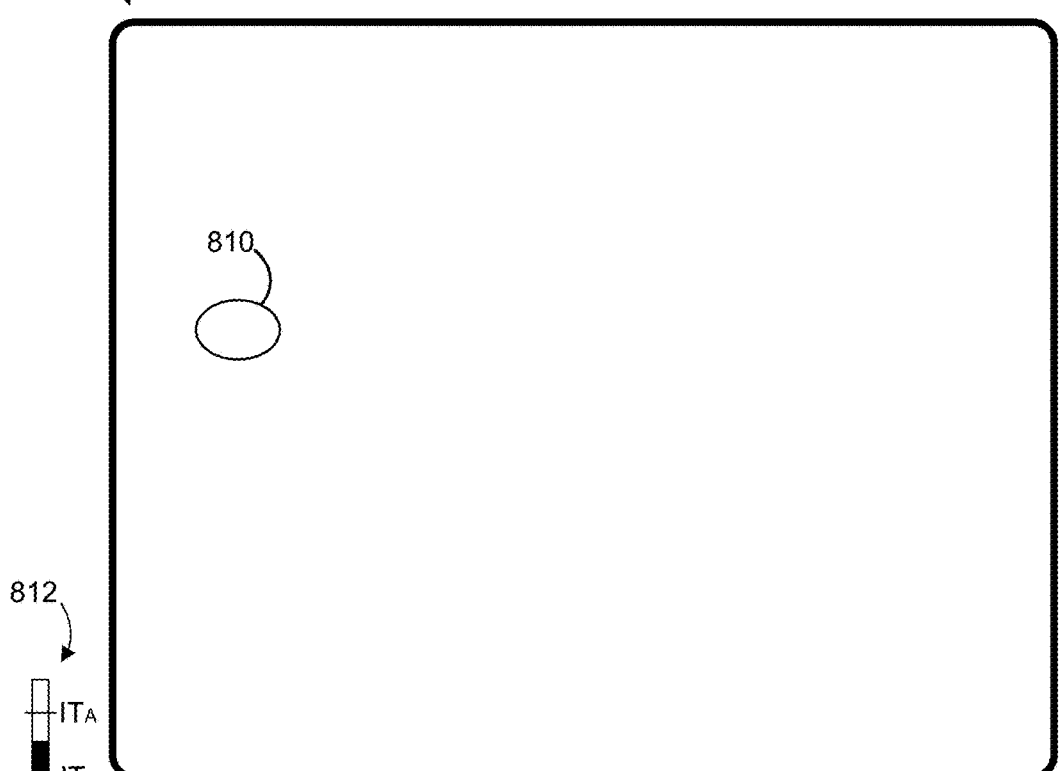
Figure 8A:
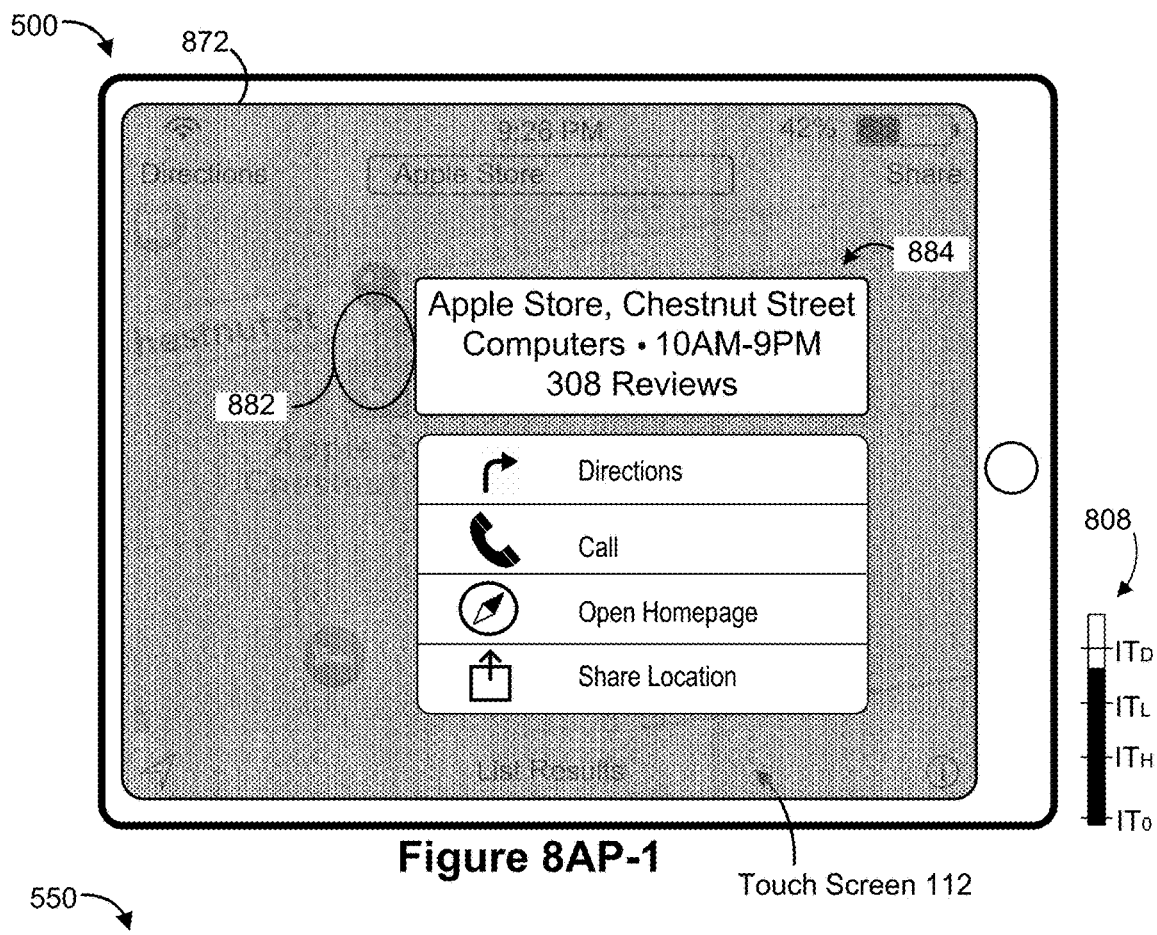
Figure 8A:
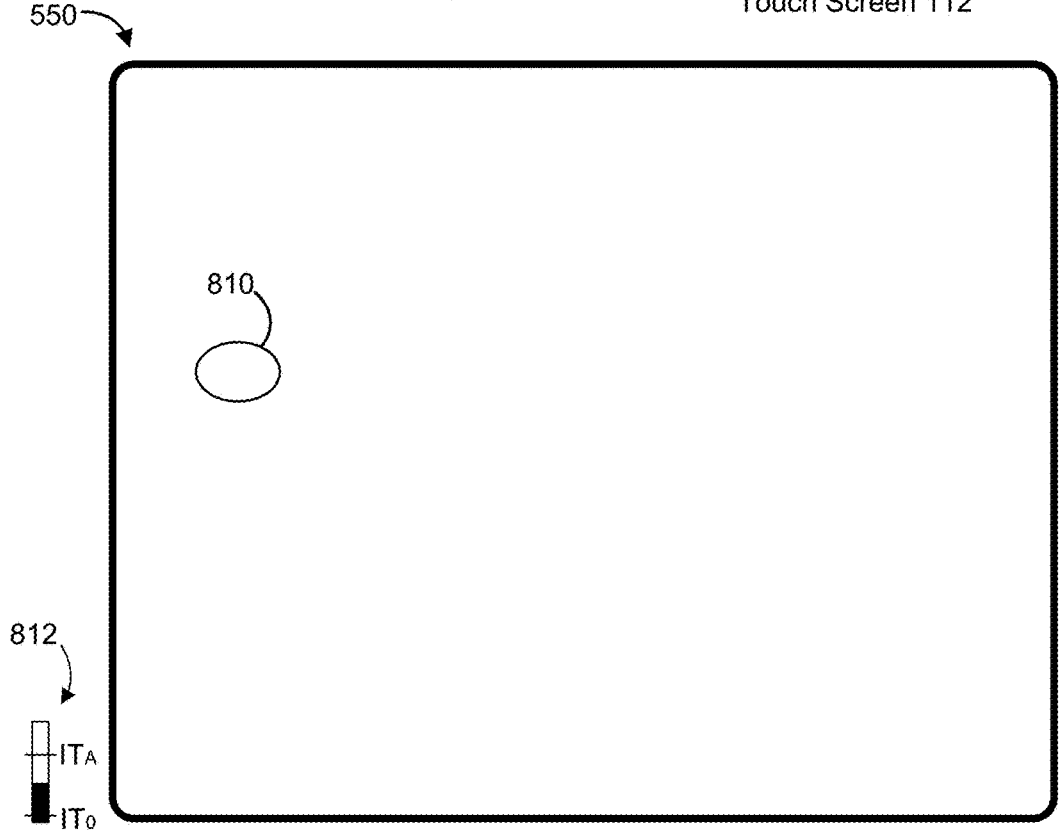
Figure 8A:
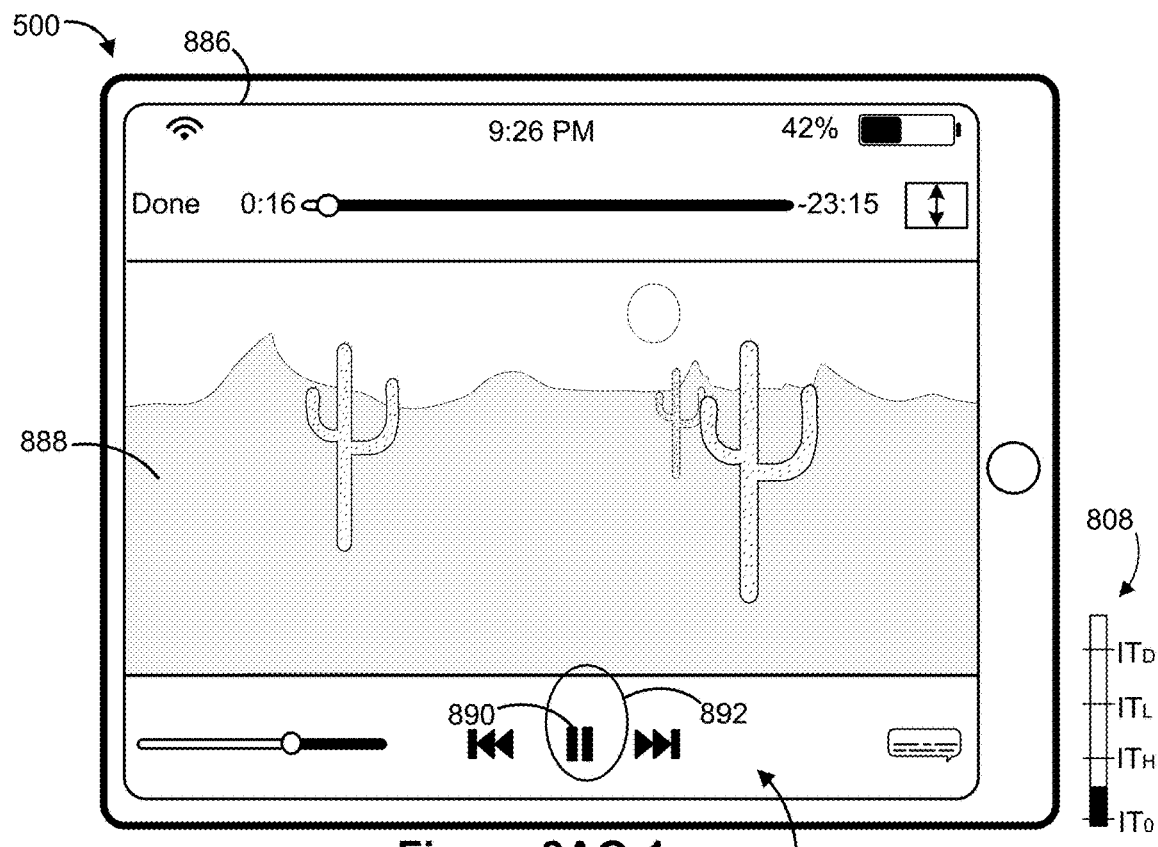
Figure 8A:
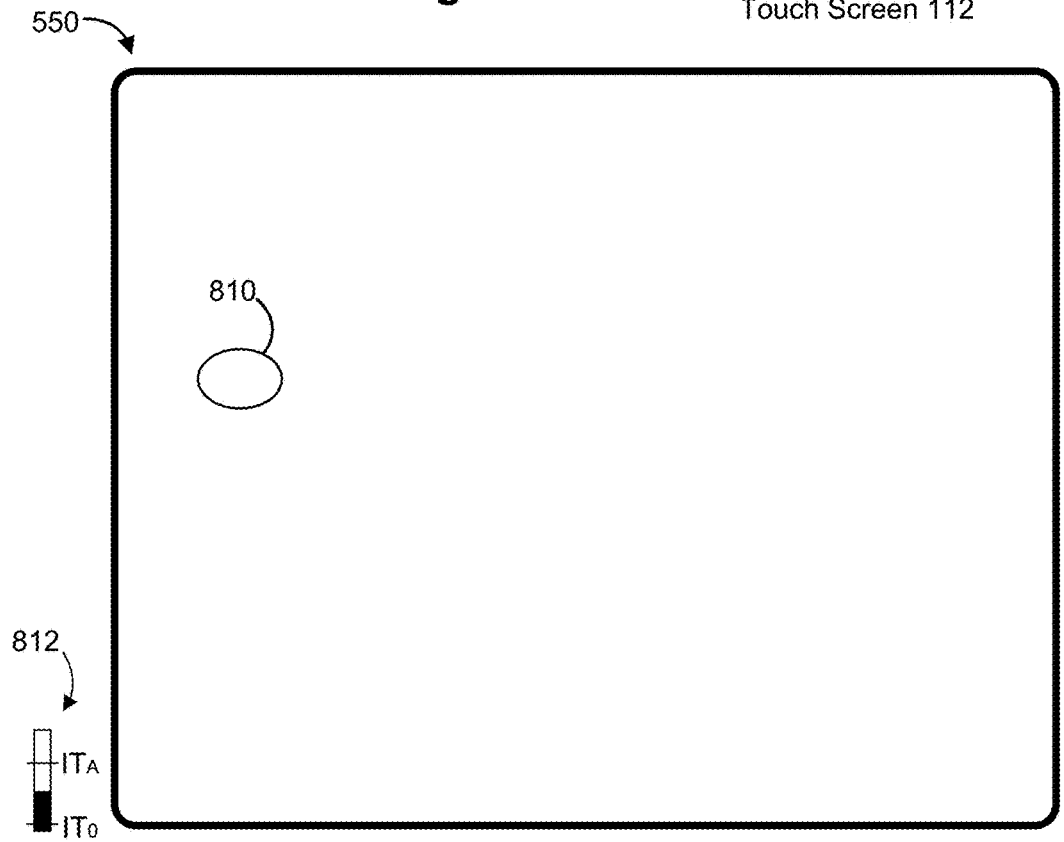
Figure 8A:
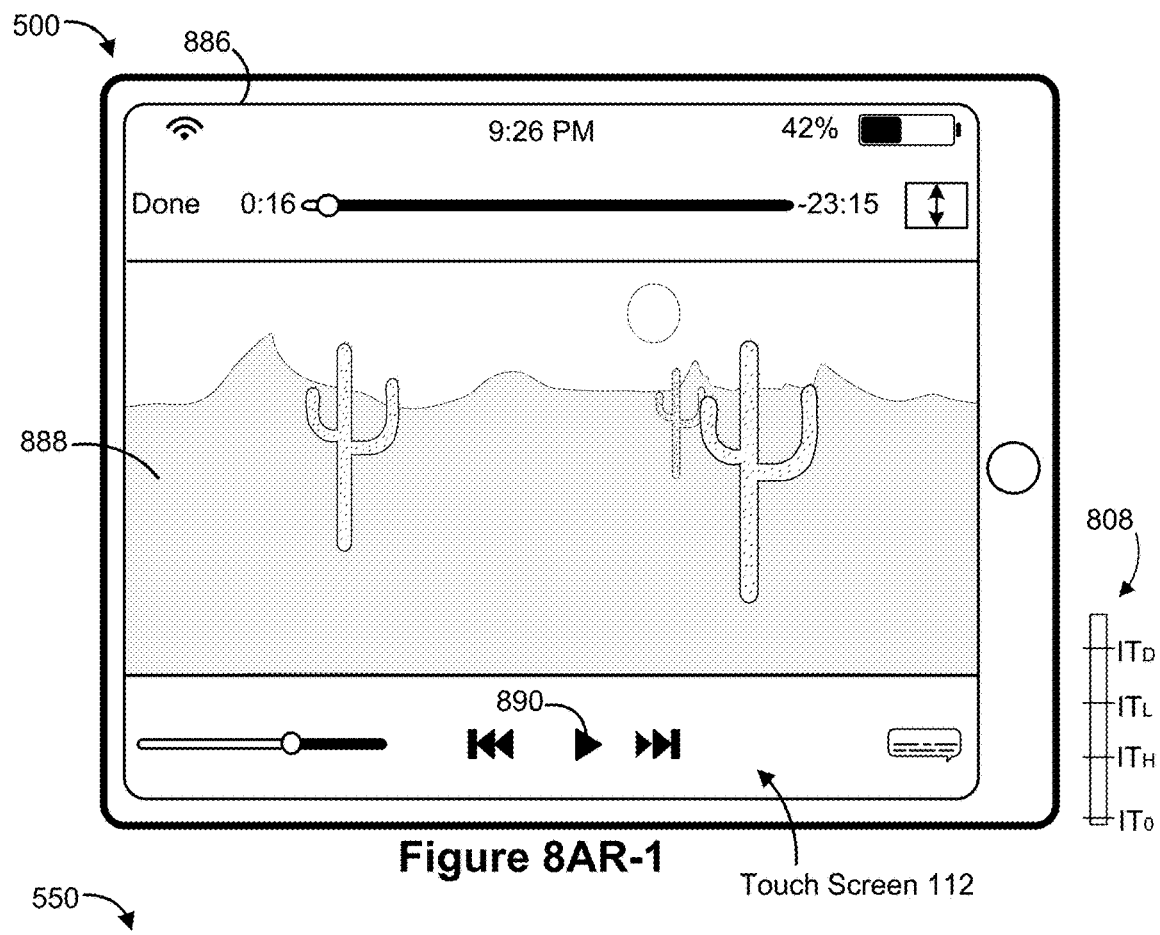
Figure 8A:
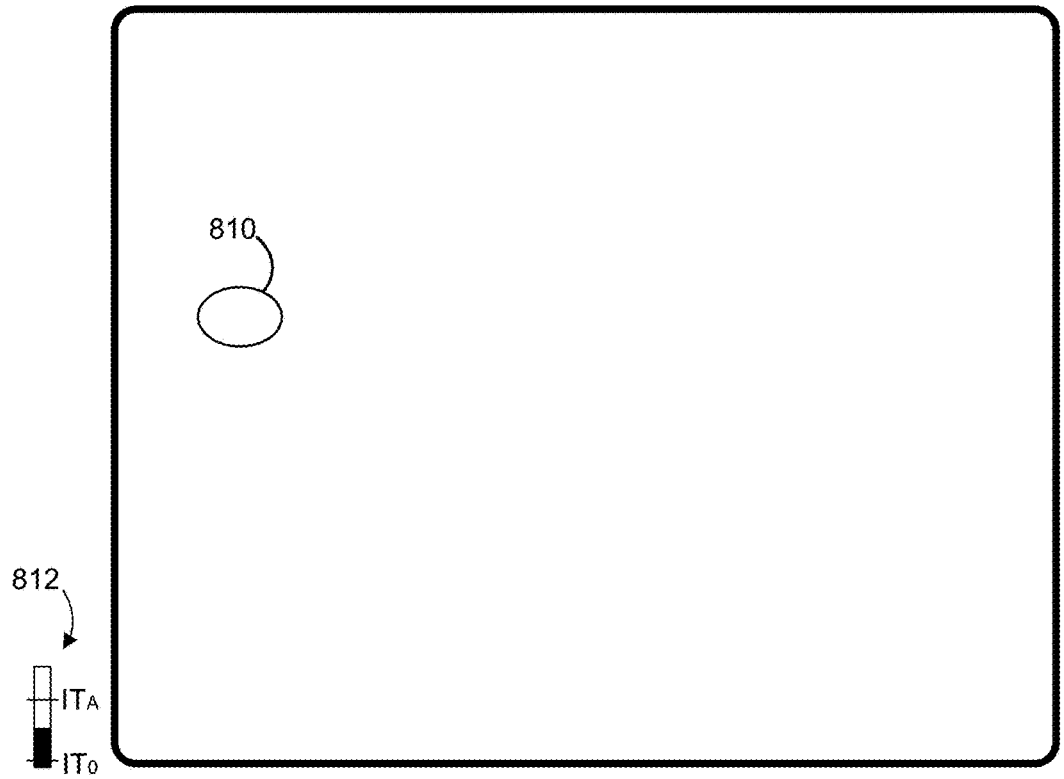
Figure 8A:
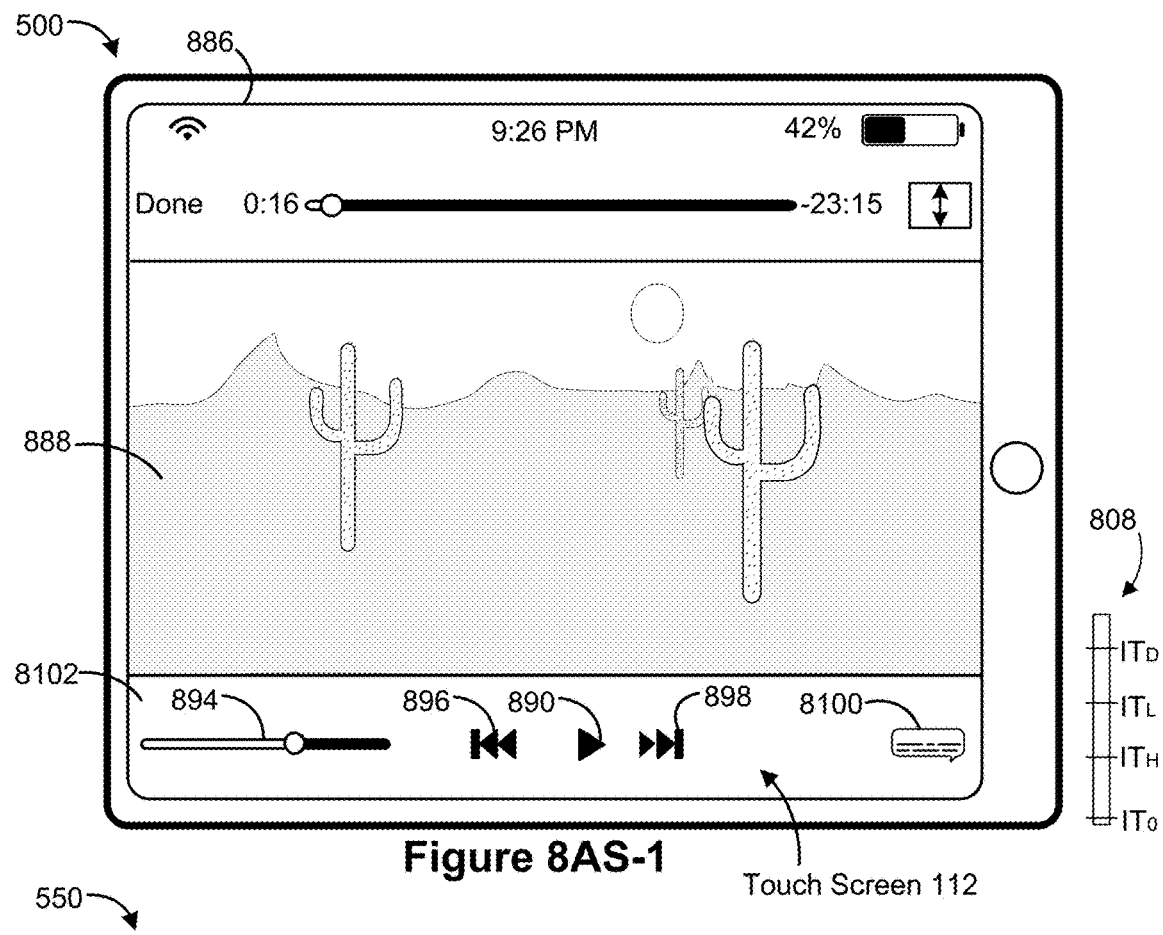
Figure 8A:
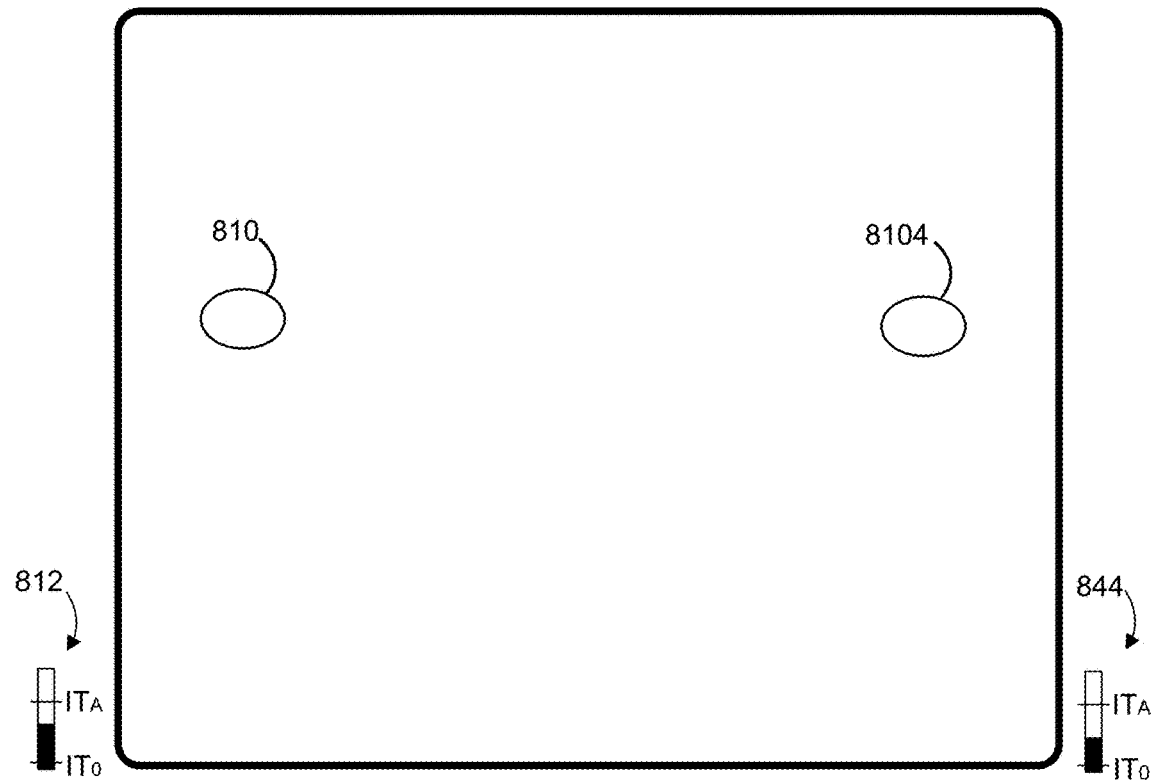
Figure 8A:
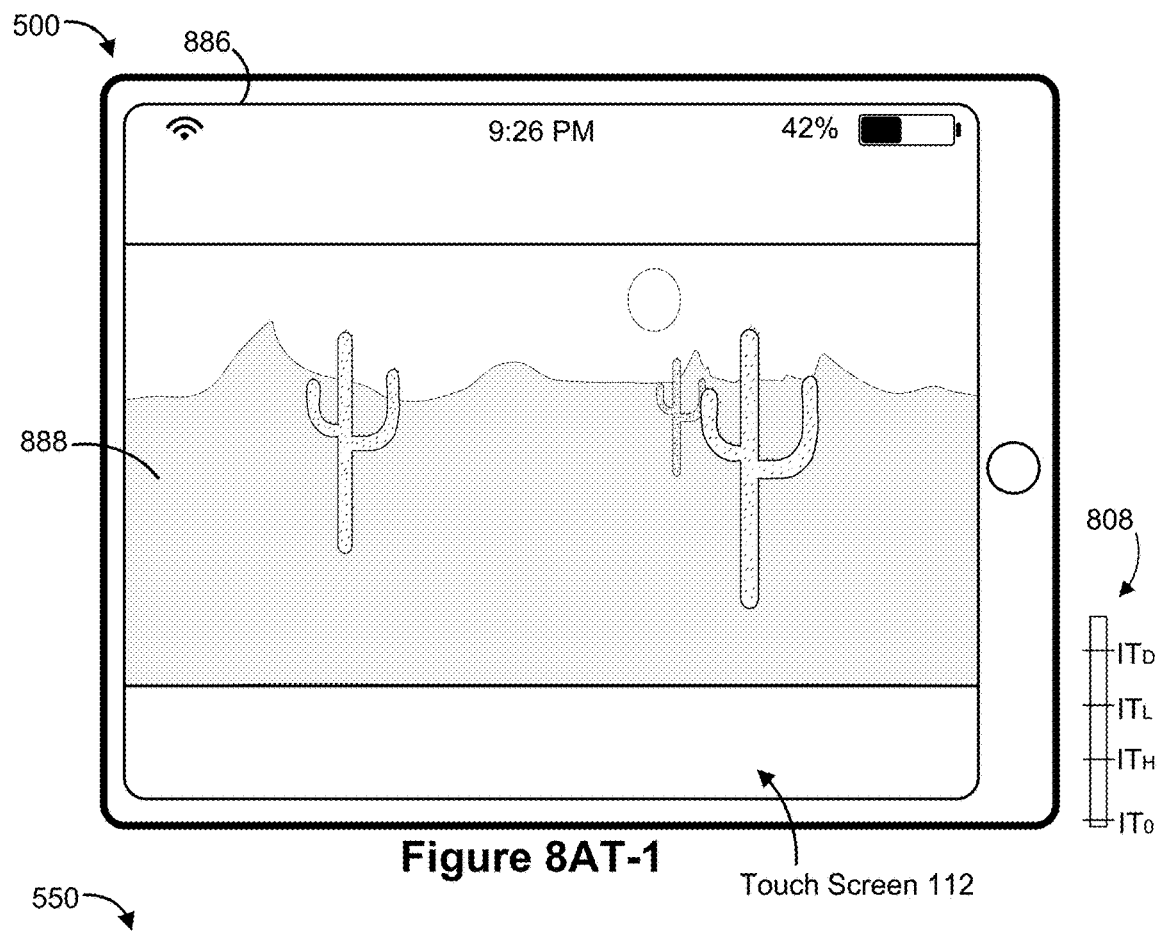
Figure 8A:
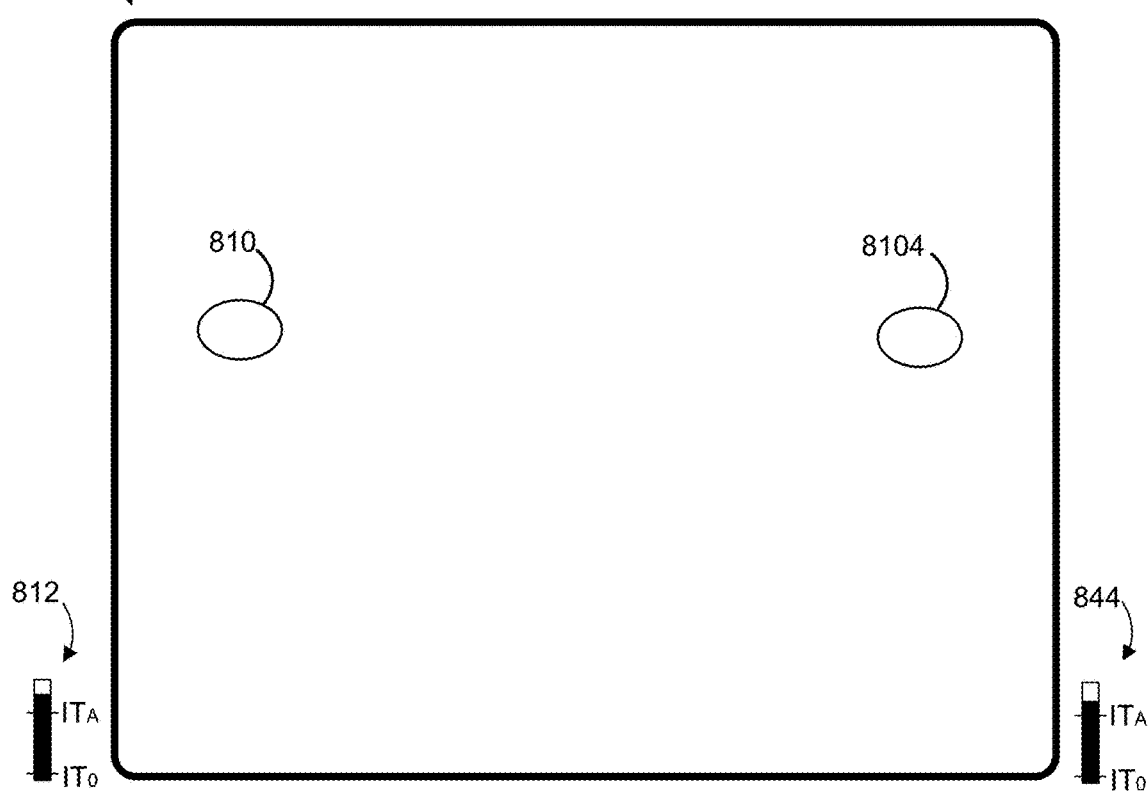
Figure 8A:
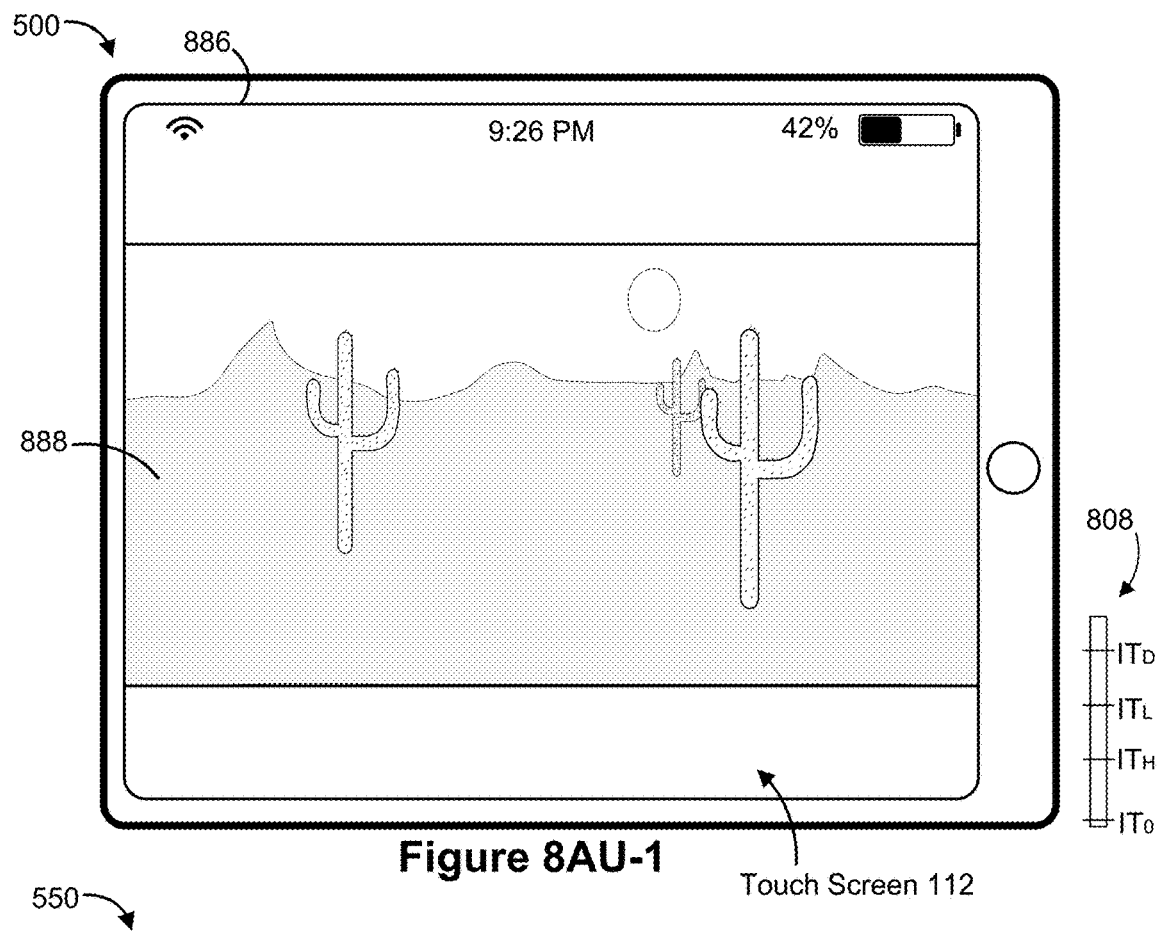
Figure 8A:
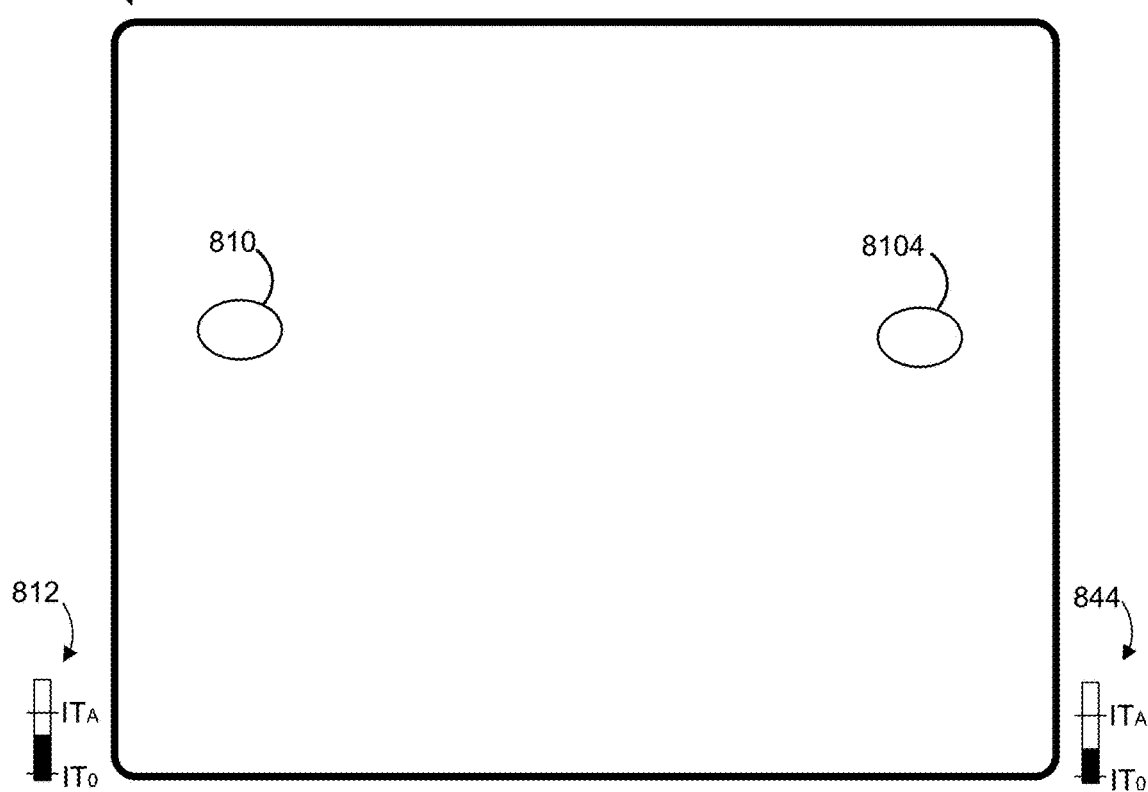
Figure 8A:
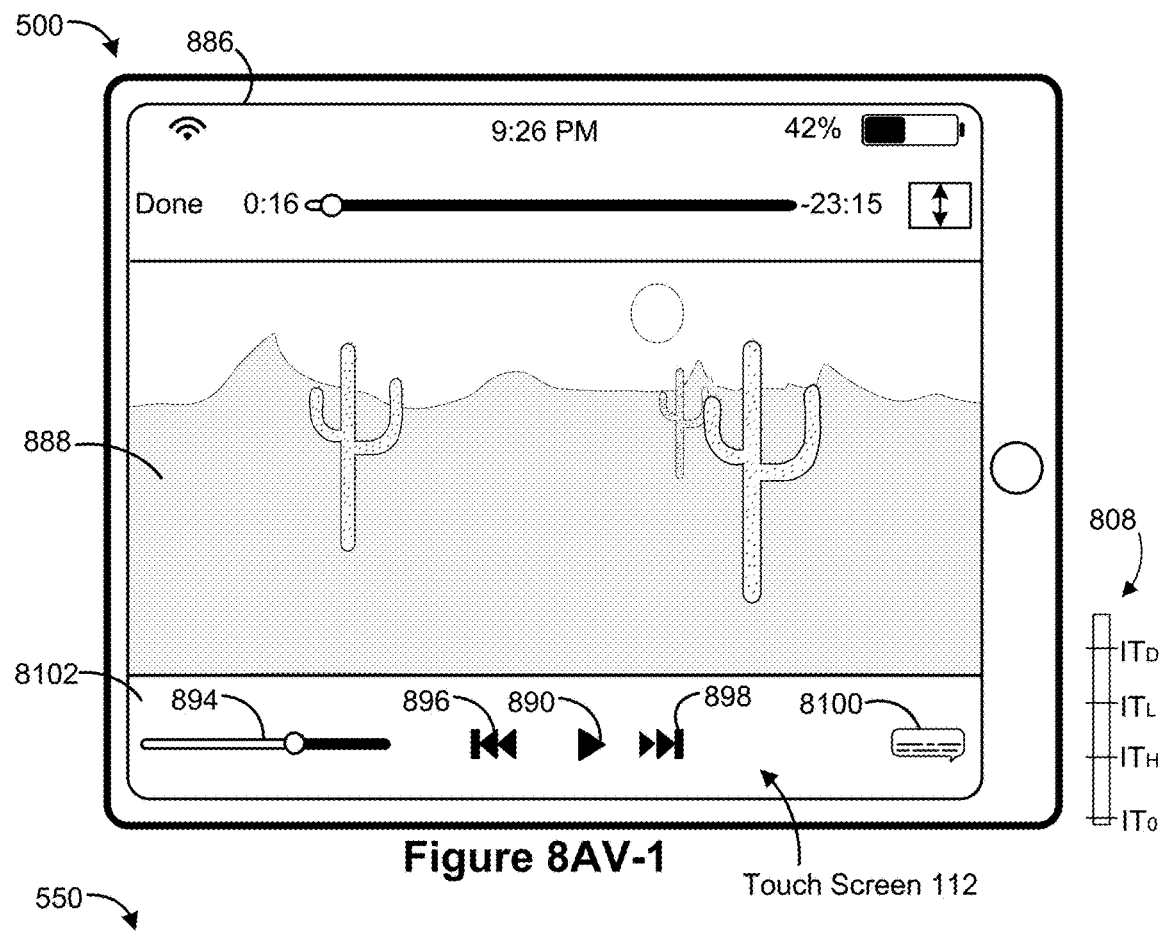
Figure 8A:
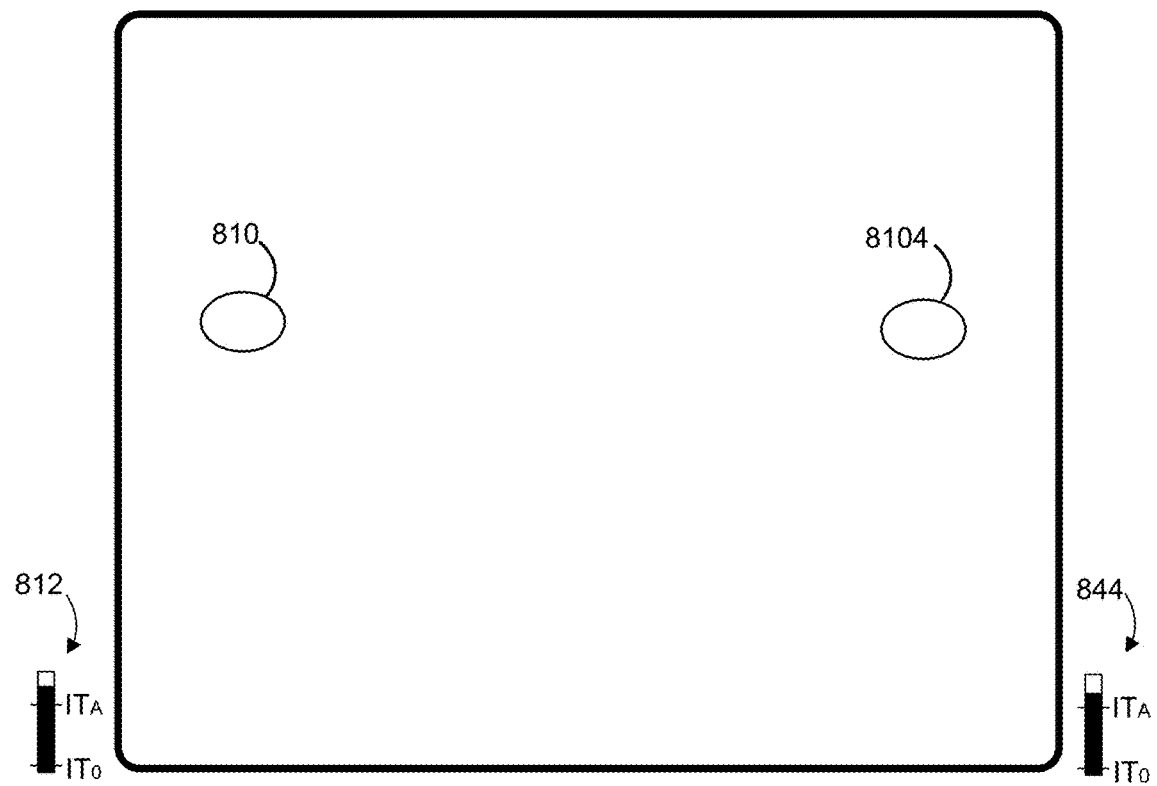
Figure 8A:
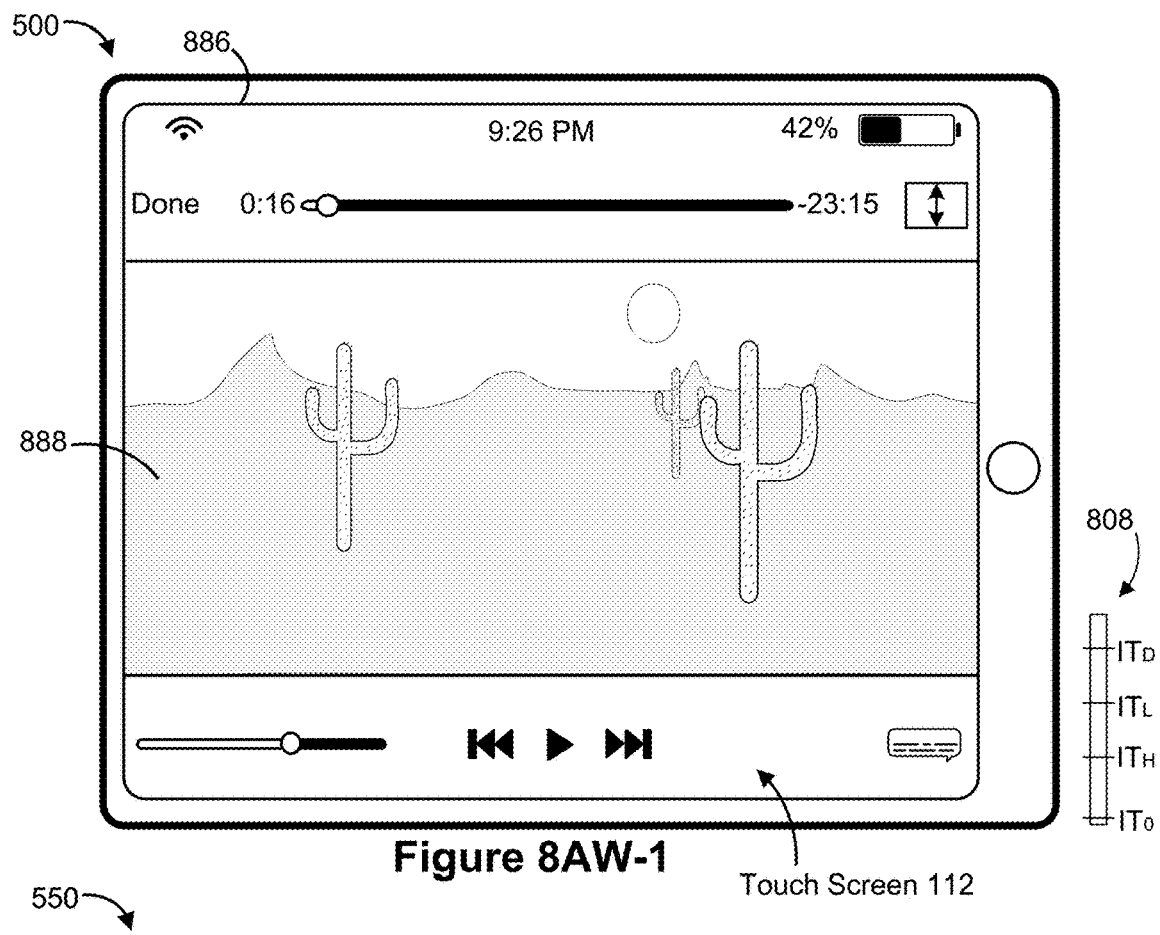
Figure 8A:
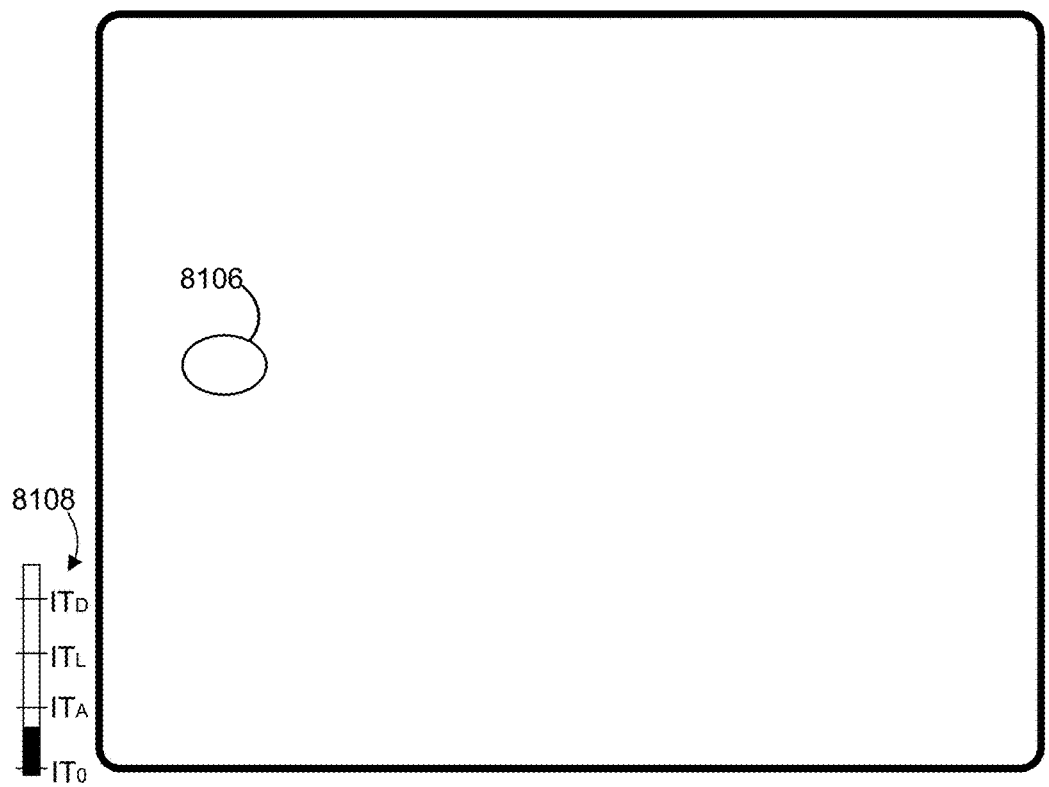
Figure 8A:
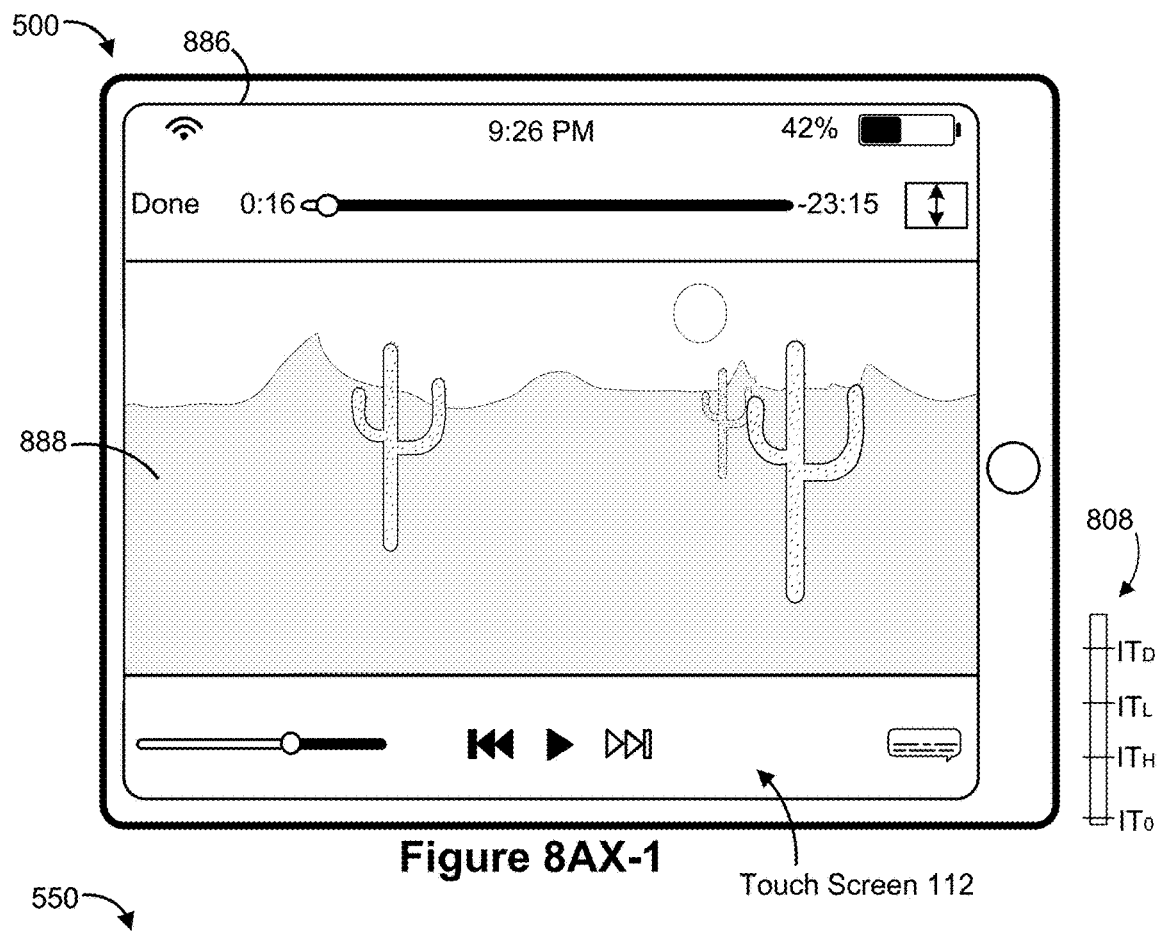
Figure 8A:
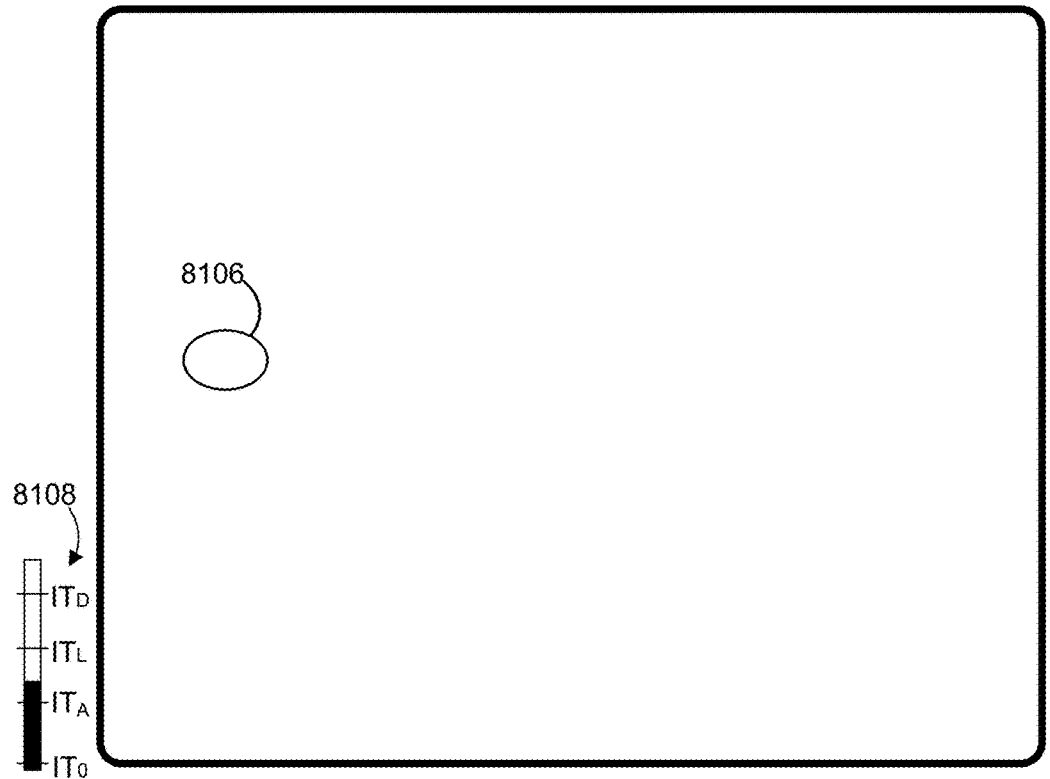
Figure 8A:
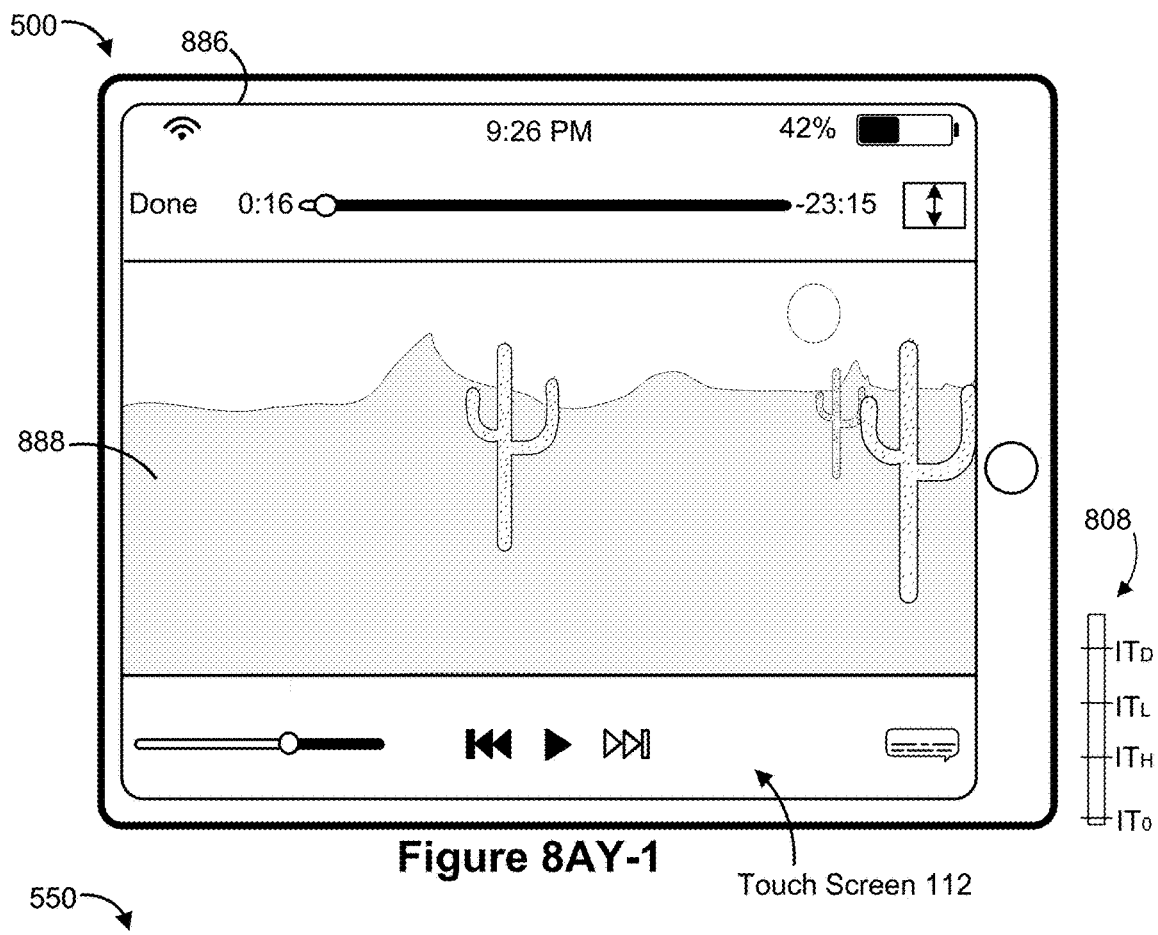
Figure 8A:
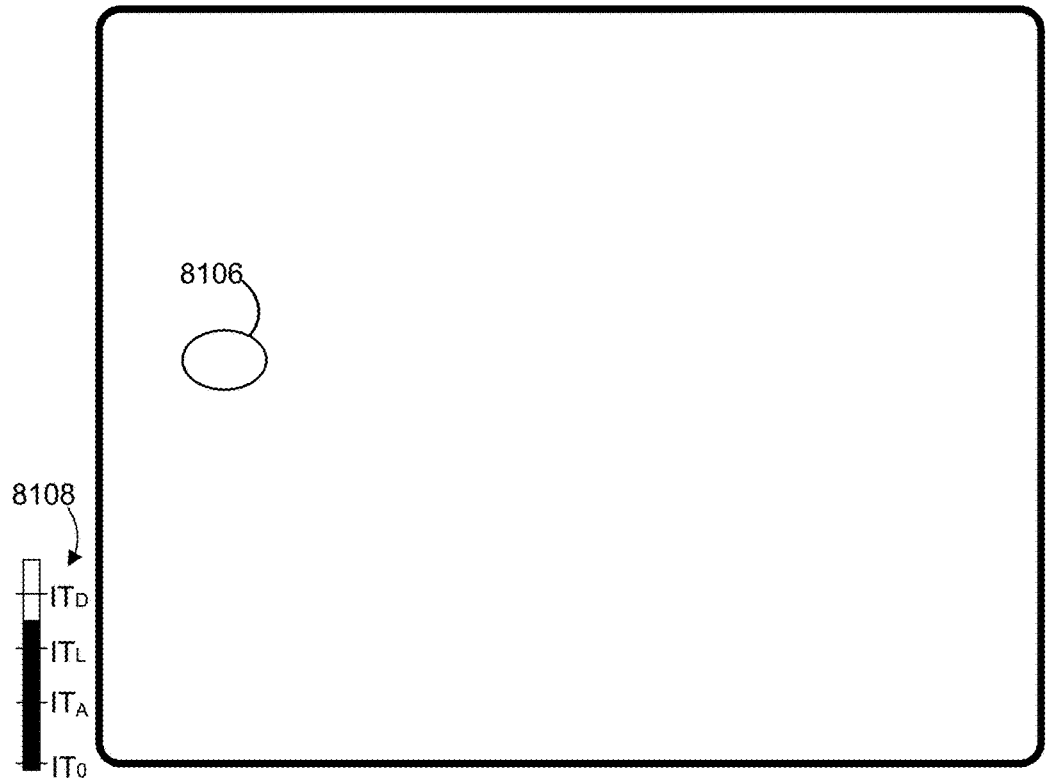
Figure 8A:
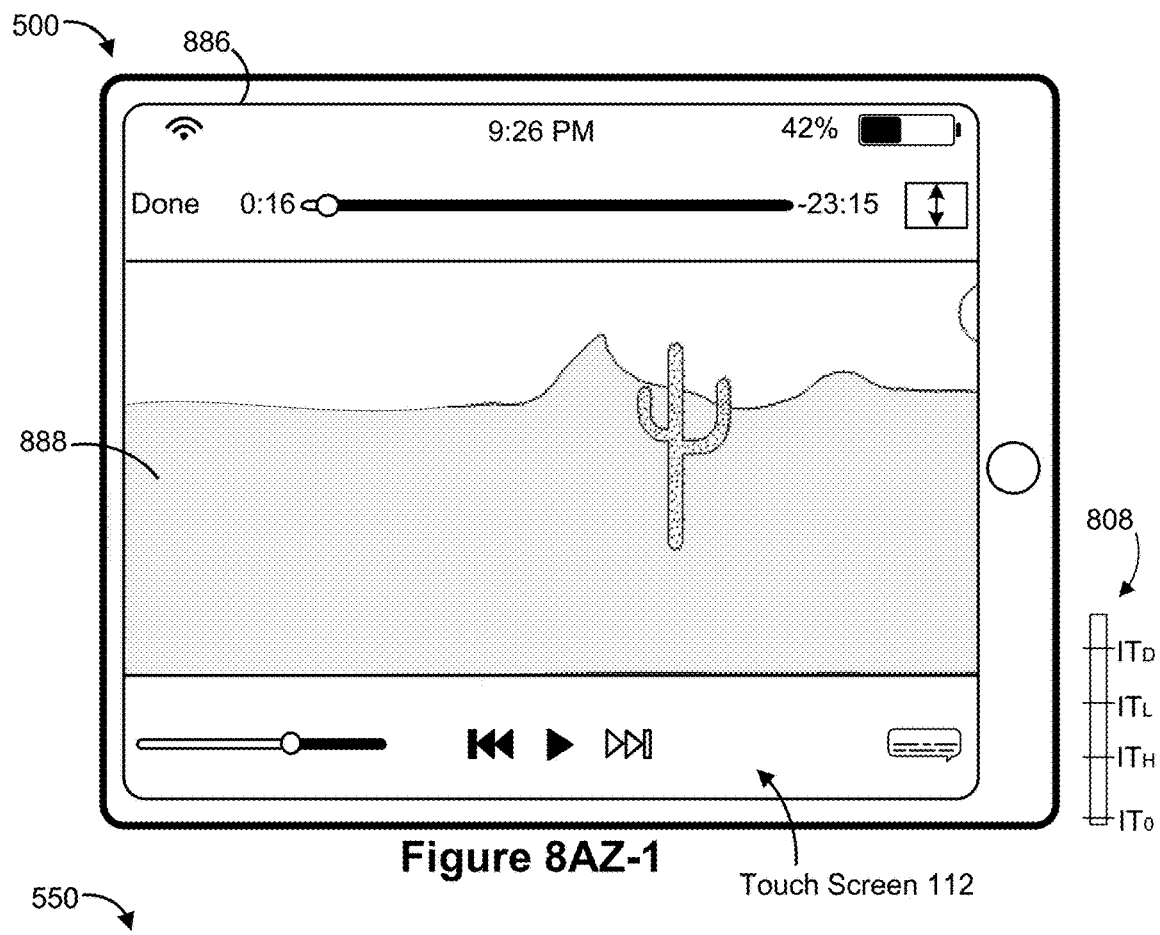
Figure 8A:
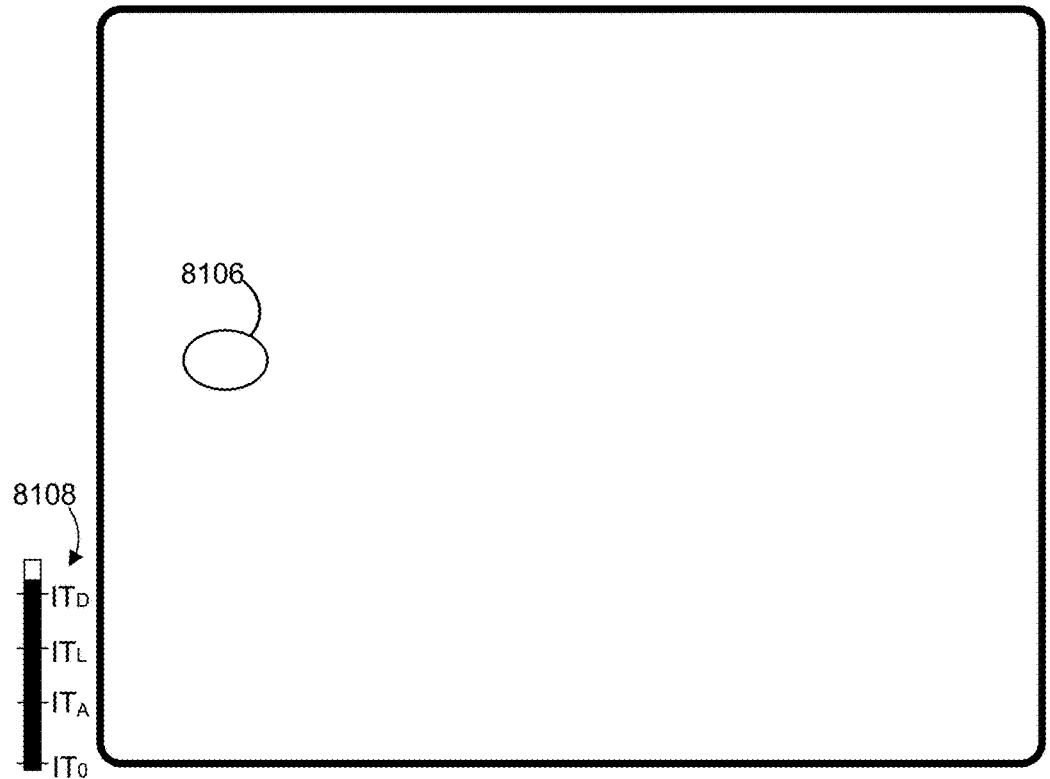
Figure 8B:
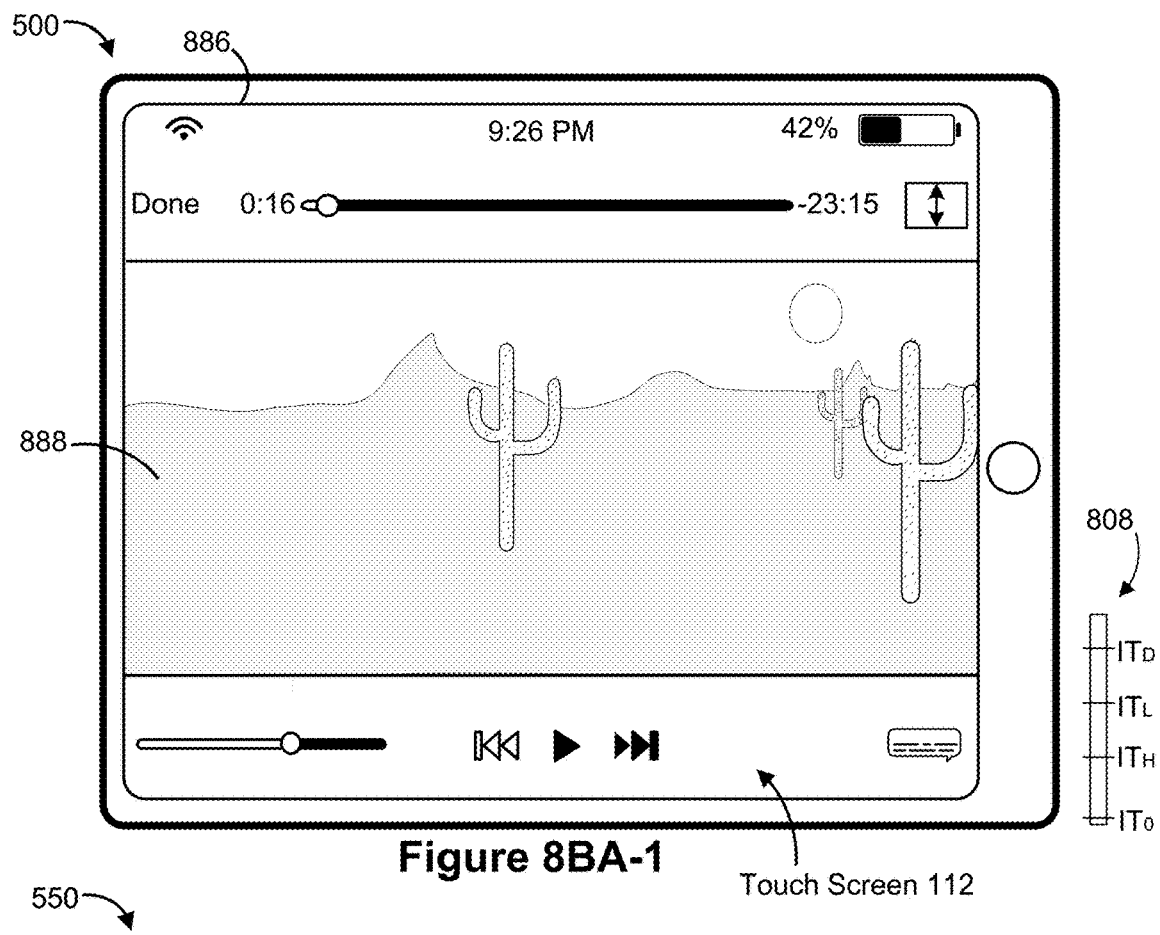
Figure 8B:
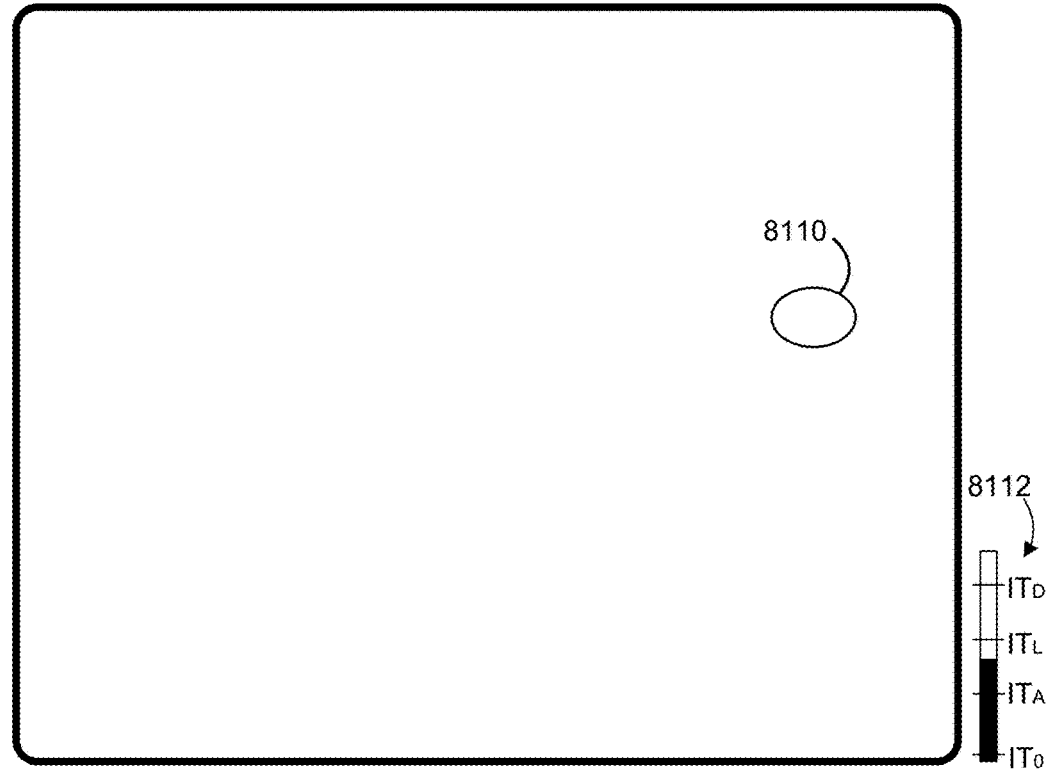
Figure 8B:
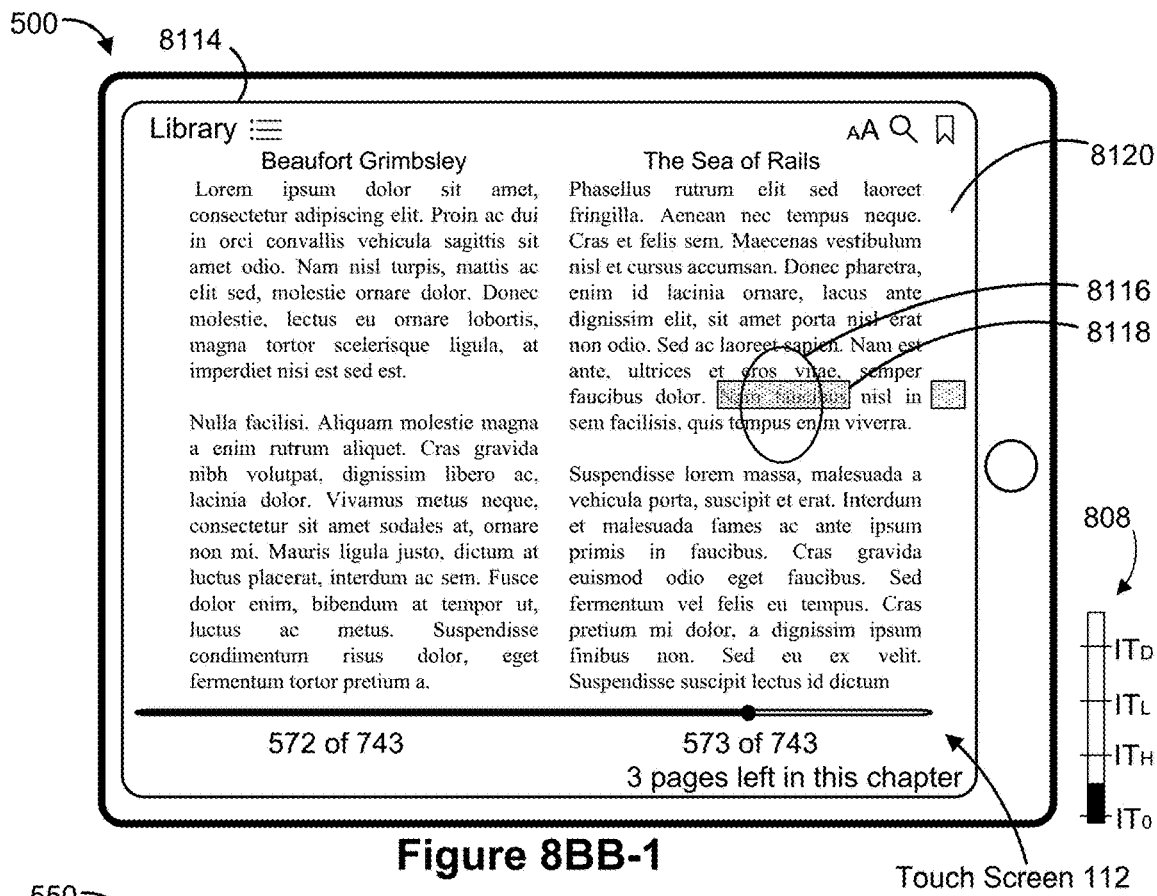
Figure 8B:
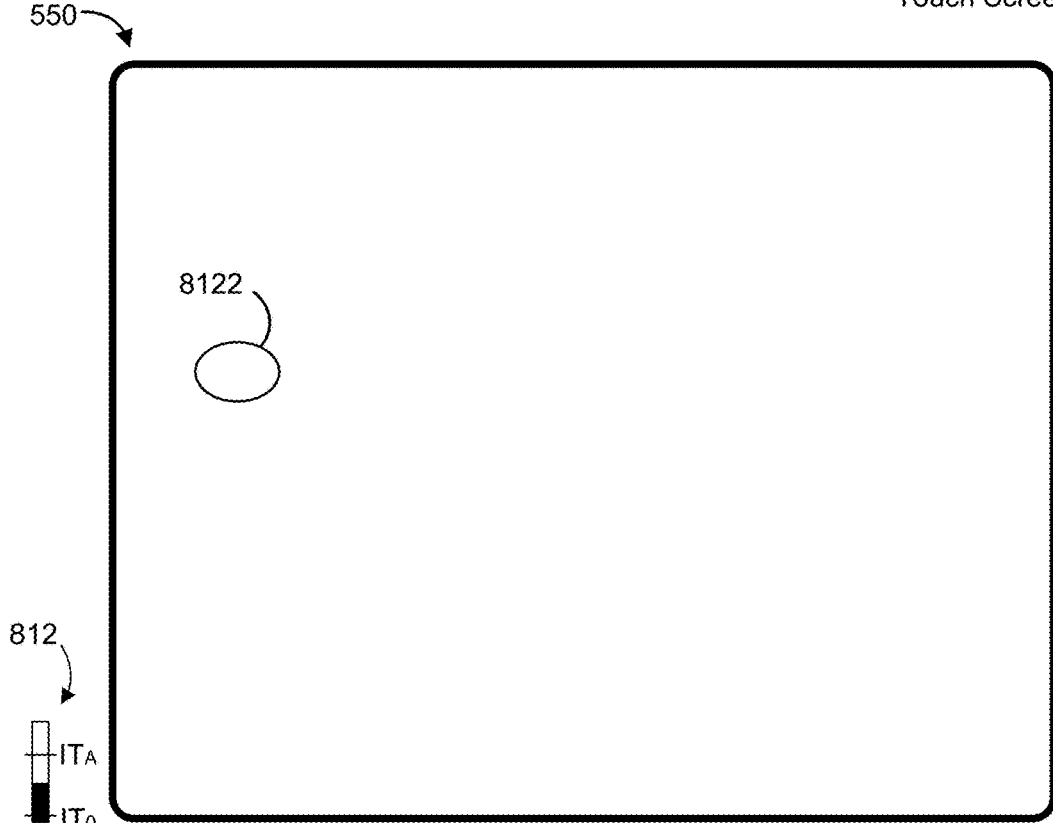
Figure 8B:
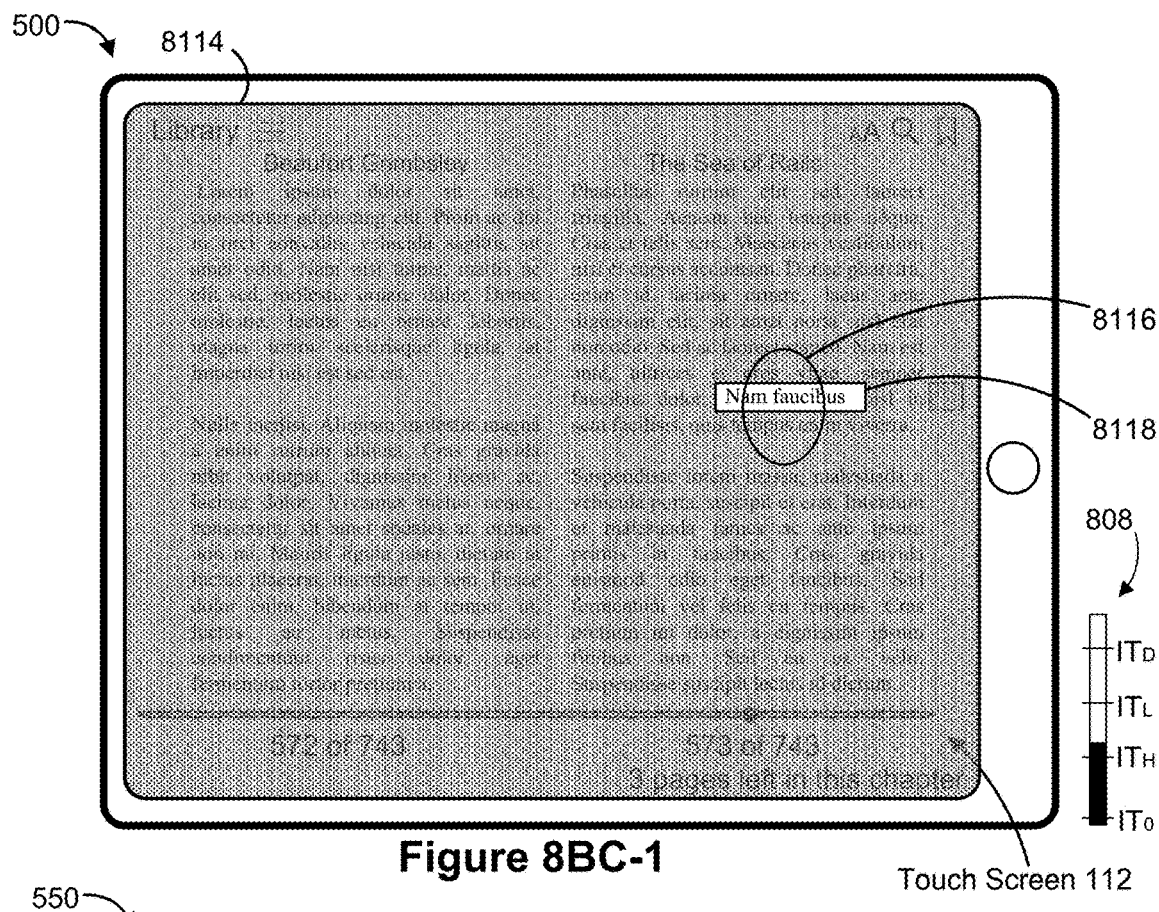
Figure 8B:
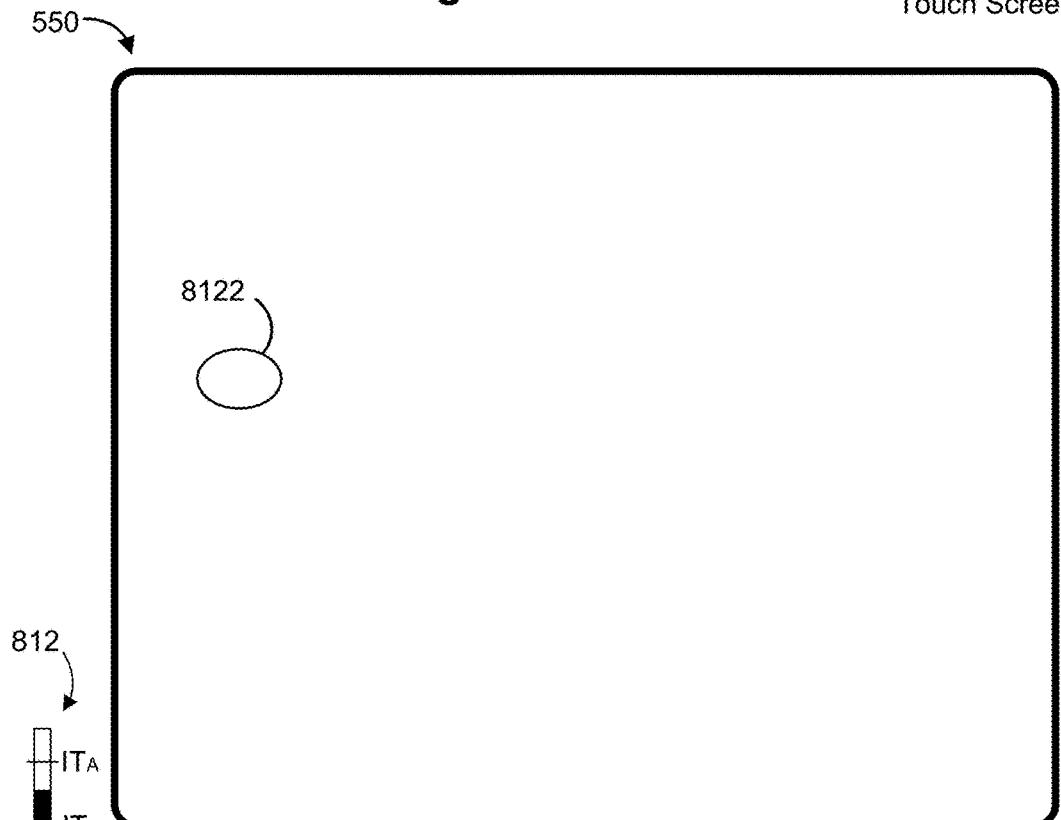
Figure 8B:
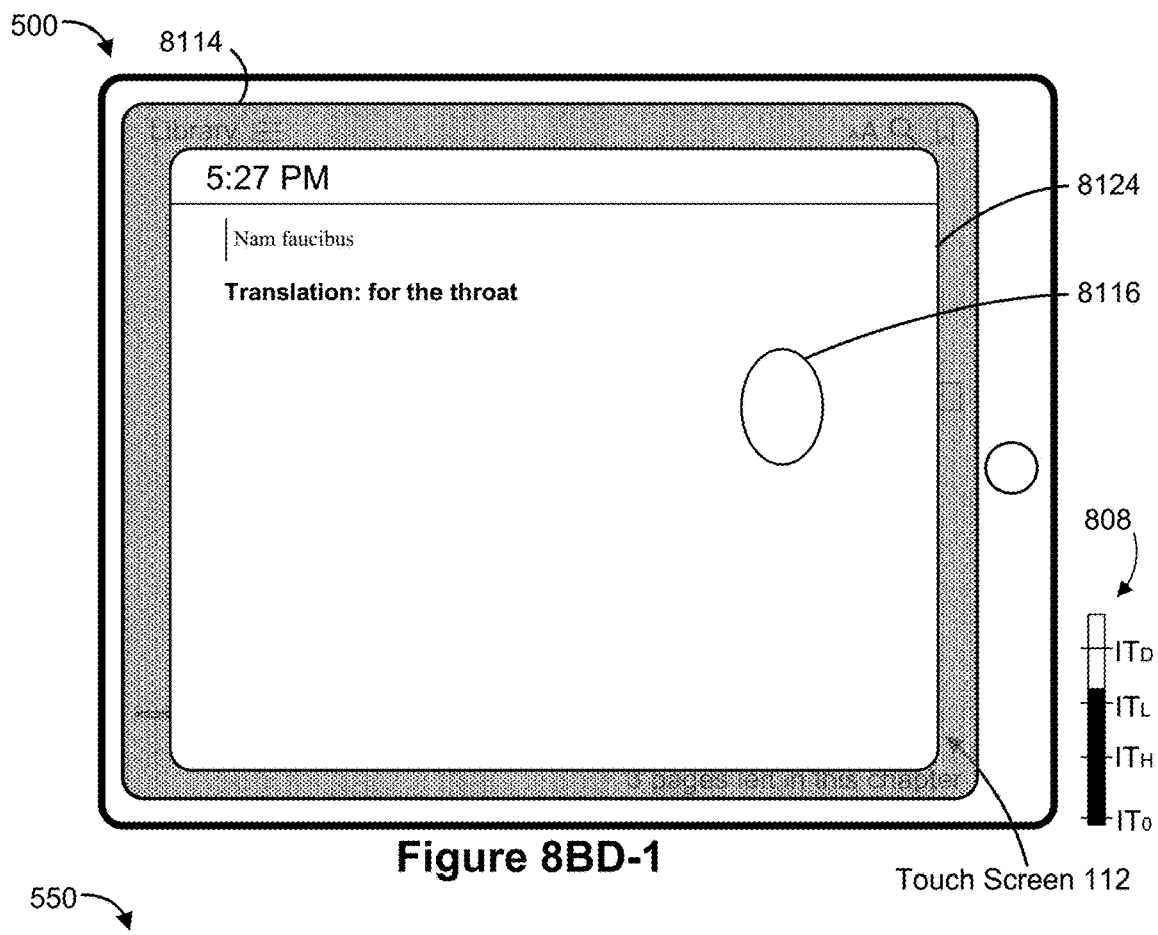
Figure 8B:
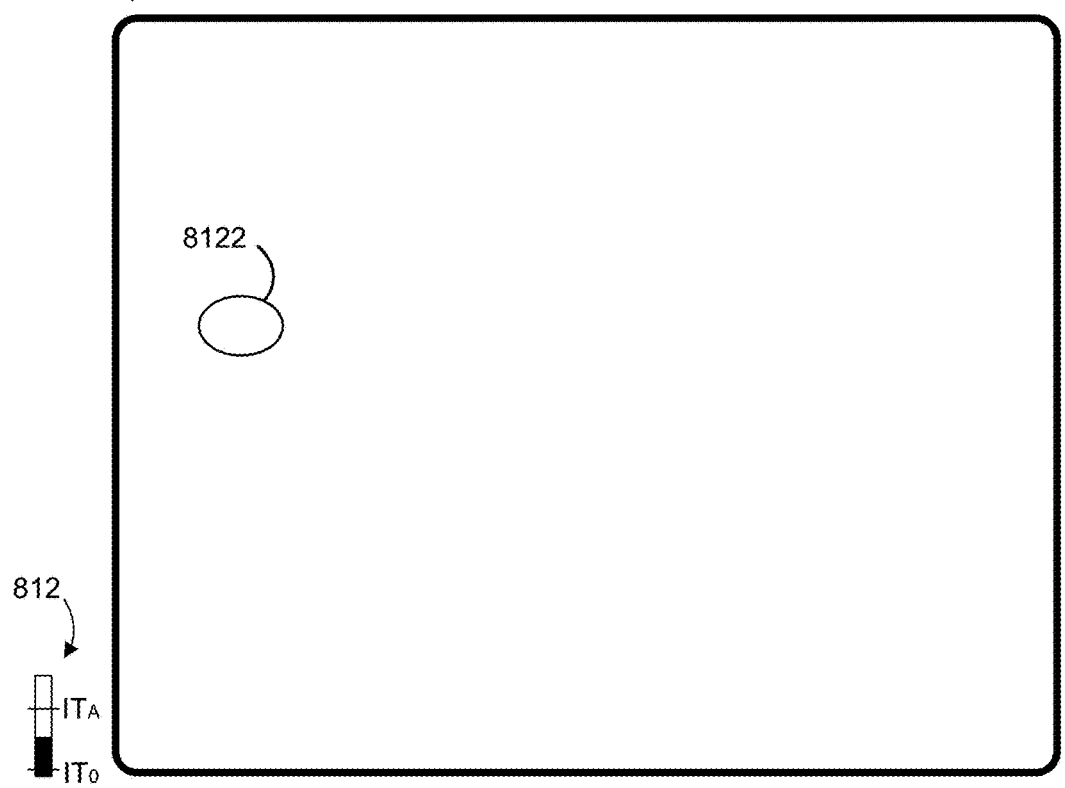
Figure 8B:
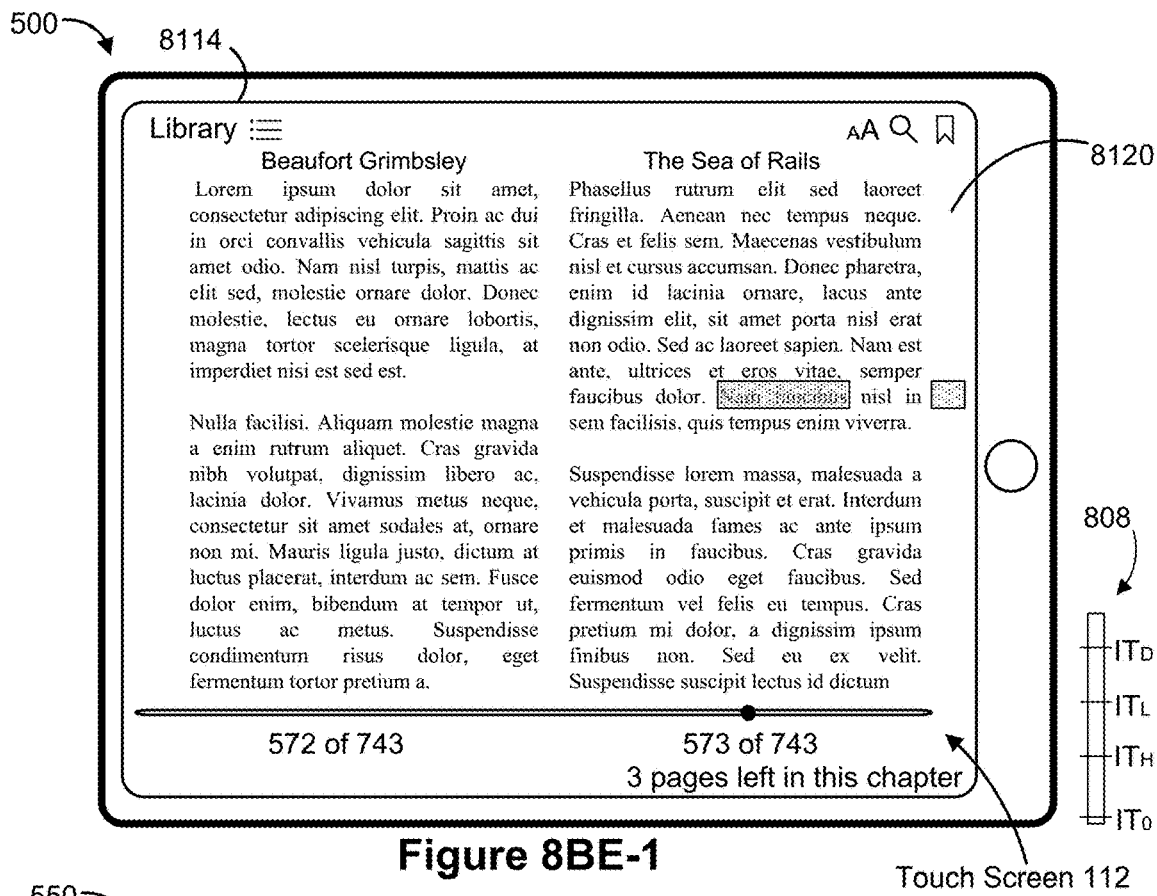
Figure 8B:
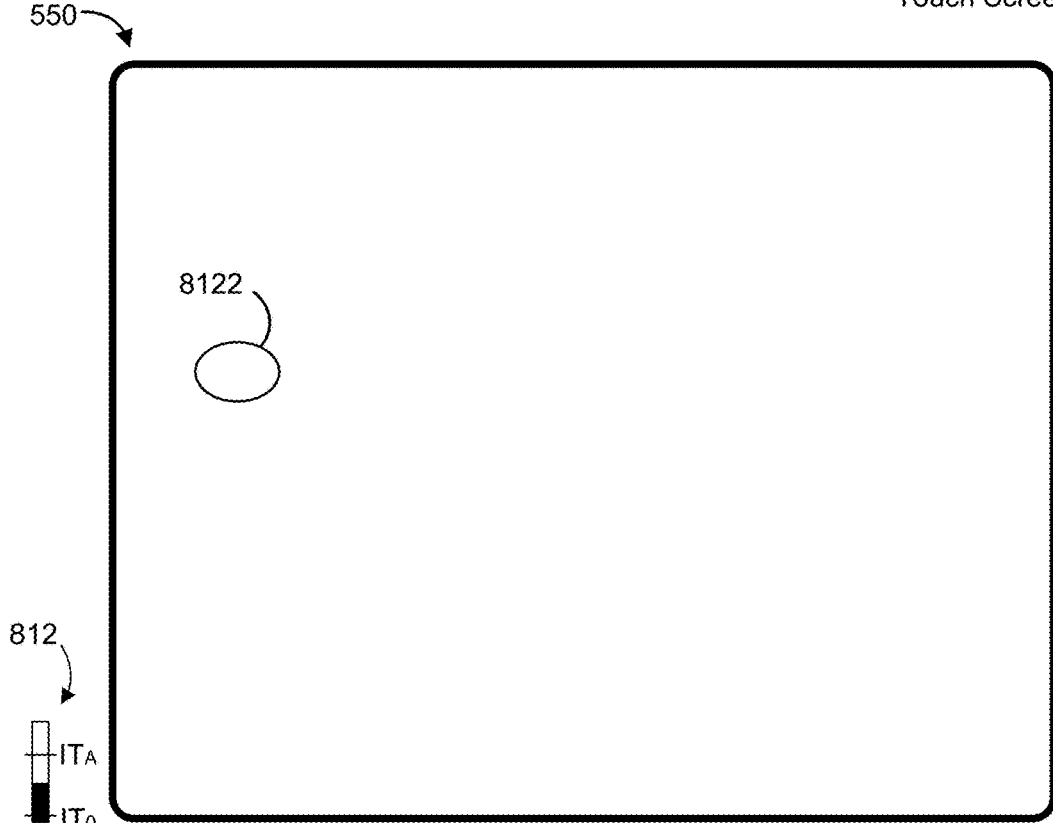
Figure 8B:
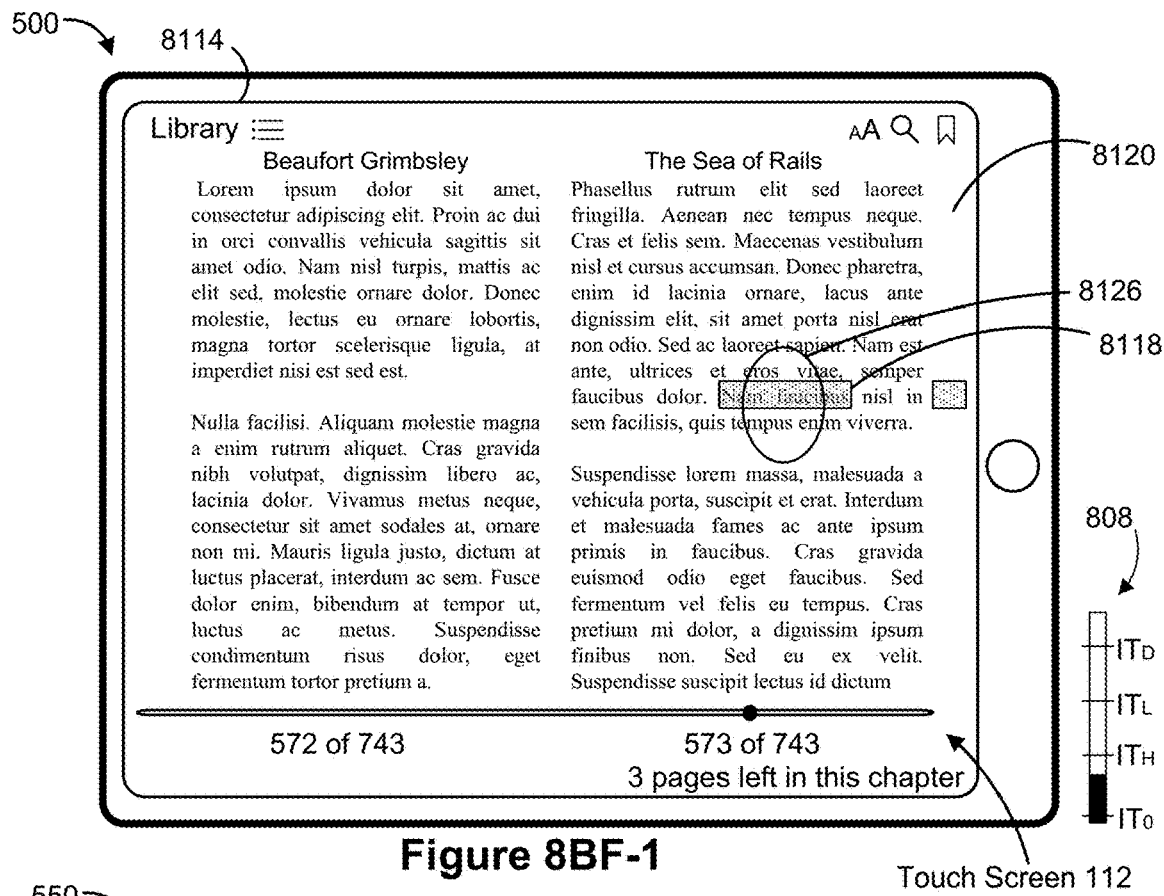
Figure 8B:
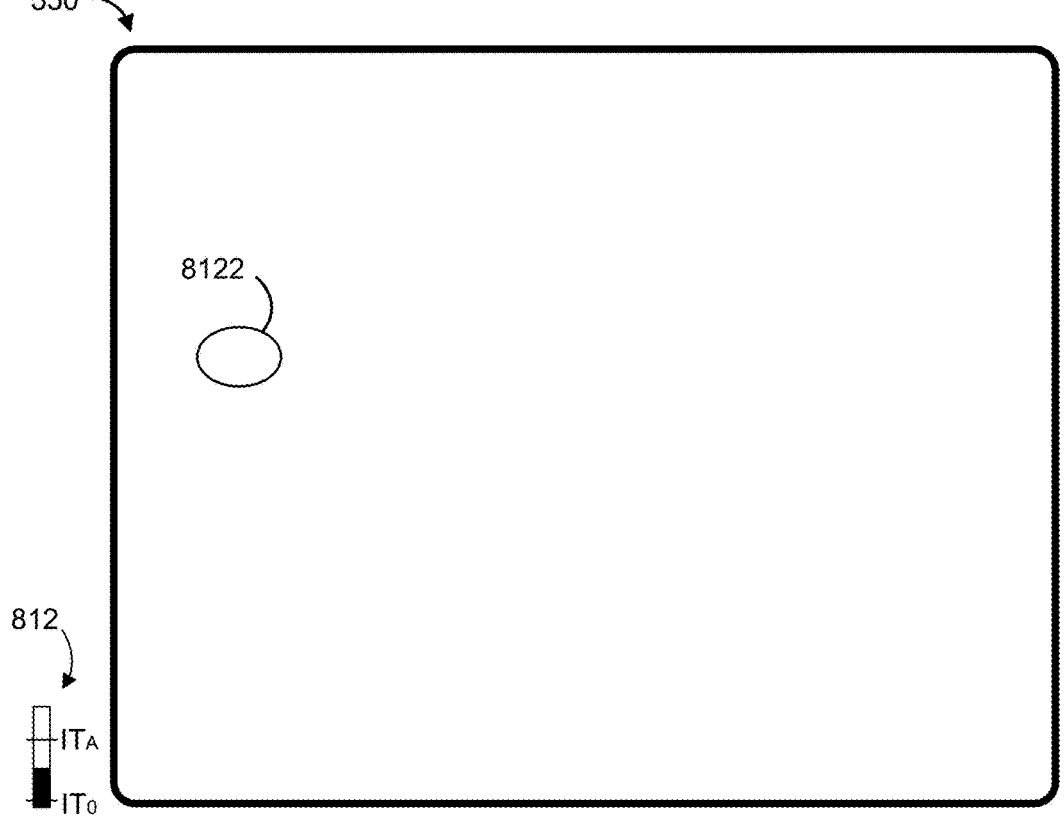
Figure 8B:
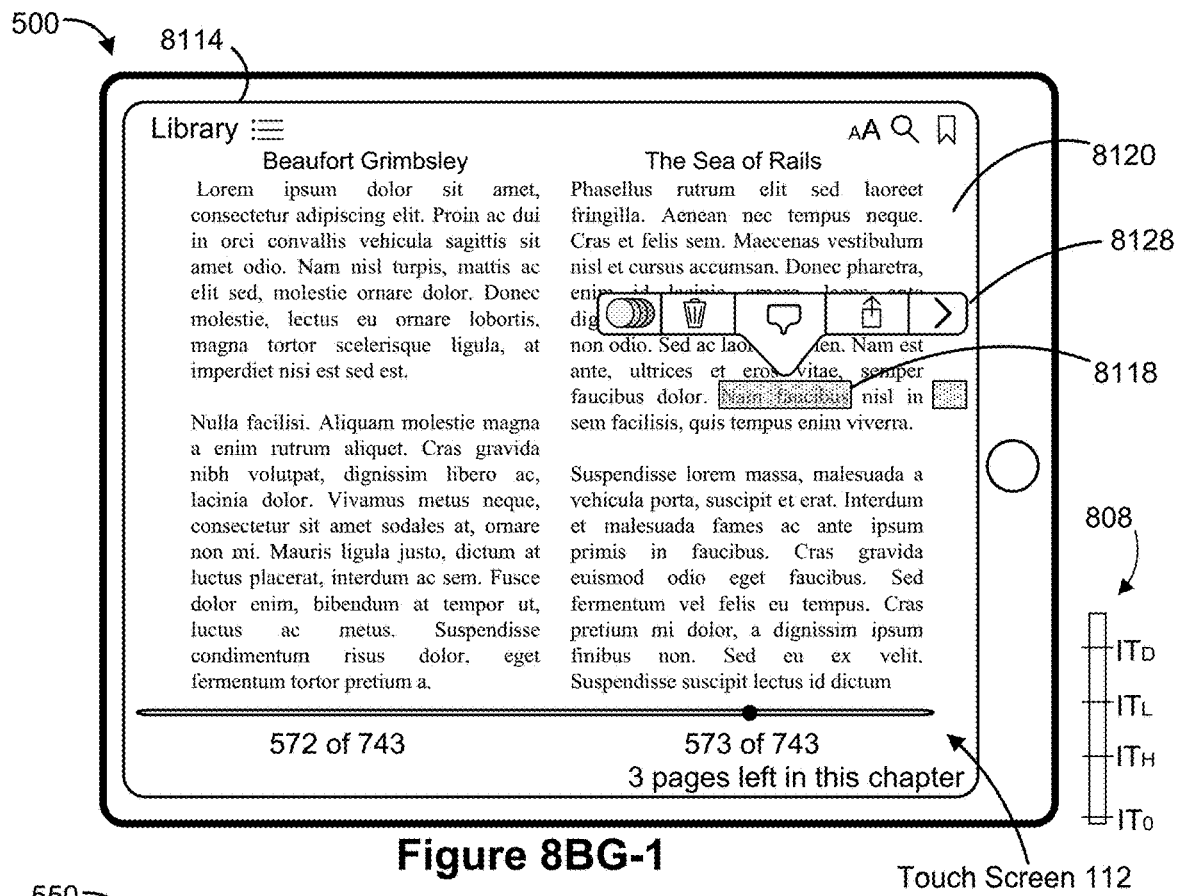
Figure 8B:
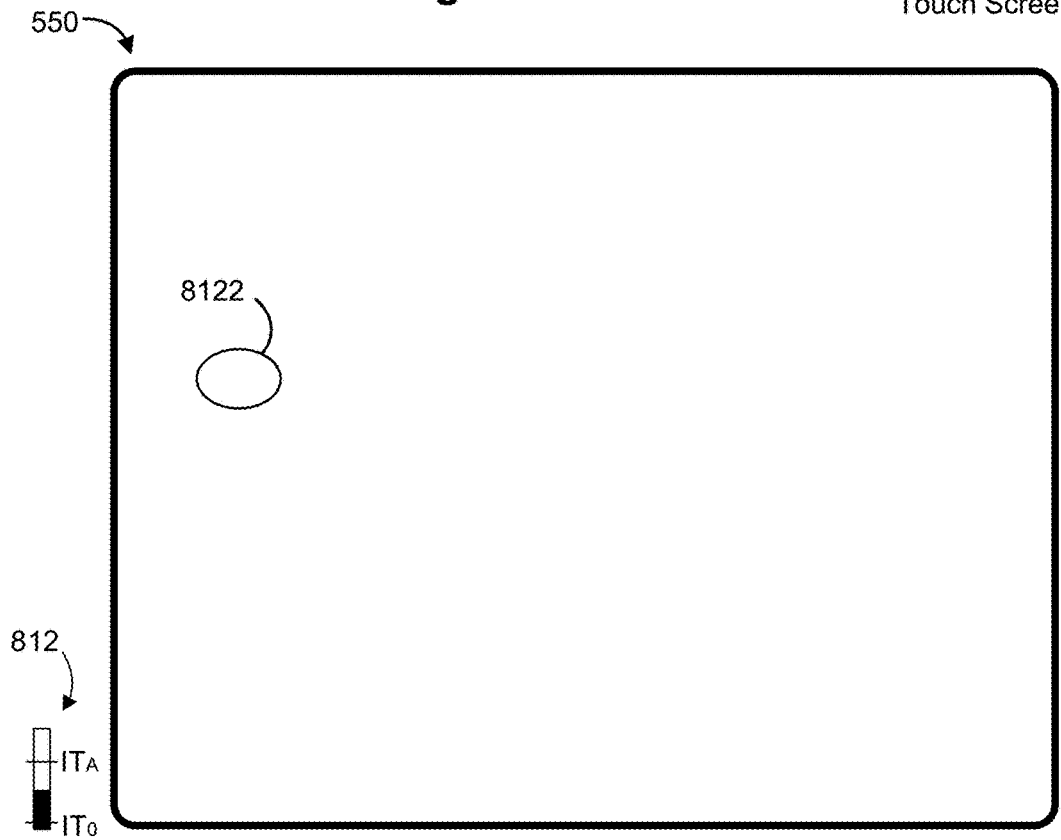
Figure 8B:
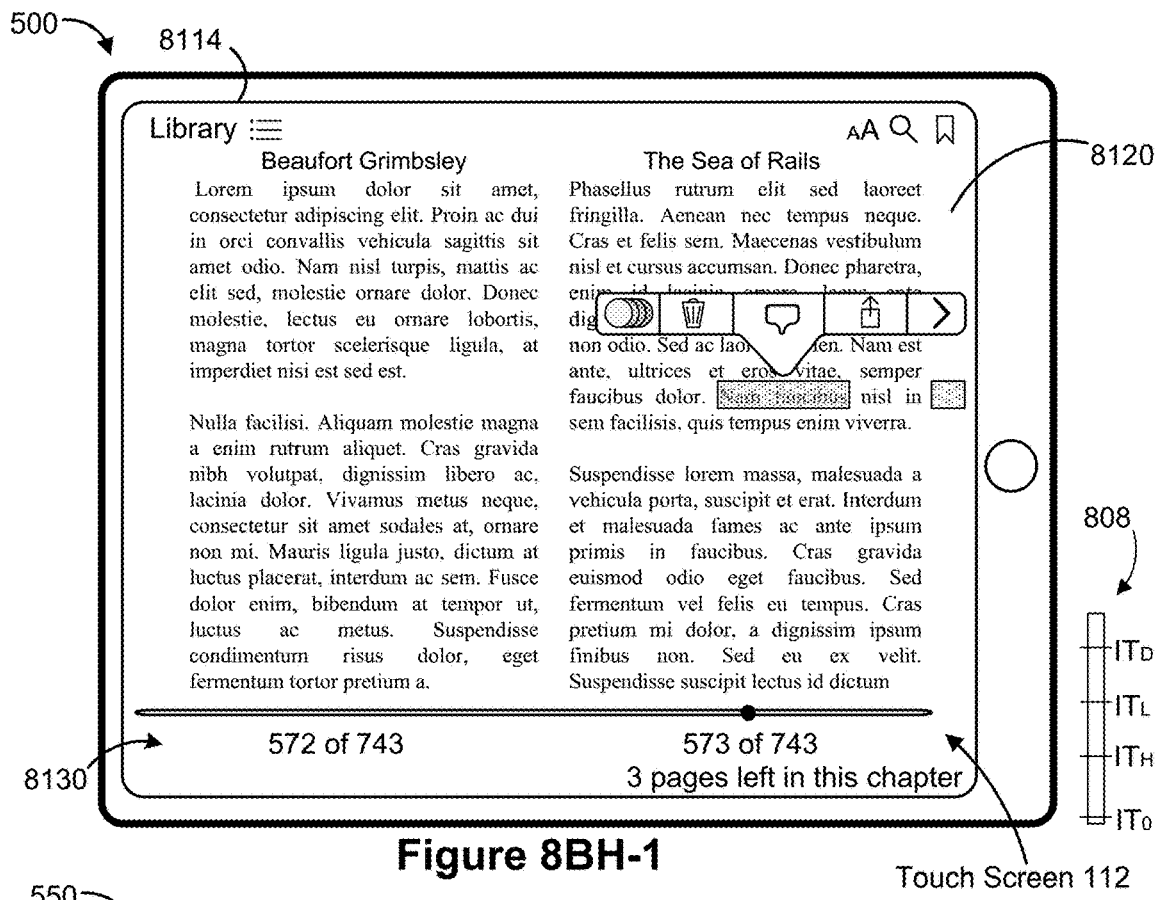
Figure 8B:
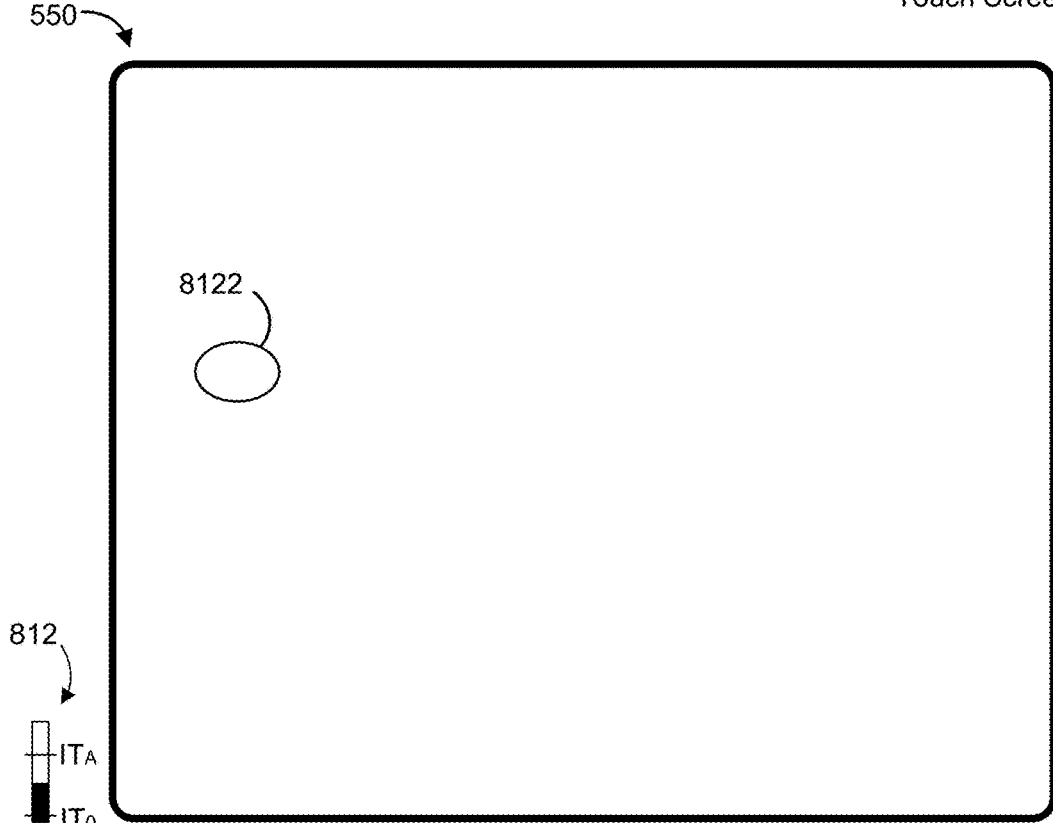
Figure 8B:
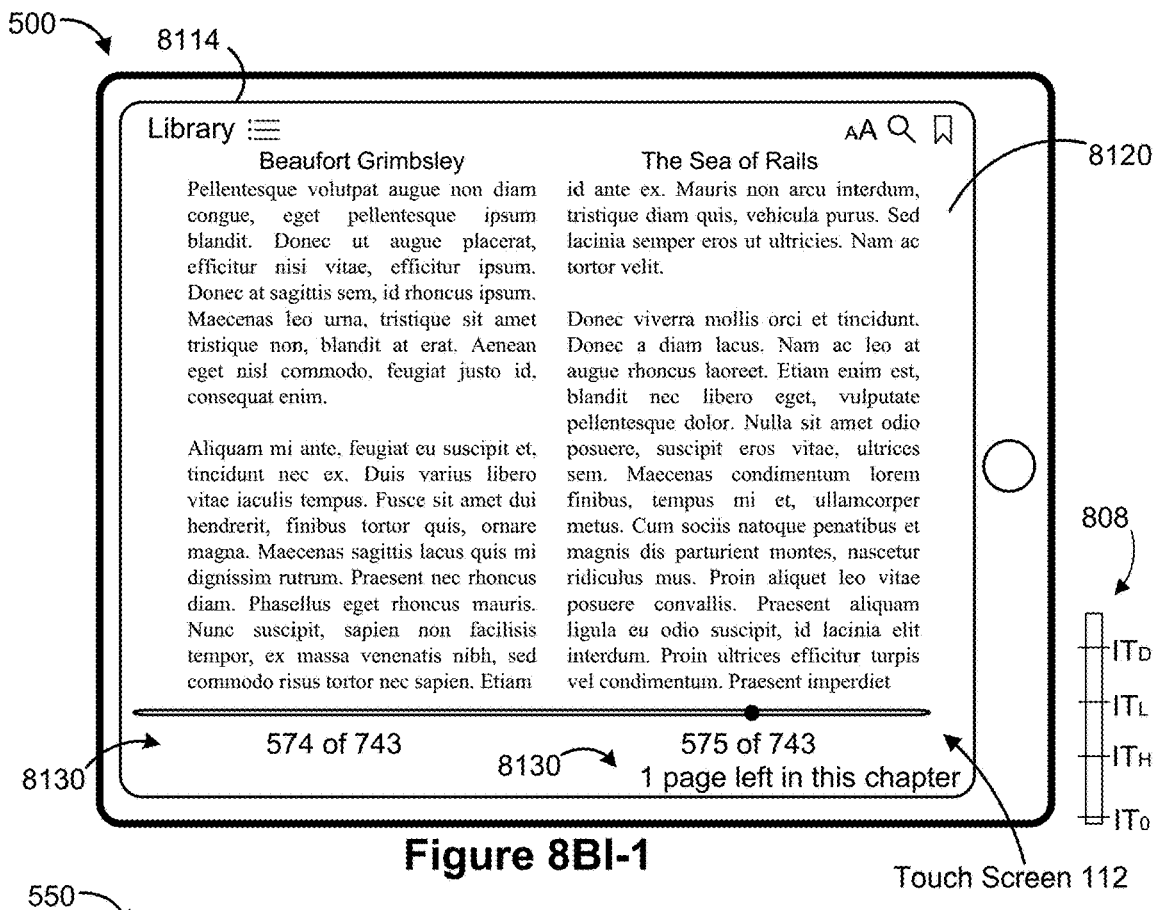
Figure 8B:
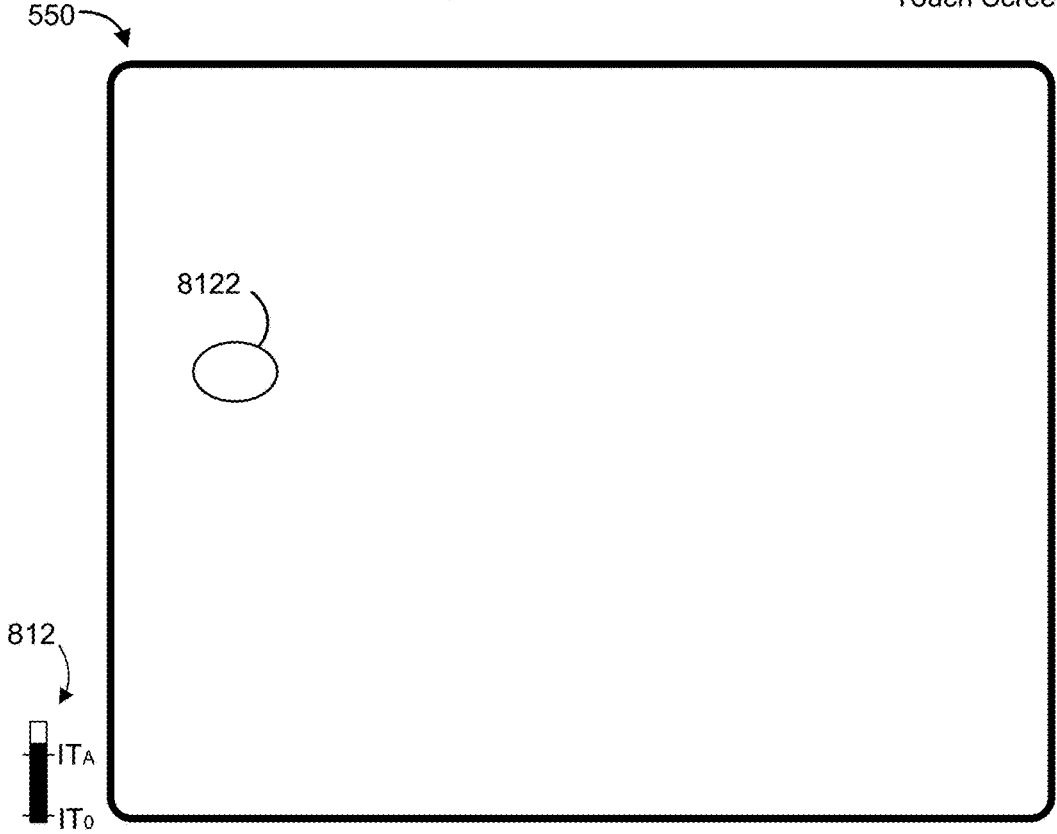
Figure 8B:
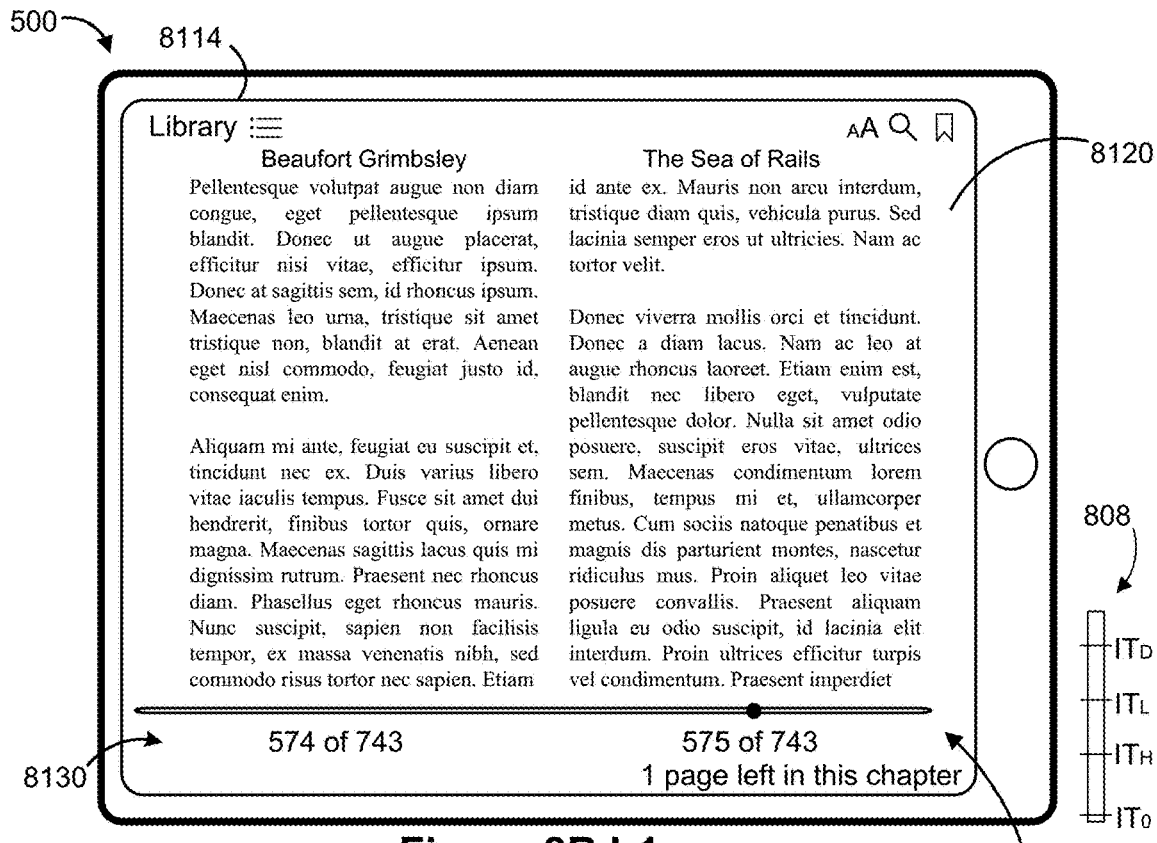
Figure 8B:
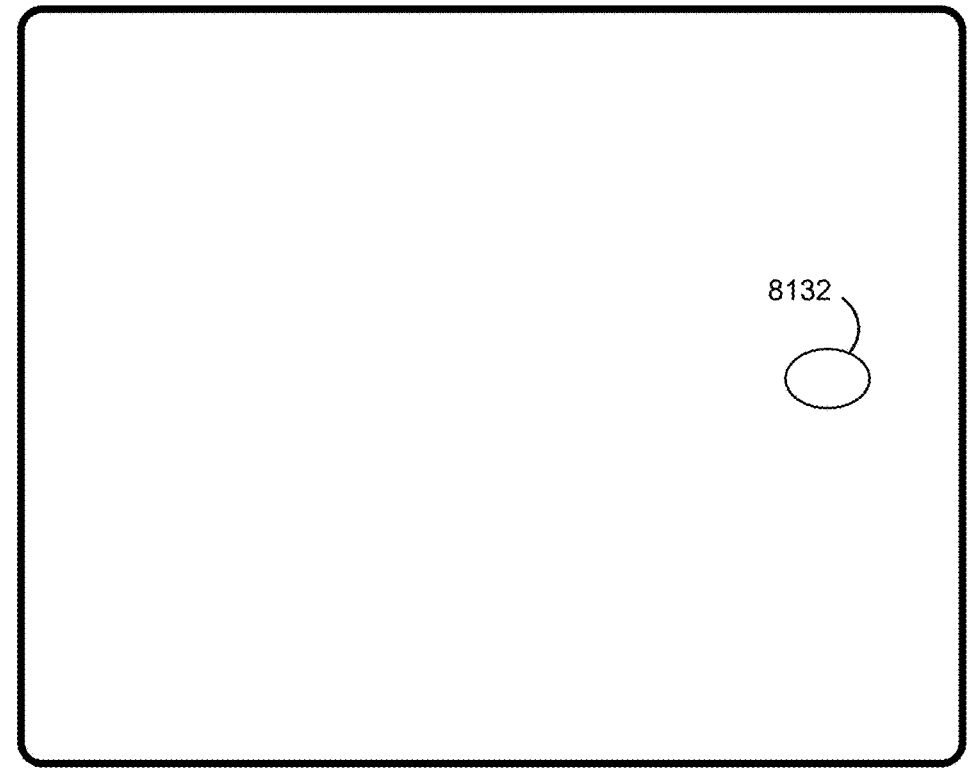
Figure 8B:
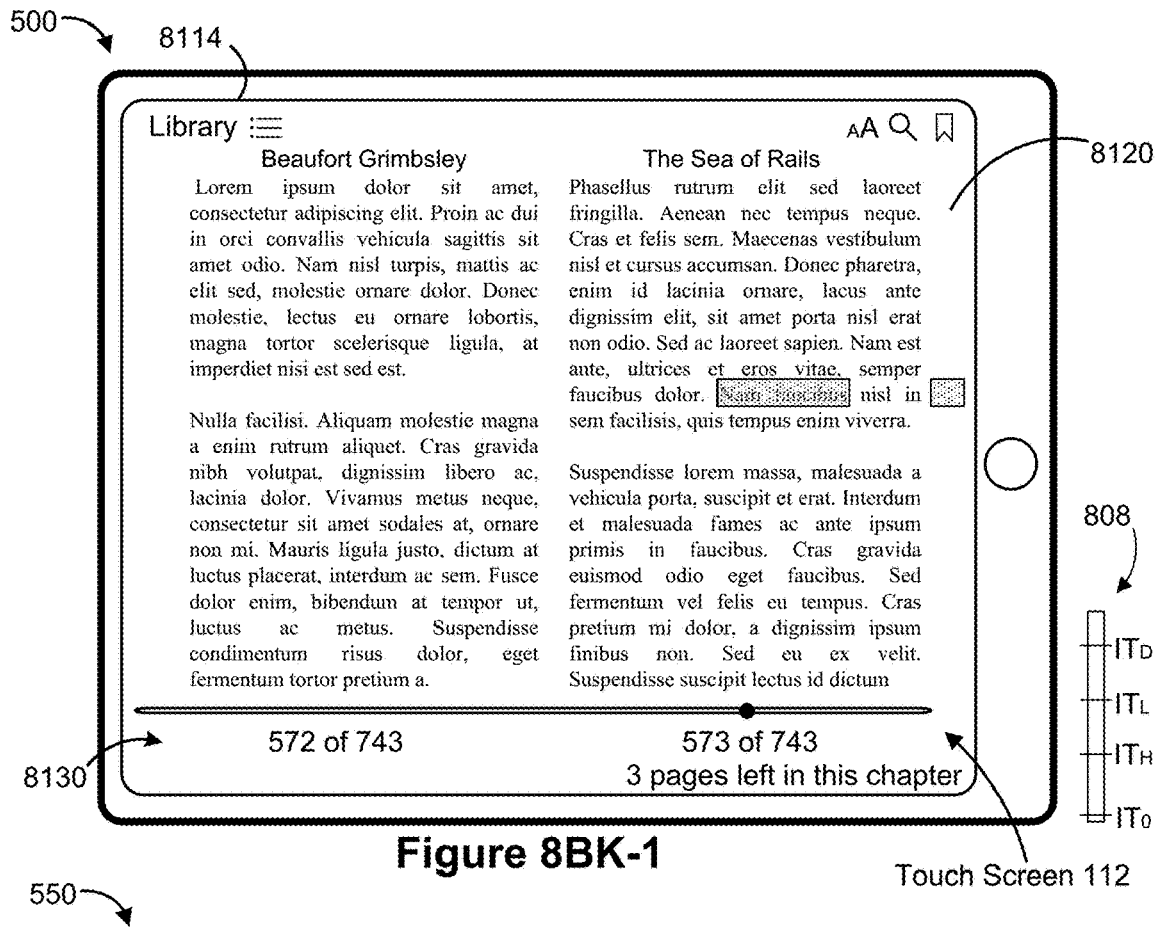
Figure 8B:
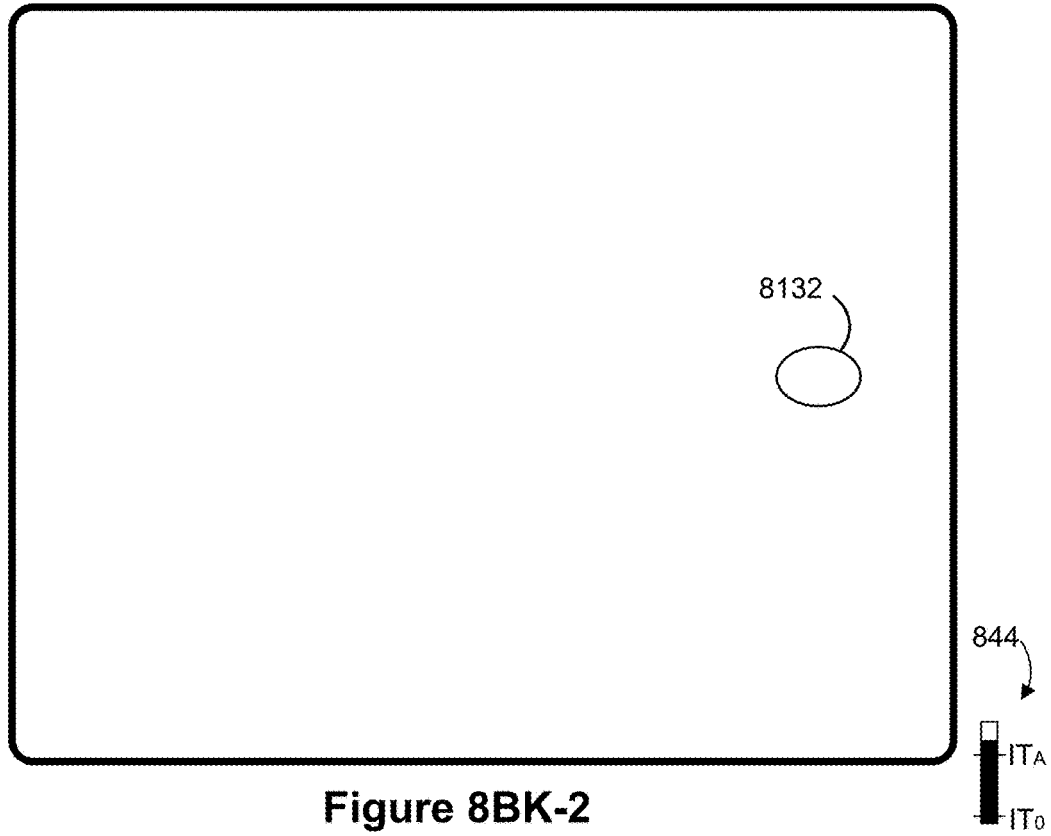
Figure 8B:
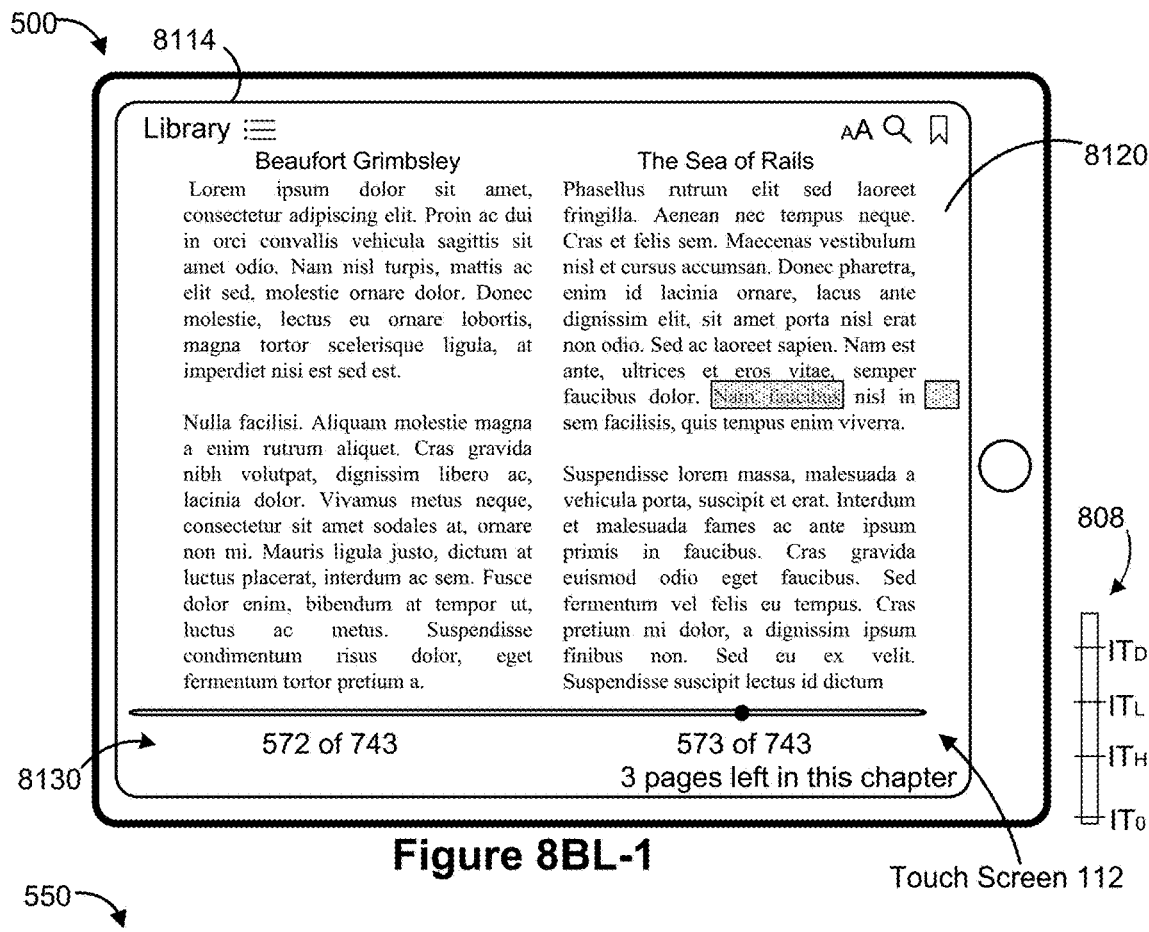
Figure 8B:
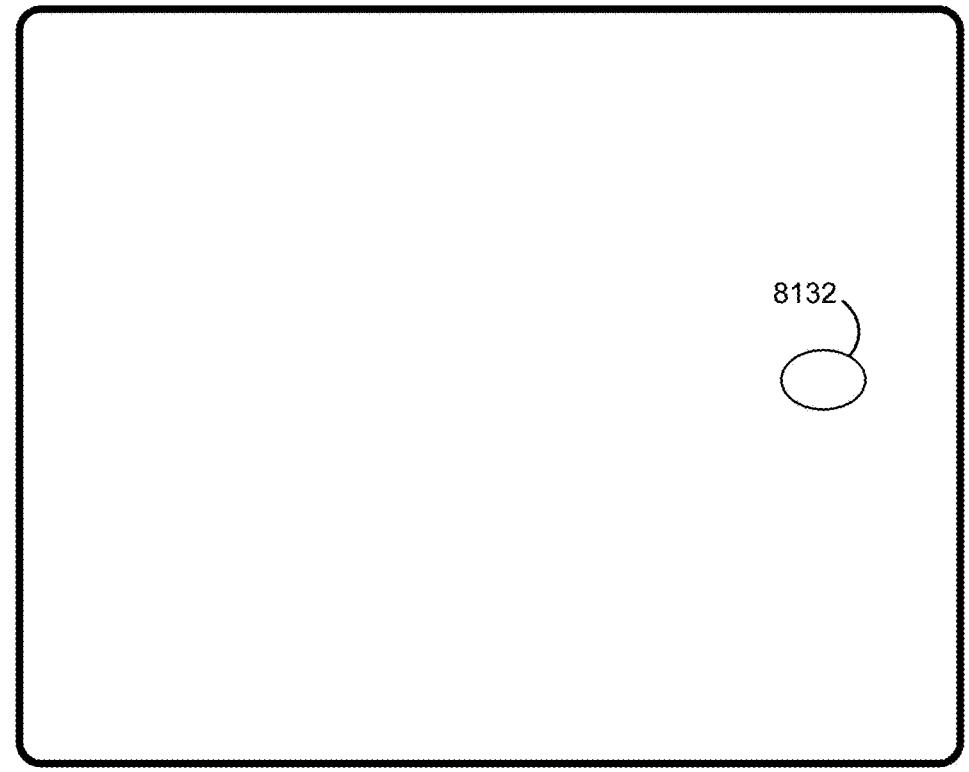
Figure 8B:
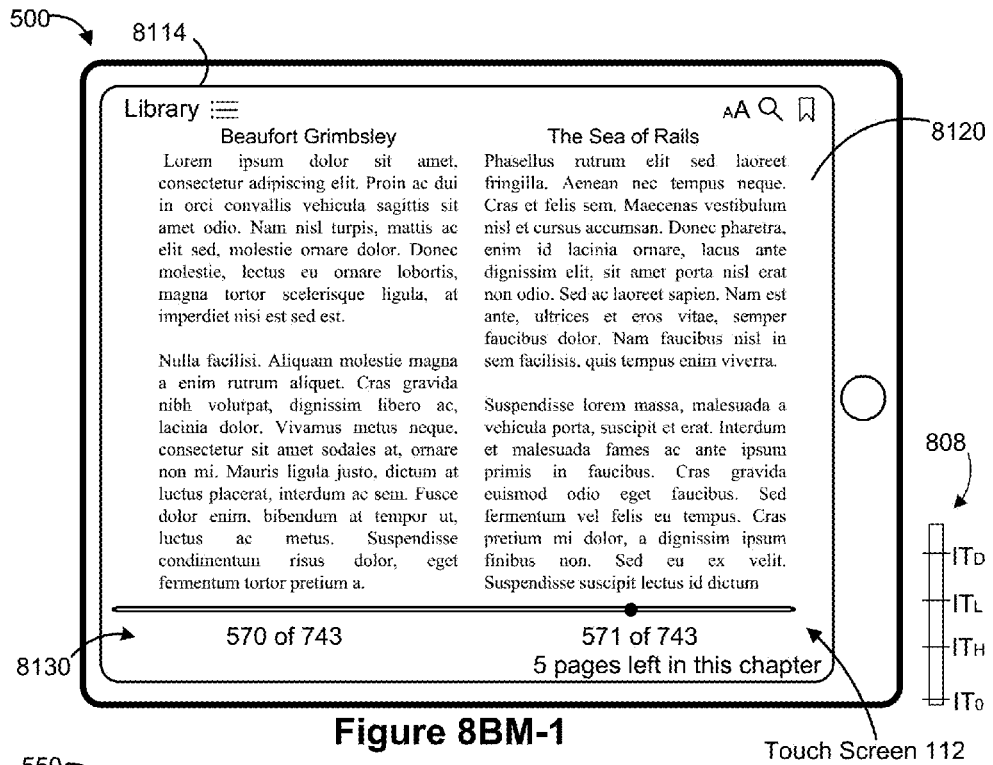
Figure 8B:
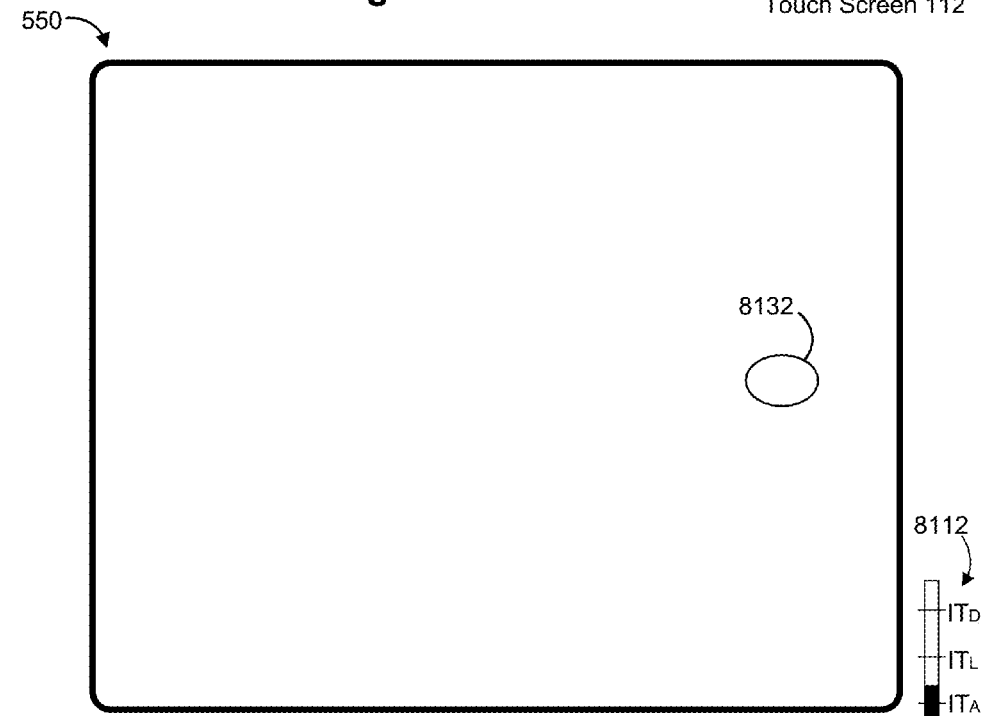
Figure 8B:
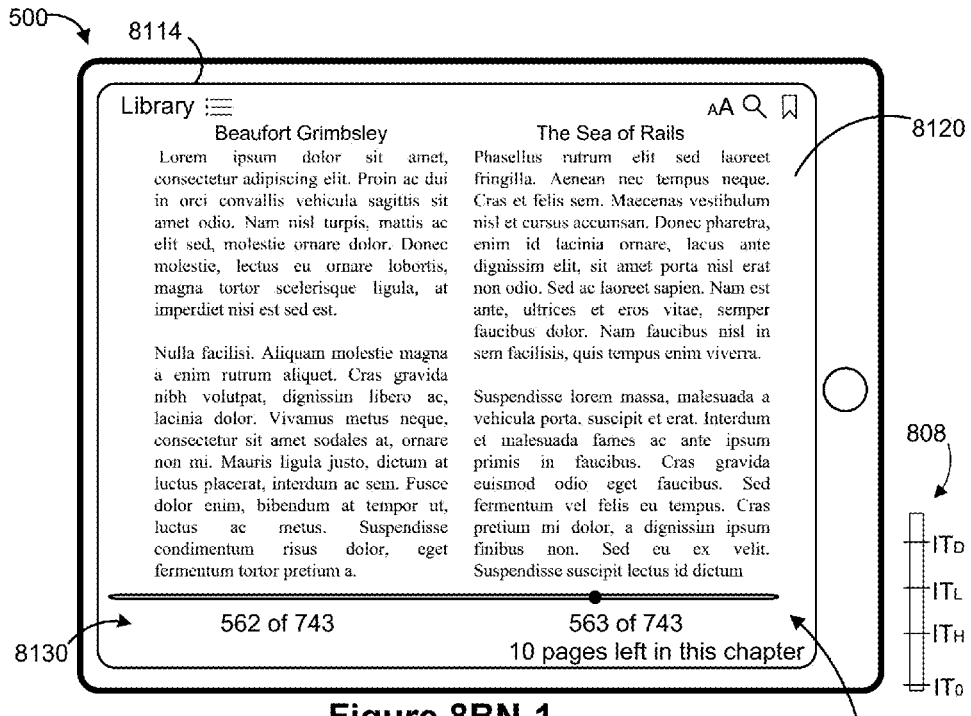
Figure 8B:
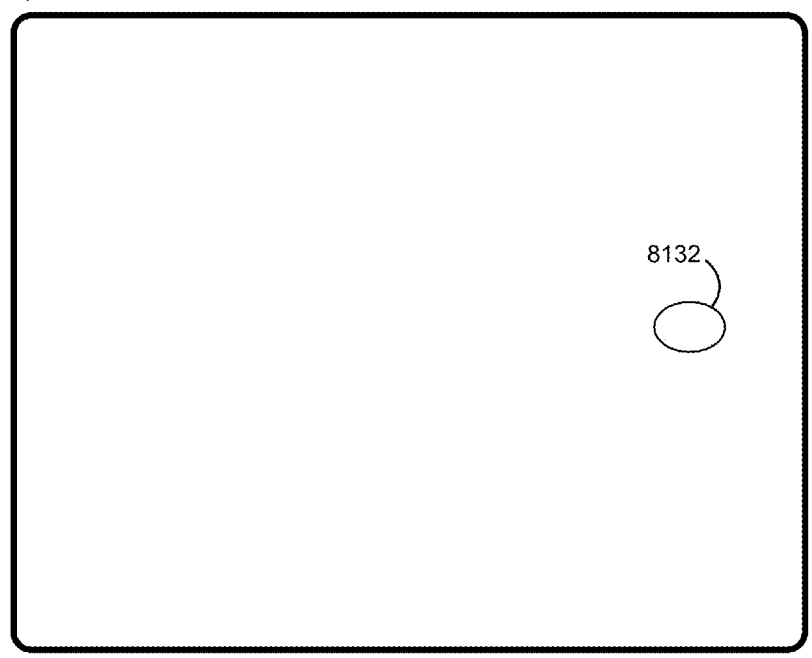
Figure 8B:
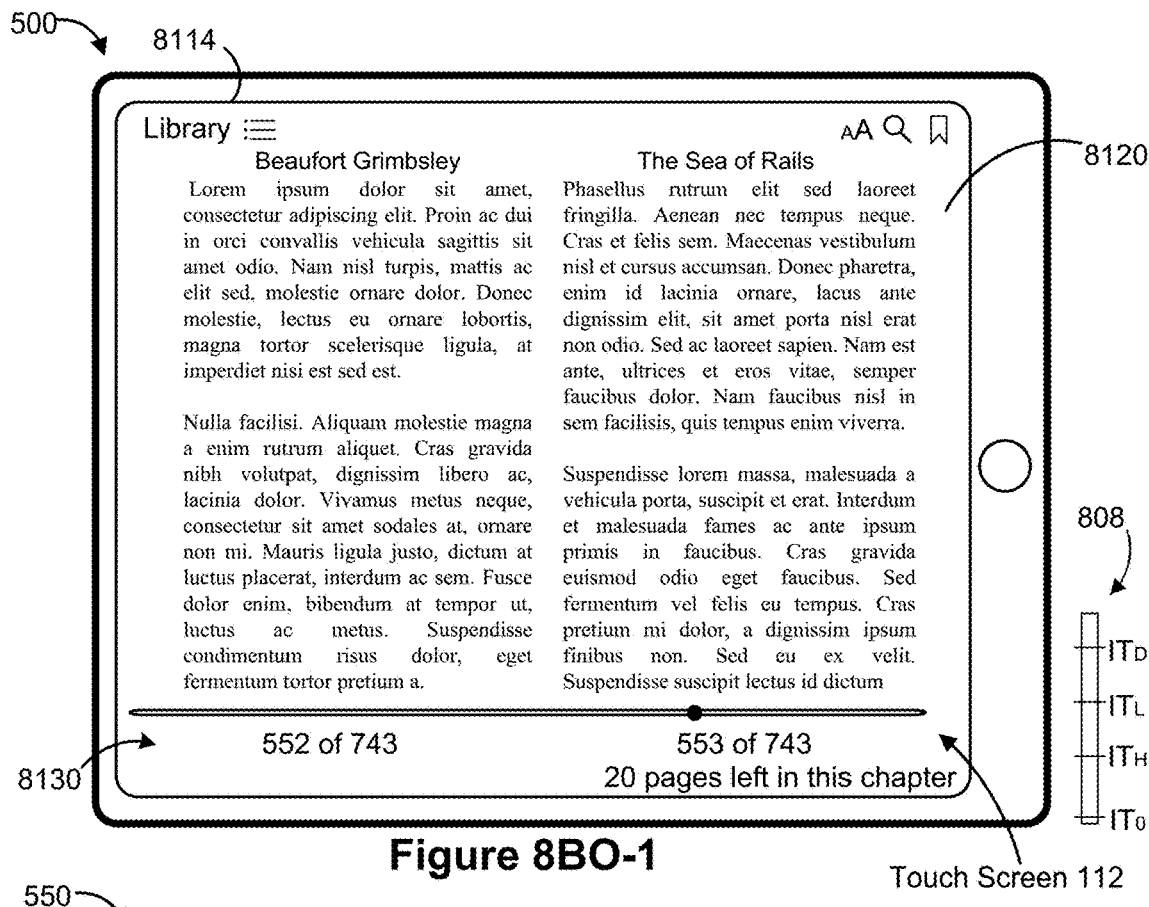
Figure 8B:

In FIGS. 8Z-8AA, in response to input on the back side 550 that increases above an activation threshold on the right half 726 of the device and the left half 724 of the device, display of keyboard 852 is replaced with display of a split keyboard. In FIG. 8Z-2, back side input 870 is detected on the left half 724 of the back side 550 of the device. In FIG. 8AA-2, the characteristic intensity of back side contact 810 of the right half 726 of the back side 550 of the device has increased above activation intensity threshold $IT_A$, as indicated by first back side intensity meter 812, and the characteristic intensity of back side contact 870 on the left half 724 of the back side 550 of the device has increased above activation intensity threshold $IT_A$, as indicated by second back side intensity meter 844. In response to the back side input, the keyboard 852 that is displayed in web application user interface 802 in FIG. 8Z-1 ceases to be displayed, and a left half 852-a of a split keyboard and a right half 852-b of the split keyboard are displayed in web application user interface 802, as shown in FIG. 8AA-1.

In FIG. 8AB, the intensity of both back side contacts has decreased. In FIG. 8AB-2, the characteristic intensity of back side contact 810 on the right half 726 of the back side 550 of the device has decreased below activation intensity threshold $IT_A$, as indicated by first back side intensity meter 812, and the characteristic intensity of back side contact 870 on the left half 724 of the back side 550 of the device has decreased below activation intensity threshold $IT_A$, as indicated by second back side intensity meter 844. In FIG. 8AB-1, display of the left half 852-a of the split keyboard and a right half 852-b of the split keyboard is maintained.

In FIG. 8AC, in response to input on the back side that increases above an activation threshold on the right half of the device and the left half of the device, the left half 852-a of the split keyboard and a right half 852-b of the split keyboard are dismissed. In FIG. 8AC-2, the characteristic intensity of back side contact 810 on the right half 726 of the back side 550 of the device has increased above activation intensity threshold $IT_A$, as indicated by first back side intensity meter 812, and the characteristic intensity of back side contact 870 on the left half 724 of the back side 550 of the device has increased above activation intensity threshold $IT_A$, as indicated by second back side intensity meter 844. In accordance with a determination that the characteristic intensity of back side contact 810 has increased above the activation intensity threshold and the characteristic intensity of back side contact 842 has increased above the activation intensity threshold, the left half 852-a and the right half 852-b cease to be displayed in web application user interface 802, as shown in FIG. 8AC-1.

In FIG. 8AD, the input on the left and right halves of back side 550 of the device has decreased below the activation threshold.

In FIG. 8AE, in response to input by back side contacts 810 and 870 that increases above an activation threshold $IT_A$ on the right half 726 and the left half 724 of the back side 550 of the device, as shown in FIG. 8AE-2, the keyboard 852 is redisplayed in web application user interface 802, as shown in FIG. 8AE-1.

FIGS. 8AF-8AN illustrate responses to front side and back side inputs when a map application user interface 872 is displayed by the device.

In FIG. 8AF-2, back side contact 870 has lifted off from the back side 550 of the device. FIGS. 8AF-8AG illustrate a transition from a two-dimensional map display mode of map application user interface 872, as shown in FIG. 8AF-1, to a three-dimensional map display mode of the map application user interface 872, as shown in FIG. 8AG-1, in response to an increase in the characteristic intensity of the back side contact 810 above an activation threshold $IT_A$, as indicated by first intensity level meter 812 in FIGS. 8AF-2 and 8AG-2.

FIGS. 8AH-8AI illustrate a transition from a three-dimensional map display mode of map application user interface 872, as shown in FIG. 8AH-1, to a two-dimensional map display mode of the map application user interface 872, as shown in FIG. 8AI-1, in response to an increase in the characteristic intensity of the back side contact 810 above an activation threshold $IT_A$, as indicated by first intensity level meter 812 in FIGS. 8AH-2 and 8AI-2.

FIGS. 8AJ-8AK illustrate input to display a map information card 878 in the map application user interface 872, as shown in FIG. 8AK-1. The map information card 878 is displayed in response to an input (e.g., a tap input) by front side contact 874 detected at a location corresponding to a map marker 876 displayed on the map application user interface 872, as shown in FIG. 8AJ-1.

FIGS. 8AL-8AM illustrate input to dismiss map information card 878, as shown in FIG. 8AL-1, in response to an input (e.g., a tap input) by front side contact 880 detected on the map application user interface 872. In FIG. 8AM-1, the map information card 878 has been dismissed and is not displayed in map application user interface 872.

FIGS. 8AN-8AP illustrate changes to map application user interface 872 in response to increasing intensity of front side contact 882 at a location corresponding to map marker 876. In FIG. 8AN-1, front side contact 882 with touch screen 112 is detected at a location that corresponds to map marker 876. In FIG. 8AO-1, in accordance with a determination that a characteristic intensity of front side contact 882 has increased above a hint intensity threshold $IT_H$, as indicated by front side intensity meter 808, map application user interface 872 is visually altered (e.g., map application user interface 872 is blurred). In some embodiments, map application user interface 802 is increasingly altered as the characteristic intensity of the contact 818 continues to increase above hint intensity threshold $IT_H$ to light press intensity threshold $IT_L$. In FIG. 8AP-1, in accordance with a determination that a characteristic intensity of front side contact 882 has increased above a light press intensity threshold $IT_L$, as indicated by front side intensity meter 808, map information platter 884 that includes information that corresponds to map marker 876 is displayed in map application user interface 872.

FIGS. 8AQ-8BA illustrate responses to front side and back side inputs when a media player user interface 886 is displayed by the device.

FIGS. 8AQ-8AR illustrate input to change a state of media content (e.g., video 888) in media player user interface 886 from a play state (as indicated by the pause icon shown on play/pause control 890 in FIG. 8AQ-1) to a pause state (as indicated by play icon shown in play/pause control 890 in FIG. 8AR-1). The state of media content is changed in response to an input (e.g., a tap input) by front side contact 892 detected on a play/pause control 890, as shown in FIG. 8AQ-1.

FIGS. 8AS-8AT illustrate input to hide a set of media controls (e.g., play/pause control 890, volume control 894, rewind control 896, fast forward control 898, and media options control 8100 shown in media overlay 8102) in response to back side input that increases above an activation threshold on the right half 726 and the left half 724 of back side 550 of the device. In FIG. 8AS-2, a back side contact 8104 is detected on the left half 724 of the back side 550 of the device. A characteristic intensity of back side contact 8104 on the left half 724 of the back side 550 of the device is below activation intensity threshold $IT_A$, as indicated by second back side intensity meter 844, and a characteristic intensity of back side contact 810 on the right half 726 of the back side 550 of the device is below activation intensity threshold $IT_A$, as indicated by first back side intensity meter 812.

In FIG. 8T-2, a characteristic intensity of back side contact 8104 on the left half 724 of the back side 550 of the device increases above activation intensity threshold $IT_A$, as indicated by second back side intensity meter 844, and a characteristic intensity of back side contact 810 on the right half 726 of the back side 550 of the device increases above activation intensity threshold $IT_A$, as indicated by first back side intensity meter 812. In accordance with a determination that the characteristic intensity of back side contacts 810 and 8104 have both increased above the activation intensity threshold $IT_A$ (e.g., while a media player user interface 886 is displayed), the media controls 890, 896, 898, 8100, and/or media overlay 8102 are hidden, as shown in FIG. 8AT-1.

FIGS. 8AU-8AV illustrate input to reveal a set of media controls in response to back side input that increases above an activation threshold on the right half 726 and the left half 724 of back side 550 of the device. In response to an increase in the characteristic intensity of bask side contacts 810 and 8104 above activation intensity threshold $IT_A$, the media controls 890, 896, 898, 8100, and/or media overlay 8102 are revealed, as shown in FIG. 8AV-1.

FIGS. 8AW-8BA illustrate back side inputs on the right half and the left half of the back side 550 of the device to move through back and forth through video 888. FIG. 8AW-8AZ illustrate use of increasing intensity of a back side input to move through video 888 at varying rates.

In FIG. 8AW-2, the device detects a contact 8106 with right half 726 of the back side 550 of the device. A characteristic intensity of the contact 8106 is indicated by high resolution intensity level meter 8108 that corresponds to input received on the right half 726 of the back side 550. In FIG. 8AX-2, in response to an increase in the intensity of back side contact 8106 above the activation intensity level threshold $IT_A$, the device begins to fast forward through video 888, as indicated in FIG. 8AX-1. As the intensity of back side contact 8106 continues to increase, as indicated by back side intensity level meter 8108 in FIGS. 8AY-2 and 8AZ-2, the device fast forwards through video 888 at an increasing rate. In some embodiments, the rate of movement through video 888 varies continuously in accordance with a characteristic intensity of back side contact 8106. In some embodiments, the rate of movement through video 888 changes when a characteristic intensity of back side contact 8106 increases above and/or falls below a threshold level, such as light press intensity threshold $IT_L$ and/or deep press intensity threshold ITS shown at back side intensity level meter 8108.

In FIG. 8BA-2, a back side contact 8110 is detected on the left half 724 of back side 550 of the device. In response to an increase in the intensity of back side contact 8110 above the activation intensity level threshold $IT_A$, the device begins to rewind through video 888. In some embodiments, as the intensity of contact 8110 varies, the rate of rewinding through video 888 varies.

FIGS. 8BB-8BO illustrate responses to front side and back side inputs when a document navigation user interface 8114 is displayed by the device.

FIGS. 8BB-8BD illustrate changes to document navigation user interface 8114 in response to increasing intensity of an input by a front side contact 8116 in document navigation user interface 8114. In FIG. 8BB-1, an input by front side contact 8116 is detected at a location that corresponds to highlighted text 8118 of a document 8020 displayed in document navigation user interface 8114. When the intensity of front side contact 8116 increases above hint intensity threshold $IT_H$, as shown in by front side intensity level meter 808 in FIG. 8BC-1, document navigation user interface 8114 is visually altered (e.g., document navigation user interface 8114 (except for highlighted text 8118) is blurred). In some embodiments, document navigation user interface 8114 is increasingly altered as the characteristic intensity of the contact 8116 continues to increase above hint intensity threshold $IT_H$ to light press intensity threshold $IT_L$. When the intensity of front side contact 8116 increases above light press intensity threshold $IT_L$, as shown in by intensity level meter 808 in FIG. 8BD-1, an information panel 8124 including information that corresponds to highlighted text 8118 is displayed in document navigation user interface 8114.

In FIG. 8AE, in response to lift-off of front side contact 8116 from touch screen 112, information panel 8124 ceases to be displayed in document navigation user interface 8114.

In FIGS. 8AF-8AG, in response to an input (e.g., a tap input) by front side contact 8126 at a location that corresponds to highlighted text 8118, as shown in FIG. 8AF-1, a menu 8128 with options that correspond to the highlighted text 8118 is displayed in document navigation user interface 8114, as indicated in FIG. 8BG-1.

FIGS. 8BH-8BK illustrate use of back side input on the right and left halves of the back side 550 of the device to navigate backward and forward, respectively, through the document 8120 displayed in the document navigation user interface 8114.

In FIG. 8BH, front side contact 8126 has lifted off from touch screen 112.

In FIG. 8BI, the characteristic intensity of back side contact 8122 on the right half 726 of the back side 550 of the device has increased above activation intensity threshold $IT_A$, as indicated by first back side intensity meter 812. In accordance with a determination that the characteristic intensity of back side contact 8122 has increased above the activation intensity threshold $IT_A$ (e.g., while a document navigation user interface 8114 is displayed) on the right half 726 of the back side 550 of the device, a next portion (e.g., next page or set of pages) of document 8120 is displayed in document navigation user interface 8114, as indicated in 8BI-1. For example, in FIG. 8BH-1, page number indicator section 8130 of document 8120 indicates that pages 572 and 573 are displayed and that three pages remain in the current chapter of document 8120. In FIG. 8BI-1, page number indicator section 8130 of document 8120 indicates that pages 574 and 575 are displayed and that one page remains in the current chapter of document 8120.

In FIG. 8BJ-2, a back side contact 8132 is detected on the left half 724 of the back side 550 of the device. In FIG. 8BK-2, the characteristic intensity of back side contact 8132 has increased above activation intensity threshold $IT_A$, as indicated by second back side intensity meter 844. In accordance with a determination that the characteristic intensity of back side contact 8132 has increased above the activation intensity threshold $IT_A$ on the left half 724 of the back side 550 of the device, a previous portion (e.g., previous page or set of pages) of document 8120 is displayed in document navigation user interface 8114, as indicated in 8BK-1. For example, in FIG. 8BK-1, page number indicator section 8130 of document 8120 indicates that pages 572 and 573 are displayed and that three pages remain in the current chapter of document 8120.

FIGS. 8BL-8BO illustrate use of increasing intensity of a back side input to move through document 8120 at varying rates.

In some embodiments, the device detects a characteristic intensity of an input on the back side 550 of the device as the intensity increases above an activation threshold intensity $IT_A$, as indicated by high resolution intensity level meter 8112 that corresponds to input received on the left half 724 of the back side 550. In FIG. 8BL-2, a back side contact 8132 is detected on the left half 724 of back side 550 of the device. In response to an increase in the intensity of back side contact 8132 above the activation intensity level threshold $IT_A$, as indicated in FIG. 8BM-2, the device displays a previous portion (e.g., previous page or set of pages) of document 8120 in document navigation user interface 8114, as indicated in 8BM-1. For example, in FIG. 8BL-1, page number indicator section 8130 of document 8120 indicates that pages 572 and 573 are displayed and that three pages remain in the current chapter of document 8120, and in FIG. BM-1, page number indicator section 8130 indicates that pages 570 and 571 are displayed and that five pages remain in the current chapter of document 8120. As the intensity of back side contact 8132 continues to increase, as indicated by back side intensity level meter 8112 in FIGS. 8BN-2 and 8BO-2, the device navigates through document 8120 at an increasing rate. In some embodiments, the rate of navigation through document 8120 varies continuously in accordance with a characteristic intensity of back side contact 8132. In some embodiments, the rate of movement through document 8120 changes when a characteristic intensity of back side contact 8132 increases above and/or falls below a threshold level, such as light press intensity threshold $IT_L$ and/or deep press intensity threshold ITS shown at back side intensity level meter 8112. For example, in accordance with a determination that the intensity of back side contact 8132 has increased above a light press intensity threshold $IT_L$, as indicated in FIG. 8BN-2, page number indicator section 8130 indicates that pages 562 and 563 are displayed and that 10 pages remain in the current chapter of document 8120, as indicated in FIG. BN-1. In accordance with a determination that the intensity of back side contact 8132 has increased above a deep press intensity threshold ITS, as indicated in FIG. 8BO-2, page number indicator section 8130 indicates that pages 552 and 553 are displayed and that 20 pages remain in the current chapter of document 8120, as indicated in FIG. BO-1. Similarly, in some embodiments, navigation forward through the document 8120 is varied in accordance with the intensity of a back side contact 8122 on the right half 736 of the back side 550 of the device. In some embodiments, the rate of the navigation decreases as the intensity of a respective contact decreases (e.g., the rate decreases continuously in response to the intensity of the contact and/or the rate decreases when the intensity of the respective contact falls below defined intensity threshold levels).

FIGS. 9A-9G are flow diagrams illustrating a method 900 of performing an operation in response to input detected on the back side of the device, in accordance with some embodiments. The method 900 is performed at an electronic device (e.g., device 300, FIG. 3, or portable multifunction device 100, FIG. 1A) with a front side that includes a touch-sensitive display, a back side that does not include a display, and one or more sensors to detect intensities of inputs on the front side of the electronic device and the back side of the electronic device. Some operations in method 900 are, optionally, combined and/or the order of some operations is, optionally, changed.

As described below, the method 900 provides an intuitive way to perform an operation in response to input detected on the back side of the device. Performing an operation in response to input detected on the back side of the device enhances the operability of the device by providing an additional side of the device at which input is detectable. Detecting input at the back of the device enhances the operability of the device by providing alternative and additional control options without increasing the number of additional displayed controls, which reduces power usage and improves battery life of the device by enabling the user to use the device more quickly and efficiently. Additionally, detecting input at the back side of the device enhances the operability of the device by providing controls that do not require input on the front side of the device. For example, performing an operation in response to input detected at the back side of the device allows the user to provide input without changing a support position for the device, for example, from supporting the device with both hands to another support position (e.g., holding a device with one hand to be able to provide input on the front of the device using the other hand, or to resting the device on a support surface to provide the input using the other hand). A device that responds to input received on the back side of the device for performing operations (e.g., operations that correspond to frequently-used controls) allows for larger device displays (e.g., displays that are too large for a typical user to support with one hand for an extended period of time), because the user can interact with the device while supporting the device with both hands. Further, because the user can interact with the device without needing to take the time required to change a support position for the device, the user is enabled to use the device more quickly and efficiently, which reduces power usage and improves battery life.

The device (902) displays, on the touch-sensitive display 112, a user interface (e.g., web application user interface 802 described with regard to FIGS. 8A-8J and 8Q-8AE, multitasking interface 830 described with regard to FIGS. 8K-8P, map application user interface 872 described with regard to FIGS. 8AF-8AP, media player user interface 886 described with regard to FIGS. 8AQ-8BA, or document navigation user interface 8114 described with regard to FIGS. 8BB-8BO), that includes a plurality of objects (e.g., link 804, back button 816, representations 824, 826, 828 of open web pages, close control 847, text input field 850, keyboard 852, content insertion indicator 864, and left half 852-*a* of a split keyboard and a right half 852-*b* of the split keyboard in web application user interface 802; representations 832, 834, 836, and 838 of active applications in multitasking interface 830; map marker 876, map information card 878, and map information platter 884 in map application user interface 872; play/pause control 890, volume control 894, rewind control 896, fast forward control 898, media options control 8100, media overlay 8102, and video 888 in media player user interface 886; and document 8120, highlighted text 8118, information panel 8124; and page number indicator section 8130 in document navigation user interface 8114).

While displaying the user interface, the device detects (904) an input on a side of the electronic device.

In response to detecting the input on the side of the electronic device (906), in accordance with a determination that the input is detected on the front side of the electronic device and meets first response criteria, the device performs (908) a first operation (e.g., displaying a link preview, a peek/pop preview, or a quick action menu that corresponds to the first object) that corresponds to a first object, in the plurality of objects, at a location of the input, wherein the first response criteria require that a characteristic intensity of the input meet a first intensity threshold in order for the criteria to be met (e.g., a light press threshold, which is greater than a contact detection threshold). For example, an input detected on the front side of the electronic device is a front side contact, such as front side contact 806 shown in FIG. 8A-1. In some embodiments, the first response criteria are met when a characteristic intensity of a front side contact increases above a light press intensity threshold $IT_L$ or a deep press intensity threshold level ITS, e.g., as indicated by intensity level meter 808 (e.g., as described with regard to FIGS. 8D-8G).

In response to detecting the input on the side of the electronic device (906), in accordance with a determination that the input (e.g., a tap input) is detected on the front side of the electronic device and meets second response criteria, the device performs (910) a second operation, different from the first operation, that corresponds to the first object at the location of the input, wherein the second response criteria do not require that the characteristic intensity of the input meet the first intensity threshold for the criteria to be met. For example, the second response criteria are met when a characteristic intensity of a front side contact is above a contact detection intensity threshold $IT_0$, e.g., as indicated by intensity level meter 808 (e.g., as described with regard to FIGS. 8A-8B).

In response to detecting the input on the side of the electronic device (906), in accordance with a determination that the input is detected on the back side of the electronic device and meets third response criteria, the device performs (912) a third operation. For example, an input detected on the back side of the electronic device is a back side contact, such as back side contact 810 shown in FIG. 8A-2. In some embodiments, the third response criteria are met when a characteristic intensity of the back side contact increases above activation intensity threshold level $IT_A$, e.g., as indicated by intensity level meter 812 (e.g., as described with regard to FIGS. 8H-8I). The third operation is different from the first operation and the second operation. For example, the first operation is displaying a second web page in web application user interface 802 in response to a tap input on a link 104 displayed in a first web page, as described with regard to FIGS. 8A-8B; the second operation is displaying a preview of a second web page in web application user interface 802 in response to an input on a link 104 with an characteristic intensity that increases above a light press intensity threshold level $IT_L$, as described with regard to FIGS. 8D-8F; and the third operation is a transition from displaying a single open web page in web application user interface 802 to displaying representations of multiple open web pages (824, 826, 828) in web application user interface 802, as described with regard to FIGS. 8H-8I. The third operation changes the displayed user interface (e.g., from displaying a single open web page to displaying representations of multiple open web pages). The change in the displayed user interface does not correspond to interaction with just a single object in the plurality of objects. For example, in some embodiments, the back side input 810 is received anywhere on back side 550 of the device (or anywhere on the left half 724 of the back side 550 of the device). The third response criteria include a criterion that is met when a characteristic intensity of the input is above a third intensity threshold; (e.g., an activation threshold (such as a light press threshold), which is greater than a contact detection threshold). In some embodiments, the third intensity threshold is the same as the first intensity threshold. In some embodiments, the third intensity threshold is the same as the second intensity threshold.

In response to detecting the input on the side of the electronic device (906), in accordance with a determination that the input is on the back side 550 of the device and does not meet the third response criteria, the device maintains (914) display of the user interface that includes the plurality of objects (e.g., the device forgoes performance of the third operation when the characteristic intensity of the input is below the third intensity threshold).

In some embodiments, performing the third operation includes (916) changing the user interface dynamically as the intensity of the input increases. For example, as described with regard to FIGS. 8BL-8BO, a rate of navigation through pages of a document 8120 displayed in document navigation user interface 8114 increases as the intensity of back side input 8132 increases. In another example, in response to a gradually increasing intensity of back side input 810 and/or back side input 8104, the device gradually displays and/or gradually ceases to display media overlay 8102 in media player user interface 886 (see FIG. 8AS).

Changing the user interface dynamically as the intensity of the input increases provides visual feedback to the user indicating that the input on the back of the device is causing the device to perform an operation associated with the user interface element. Providing improved visual feedback to the user enhances the operability of the device and makes the user-device interface more efficient (e.g., by enhancing the user's awareness of the operations available to be performed in response to inputs on the back side of the device, helping the user to provide proper inputs on the back side of the device, and reducing user mistakes when providing inputs on the back side of the device), which, additionally, reduces power usage and improves battery life of the device by enabling the user to use the device more quickly and efficiently In some embodiments, performing the second operation includes (918) activating a media control (e.g., a play/pause icon or a volume slider); and performing the third operation includes hiding a set of one or more media controls (e.g., a set of media controls including the media control activated by the first operation). For example, activation of a play/pause control 890 in response to input by front side contact 892 is described with regard to FIGS. 8AQ-8AR. Hiding a set of media controls 890, 896, 898, 8100 and media overlay 8102 in response to input by back side contacts 810 and 8104 is described with regard to FIGS. 8AS-8AT. In some embodiments, performing the first operation includes increasing a volume level or navigation through media content.

Hiding a set of one or more media controls in response to detecting input on the back of the device enhances the operability of the device by providing controls for activating a media control and hiding a set of one or more media controls without requiring controls for these functions to be separately displayed on the user interface. Providing a control that hides a set of one or more media controls in response to input detected on the back side of the device makes the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, hiding a set of one or more media controls in response to detecting input on the back of the device enhances the operability of the device by reducing the time required to hide a set of one or more media controls, e.g., by allowing the user to hide the set of one or more media controls without changing a support position of the device (e.g., from holding the device with both hands to another support position that allows input to be provided on the front side of the device).

In some embodiments, in response to detecting a second input while the set of one or more media controls are hidden (920): in accordance with a determination that the second input is on the back side of the device and the second input meets the third response criteria, redisplaying the set of one or more media controls. For example, redisplaying a set of media controls 890, 896, 898, 8100 and media overlay 8102 in response to input by back side contacts 810 and 8104 is described with regard to FIGS. 8AU-8AV. In some embodiments, detecting a second input includes detecting that a prior input has ended (e.g., a liftoff of a contact with the device has been detected and/or the characteristic intensity of the input has fallen below an end intensity threshold (e.g., a contact detection threshold $IT_0$, as indicated by back side intensity level meter 812 and/or back side intensity level meter 844, or a different intensity threshold)).

Redisplaying a set of one or more media controls in accordance with a determination that an input is on the back side of the device enhances the operability of the device by reducing the number of inputs required to redisplay the set of one or more media controls. Reducing the number of inputs required to redisplay the set of one or more media controls enhances the operability of the device by making the user-device interface more efficient, which, additionally, reduces power usage and improves battery life of the device by enabling the user to use the device more quickly and efficiently. Also, redisplaying the set of one or more media controls in response to detecting input on the back of the device that meets third response criteria enhances the operability of the device by reducing the time required to redisplay the set of one or more media controls, e.g., by allowing the user to perform the operation without changing a support position of the device (e.g., from holding the device with both hands to another support position that allows input to be provided on the front side of the device.

In some embodiments, performing the first operation includes (922) performing a first map application operation (e.g., displaying information about a point of interest in a map, selecting a route, scrolling the map, zooming the map, and/or switching from a first map perspective (e.g., map view) to a second map perspective (e.g., street view)); performing the second operation includes performing a second map application operation that is different from the first map application operation (e.g., displaying a menu for the map); and performing the third operation includes performing a third map application operation (e.g., tilting the map) that is different from the first map application operation and the second map operation. For example, displaying information (e.g., in map information card 878) about a point of interest (e.g., as indicated by map marker 876) in a map in response to input (e.g., a tap input) by front side contact 874 is described with regard to FIGS. 8AJ-8AK. Displaying a menu for the map (e.g., in information platter 884) in response to input by contact 882 with increasing intensity is described with regard to FIGS. 8AN-8AP. Tilting a map displayed in map application user interface 872 (e.g., switching from a two-dimensional view of the map to a three dimensional view of the map or vice versa) in response to input by a back side contact 810 is described with regard to Figures AF-AI.

Performing a map application operation in accordance with a determination that input is detected on the back side of the device enhances the operability of the device by providing an additional control for accessing a third map application operation without requiring the additional control to be displayed on the user interface. Providing the additional control for performing the third map application operation makes the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, performing a third map application operation in response to detecting input on the back of the device enhances the operability of the device by reducing the time required to perform a third map application operation, e.g., by allowing the user to perform the third map application operation without changing a support position of the device (e.g., from holding the device with both hands to another support position that allows input to be provided on the front side of the device).

In some embodiments (924), the first object corresponds to a point of interest (e.g., map marker 876) in a map; the first map application operation includes displaying a menu for the map (e.g., in information platter 884); the second map application operation includes displaying information about the point of interest (e.g., in map information card 878) and the third map application operation includes tilting the map (e.g., switching from a two-dimensional view of the map to a three dimensional view of the map or vice versa as described with regard to Figures AF-AI).

Tilting a map in accordance with a determination that input is detected on the back side of the device enhances the operability of the device by tilting the map without requiring a control for this operation to be separately displayed on the user interface. Providing a control that tilts the map in response to input on the back side of the device makes the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, tilting the map in response to detecting input on the back of the device enhances the operability of the device by reducing the time required to tilt the map, e.g., by allowing the user to tilt the map without changing a support position of the device (e.g., from holding the device with both hands to another support position that allows input to be provided on the front side of the device).

In some embodiments (926), performing the first operation includes performing a first keyboard operation (e.g., selecting a key in a virtual keyboard or displaying alternate characters); and performing the third operation includes performing a second keyboard operation (e.g., splitting the virtual keyboard or hiding the virtual keyboard). Selecting a key in a keyboard in response to an input (e.g., a tap input) by front side contact 856 is described with regard to FIGS. 8V-8W. Splitting the virtual keyboard in response to input by back side contacts 810 and 870 is described with regard to FIGS. 8Z-8AA. Hiding the virtual keyboard in response to input by back side contacts 810 and 870 is described with regard to FIGS. 8AB-8AC.

Performing a second keyboard operation in accordance with a determination that input is detected on the back side of the device enhances the operability of the device by providing a second keyboard operation without requiring a control for this operation to be separately displayed on the user interface. Providing a control that performs a second keyboard operation in response to back side input makes the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, performing a second keyboard operation in response to detecting input on the back of the device enhances the operability of the device by reducing the time required to perform a second keyboard application operation, e.g., by allowing the user to perform the operation without changing a support position of the device (e.g., from holding the device with both hands to another support position that allows input to be provided on the front side of the device).

In some embodiments (928), the first object corresponds to a key (e.g., key 856) in an unsplit keyboard 825; the first keyboard operation includes selecting the key in the unsplit keyboard (e.g., as described with regard to FIGS. 8V-8W); and the second keyboard operation includes displaying a split keyboard (e.g., displaying a left half 852-*a* of a split keyboard and a right half 852-*b* of the split keyboard as described with regard to FIGS. 8A-8AA). For example, the second keyboard operation changes a single unsplit keyboard 852 into two halves 852-*a* and 852-*b* of a split keyboard. In some embodiments, the locations of the two halves of the split keyboard are determined based on detected locations of contacts (e.g., thumbs 606 and 608, as shown in FIG. 6A) on the touch-sensitive display 112.

Displaying a split keyboard in accordance with a determination that input is detected on the back side of the device enhances the operability of the device by displaying a split keyboard without requiring a control for this operation to be separately displayed on the user interface. Providing a control that displays a split keyboard in response to back side input makes the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, displaying a split keyboard in response to detecting input on the back of the device enhances the operability of the device by reducing the time required to display a split keyboard, e.g., by allowing the user to perform the operation without changing a support position of the device (e.g., from holding the device with both hands to another support position that allows input to be provided on the front side of the device).

In some embodiments (930), the first object corresponds to a key (e.g., key 856) in a displayed keyboard 852; the first keyboard operation includes selecting the key in the displayed keyboard (e.g., as described with regard to FIGS. 8V-8W); and the second keyboard operation includes ceasing to display the keyboard 852. For example, the second keyboard operation hides the keyboard 852.

Ceasing to display a keyboard in accordance with a determination that input is detected on the back side of the device enhances the operability of the device by ceasing to display a keyboard without requiring a control for this operation to be separately displayed on the user interface. Providing a control that ceases to display a keyboard in response to input detected on the back side of the device makes the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, ceasing to display a split keyboard in response to detecting input on the back of the device enhances the operability of the device by reducing the time required to cease to display a keyboard, e.g., by allowing the user to perform the operation without changing a support position of the device (e.g., from holding the device with both hands to another support position that allows input to be provided on the front side of the device).

In some embodiments, performing the second operation includes (932) changing an appearance of the keyboard 852 to indicate that the electronic device is operating in a text selection mode of operation, wherein changing the appearance of the keyboard includes obscuring an appearance of characters on keys of the keyboard (e.g., as indicated in FIG. 8Y-1).

Changing an appearance of the keyboard to indicate that the electronic device is operating in a text selection mode of operation, wherein changing the appearance of the keyboard includes obscuring an appearance of characters on keys of the keyboard, in accordance with a determination that input is detected on the back side of the device enhances the operability of the device by changing the appearance of the keyboard without requiring a control for this operation to be separately displayed on the user interface. Providing a control that changes the appearance of a keyboard in response to input detected on the back side of the device makes the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, changing the appearance of the keyboard in response to detecting input on the back of the device enhances the operability of the device by reducing the time required to change the appearance of a keyboard, e.g., by allowing the user to perform the operation without changing a support position of the device (e.g., from holding the device with both hands to another support position that allows input to be provided on the front side of the device).

In some embodiments (934), the first object corresponds to first content in a view of an application (e.g., a first web page as displayed in web application user interface 802 in FIG. 8D-1); the first operation includes displaying a preview of second content (e.g., displaying a preview of a second webpage in preview panel 820, as shown in FIG. 8F-1); the second operation includes navigating from the first content to the second content in the view of the application (e.g., navigating from a first web page, as shown in FIG. 8A-1, to a second web page, as shown in FIG. 8B-1, in response to input by contact 806 at a location corresponding to link 804); and the third operation includes displaying multiple views (e.g., entering a mode that displays views of representations 824, 826, and 828 of open web pages in web application user interface 802, as described with regard to FIGS. 8H-8I, or entering a mode that displays views of representations 832, 834, and 836 of active applications in multitasking interface 830, as described with regard to FIGS. 8J-8K), and navigates between multiple views, (e.g., scrolling and/or shifting the views as described with regard to FIGS. 8L-8O).

Displaying multiple views (e.g., multiple views that include views of multiple applications and/or multiple views that include views of representations of webpages in a single application) in accordance with a determination that input is detected on the back side of the device enhances the operability of the device by displaying the multiple views without requiring a control for this operation to be separately displayed on the user interface. Providing a control that displays the multiple views in response to input detected on the back side of the device makes the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, displaying the multiple views in response to detecting input on the back of the device enhances the operability of the device by reducing the time required to display multiple views, e.g., by allowing the user to perform the operation without changing a support position of the device (e.g., from holding the device with both hands to another support position that allows input to be provided on the front side of the device).

In some embodiments (936), the multiple views include views of multiple applications (views of representation 832 corresponding to media player application 432, 834 corresponding to web browser application 420, and 836 corresponding to map application 436, as described with regard to FIGS. 8J-8K).

In some embodiments (938), the multiple views include views of representations of webpages in a single application (e.g., views of representations 824, 826, and 828 of open web pages in web application user interface 802, as described with regard to FIGS. 8H-8I).

In some embodiments, in response to detecting a second input while displaying the multiple views: in accordance with a determination that the second input is on the back side 550 of the electronic device and the second input meets fourth response criteria, the device navigates (940) through the multiple views (e.g., changing from primarily displaying a first view of the multiple views to primarily displaying a second view of the multiple views (e.g., a previous or subsequent view), displaying at least one additional view (e.g., a previous or subsequent view), and/or ceasing to display at least one view of the multiple views). For example, views of representation 832 of media player application 432, 834 of web browser application 420, and 836 of map application 436, as displayed in multitasking user interface 830 in FIG. 8L-1, are shifted rightward in response to back side input by contact 810 on the right half 736 of the back side 550 of the device, revealing representation 838 of books application 840 in FIG. 8M-1. Views of representation 838 of books application 840, representation 832 of media player application 432, and representation 834 of web browser application 420, as displayed in multitasking user interface 830 in FIG. 8N-1, are shifted leftward in response to back side input by contact 842 on the left half 734 of the back side 550 of the device, as shown in FIG. 8O-1. In some embodiments, the fourth response criteria include a criterion that is met when a characteristic intensity of the second input is above a fourth intensity threshold (e.g., an activation threshold (such as a light press threshold), which is greater than a contact detection threshold, e.g., as indicated at $IT_A$ of first intensity level meter 812 and second intensity level meter 884.). In some embodiments, the fourth intensity threshold is the same as the third intensity threshold. In some embodiments, the fourth intensity threshold is the same as the second intensity threshold.

Navigating through multiple views (e.g., multiple views that include views of multiple applications and/or multiple views that include views of representations of webpages in a single application) in accordance with a determination that an input is on the back side of the device and the input meets intensity criteria enhances the operability of the device by reducing the number of inputs required to navigate through multiple views. Reducing the number of inputs required to navigate through multiple views enhances the operability of the device by making the user-device interface more efficient, which, additionally, reduces power usage and improves battery life of the device by enabling the user to use the device more quickly and efficiently. Also, navigating through the multiple views in response to detecting input on the back of the device that meets fourth response criteria enhances the operability of the device by reducing the time required to redisplay the set of one or more media controls, e.g., by allowing the user to perform the operation without changing a support position of the device (e.g., from holding the device with both hands to another support position that allows input to be provided on the front side of the device).

In some embodiments, a speed of navigating through the multiple views varies (942) in accordance with a characteristic intensity of a contact in the second input. In some embodiments, the speed is proportional to the characteristic intensity of a contact in the second input.

Varying the speed of navigating through the multiple views in accordance with input intensity enhances the operability of the device by reducing the number of inputs required to navigate at various speeds through multiple views. Reducing the number of inputs required to navigate at various speeds through multiple views enhances the operability of the device by making the user-device interface more efficient (e.g., by allowing the user to quickly make adjustments (e.g., multiple adjustments) to navigation speed during a single input), which, additionally, reduces power usage and improves battery life of the device by enabling the user to use the device more quickly and efficiently.

In some embodiments, navigating through the multiple views includes (944) changing from primarily displaying a first view of the multiple views (e.g., the first view is displayed more prominently than other views of the multiple views) to primarily displaying a second view of the multiple views (e.g., the second view is displayed more prominently than other views of the multiple views). For example, in FIG. 8L-1, view 834 of web browser application 420 is displayed more prominently displayed (e.g., is displayed with a larger size) than views 832 and 836. In FIG. 8M-1, in response to navigation input by back side contact 810, the device changes from primarily displaying view 834 to primarily displaying view 832 (e.g., view 832 of media player application 432 is displayed more prominently displayed than views 838 and 834) after views 832, 834, and 836 have shifted leftward. The device determines a location on the back side of the device at which the second input is received; in accordance with a determination that the location corresponds to a first location (e.g., the right half 726 of the back side) on the back side of the device, the second view of the multiple views is a next view relative to the first view (e.g., the second input is provided by back side contact 810, as described with regard to FIGS. 8L-8M); and in accordance with a determination that the location corresponds to a second location (e.g., the left half 724 of the back side) on the back side of the device, the second view of the multiple views is a previous view relative to the first view (e.g., the second input is provided by back side contact 842, as described with regard to FIGS. 8N-8O), or vice versa.

Navigating through the multiple views to a next view or a previous view relative to the first view (e.g., by one or more views) in accordance with a determination that an input was detected at a first location or a second location on the back side of the device, respectively, enhances the operability of the device by providing an additional control for navigating through multiple views without requiring the additional control to be displayed on the user interface. Providing the additional control for navigating through the multiple views to a next view or a previous view makes the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, navigating bi-directionally using inputs on the back of the device enhances the operability of the device by reducing the time required to navigate through multiple views, e.g., by allowing the user to navigate backward and/or forward through the applications or webpages without changing a support position of the device (e.g., from holding the device with both hands to another support position that allows input to be provided on the front side of the device).

In some embodiments (946), in response to detecting a second input while displaying the multiple views (e.g., views 832, 834, and 836, as illustrated in FIG. 8O-1): in accordance with a determination that the second input (e.g., by contact 810) is on the back side of the electronic device and the second input meets fifth response criteria, navigating from a first view (e.g., view 834) to an adjacent view (e.g., view 832) in the multiple views (e.g., changing from primarily displaying a first view 834 of the multiple views, as shown in FIG. 8L-1 to primarily displaying a previous view 832, as shown in FIG. 8M-1, or a subsequent view; in other words, moving forwards or backwards by a single view in the multiple views). In some embodiments, the fifth response criteria include a criterion that is met when the second input is a discrete press input that lasts less than a predefined time, and the discrete press input includes a contact (e.g., 810) with a characteristic intensity above an intensity threshold (e.g., an activation threshold $IT_A$ (such as a light press threshold), which is greater than a contact detection threshold $IT_0$).

In some embodiments, in response to detecting a second input while displaying the multiple views: in accordance with a determination that the second input includes a first contact (e.g., 810) on a first half (e.g., right half 736) of the back side 550 of the electronic device and a second contact (e.g., 842) on a second half (e.g., left half 734) of the back side 550 of the electronic device, and the second input meets sixth response criteria, the device replaces display (948) of the multiple views with a currently selected view of the multiple views (e.g., the device replaces the multiple views 832, 834, 836, as shown in multitasking user interface 830 of FIG. 8P-1, with currently selected view 834 (e.g., web application user interface 802), as shown in FIG. 8Q-1. In some embodiments, the sixth response criteria include a criterion that is met when a characteristic intensity of a contact in the second input is above an intensity threshold (e.g., an activation threshold $IT_A$ (such as a light press threshold), which is greater than a contact detection threshold $IT_0$).

Replacing display of multiple views with a currently selected view in response to an input that includes contact on both halves of the back side of the electronic device enhances the operability of the device by providing an additional control for selecting a view without requiring the additional control to be displayed on the user interface. Providing the additional control for selecting a view enhances the operability of the device by making the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, selecting a view using input on the back side of the device enhances the operability of the device by reducing the time required select a view, e.g., by allowing the user select a view without changing a support position of the device (e.g., from holding the device with both hands to another support position that allows input to be provided on the front side of the device).

In some embodiments (952), the first object corresponds to a portion of text on a first page of a document (e.g., a word, sentence, or paragraph, such as highlighted text 8118 shown in FIG. 8BB-1); performing the first operation includes displaying a preview that corresponds to the portion of the text (e.g., information panel 8124 including information that corresponds to highlighted text 8118, as shown in FIG. 8BD-1); performing the second operation includes selecting the portion of the text; and performing the third operation includes navigating from the first page of the document to a second page of the document. For example, in response to an increase in intensity of an input by back side contact 8122, as indicated in Figures BH-2 to BI-2, the device navigates from a first page of document 8120 (e.g., page 572 as indicated in page number indicator section 8130 of FIG. 8BH-1) to a second page of a document (e.g., page 874 as indicated in page number indicator section 8130 of FIG. 8BI-1). In some embodiments, there are multiple pages between the first page of the document and the second page of the document.

Navigating through pages of a document in accordance with a determination that an input was detected on the back side of the device enhances the operability of the device by providing an additional control for navigating through a document without requiring the additional control to be displayed on the user interface. Providing the additional control for navigating through a document makes the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, navigating through the pages of the document in response to detecting input on the back of the device enhances the operability of the device by reducing the time required to navigate through the pages of a document, e.g., by allowing the user to navigate through the pages of a document without changing a support position of the device (e.g., from holding the device with both hands to another support position that allows input to be provided on the front side of the device).

In some embodiments, navigating from the first page of the document to the second page of the document includes (954) determining a location on the back side of the electronic device at which the input is received. In accordance with a determination that the location corresponds to a first location on the back side of the electronic device (e.g., the left half 724 of the back side 550), the second page of the document is a page of the document that precedes the first page of the document; and in accordance with a determination that the location corresponds to a second location on the back side of the electronic device (e.g., the right half 726 of the back side 550), the second page of the document is a page of the document that follows the first page of the document (or vice versa). For example, in response to an input by contact 8132 detected on the left half 724 of the back side 550 of the device, the device navigates to a set of pages, as indicated by number indicator section 8130 in FIG. 8BK-1, that precede the pages shown in FIG. 8BJ-1. In response to an input by contact 8122 detected on the right half 726 of the back side 550 of the device, the device navigates to a set of pages, as indicated by number indicator section 8130 in FIG. 8BI-1, that follow the pages shown in FIG. 8BH-1.

Navigating through the pages of a document to a preceding page or a following page relative to the first view (e.g., by one or more views) in accordance with a determination that an input was detected at a first location or a second location on the back side of the device, respectively, enhances the operability of the device by providing an additional control for navigating through a document without requiring the additional control to be displayed on the user interface. Providing the additional control for navigating through a document to a following page or a preceding page makes the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, navigating bi-directionally using inputs on the back of the device enhances the operability of the device by reducing the time required to navigate through a document, e.g., by allowing the user to navigate backward and/or forward through the document without changing a support position of the device (e.g., from holding the device with both hands to another support position that allows input to be provided on the front side of the device).

In some embodiments (956), a speed of navigating from the first page of the document to the second page of the document varies in accordance with the characteristic intensity of a contact in the input. For example, as shown in FIGS. 8BL-8BO, navigation back through the pages of document 8120 occurs at an increasing rate (e.g., navigating back through increasing numbers of pages) as the intensity of contact 8132 increases. In some embodiments, the speed is proportional to the characteristic intensity of a contact in the input.

Varying the speed of navigating through the a document (e.g., by one or more pages for each input) in accordance with input intensity enhances the operability of the device by reducing the number of inputs required to navigate at various speeds through a document. Reducing the number of inputs required to navigate at various speeds through a document enhances the operability of the device by making the user-device interface more efficient (e.g., by allowing the user to quickly make adjustments (e.g., multiple adjustments) to navigation speed during a single input), which, additionally, reduces power usage and improves battery life of the device by enabling the user to use the device more quickly and efficiently.

In some embodiments, in response to detecting a second input while displaying the second page of the document (958): in accordance with a determination that the second input is on the back side 550 of the electronic device and the second input meets sixth response criteria, navigating from the second page of the document to an adjacent page (e.g., moving forwards or backwards by a single page in the document). In some embodiments, the sixth response criteria include a criterion that is met when the second input is a discrete press input that lasts less than a predefined time, and the discrete press input includes a contact with a characteristic intensity above an intensity threshold (e.g., an activation threshold $IT_A$ (such as a light press threshold), which is greater than a contact detection threshold $IT_0$). For example, in response to an input by contact 8132 that increases above an activation threshold $IT_A$ while a page of document 8120 is shown (e.g., including pages 574 and 575, as indicated by page number indicator section 8130), an adjacent page (e.g., including pages 572 and 573, as indicated by page number indicator section 813) is displayed, as described with regard to FIGS. 8BK-8BL.

In some embodiments (960), the back side of the electronic device does not have a touch-sensitive display, and the electronic device is not configured to detect a location of an input on the back side of the electronic device.

Detecting an input on the back side of a device that does not have a touch-sensitive display capable of detecting a location of an input on the back side allows an operation to be performed in response to an input at an input-sensing device that uses fewer sensors than the touch-sensitive display. Performing an operation in response to an input at an input-sensing device that uses fewer sensors than the touch-sensitive display reduces power usage and improves battery life of the device by utilizing fewer sensors for detecting input.

In some embodiments (962), at least one sensor that is configured to detect intensities of inputs on the front side of the device is also configured to detect intensities of inputs on the back side of the device. In some embodiments, pressure inputs by contacts on the back side of the device are detected by pressure sensors that also detect pressure of contacts on the touch-sensitive display.

In comparison with systems that use distinct sensors for detecting intensities of inputs on the front side of the device and on the back of the device, using the same sensor to detect intensities of inputs on the front of the device and the back side of the device reduces power usage and improves battery life of the device.

In some embodiments, in accordance with a determination that the input is detected on the back side of the electronic device and meets fourth response criteria, the device performs (964) a fourth operation, wherein: the fourth operation is different from the first operation, the second operation, and the third operation; the fourth operation changes the displayed user interface; the change in the displayed user interface does not correspond to interaction with just a single object in the plurality of objects; and the fourth response criteria include a criterion that is met when a characteristic intensity of the input is above a fourth intensity threshold. (e.g., a deep press threshold). In some embodiments, the fourth intensity threshold is the same as the second intensity threshold.

Performing an operation in response to input at the back side of the device that meets intensity criteria enhances the operability of the device by reducing the number of inputs required to perform the operation. Reducing the number of inputs required to perform the operation enhances the operability of the device by making the user-device interface more efficient (e.g., by reducing the number of controls displayed on the user interface and/or providing a greater number of functions available without increasing the number of control displayed on the user interface), which, additionally, reduces power usage and improves battery life of the device by enabling the user to use the device more quickly and efficiently. Also, performing an operation in response to detecting input on the back of the device that meets the intensity criteria enhances the operability of the device by reducing the time required to perform an operation, e.g., by allowing the user to perform the operation without changing a support position of the device (e.g., from holding the device with both hands to another support position that allows input to be provided on the front side of the device).

It should be understood that the particular order in which the operations in FIGS. 9A-9G have been described is merely exemplary and is not intended to indicate that the described order is the only order in which the operations could be performed. One of ordinary skill in the art would recognize various ways to reorder the operations described herein.

Figure 10:
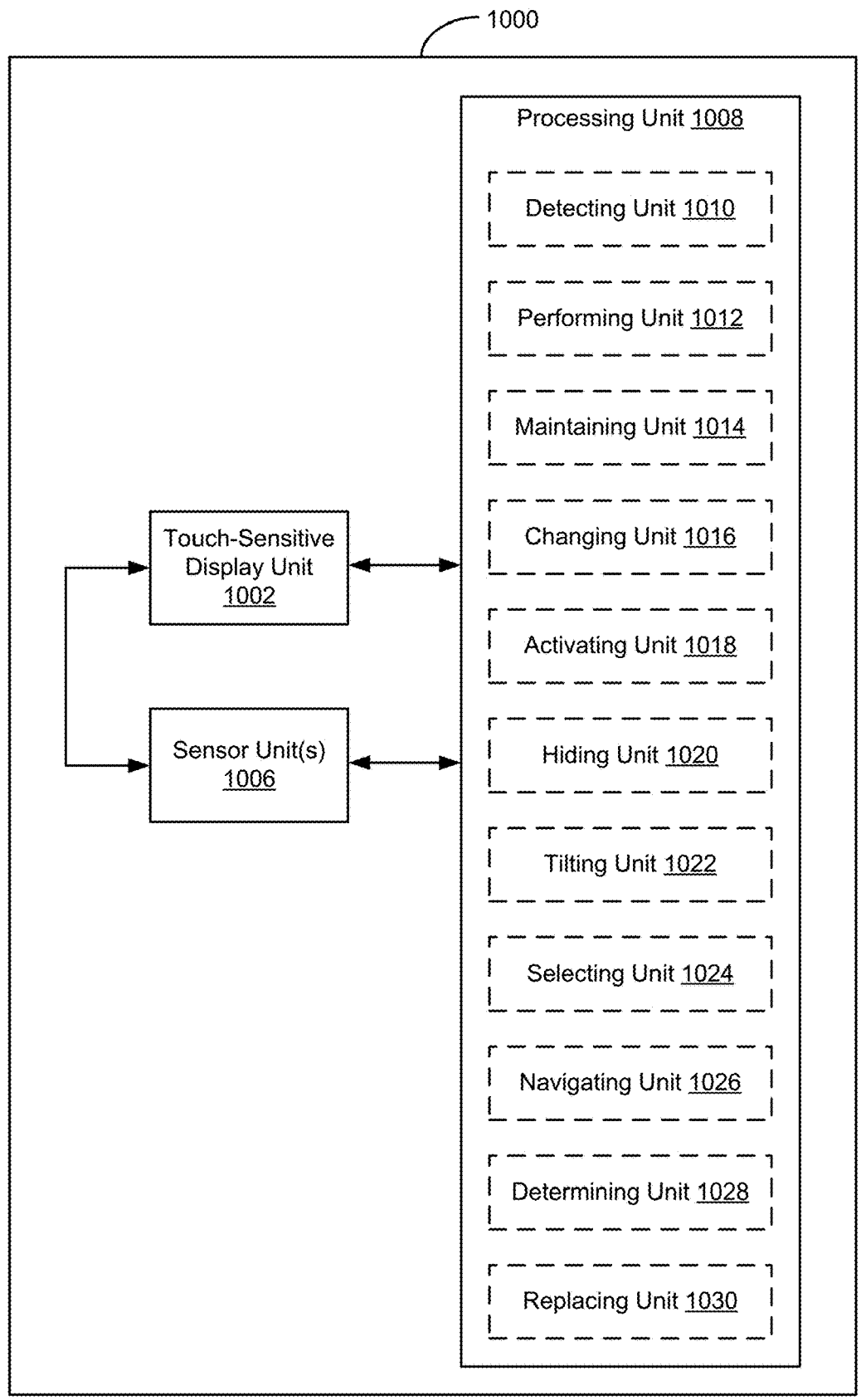
FIG. 10 is a functional block diagram of an electronic device, in accordance with some embodiments.

In accordance with some embodiments, FIG. 10 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a touch-sensitive display unit 1002 configured to display user interfaces and to detect contacts and a processing unit 1008 coupled to the touch-sensitive display unit 1002 and the one or more sensor units 1006. In some embodiments, the electronic device 1000 has a front side that includes the touch-sensitive display unit 1002 and a back side that does not include a display unit, the electronic device further includes one or more sensor units 1006 that are configured to detect intensities of inputs on the front side of the electronic device and the back side of the electronic device. In some embodiments, the processing unit includes detecting unit 1010, performing unit 1012, maintaining unit 1014, changing unit 1016, activating unit 1018, hiding unit 1020, tilting unit 1022, selecting unit 1024, navigating unit 1026, determining unit 1028, and replacing unit 1030.

The processing unit 1008 is configured to: enable display of (e.g., with the touch-sensitive display unit 1002), on the touch-sensitive display unit 1002, a user interface that includes a plurality of objects; while displaying the user interface, detect (e.g., with the detecting unit 1010) an input on a side of the electronic device; and, in response to detecting the input on the side of the electronic device: in accordance with a determination that the input is detected on the front side of the electronic device and meets first response criteria, perform (e.g., with the performing unit 1012) a first operation that corresponds to a first object, in the plurality of objects, at a location of the input, wherein the first response criteria require that a characteristic intensity of the input meet a first intensity threshold in order for the criteria to be met; in accordance with a determination that the input is detected on the front side of the electronic device and meets second response criteria, perform (e.g., with the performing unit 1012) a second operation, different from the first operation, that corresponds to the first object at the location of the input, wherein the second response criteria do not require that the characteristic intensity of the input meet the first intensity threshold for the criteria to be met; in accordance with a determination that the input is detected on the back side of the electronic device and meets third response criteria, perform (e.g., with the performing unit 1012) a third operation, wherein: the third operation is different from the first operation and the second operation; the third operation changes (e.g., with the changing unit 1016) the displayed user interface; the change in the displayed user interface does not correspond to interaction with just a single object in the plurality of objects; and the third response criteria include a criterion that is met when a characteristic intensity of the input is above a third intensity threshold; and, in accordance with a determination that the input is on the back side of the device and does not meet the third response criteria, maintain (e.g., with the maintaining unit 1014) display of the user interface that includes the plurality of objects.

In some embodiments, performing the third operation includes changing the user interface dynamically as the intensity of the input increases.

In some embodiments, performing the second operation includes activating a media control; and performing the third operation includes hiding a set of one or more media controls.

In some embodiments, the processing unit 1008 is further configured to: in response to detecting a second input while the set of one or more media controls are hidden: in accordance with a determination that the second input is on the back side of the device and the second input meets the third response criteria, redisplay (e.g., with the touch-sensitive display unit 1002) the set of one or more media controls.

In some embodiments, performing the first operation includes performing (e.g., with the performing unit 1012) a first map application operation; performing the second operation includes performing (e.g., with the performing unit 1012) a second map application operation that is different from the first map application operation; and performing the third operation includes performing (e.g., with the performing unit 1012) a third map application operation that is different from the first map application operation and the second map operation.

In some embodiments, the first object corresponds to a point of interest in a map; the first map application operation includes displaying (e.g., with the touch-sensitive display unit 1002) a menu for the map; the second map application operation includes displaying (e.g., with the touch-sensitive display unit 1002) information about the point of interest; and the third map application operation includes tilting (e.g., with the tilting unit 1022) the map.

In some embodiments, performing the first operation includes performing (e.g., with the performing unit 1012) a first keyboard operation; and performing the third operation includes performing (e.g., with the performing unit 1012) a second keyboard operation.

In some embodiments, the first object corresponds to a key in an unsplit keyboard; the first keyboard operation includes selecting (e.g., with the selecting unit 1024) the key in the unsplit keyboard; and the second keyboard operation includes displaying a split keyboard.

In some embodiments, the first object corresponds to a key in a displayed keyboard; the first keyboard operation includes selecting (e.g., with the selecting unit 1024) the key in the displayed keyboard; and the second keyboard operation includes ceasing to display (e.g., with the touch-sensitive display unit 1002) the keyboard.

In some embodiments, performing the second operation includes changing (e.g., with the changing unit 1016) an appearance of the keyboard to indicate that the electronic device is operating in a text selection mode of operation, wherein changing the appearance of the keyboard includes obscuring (e.g., with the touch-sensitive display unit 1002) an appearance of characters on keys of the keyboard.

In some embodiments, the first object corresponds to first content in a view of an application; the first operation includes displaying (e.g., with the touch-sensitive display unit 1002) a preview of second content; the second operation includes navigating (e.g., with the navigating unit 1026) from the first content to the second content in the view of the application; and the third operation includes displaying (e.g., with the touch-sensitive display unit 1002) multiple views.

In some embodiments, the multiple views include views of multiple applications.

In some embodiments, the multiple views include views of representations of webpages in a single application.

In some embodiments, the processing unit 1008 is further configured to: in response to detecting a second input while displaying the multiple views: in accordance with a determination that the second input is on the back side of the electronic device and the second input meets fourth response criteria, navigate (e.g., with the navigating unit 1026) through the multiple views.

In some embodiments, a speed of navigating through the multiple views varies in accordance with a characteristic intensity of a contact in the second input.

In some embodiments, navigating through the multiple views includes changing (e.g., with the changing unit 1016) from primarily displaying a first view of the multiple views to primarily displaying a second view of the multiple views; and the processing unit 1008 is further configured to: determine (e.g., with the determining unit 1028) a location on the back side of the device at which the second input is received; in accordance with a determination that the location corresponds to a first location on the back side of the device, the second view of the multiple views is a next view relative to the first view; and in accordance with a determination that the location corresponds to a second location on the back side of the device, the second view of the multiple views is a previous view relative to the first view.

In some embodiments, the processing unit 1008 is further configured to: in response to detecting a second input while displaying the multiple views: in accordance with a determination that the second input is on the back side of the electronic device and the second input meets fifth response criteria, navigate (e.g., with the navigating unit 1026) from a first view to an adjacent view in the multiple views.

In some embodiments, the processing unit 1008 is further configured to: in response to detecting a second input while displaying the multiple views: in accordance with a determination that the second input includes a first contact on a first half of the back side of the electronic device and a second contact on a second half of the back side of the electronic device, and the second input meets sixth response criteria, replace (e.g., with the replacing unit 1030) display of the multiple views with a currently selected view of the multiple views.

In some embodiments, the first object corresponds to a portion of text on a first page of a document; performing the first operation includes displaying (e.g., with the touch-sensitive display unit 1002) a preview that corresponds to the portion of the text; performing the second operation includes selecting (e.g., with the selecting unit 1024) the portion of the text; and performing the third operation includes navigating (e.g., with the navigating unit 1026) from the first page of the document to a second page of the document.

In some embodiments, navigating from the first page of the document to the second page of the document includes: determining (e.g., with the determining unit 1028) a location on the back side of the electronic device at which the input is received; in accordance with a determination that the location corresponds to a first location on the back side of the electronic device, the second page of the document is a page of the document that precedes the first page of the document; and in accordance with a determination that the location corresponds to a second location on the back side of the electronic device, the second page of the document is a page of the document that follows the first page of the document.

In some embodiments, a speed of navigating from the first page of the document to the second page of the document varies in accordance with the characteristic intensity of a contact in the input.

In some embodiments, the processing unit 1008 is further configured to: in response to detecting a second input while displaying the second page of the document: in accordance with a determination that the second input is on the back side of the electronic device and the second input meets sixth response criteria, navigate (e.g., with the navigating unit 1026) from the second page of the document to an adjacent page.

In some embodiments, the back side of the electronic device does not have a touch-sensitive display unit, and the electronic device is not configured to detect (e.g., with the detecting unit 1010) a location of an input on the back side of the electronic device.

In some embodiments, at least one sensor unit that is configured to detect (e.g., with the detecting unit 1010) intensities of inputs on the front side of the device is also configured to detect (e.g., with the detecting unit 1010) intensities of inputs on the back side of the device.

In some embodiments, the processing unit 1008 is further configured to: in accordance with a determination that the input is detected on the back side of the electronic device and meets fourth response criteria, perform (e.g., with the performing unit 1012) a fourth operation, wherein: the fourth operation is different from the first operation, the second operation, and the third operation; the fourth operation changes (e.g., with the changing unit 1016) the displayed user interface; the change in the displayed user interface does not correspond to interaction with just a single object in the plurality of objects; and the fourth response criteria include a criterion that is met when a characteristic intensity of the input is above a fourth intensity threshold.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9G are, optionally, implemented by components depicted in FIGS. 1A-1B or FIG. 10. For example, displaying operations 906, detecting operations 904 and 906, and performing operations 908 and 910, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions, which when executed by an electronic device with a front side that includes a touch-sensitive display and a back side that does not include a display, wherein the electronic device includes one or more sensors that are configured to detect intensities of inputs on the front side of the electronic device and the back side of the electronic device, cause the electronic device to:

display, on the touch-sensitive display, a user interface that includes a plurality of objects;

while displaying the user interface, detect an input on a side of the electronic device; and, in response to detecting the input on the side of the electronic device:

in accordance with a determination that the input is detected on the front side of the electronic device and meets first response criteria, perform a first operation that corresponds to a first object, in the plurality of objects, at a location of the input, wherein the first response criteria require that a characteristic intensity of the input meet a first intensity threshold in order for the first response criteria to be met;

in accordance with a determination that the input is detected on the front side of the electronic device and meets second response criteria, perform a second operation, different from the first operation, that corresponds to the first object at the location of the input, wherein the second response criteria do not require that the characteristic intensity of the input meet the first intensity threshold for the second response criteria to be met;

in accordance with a determination that the input is detected on the back side of the electronic device and meets third response criteria, perform a third operation, wherein:
the third operation is different from the first operation and the second operation;
the third operation changes the displayed user interface;
the change in the displayed user interface does not correspond to interaction with just a single object in the plurality of objects; and
the third response criteria include a criterion that is met when the characteristic intensity of the input is above a third intensity threshold; and, in accordance with a determination that the input is on the back side of the electronic device and does not meet the third response criteria, maintain display of the user interface that includes the plurality of objects.

2. The computer readable storage medium of claim 1, wherein performing the third operation includes changing the user interface dynamically as the characteristic intensity of the input increases.

3. The computer readable storage medium of claim 1, wherein:
performing the second operation includes activating a media control; and
performing the third operation includes hiding a set of one or more media controls.

4. The computer readable storage medium of claim 3, including instructions, which when executed by the electronic device, cause the electronic device to:
in response to detecting a second input while the set of one or more media controls are hidden:
in accordance with a determination that the second input is on the back side of the electronic device and the second input meets the third response criteria, redisplay the set of one or more media controls.

5. The computer readable storage medium of claim 1, wherein:
performing the first operation includes performing a first map application operation;
performing the second operation includes performing a second map application operation that is different from the first map application operation; and
performing the third operation includes performing a third map application operation that is different from the first map application operation and the second map application operation.

6. The computer readable storage medium of claim 5, wherein:
the first object corresponds to a point of interest in a map;
the first map application operation includes displaying a menu for the map;
the second map application operation includes displaying information about the point of interest; and
the third map application operation includes tilting the map.

7. The computer readable storage medium of claim 1, wherein:
performing the first operation includes performing a first keyboard operation; and
performing the third operation includes performing a second keyboard operation.

8. The computer readable storage medium of claim 7, wherein:
the first object corresponds to a key in an unsplit keyboard;
the first keyboard operation includes selecting the key in the unsplit keyboard; and
the second keyboard operation includes displaying a split keyboard.

9. The computer readable storage medium of claim 7, wherein:
the first object corresponds to a key in a displayed keyboard;
the first keyboard operation includes selecting the key in the displayed keyboard; and
the second keyboard operation includes ceasing to display the keyboard.

10. The computer readable storage medium of claim 7, wherein performing the second operation includes changing an appearance of a displayed keyboard to indicate that the electronic device is operating in a text selection mode of operation, wherein changing the appearance of the displayed keyboard includes obscuring an appearance of characters on keys of the displayed keyboard.

11. The computer readable storage medium of claim 1, wherein:
the first object corresponds to first content in a view of an application;
the first operation includes displaying a preview of second content;
the second operation includes navigating from the first content to the second content in the view of the application; and
the third operation includes displaying multiple views.

12. The computer readable storage medium of claim 11, wherein the multiple views include views of multiple applications.

13. The computer readable storage medium of claim 11, wherein the multiple views include views of representations of webpages in a single application.

14. The computer readable storage medium of claim 11, including instructions, which when executed by the electronic device, cause the electronic device to:
in response to detecting a second input while displaying the multiple views:
in accordance with a determination that the second input is on the back side of the electronic device and the second input meets fourth response criteria, navigate through the multiple views.

15. The computer readable storage medium of claim 14, wherein a speed of navigating through the multiple views varies in accordance with a characteristic intensity of a contact in the second input.

16. The computer readable storage medium of claim 14, wherein navigating through the multiple views includes changing from primarily displaying a first view of the multiple views to primarily displaying a second view of the multiple views; and
the one or more programs comprise instructions, which when executed by the electronic device cause the electronic device to:
determine a location on the back side of the electronic device at which the second input is received;
in accordance with a determination that the location corresponds to a first location on the back side of the electronic device, the second view of the multiple views is a next view relative to the first view; and in accordance with a determination that the location corresponds to a second location on the back side of the electronic device, the second view of the multiple views is a previous view relative to the first view.

17. The computer readable storage medium of claim 11, including instructions, which when executed by the electronic device, cause the electronic device to:

in response to detecting a second input while displaying the multiple views:

in accordance with a determination that the second input is on the back side of the electronic device and the second input meets fifth response criteria, navigate from a first view to an adjacent view in the multiple views.

18. The computer readable storage medium of claim 11, including instructions, which when executed by the electronic device, cause the electronic device to:

in response to detecting a second input while displaying the multiple views:

in accordance with a determination that the second input includes a first contact on a first half of the back side of the electronic device and a second contact on a second half of the back side of the electronic device, and the second input meets sixth response criteria, replace display of the multiple views with a currently selected view of the multiple views.

19. The computer readable storage medium of claim 1, wherein:

the first object corresponds to a portion of text on a first page of a document;

performing the first operation includes displaying a preview that corresponds to the portion of the text;

performing the second operation includes selecting the portion of the text; and performing the third operation includes navigating from the first page of the document to a second page of the document.

20. The computer readable storage medium of claim 19, wherein navigating from the first page of the document to the second page of the document includes:

determining a location on the back side of the electronic device at which the input is received;

in accordance with a determination that the location corresponds to a first location on the back side of the electronic device, the second page of the document is a page of the document that precedes the first page of the document; and in accordance with a determination that the location corresponds to a second location on the back side of the electronic device, the second page of the document is a page of the document that follows the first page of the document.

21. The computer readable storage medium of claim 19, wherein a speed of navigating from the first page of the document to the second page of the document varies in accordance with the characteristic intensity of a contact in the input.

22. The computer readable storage medium of claim 19, including instructions, which when executed by the electronic device, cause the electronic device to:

in response to detecting a second input while displaying the second page of the document:

in accordance with a determination that the second input is on the back side of the electronic device and the second input meets sixth response criteria, navigate from the second page of the document to an adjacent page.

23. The computer readable storage medium of claim 1, wherein the back side of the electronic device does not have a touch-sensitive display, and the electronic device is not configured to detect a location of an input on the back side of the electronic device.

24. The computer readable storage medium of claim 1, wherein at least one sensor that is configured to detect intensities of inputs on the front side of the electronic device is also configured to detect intensities of inputs on the back side of the electronic device.

25. The computer readable storage medium of claim 1, including instructions, which when executed by the electronic device, cause the electronic device to:

in accordance with a determination that the input is detected on the back side of the electronic device and meets fourth response criteria, perform a fourth operation, wherein:

the fourth operation is different from the first operation, the second operation, and the third operation;

the fourth operation changes the displayed user interface;

the change in the displayed user interface does not correspond to interaction with just a single object in the plurality of objects; and the fourth response criteria include a criterion that is met when the characteristic intensity of the input is above a fourth intensity threshold.

26. A method, comprising:

at an electronic device with a front side that includes a touch-sensitive display and a back side that does not include a display, wherein the electronic device includes one or more sensors that are configured to detect intensities of inputs on the front side of the electronic device and the back side of the electronic device:

displaying, on the touch-sensitive display, a user interface that includes a plurality of obj ects;

while displaying the user interface, detecting an input on a side of the electronic device; and, in response to detecting the input on the side of the electronic device:

in accordance with a determination that the input is detected on the front side of the electronic device and meets first response criteria, performing a first operation that corresponds to a first object, in the plurality of objects, at a location of the input, wherein the first response criteria require that a characteristic intensity of the input meet a first intensity threshold in order for the first response criteria to be met;

in accordance with a determination that the input is detected on the front side of the electronic device and meets second response criteria, performing a second operation, different from the first operation, that corresponds to the first object at the location of the input, wherein the second response criteria do not require that the characteristic intensity of the input meet the first intensity threshold for the second response criteria to be met;

in accordance with a determination that the input is detected on the back side of the electronic device and meets third response criteria, performing a third operation, wherein:

the third operation is different from the first operation and the second operation;

the third operation changes the displayed user interface;

the change in the displayed user interface does not correspond to interaction with just a single object in the plurality of objects; and the third response criteria include a criterion that is met when the characteristic intensity of the input is above a third intensity threshold; and, in accordance with a determination that the input is on the back side of the electronic device and does not meet the third response criteria, maintaining display of the user interface that includes the plurality of objects.

27. An electronic device, comprising:
a front side that includes a touch-sensitive display;
a back side that does not include a display;
one or more sensors to detect intensities of inputs on the front side of the electronic device and the back side of the electronic device;
one or more processors;
memory; and
one or more programs, wherein the one or more programs are stored in the memory and configured to be executed by the one or more processors, the one or more programs including instructions for:
displaying, on the touch-sensitive display, a user interface that includes a plurality of objects;
while displaying the user interface, detecting an input on a side of the electronic device; and,
in response to detecting the input on the side of the electronic device:
in accordance with a determination that the input is detected on the front side of the electronic device and meets first response criteria, performing a first operation that corresponds to a first object, in the plurality of objects, at a location of the input, wherein the first response criteria require that a characteristic intensity of the input meet a first intensity threshold in order for the first response criteria to be met;
in accordance with a determination that the input is detected on the front side of the electronic device and meets second response criteria, performing a second operation, different from the first operation, that corresponds to the first object at the location of the input, wherein the second response criteria do not require that the characteristic intensity of the input meet the first intensity threshold for the second response criteria to be met;
in accordance with a determination that the input is detected on the back side of the electronic device and meets third response criteria, performing a third operation, wherein:
the third operation is different from the first operation and the second operation;
the third operation changes the displayed user interface;
the change in the displayed user interface does not correspond to interaction with just a single object in the plurality of objects; and
the third response criteria include a criterion that is met when the characteristic intensity of the input is above a third intensity threshold; and,
in accordance with a determination that the input is on the back side of the electronic device and does not meet the third response criteria, maintaining display of the user interface that includes the plurality of objects.

28. The method of claim 26, wherein performing the third operation includes changing the user interface dynamically as the characteristic intensity of the input increases.

29. The method of claim 26, wherein:
performing the second operation includes activating a media control; and
performing the third operation includes hiding a set of one or more media controls.

30. The method of claim 29, including:
in response to detecting a second input while the set of one or more media controls are hidden:
in accordance with a determination that the second input is on the back side of the electronic device and the second input meets the third response criteria, redisplaying the set of one or more media controls.

31. The method of claim 26, wherein:
performing the first operation includes performing a first map application operation;
performing the second operation includes performing a second map application operation that is different from the first map application operation; and
performing the third operation includes performing a third map application operation that is different from the first map application operation and the second map application operation.

32. The method of claim 31, wherein:
the first object corresponds to a point of interest in a map;
the first map application operation includes displaying a menu for the map;
the second map application operation includes displaying information about the point of interest; and
the third map application operation includes tilting the map.

33. The method of claim 26, wherein:
performing the first operation includes performing a first keyboard operation; and
performing the third operation includes performing a second keyboard operation.

34. The method of claim 26, wherein:
the first object corresponds to first content in a view of an application;
the first operation includes displaying a preview of second content;
the second operation includes navigating from the first content to the second content in the view of the application; and
the third operation includes displaying multiple views.

35. The method of claim 26, wherein:
the first object corresponds to a portion of text on a first page of a document;
performing the first operation includes displaying a preview that corresponds to the portion of the text;
performing the second operation includes selecting the portion of the text; and
performing the third operation includes navigating from the first page of the document to a second page of the document.

36. The method of claim 26, wherein the back side of the electronic device does not have a touch-sensitive display, and the electronic device is not configured to detect a location of an input on the back side of the electronic device.

37. The method of claim 26, wherein at least one sensor that is configured to detect intensities of inputs on the front side of the electronic device is also configured to detect intensities of inputs on the back side of the electronic device.

38. The method of claim 26, including:
in accordance with a determination that the input is detected on the back side of the electronic device and meets fourth response criteria, performing a fourth operation, wherein:
the fourth operation is different from the first operation, the second operation, and the third operation;
the fourth operation changes the displayed user interface;
the change in the displayed user interface does not correspond to interaction with just a single object in the plurality of objects; and
the fourth response criteria include a criterion that is met when the characteristic intensity of the input is above a fourth intensity threshold.

39. The electronic device of claim 27, wherein performing the third operation includes changing the user interface dynamically as the characteristic intensity of the input increases.

40. The electronic device of claim 27, wherein:
performing the second operation includes activating a media control; and
performing the third operation includes hiding a set of one or more media controls.

41. The electronic device of claim 40, wherein the one or more programs include instructions for:
in response to detecting a second input while the set of one or more media controls are hidden:
in accordance with a determination that the second input is on the back side of the electronic device and the second input meets the third response criteria, redisplaying the set of one or more media controls.

42. The electronic device of claim 27, wherein:
performing the first operation includes performing a first map application operation;
performing the second operation includes performing a second map application operation that is different from the first map application operation; and
performing the third operation includes performing a third map application operation that is different from the first map application operation and the second map application operation.

43. The electronic device of claim 42, wherein:
the first object corresponds to a point of interest in a map;
the first map application operation includes displaying a menu for the map;
the second map application operation includes displaying information about the point of interest; and
the third map application operation includes tilting the map.

44. The electronic device of claim 27, wherein:
performing the first operation includes performing a first keyboard operation; and
performing the third operation includes performing a second keyboard operation.

45. The electronic device of claim 27, wherein:
the first object corresponds to first content in a view of an application;
the first operation includes displaying a preview of second content;
the second operation includes navigating from the first content to the second content in the view of the application; and
the third operation includes displaying multiple views.

46. The electronic device of claim 27, wherein:
the first object corresponds to a portion of text on a first page of a document;
performing the first operation includes displaying a preview that corresponds to the portion of the text;
performing the second operation includes selecting the portion of the text; and
performing the third operation includes navigating from the first page of the document to a second page of the document.

47. The electronic device of claim 27, wherein the back side of the electronic device does not have a touch-sensitive display, and the electronic device is not configured to detect a location of an input on the back side of the electronic device.

48. The electronic device of claim 27, wherein at least one sensor that is configured to detect intensities of inputs on the front side of the electronic device is also configured to detect intensities of inputs on the back side of the electronic device.

49. The electronic device of claim 27, wherein the one or more programs include instructions for:
in accordance with a determination that the input is detected on the back side of the electronic device and meets fourth response criteria, performing a fourth operation, wherein:
the fourth operation is different from the first operation, the second operation, and the third operation;
the fourth operation changes the displayed user interface;
the change in the displayed user interface does not correspond to interaction with just a single object in the plurality of objects; and
the fourth response criteria include a criterion that is met when the characteristic intensity of the input is above a fourth intensity threshold.

* * * * *

UNITED STATES PATENT AND TRADEMARK OFFICE
CERTIFICATE OF CORRECTION

PATENT NO. : 10,691,330 B2
APPLICATION NO. : 15/691705
DATED : June 23, 2020
INVENTOR(S) : Abdollahian et al.

Page 1 of 1

It is certified that error appears in the above-identified patent and that said Letters Patent is hereby corrected as shown below:

In the Claims

Claim 26, Column 62, Line 40, please delete "plurality of obj ects;" and insert --plurality of objects;--.

Signed and Sealed this
Eleventh Day of August, 2020

Andrei Iancu
*Director of the United States Patent and Trademark Office*